(12) United States Patent
Jinzaki et al.

(10) Patent No.: US 7,746,906 B2
(45) Date of Patent: Jun. 29, 2010

(54) DATA COMMUNICATIONS SYSTEM

(75) Inventors: Akira Jinzaki, Kawasaki (JP); Hisashi Koga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 11/456,237

(22) Filed: Jul. 10, 2006

(65) Prior Publication Data

US 2006/0239296 A1    Oct. 26, 2006

Related U.S. Application Data

(62) Division of application No. 09/767,259, filed on Jan. 23, 2001, now Pat. No. 7,133,407.

(30) Foreign Application Priority Data

| Jan. 25, 2000 | (JP) | ............................ 2000-015504 |
| Feb. 16, 2000 | (JP) | ............................ 2000-038514 |
| Feb. 25, 2000 | (JP) | ............................ 2000-049775 |
| Nov. 27, 2000 | (JP) | ............................ 2000-359579 |

(51) Int. Cl.
*H04J 3/16* (2006.01)
*H04J 3/06* (2006.01)

(52) U.S. Cl. ...................... 370/503; 370/519

(58) Field of Classification Search ................ 370/350, 370/470, 474, 473, 503, 509, 512, 394, 412; 714/776, 713, 747; 710/30
See application file for complete search history.

(56) References Cited

U.S. PATENT DOCUMENTS 5,602,992 A * 2/1997 Danneels .................... 709/248
5,640,388 A * 6/1997 Woodhead et al. .......... 370/468
5,802,051 A * 9/1998 Petersen et al. ........ 370/395.42
5,923,902 A    7/1999 Inagaki
6,134,246 A * 10/2000 Cai et al. .................... 370/474
6,728,924 B1 * 4/2004 Lou et al. .................... 714/776

(Continued)

FOREIGN PATENT DOCUMENTS

JP        09-055754        2/1997

(Continued)

OTHER PUBLICATIONS

Koga, Jinzaki, "DV stream Transmission over World Wide Internet by Video Frame Recognition", IEEE Packet Video Conference, May 1-2, 2000, XP-002243006, Italy.

(Continued)

*Primary Examiner*—Hanh Nguyen
(74) *Attorney, Agent, or Firm*—Staas & Halsey LLP

(57) ABSTRACT

A transmitting side relay device comprises additional information generation means for generating additional information about the characteristics of a data stream, packet generation means for generating a packet by attaching additional information to each transfer unit and transmitting means for transmitting the packet to the third network according to prescribed procedures. A receiving side relay device comprises separation means for breaking down the received packet into additional information and a transfer unit, analysis means for analyzing the additional information, reproduction means for locating information included in a corresponding transfer unit in an appropriate position and reproducing the data stream and output means for outputting the data stream reproduced by the reproduction means to the second network.

4 Claims, 81 Drawing Sheets

U.S. PATENT DOCUMENTS

| | | | | |
|---|---|---|---|---|
| 6,829,248 | B1 * | 12/2004 | Metzger et al. | 370/466 |
| 6,988,238 | B1 * | 1/2006 | Kovacevic et al. | 714/799 |
| RE39,454 | E * | 1/2007 | Cantoni et al. | 370/473 |

FOREIGN PATENT DOCUMENTS

| | | |
|---|---|---|
| JP | 09-233098 | 9/1997 |
| JP | 10-178637 | 6/1998 |
| JP | 2000-216815 | 8/2000 |

OTHER PUBLICATIONS

Ogawa, A et al., "Design and Implementation of DV stream Stream over Internet", Internet Workshop, 1999. IWS 99 Osaka, Japan, Feb. 18-20, 1999, Piscataway, NJ, USA, IEEE.

RWCP, "Press Release on Detailed Technology of "Life" opera by Sakamoto", RWC News on "Life" Opera Technics, Online!, Sep. 1999, XP002243007.

-& RWCP: "Information: Life", RWC News, Online!, vol. 7, Nov. 15, 1999, XP002243008.

-& Jkinzaki, Koga, Murai et al., "Construction of Virtual Private Distributed System by Comet", RWC 2000 Symposium, Jan. 17-19, 2000, pp. 1-3, XP002243009.

Keio University, Wisconsin University, "Remote lecture from Wisconsin University", APAN Asia Pacific Advanced Network, Online!, Dec. 19, 1999, XP002243016.

Kobayashi, Ogawa et al., "RTP Payload Format for DV Format Video", IETF Draft Audio Video Group, Online!, Oct. 18, 1999, XP 002243017.

Murai, Landweber, "Distance Learning and This Project", Wisconsin University, Online!, Nov. 19, 1999, XP002243015.

Saito, Takabatake et al., "IP Over ISO1394 and AV over ISO1394 Controlled by an Extension of MCAP", IETF Draft, Online!, Sep. 1999, XP002243018.

D6: XP2229836 RFC 1889 Jan. 1996 RTP: A Transport Protocol for real time applications pp. 1 to 38 (available from www.ietf.org).

D7: XP2144280 RFC 2038 Oct. 1996 RTP payload format for MPEG1/MPEG2 Video.

Schulzrinne et al., "Issues in Designing a Transport Protocol for Audio and Video Conferences other Multi participant Real-Time Applications, draft-ietf-avt-issues-01.txt, available from http://tools.ietf.org/wg/avt/draft-ietf-avt-issues/draft-ietf-avt-issues-01.txt", published Oct. 20, 1993.

Kobayashi, Ogawa et al., "RTP payload format for DV format video", Oct. 18, 1999.

European Search Report dated Jun. 23, 2004, Appln No. 04009282.7-2416.

European Search Report dated Jun. 23, 2004, Appln No. 04009283.5-2416.

European Search Report dated Apr. 28, 2004, Appln No. 01 300 661.4.

European Search Report dated Jul. 22, 2004, Appln No. 04009281.

European Office Action dated Nov. 18, 2004.

Office Action dated Feb. 18, 2005 for corresponding European Application No. 04 009 281.9.

Office Action dated Feb. 18, 2005 for corresponding European Application No. 04 009 283.5.

Office Action dated Feb. 18, 2005 for corresponding European Application No. 04 009 282.7.

Office Action for corresponding European Application No. 01 300 661.4 dated Apr. 21, 2005.

Office Action for corresponding European Application No. 04 009 283.5 dated Sep. 16, 2005.

Office Action for corresponding European Application No. 01 300 661.4 dated Sep. 15, 2005.

Japanese Office Action issued on Jun. 23, 2009 in corresponding Japanese Patent Application No. 2000-359579.

Notice of Allowance issued on Jul. 3, 2006 in parent patent application; U.S. Appl. No. 09/767,259.

Notice of Allowance mailed Jul. 3, 2006 from U.S. Patent 7,133,407.

European Search Report mailed Nov. 13, 2009 in corresponding European Application No. 04 009 282.7-2416.

P. Johansson, "IEEE 1394 Asynchronous Streams, " IEEE, Nov. 1998.

B. Gleeson, et al., "A Framework for IP Based Virtual Private Networks, " Nov. 1999.

* cited by examiner

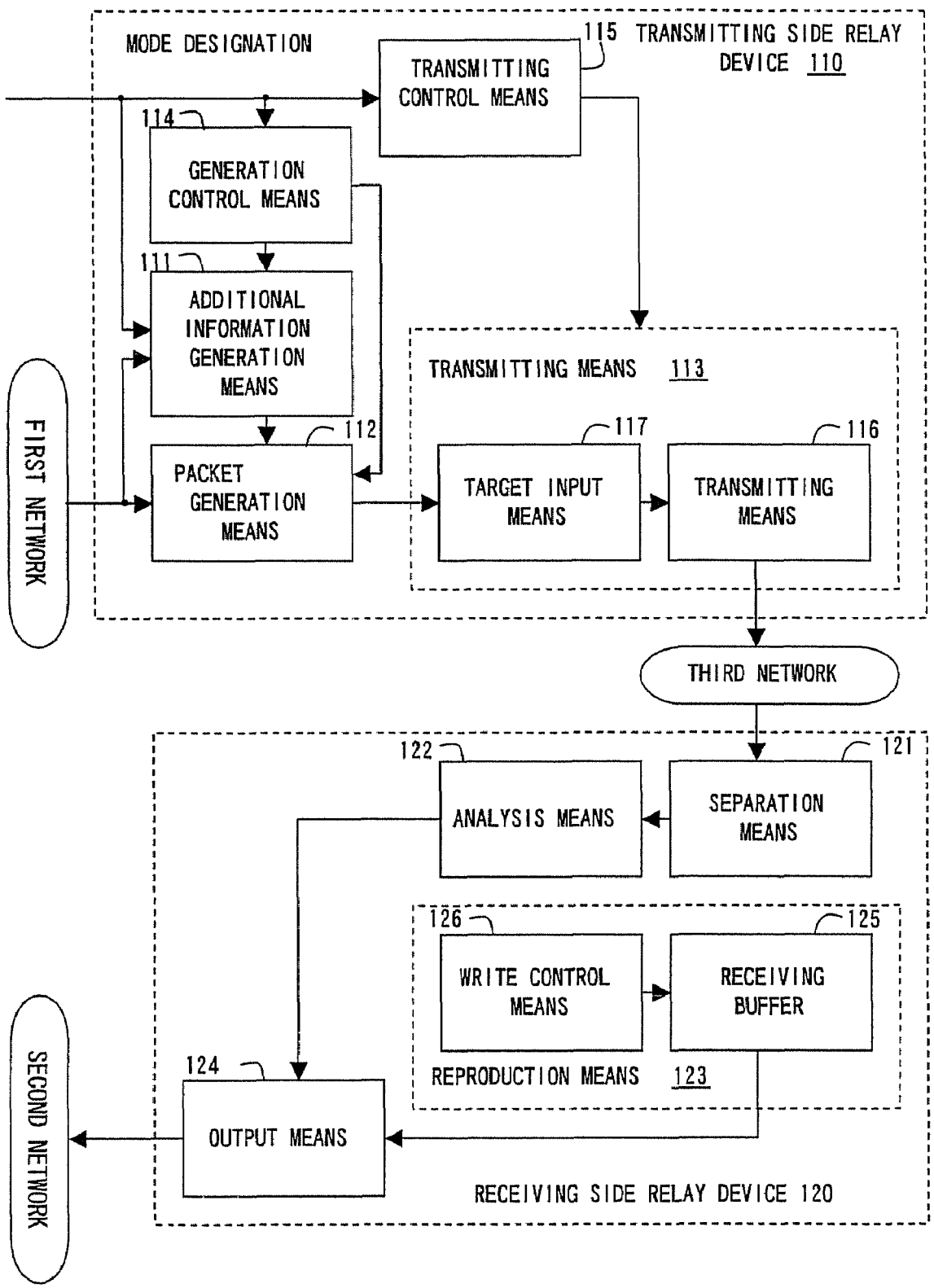
F I G. 7

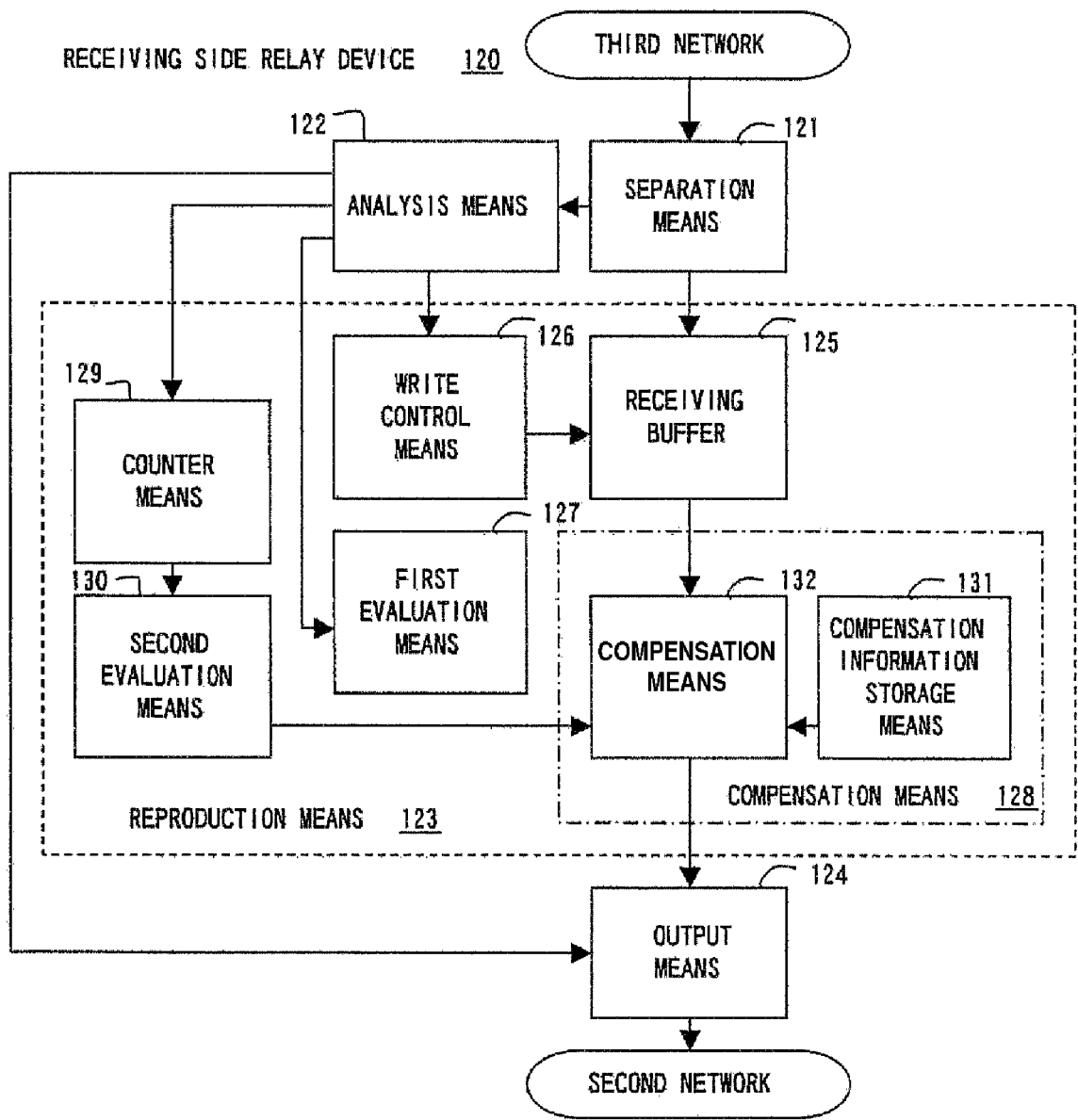
F I G. 8

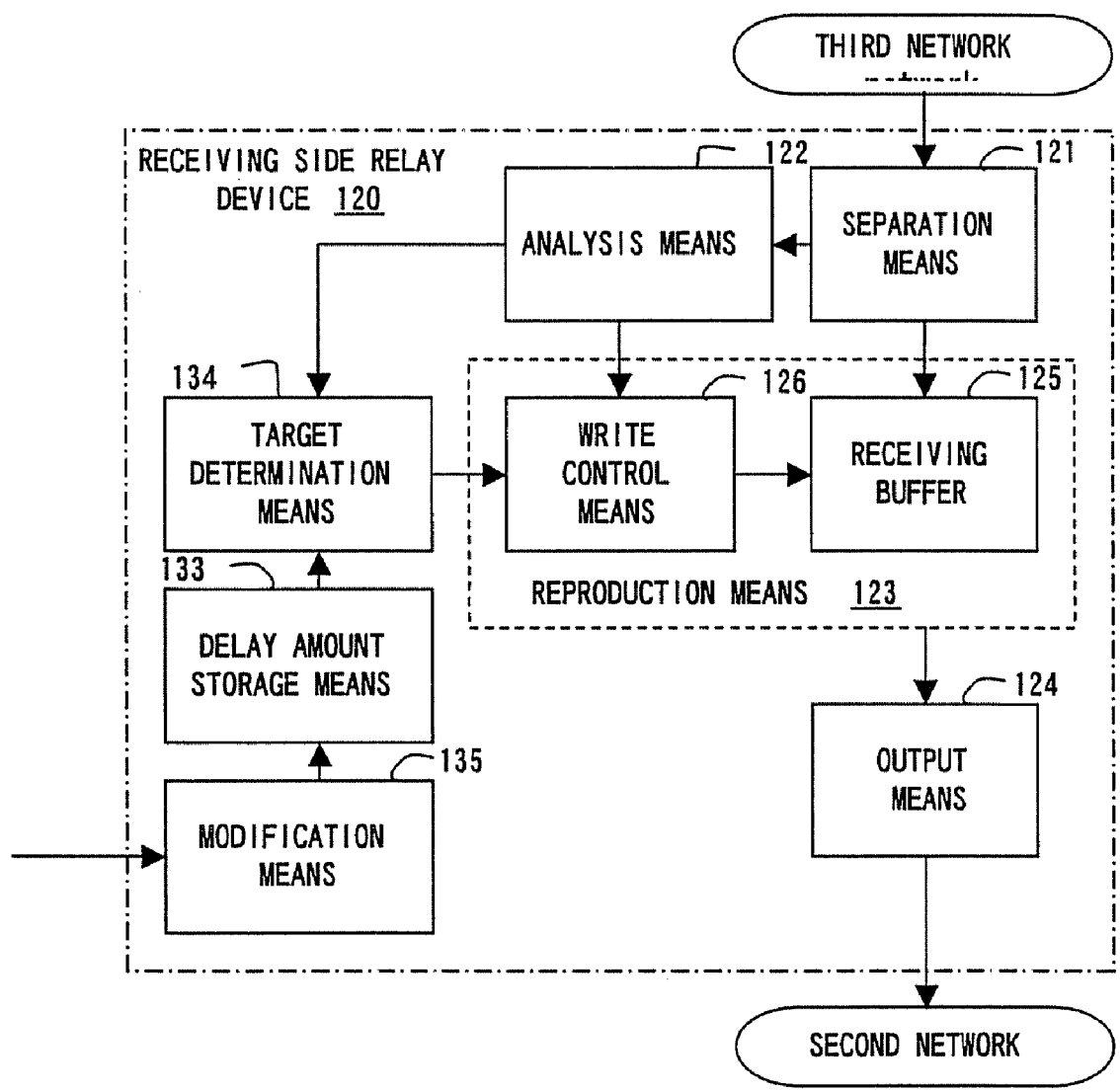
F I G. 9

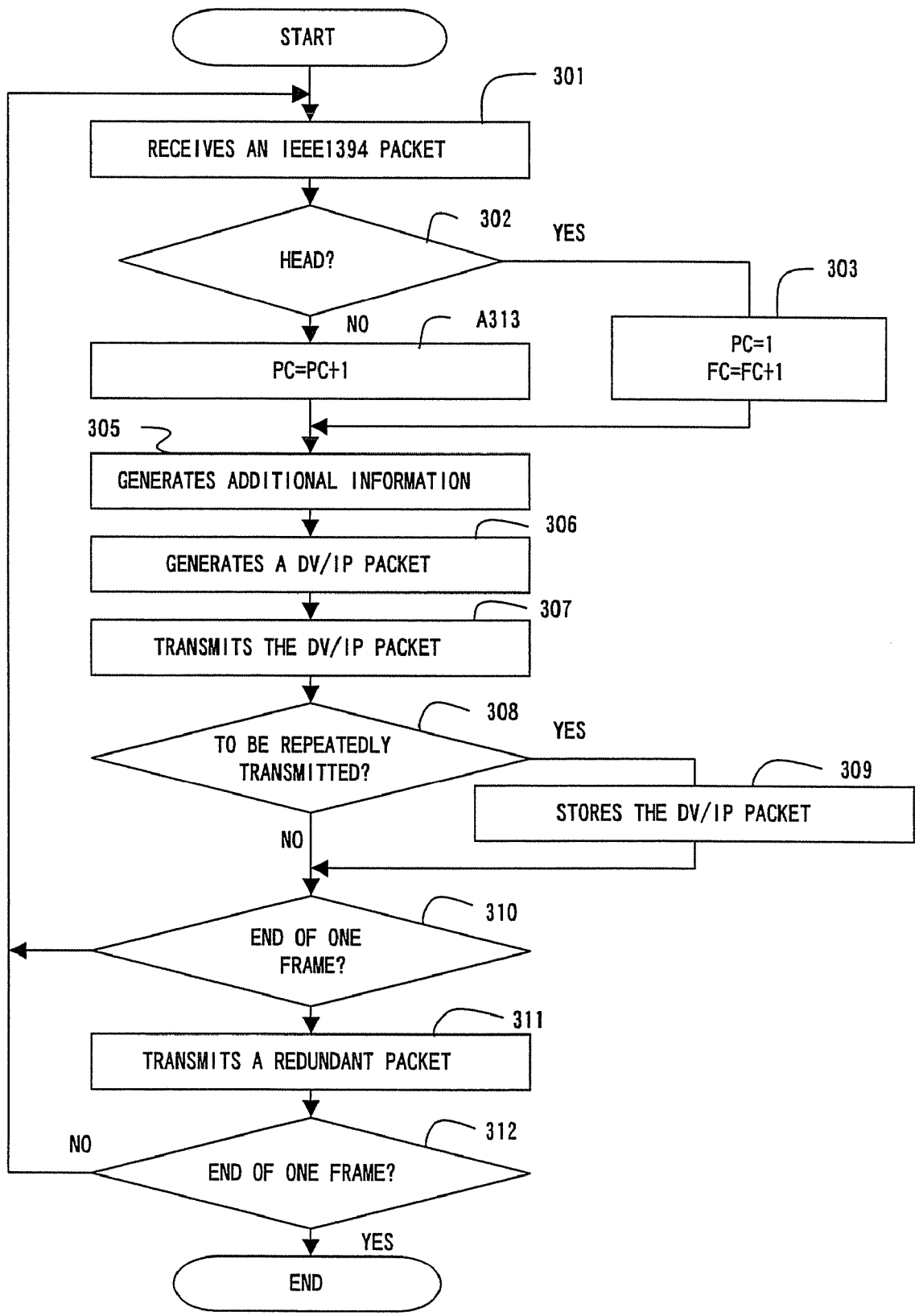
F I G. 14

| BLOCK No. | FRAME(0) | FRAME(1) | ... | FRAME(K) |
|---|---|---|---|---|
| 0 | $DV_{0,0}$ | $DV_{1,0}$ | ... | $DV_{K,0}$ |
| 1 | $DV_{0,1}$ | $DV_{1,1}$ | ... | $DV_{K,1}$ |
| 2 | $DV_{0,2}$ | $DV_{1,2}$ | ... | $DV_{K,2}$ |
| ⋮ | ⋮ | ⋮ | ⋮ | ⋮ |
| 249 | $DV_{0,249}$ | $DV_{1,249}$ | ... | $DV_{K,249}$ |

FIG. 17A

| | FRAME(0) | FRAME(1) | ... | FRAME(K) |
|---|---|---|---|---|
| RECEIVING BLOCK | RBC0 | RBC1 | ... | RBCK |
| FRAME HEADER | FHC0 | FHC1 | ... | FHCK |
| AUDIO BLOCK | ABC0 | ABC1 | ... | ABCK |
| VIDEO BLOCK | VBC0 | VBC1 | ... | VBCK |

FIG. 17B

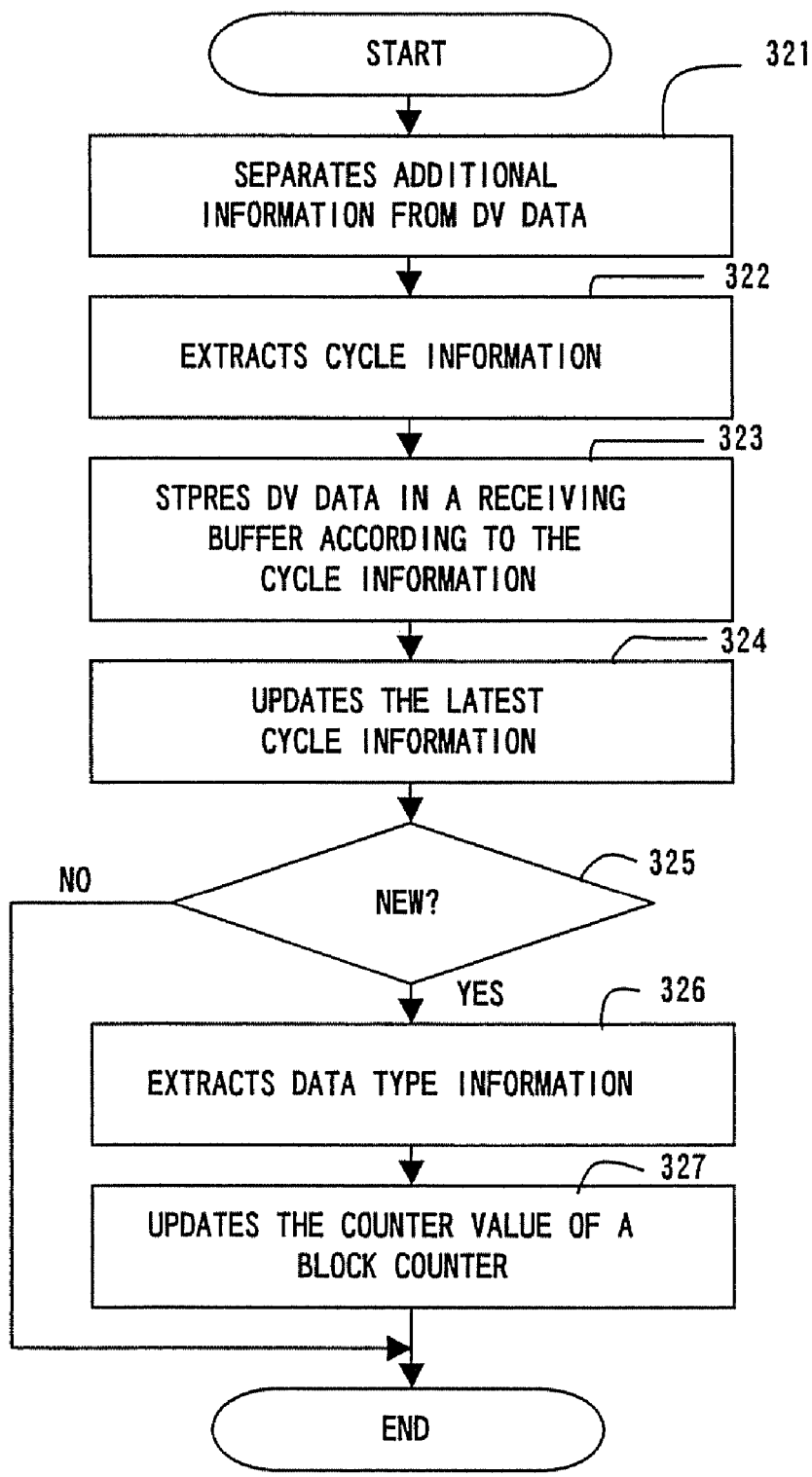
F I G. 1 8 A

| FIRST BUFFER | SECOND BUFFER |
|---|---|
| $DV_{(n-1, 0)}$ | $DV_{(n, 0)}$ |
| $DV_{(n-1, 1)}$ | $DV_{(n, 1)}$ |
| $DV_{(n-1, 2)}$ | LOST |
| ⋮ | ⋮ |
| $DV_{(n-1, 249)}$ | $DV_{(n, 249)}$ |

| PACKET No. | TRANSMITTING DATA |
|---|---|
| 0 | $DV_{(n, 0)}$ |
| 1 | $DV_{(n, 1)}$ |
| 2 | $DV_{(n-1, 2)}$ |
| ⋮ | ⋮ |
| 249 | $DV_{(n, 249)}$ |

FIG. 19A

| PACKET No. | FIRST BUFFER | SECOND BUFFER |
|---|---|---|
| 0 | $FH_{n-1}$ | $FH_n$ |
| 1 | $a_{n-1} V_{n-1} V_{n-1} V_{n-1} V_{n-1} V_{n-1}$ | $a_n V_n V_n V_n V_n V_n$ |
| 2 | $V_{n-1} V_{n-1} V_{n-1} V_{n-1} V_{n-1} V_{n-1}$ | LOST |
| 3 | $V_{n-1} V_{n-1} V_{n-1} V_{n-1} a_{n-1} V_{n-1}$ | $V_n V_n V_n V_n a_n V_n$ |
| ⋮ | ⋮ | ⋮ |
| 249 | $V_{n-1} V_{n-1} V_{n-1} V_{n-1} V_{n-1} V_{n-1}$ | LOST |

FIG. 19B

| PACKET No. | TRANSMITTING DATA |
|---|---|
| 0 | $FH_{n-1}$ |
| 1 | $a_n V_{n-1} V_{n-1} V_{n-1} V_{n-1} V_{n-1}$ |
| 2 | $V_{n-1} V_{n-1} V_{n-1} V_{n-1} V_{n-1} V_{n-1}$ |
| 3 | $V_{n-1} V_{n-1} V_{n-1} V_{n-1} a_n V_{n-1}$ |
| ⋮ | ⋮ |
| 249 | $V_{n-1} V_{n-1} V_{n-1} V_{n-1} V_{n-1} V_{n-1}$ |

FIG. 19C

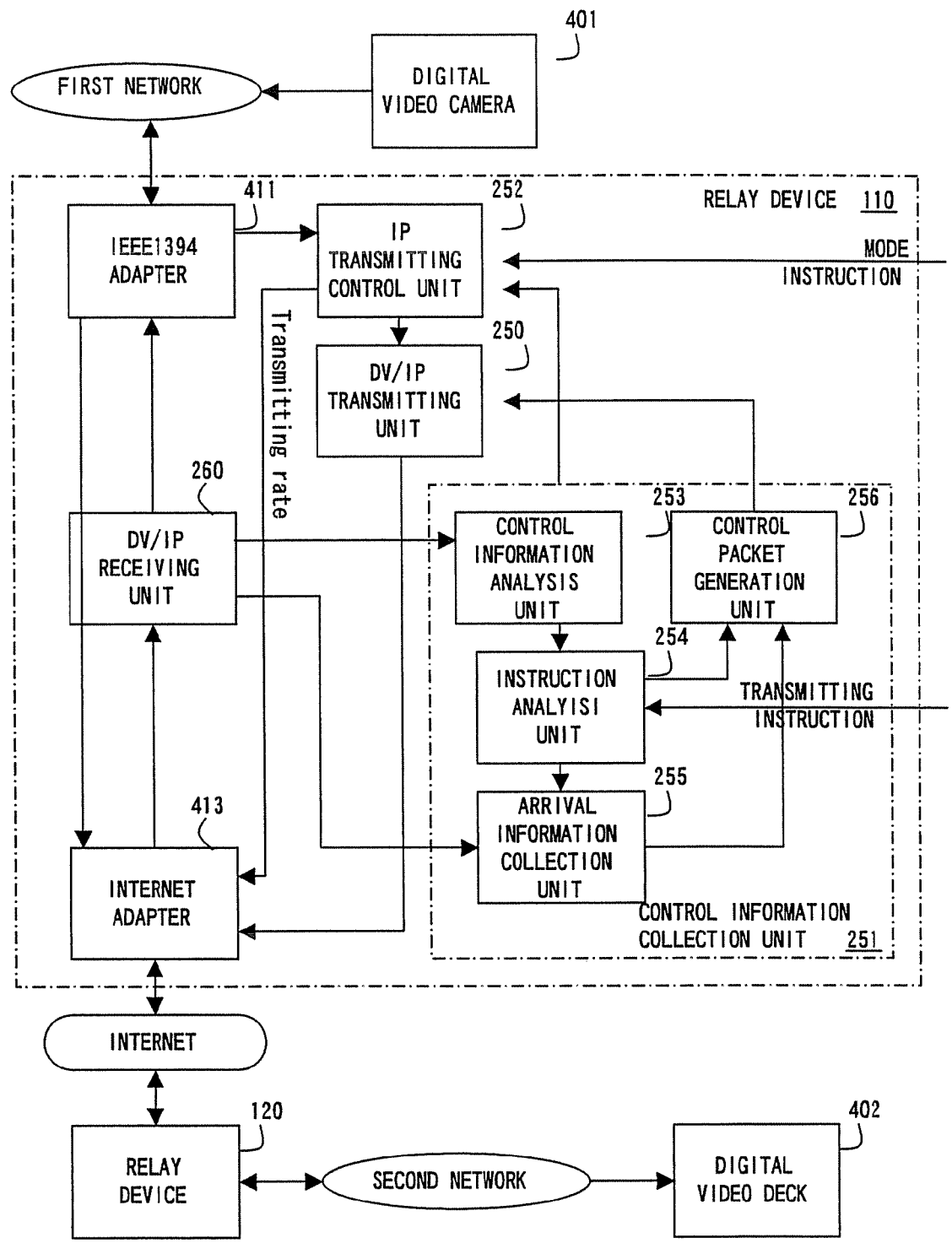
F I G. 20

| PACKET No. | ONLY VOICE | ONLY PICTURE |
|---|---|---|
| 0 | F H | F H |
| 1 | a v v v v v | – v v v v v |
| 2 | – – – – – – | v v v v v v |
| 3 | v v v v a v | v v v v – v |
| ⋮ | ⋮ | ⋮ |
| 249 | – – – – – – | v v v v v v |

FIG. 26A

| PACKET No. | FIRST BUFFER | SECOND BUFFER |
|---|---|---|
| 0 | $FH_{n-1}$ | $FH_n$ |
| 1 | $a_{n-1} v_{n-1} v_{n-1} v_{n-1} v_{n-1} v_{n-1}$ | $a_n$ – – – – – |
| 2 | $v_{n-1} v_{n-1} v_{n-1} v_{n-1} v_{n-1} v_{n-1}$ | – – – – – – |
| 3 | $v_{n-1} v_{n-1} v_{n-1} v_{n-1} a_{n-1} v_{n-1}$ | – – – – $a_n$ – |
| ⋮ | ⋮ | ⋮ |
| 249 | $v_{n-1} v_{n-1} v_{n-1} v_{n-1} v_{n-1} v_{n-1}$ | – – – – – – |

FIG. 26B

| PACKET No. | TRANSMITTING DATA |
|---|---|
| 0 | $FH_{n-1}$ |
| 1 | $a_n\ v_{n-1} v_{n-1} v_{n-1} v_{n-1} v_{n-1}$ |
| 2 | $v_{n-1} v_{n-1} v_{n-1} v_{n-1} v_{n-1} v_{n-1}$ |
| 3 | $v_{n-1} v_{n-1} v_{n-1} v_{n-1} a_n\ v_{n-1}$ |
| ⋮ | ⋮ |
| 249 | $v_{n-1} v_{n-1} v_{n-1} v_{n-1} v_{n-1} v_{n-1}$ |

FIG. 26C

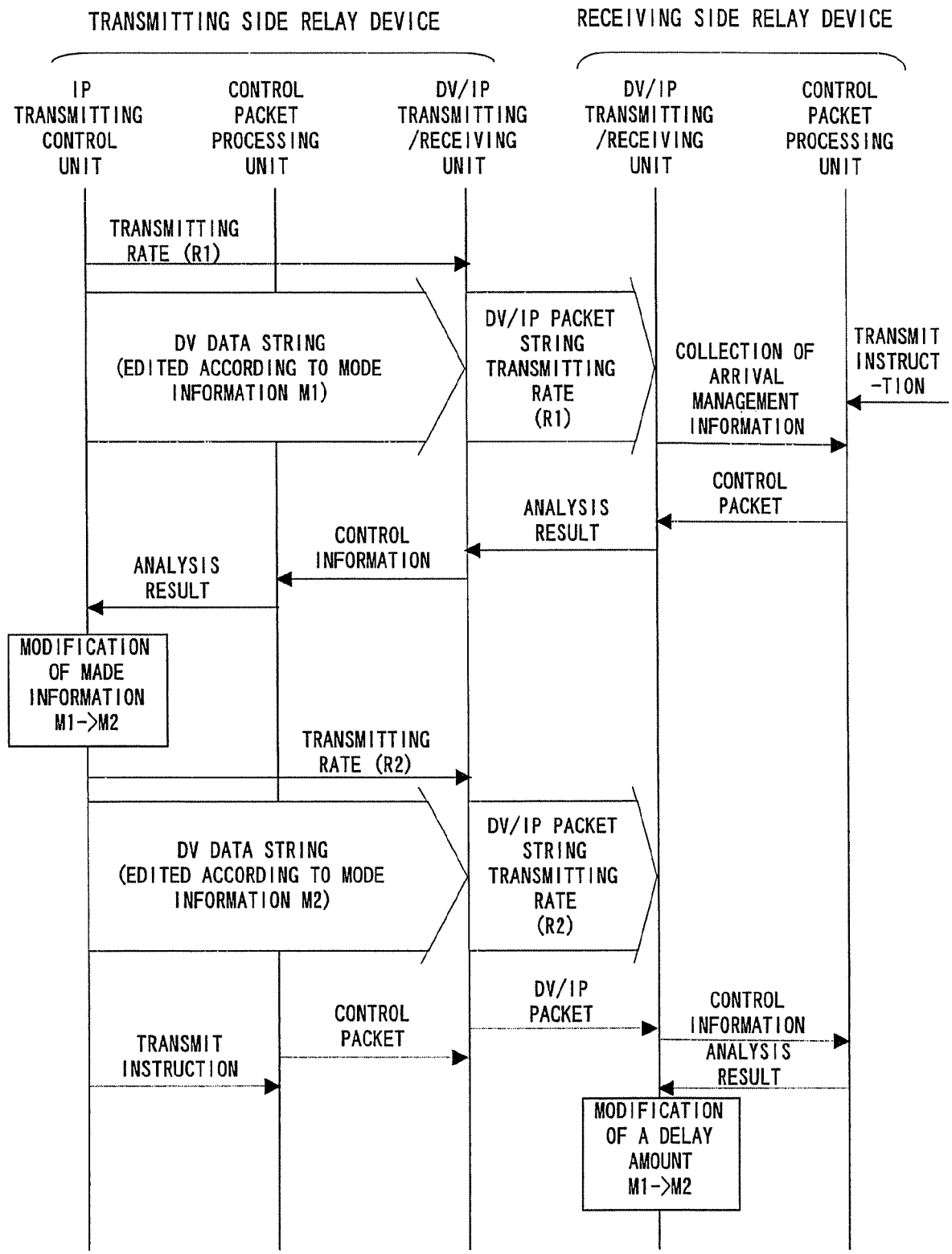
F I G. 2 7

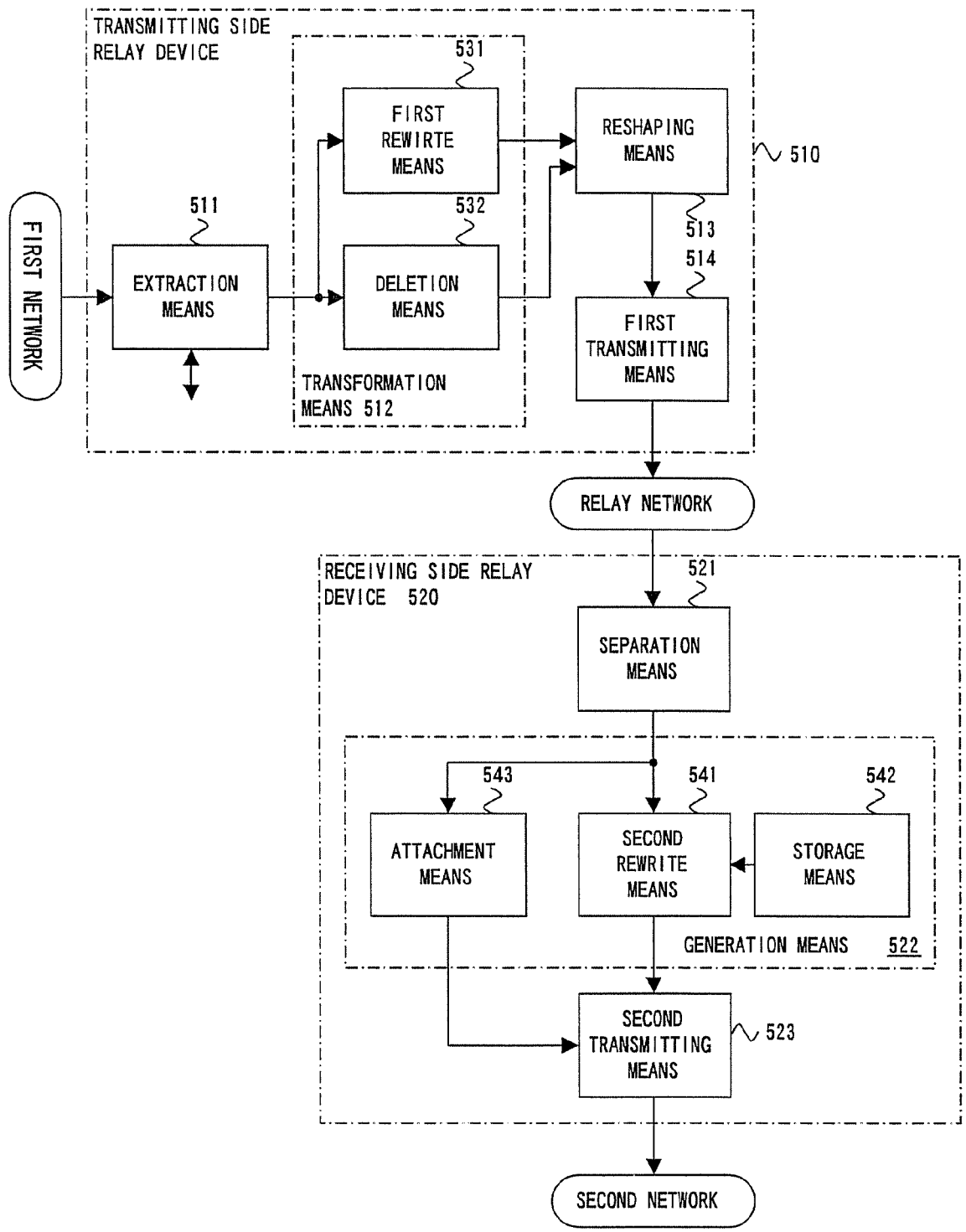
F I G. 2 8

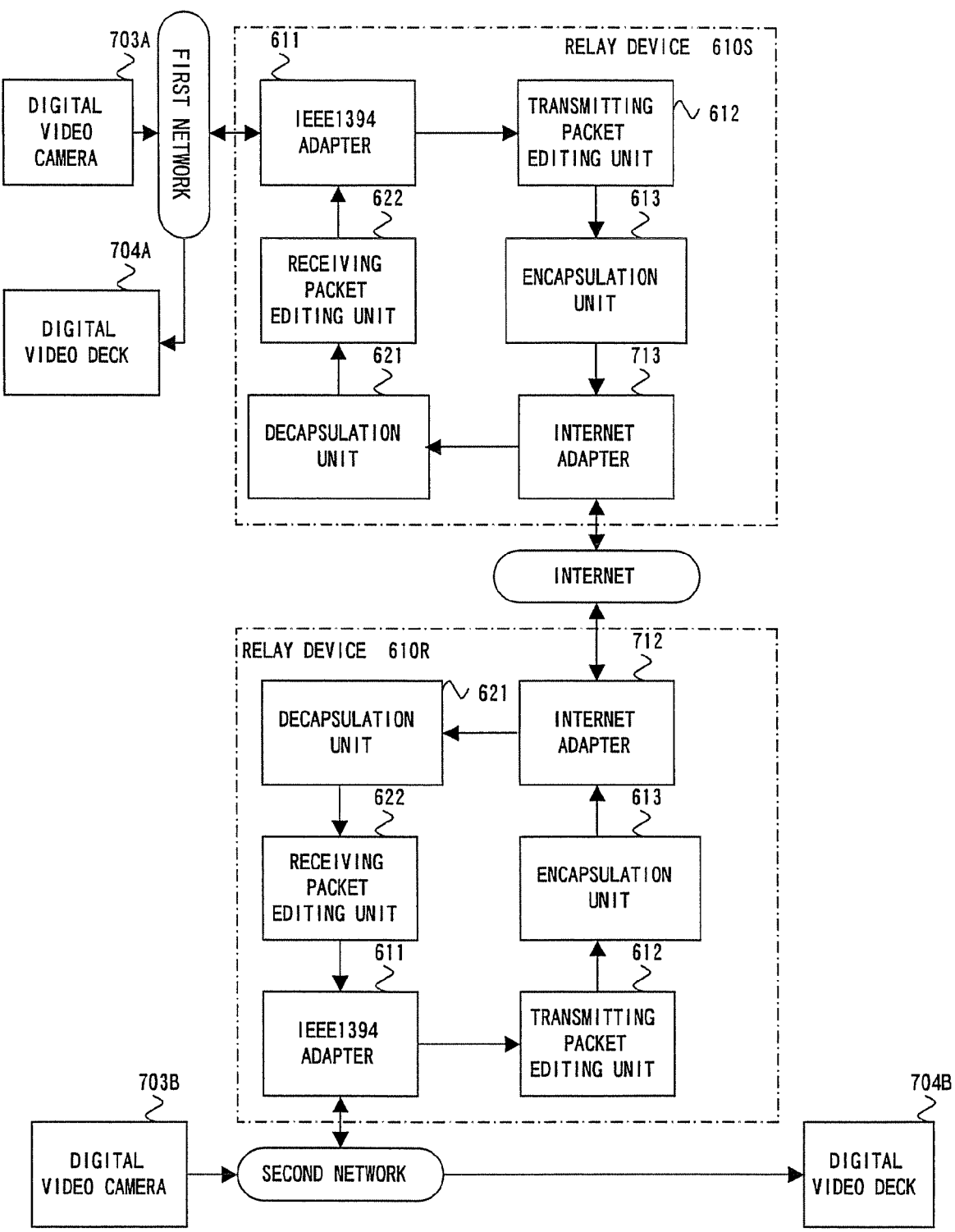
F I G. 31

| TRANSMITTING SIDE CHANNEL ID | RECEIVING SIDE CHANNEL ID |
|---|---|
| S 1 | R 1 |
| ⋮ | ⋮ |

FIG. 34A

| TRANSMITTING SIDE CHANNEL ID | NETWORK ADDRESS | RECEIVING SIDE CHANNEL ID |
|---|---|---|
| S 1 | N 1 | R 1 |
| S 1 | N 2 | R 2 |
| S 2 | N 1 | R 3 |
| ⋮ | ⋮ | ⋮ |

FIG. 34B

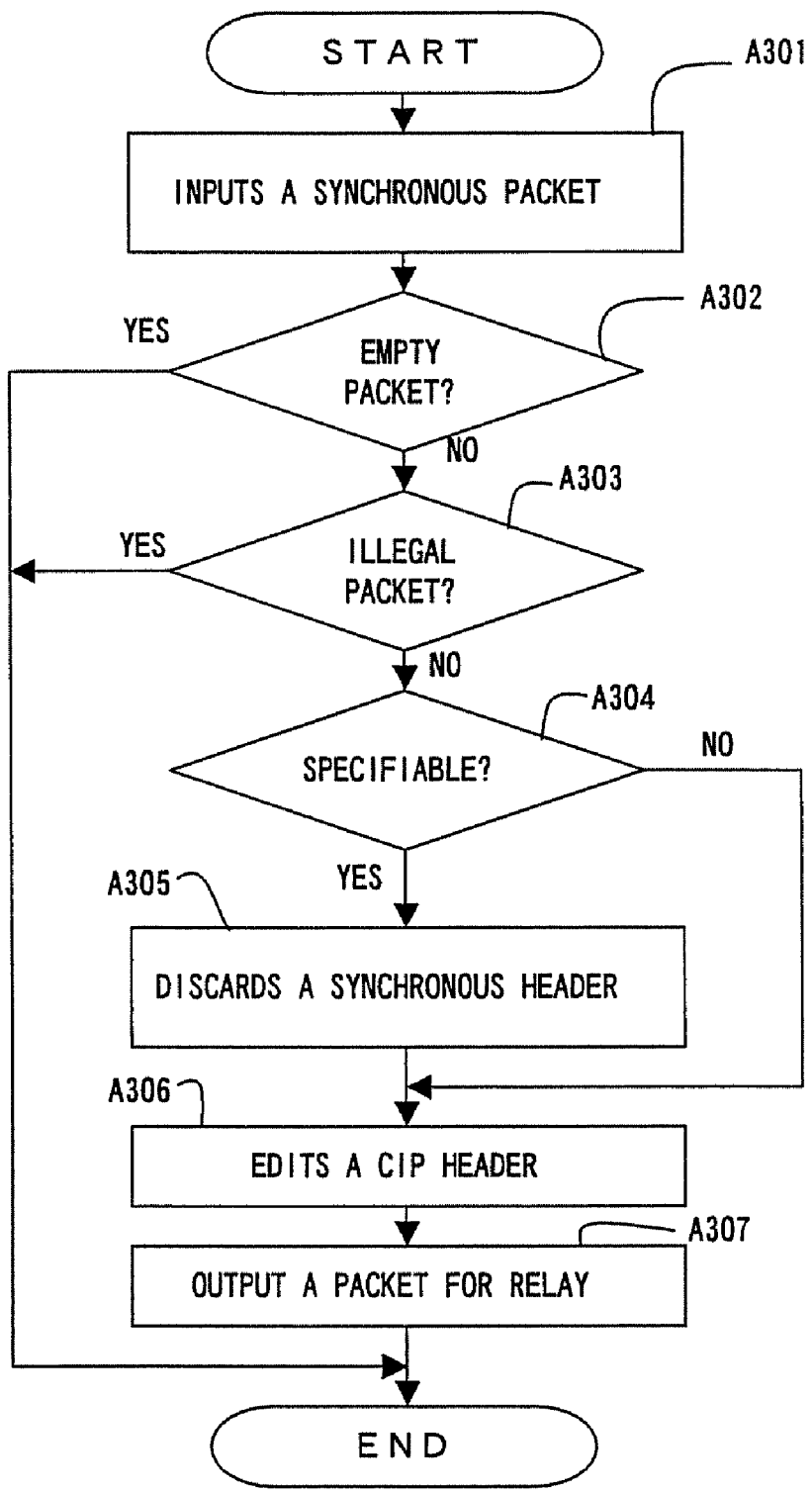
F I G. 3 8

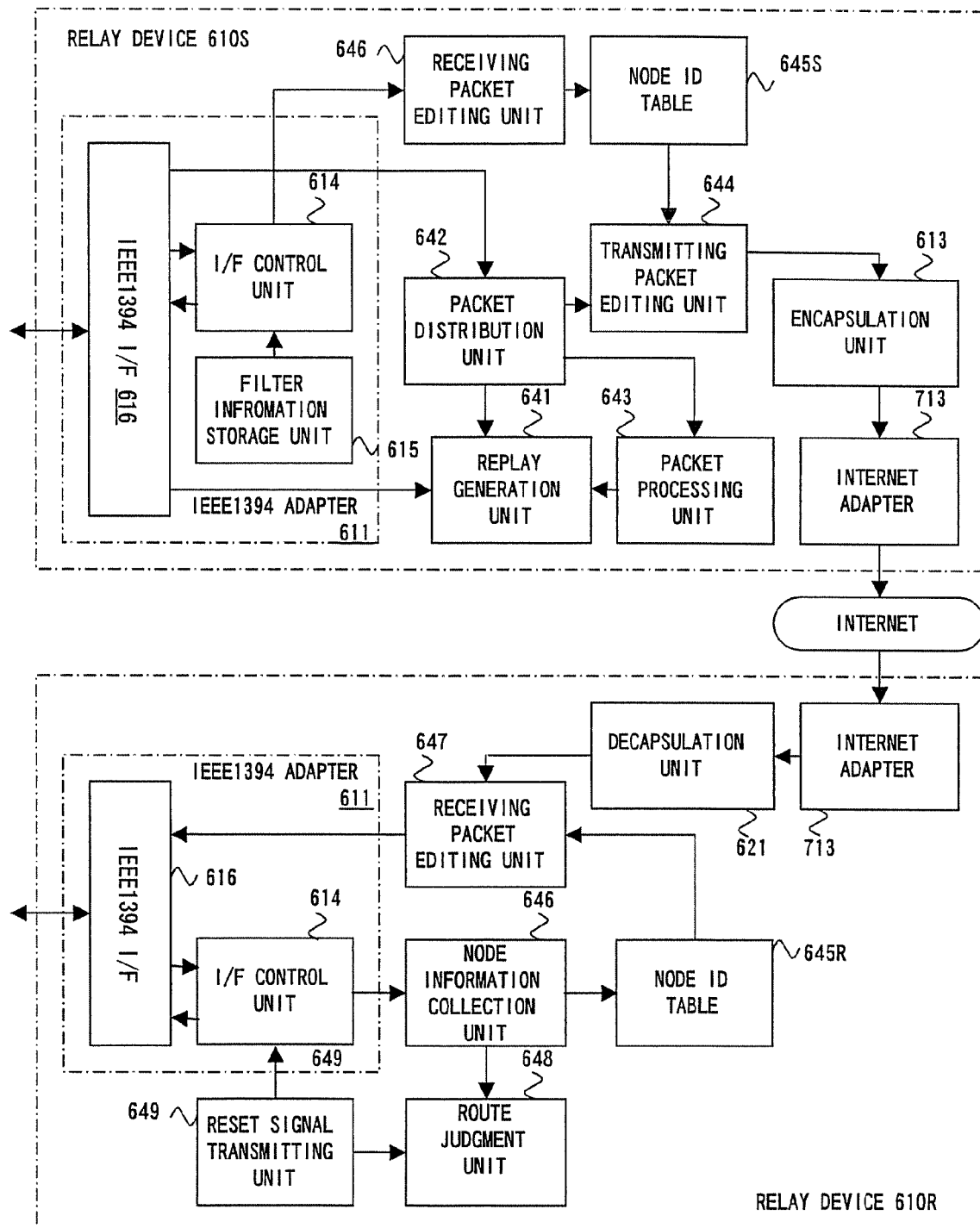
F I G. 40

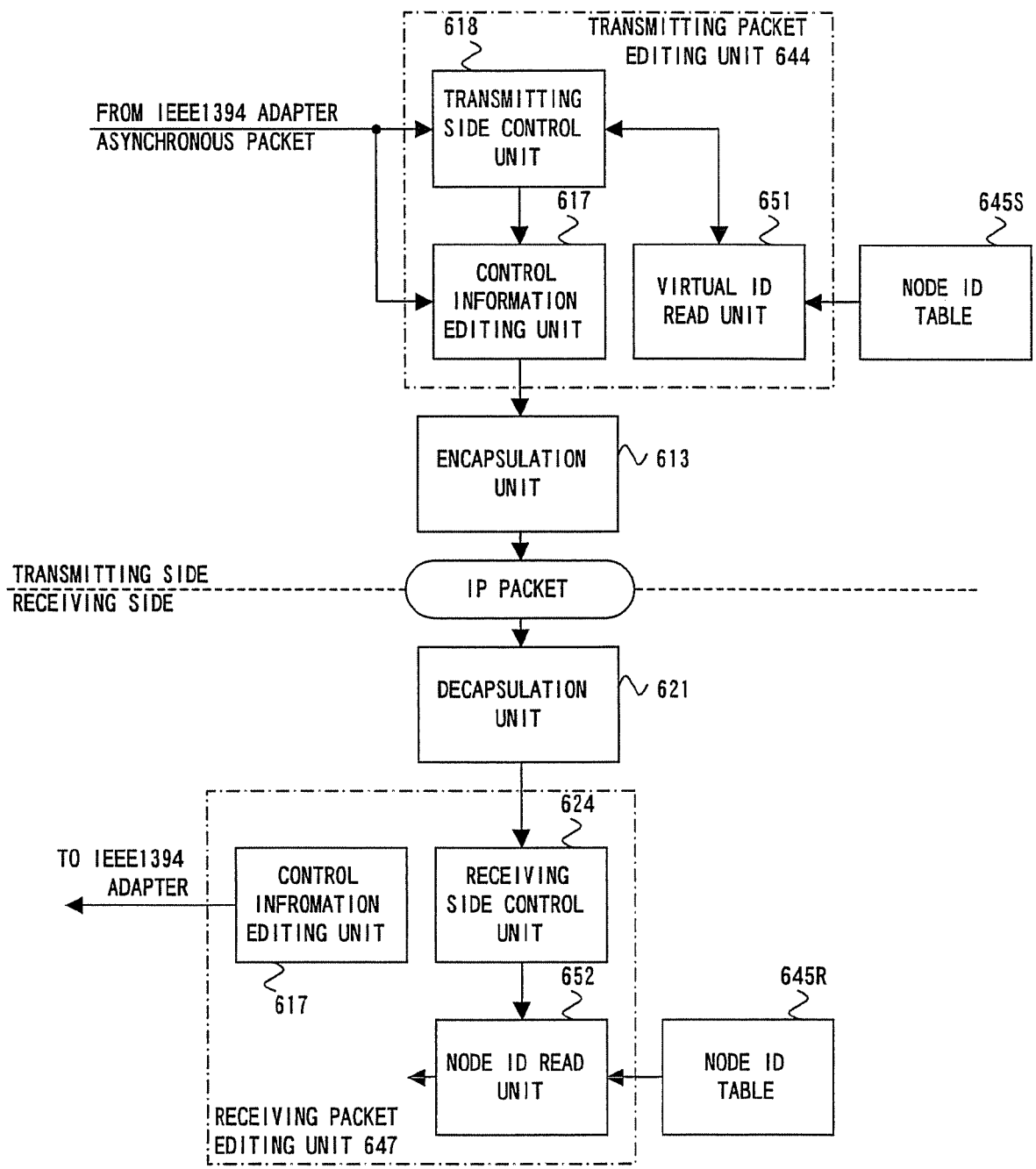
F I G. 4 1

| SERIAL No. | VIRTUAL ID | NODE ID |
|---|---|---|
| Sn1 | Vs1 | 0 |
| Sn2 | Vs2 | 1 |
| ⋮ | ⋮ | ⋮ |
| Sn5 | Vs5 | 4 |

| SERIAL No. | VIRTUAL ID | NODE ID |
|---|---|---|
| Sn6 | Vr1 | 0 |
| Sn7 | Vr2 | 1 |
| ⋮ | ⋮ | ⋮ |
| Sn14 | Vr9 | 8 |

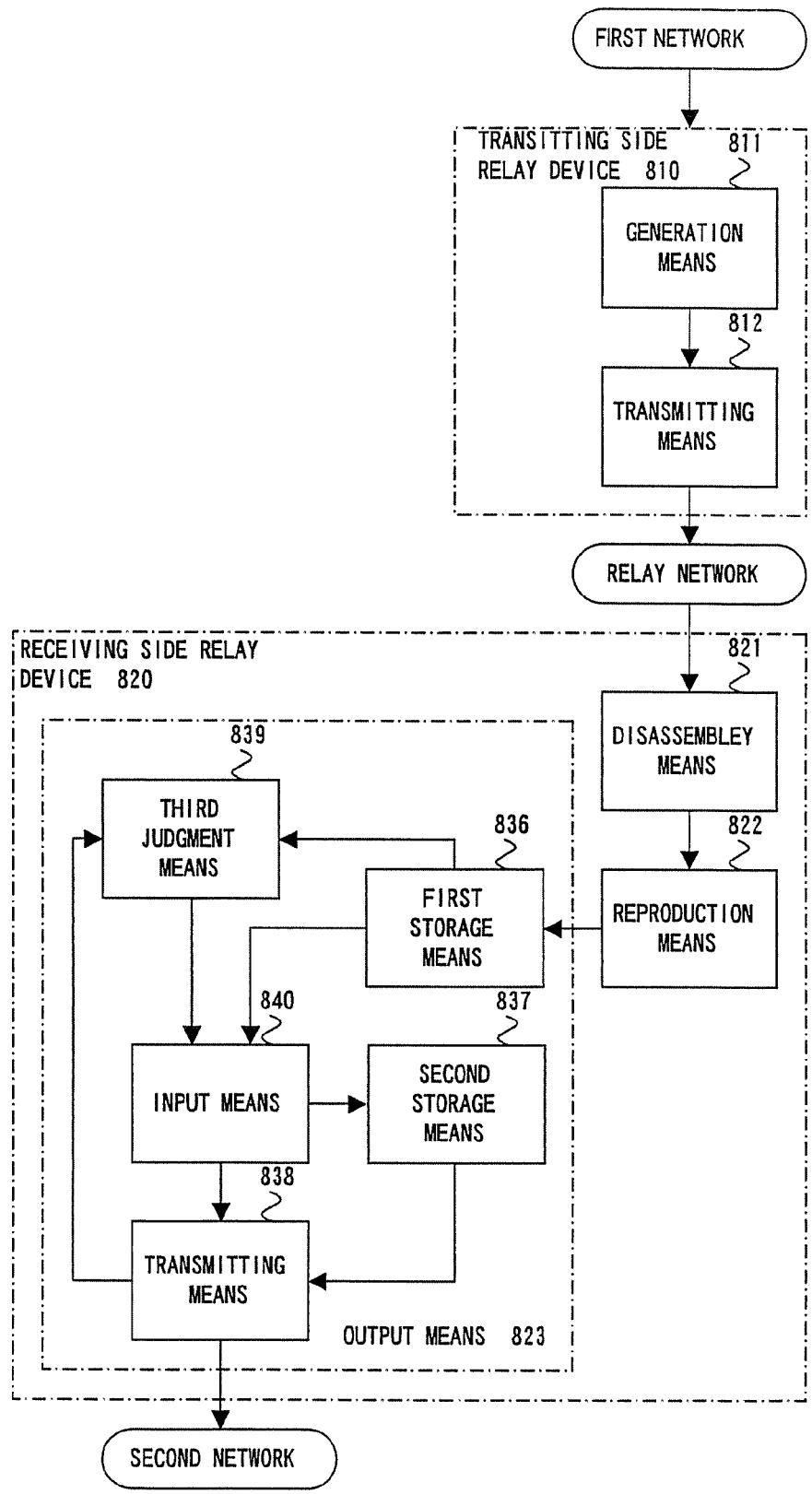
F I G. 4 8

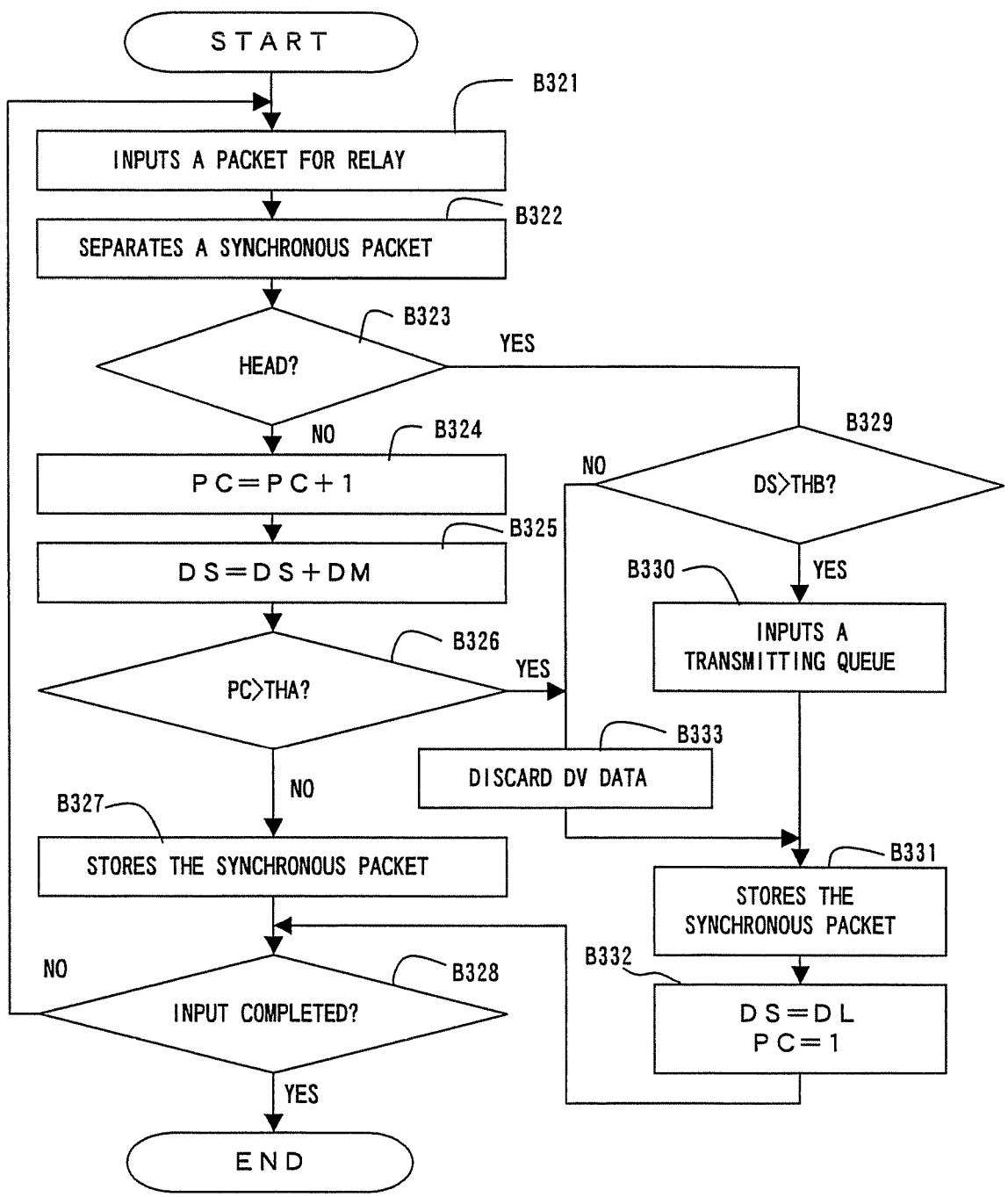
F I G. 5 5

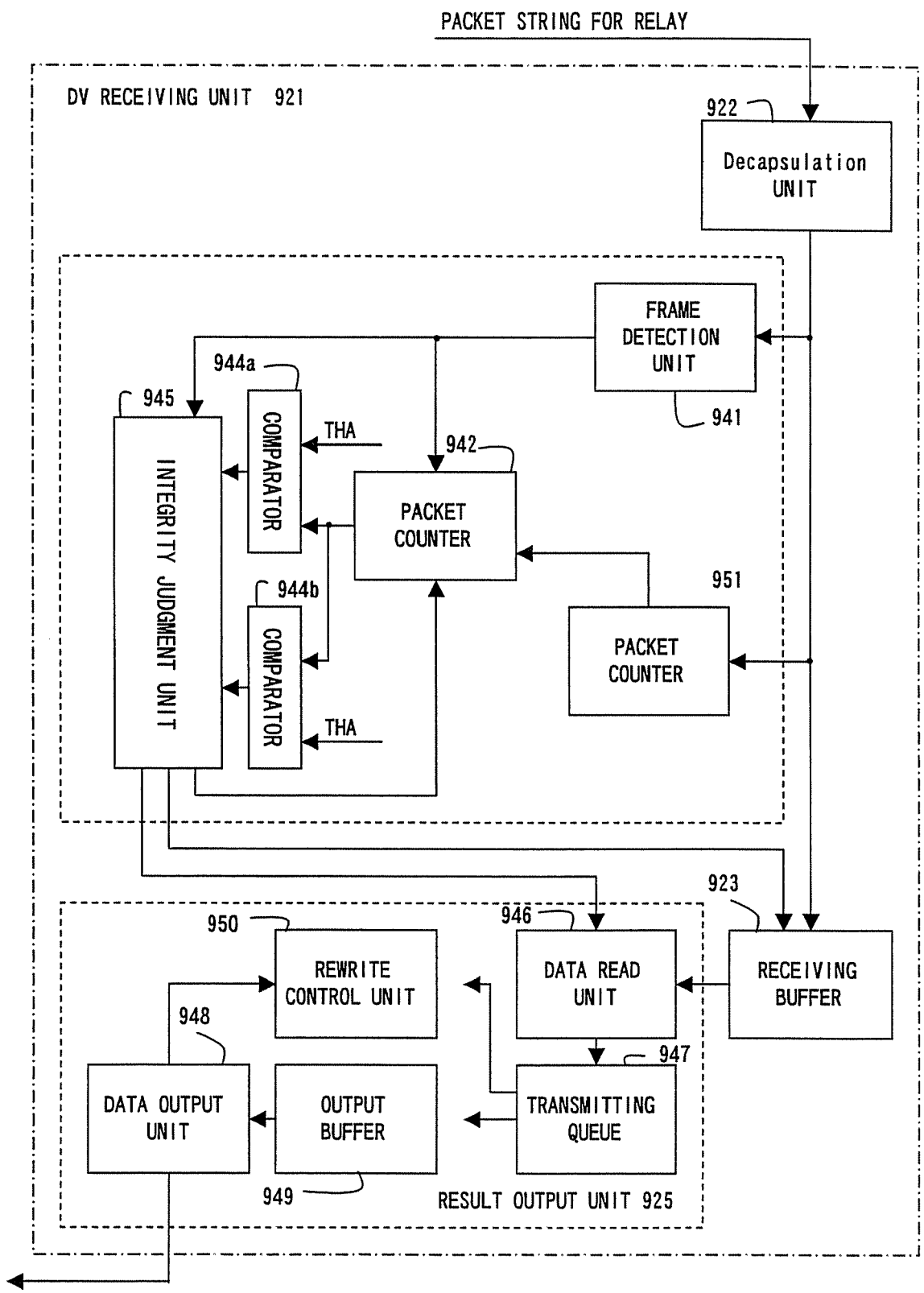
F I G. 5 7

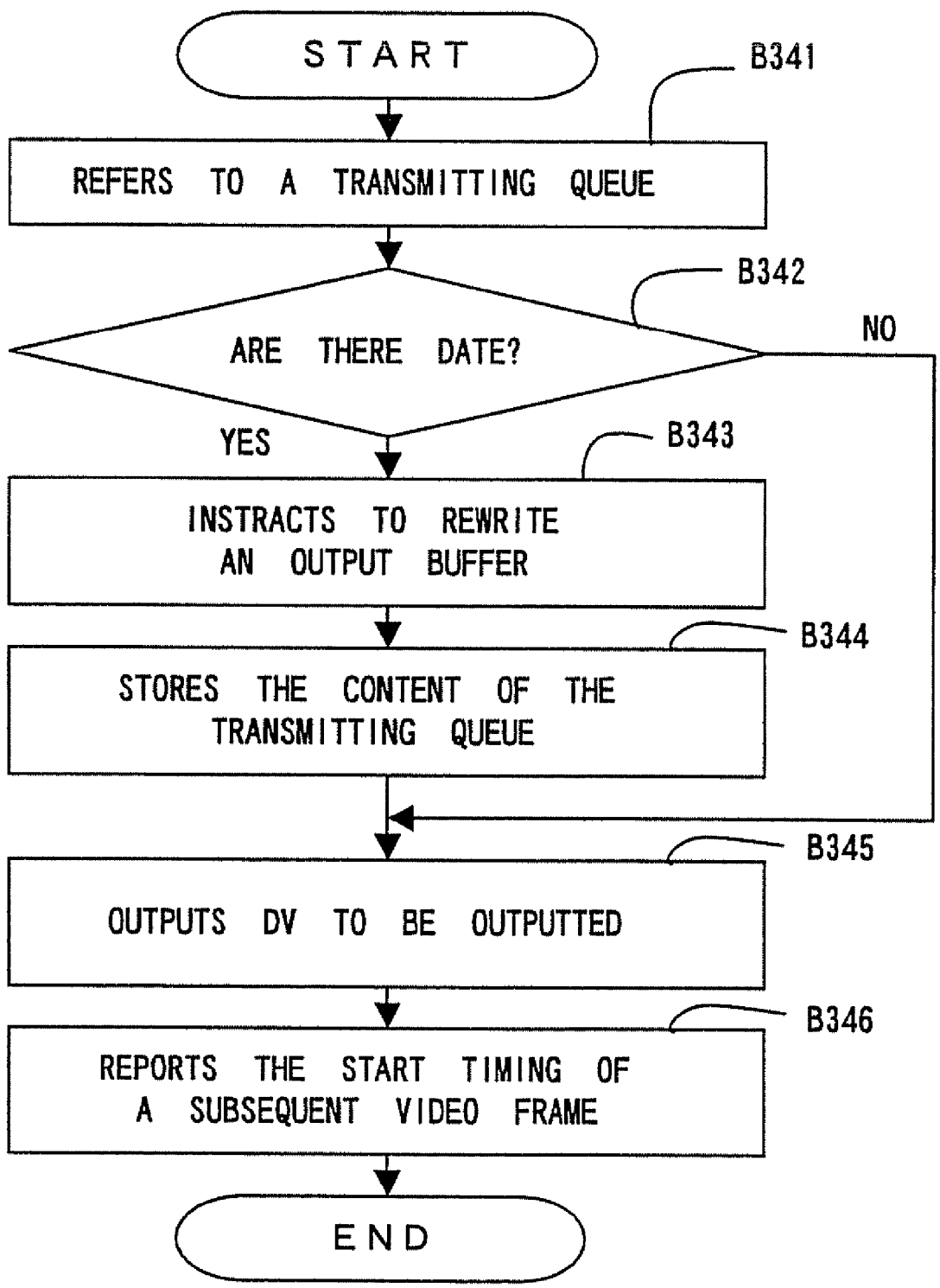
F I G. 5 8

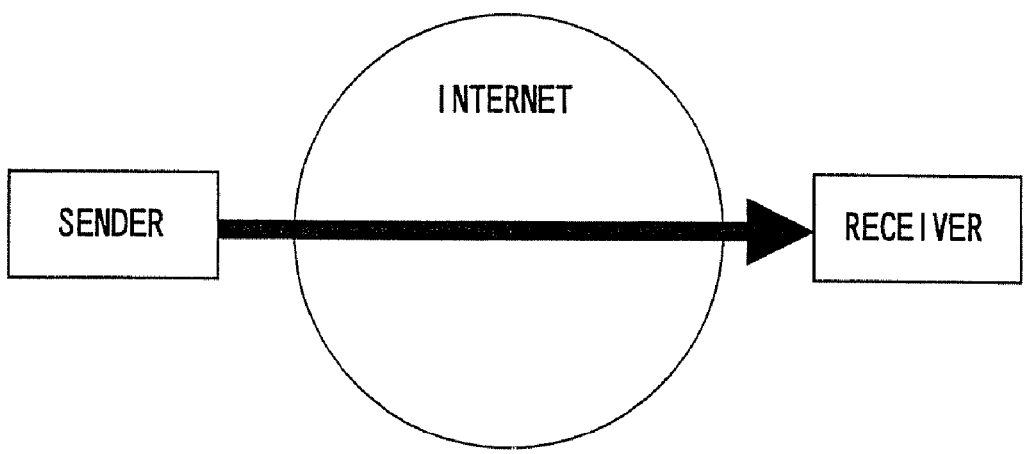
F I G. 6 0 A
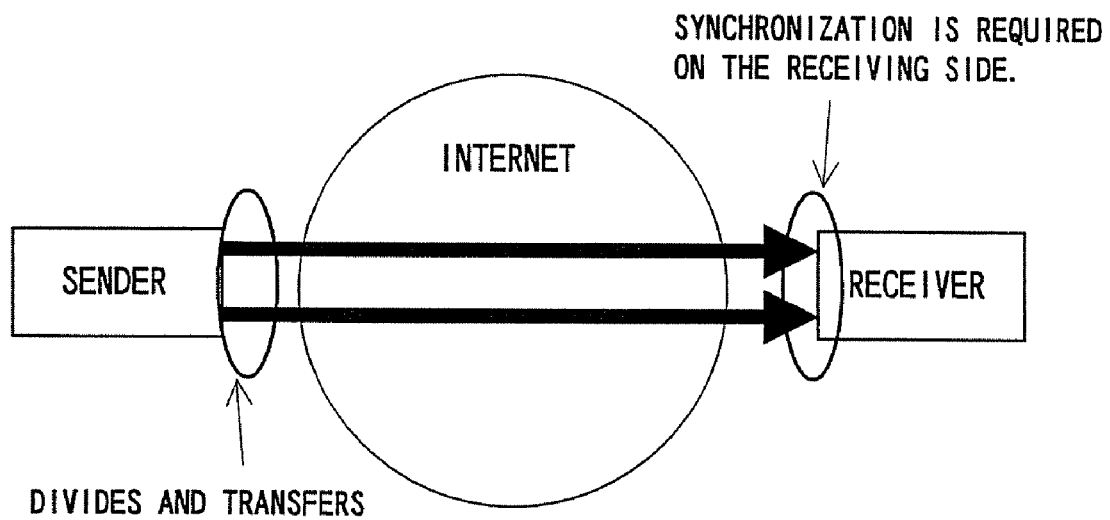
F I G. 6 0 B
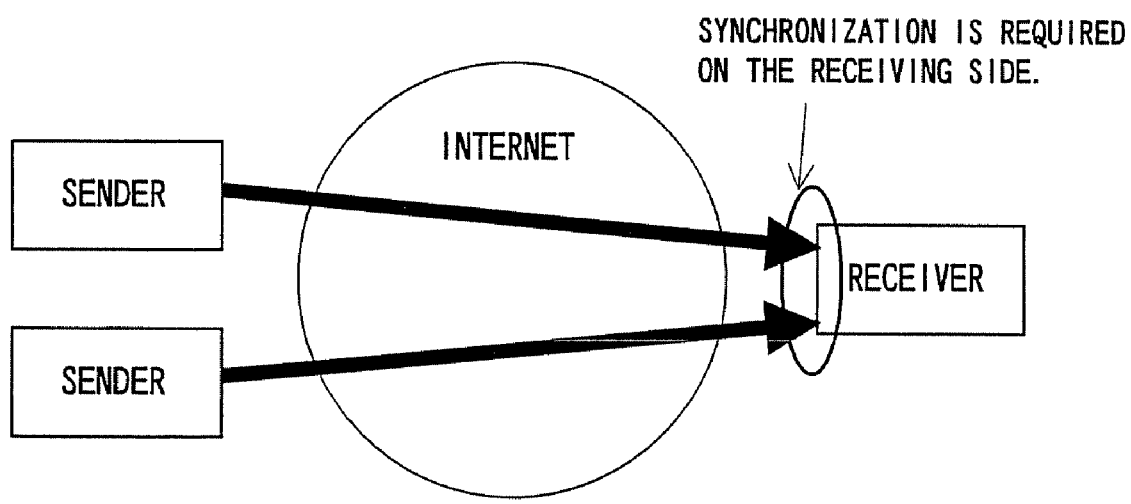
F I G. 6 0 C

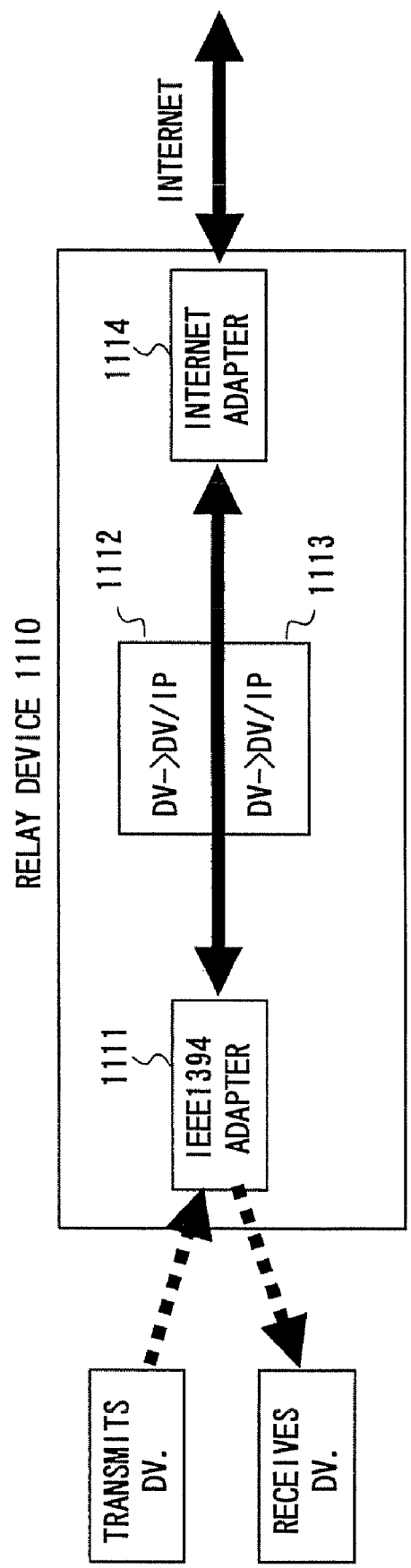
F I G. 6 1

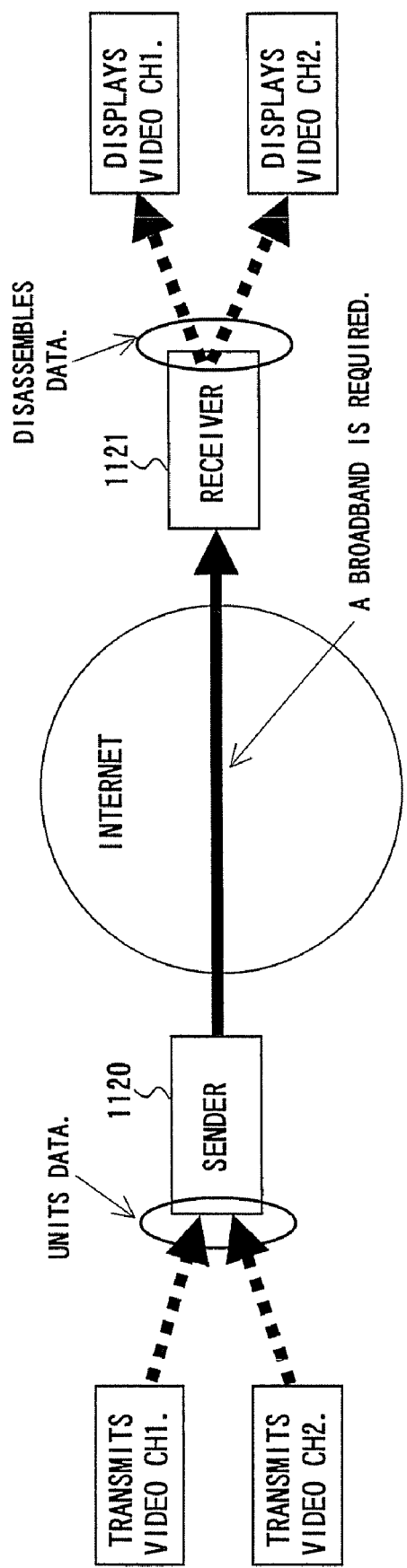
F I G. 6 2

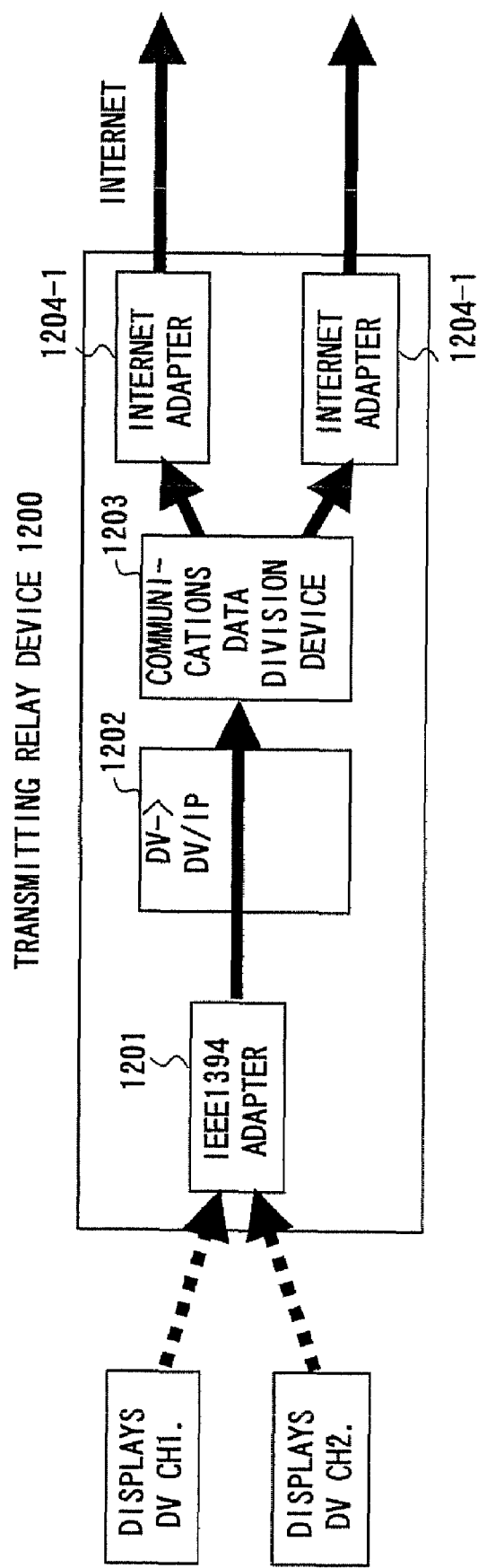
F I G. 6 4

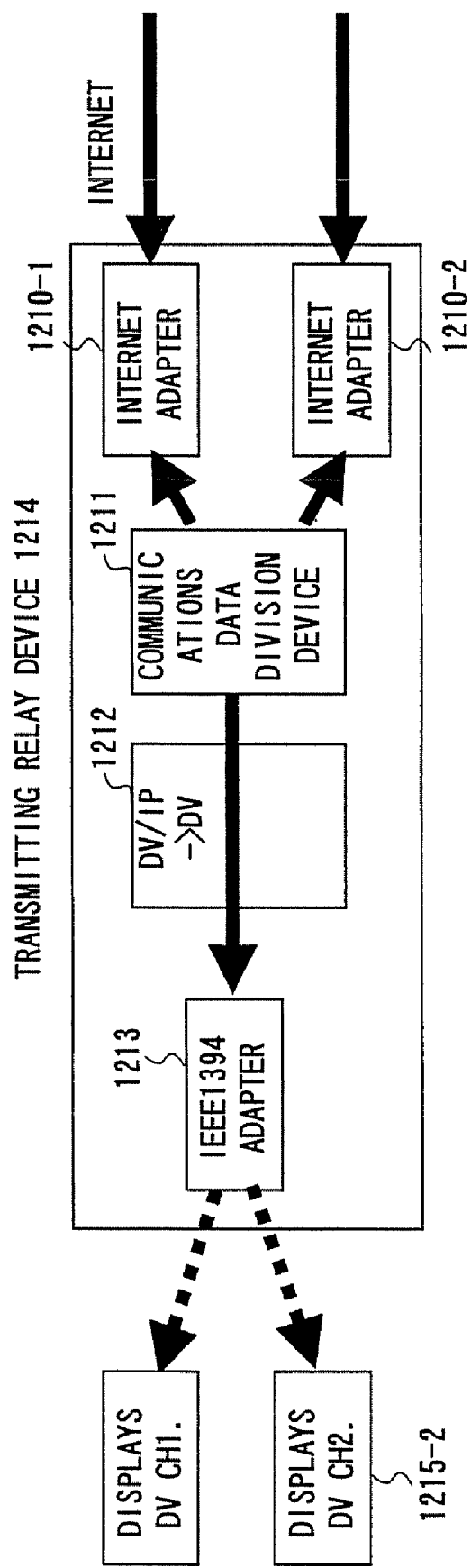
F I G. 6 5

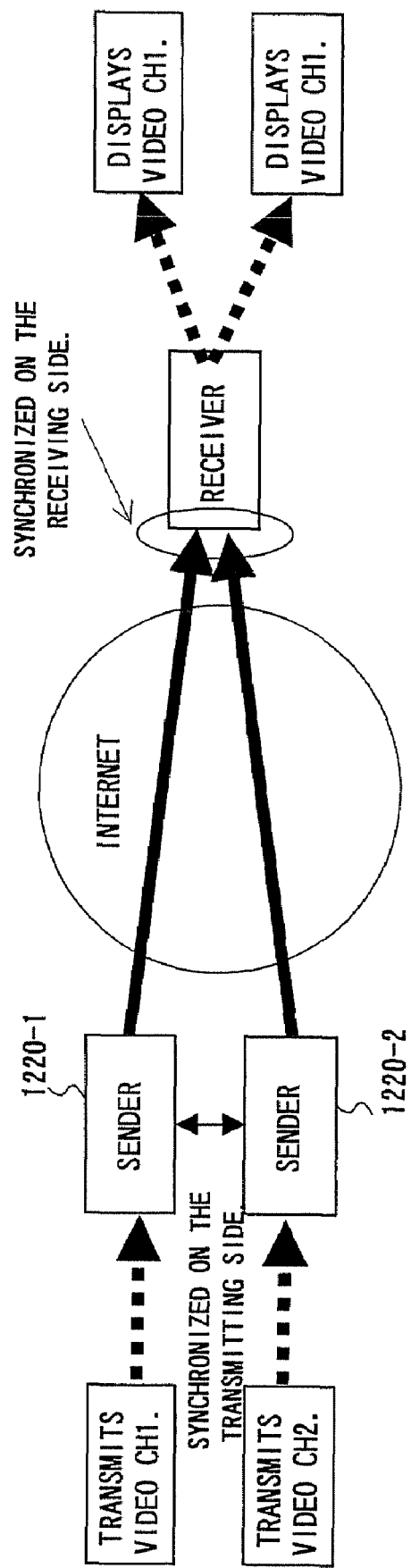
F I G. 66

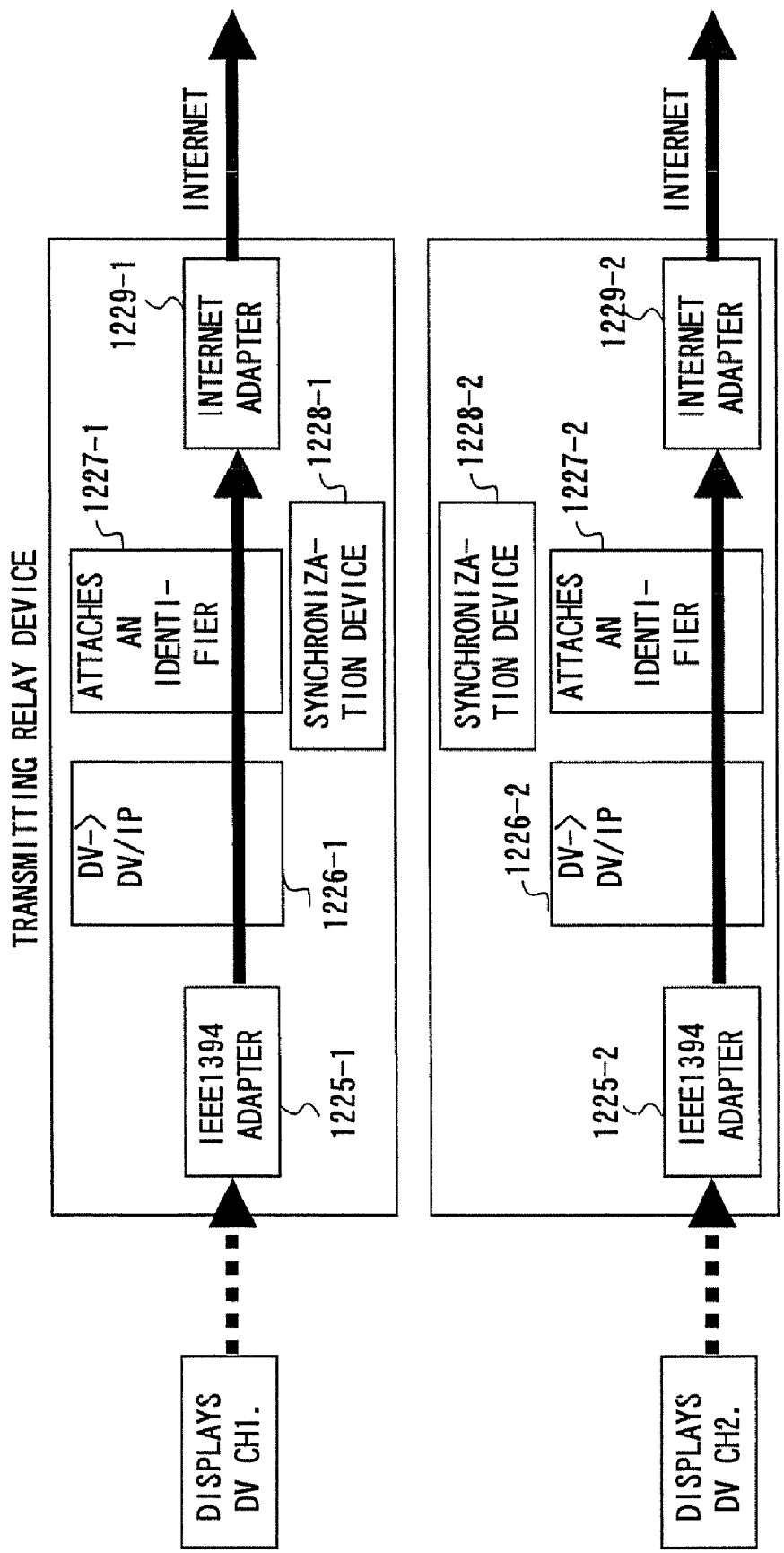
F I G. 67

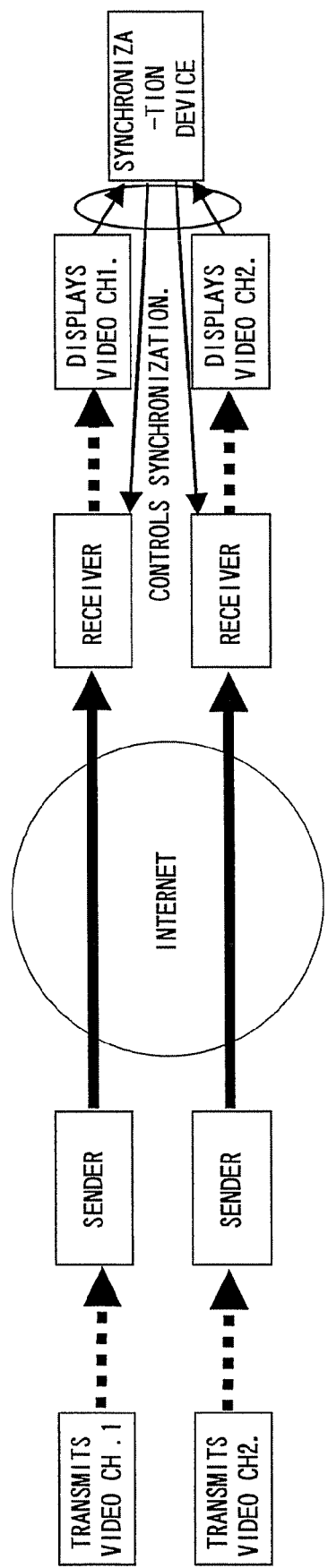
F I G. 7 1

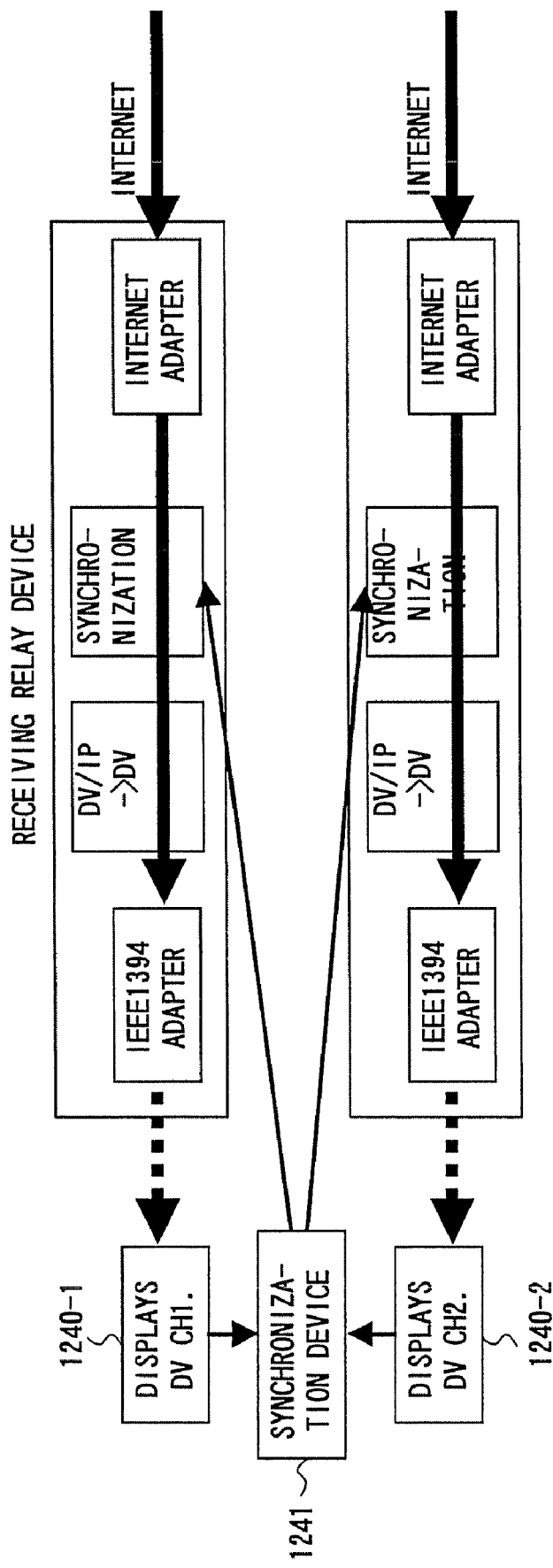
F I G. 7 2

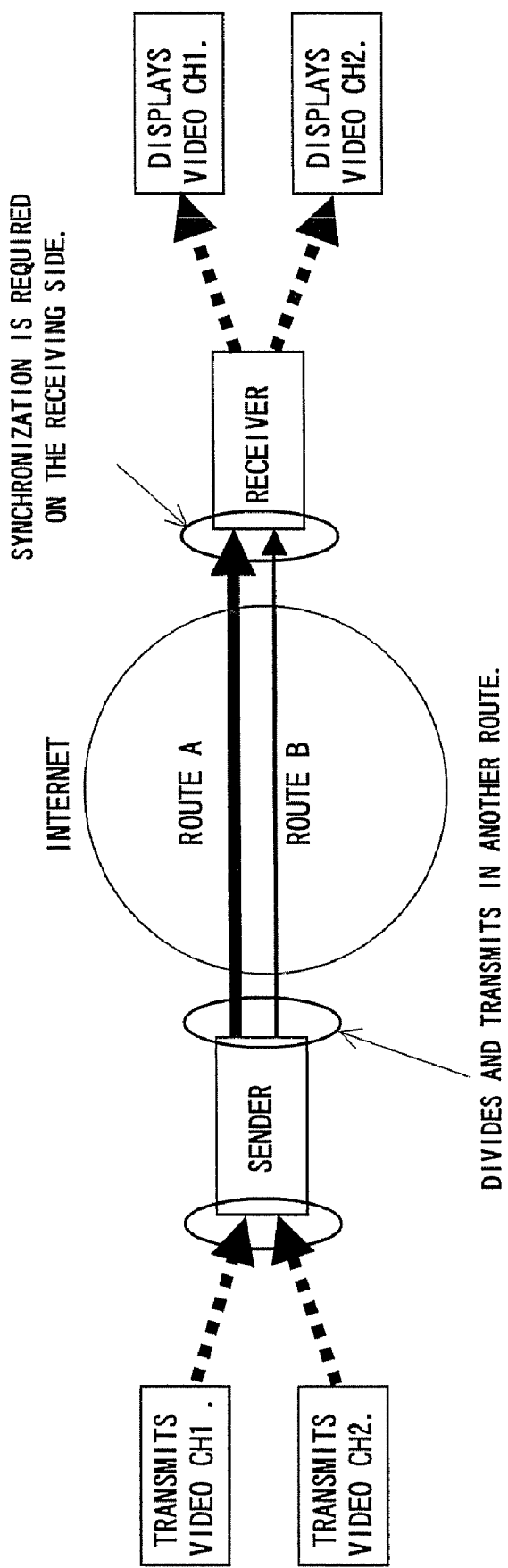
F I G. 7 3

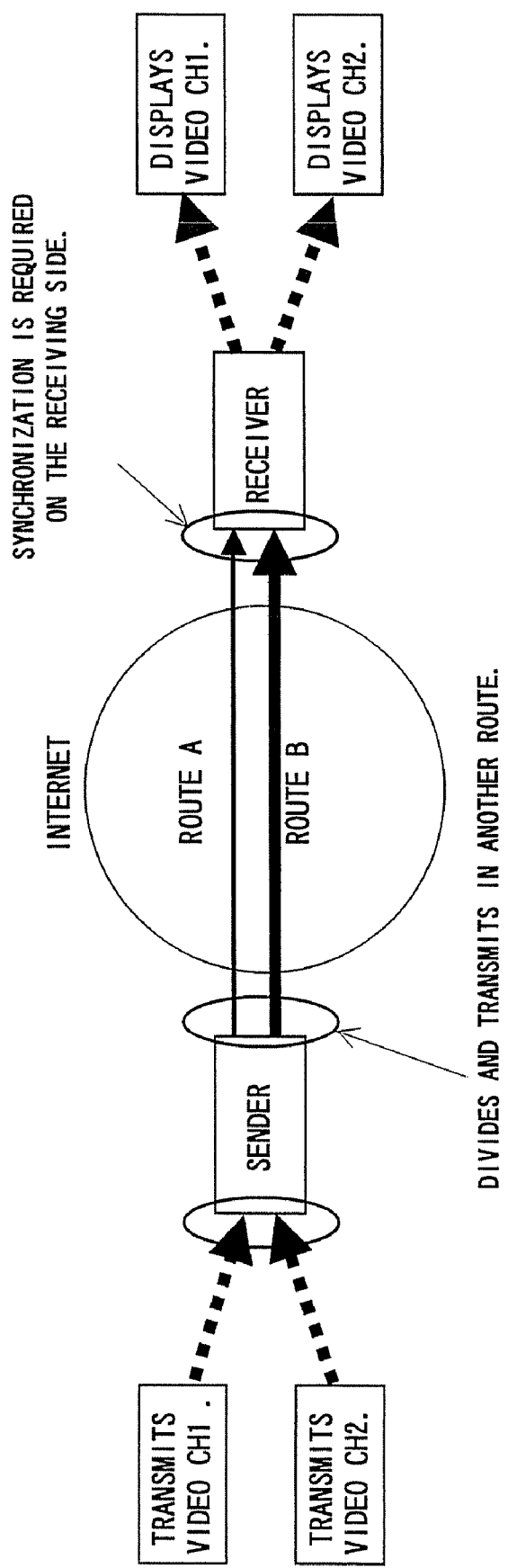
F I G. 74

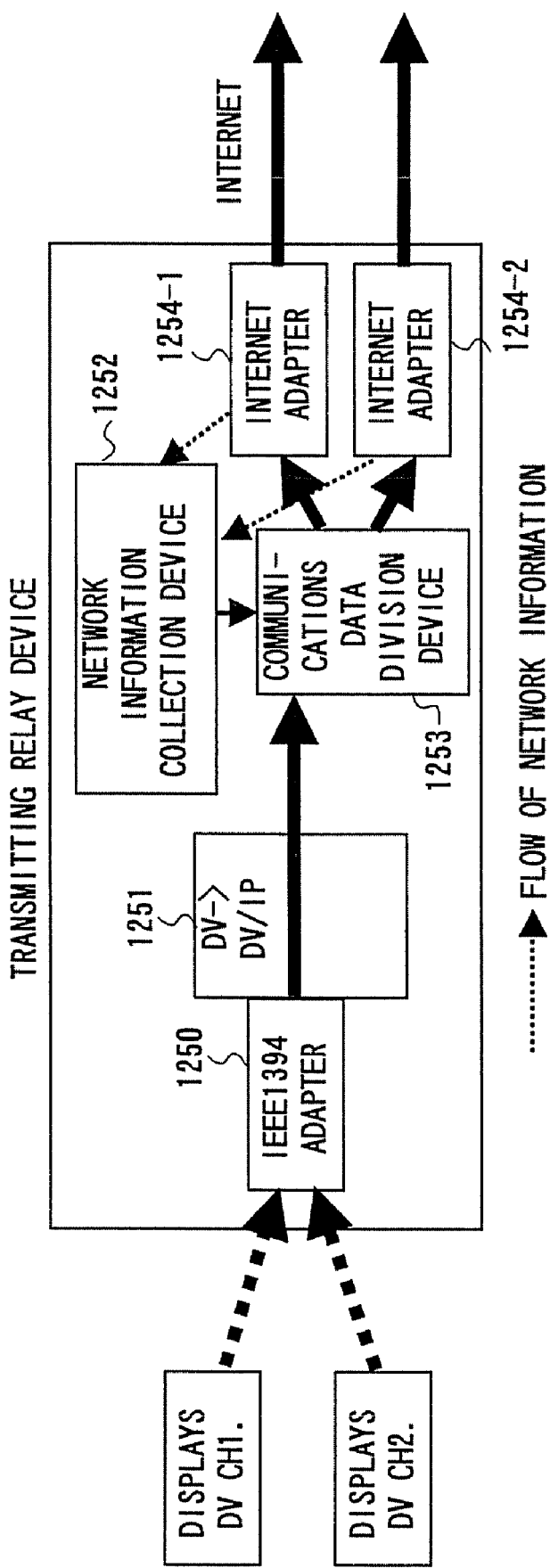
F I G. 7 5

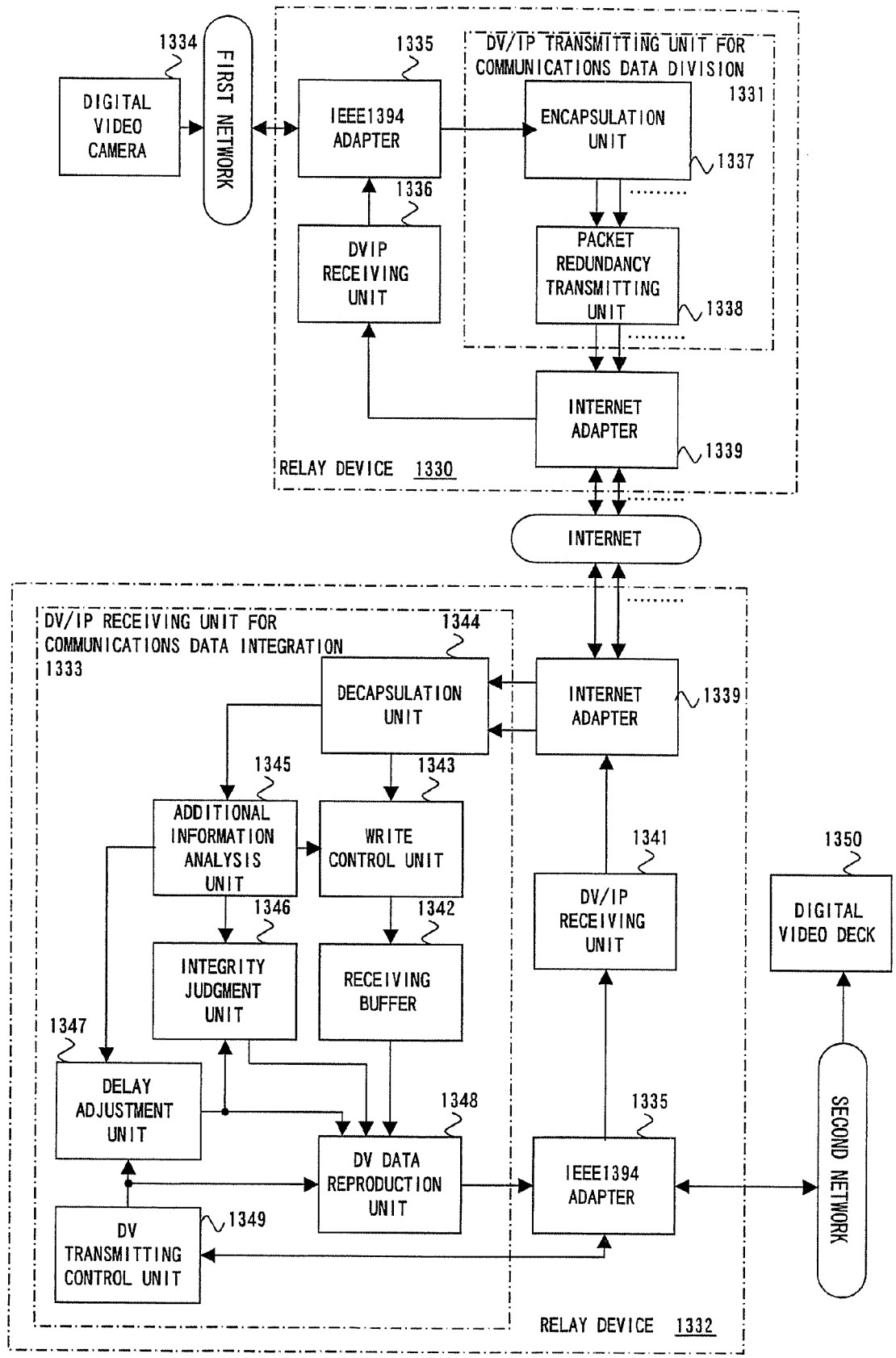
F I G. 7 7

DATA COMMUNICATIONS SYSTEM

CROSS REFERENCE TO RELATED APPLICATION

This application is a Divisional of application Ser. No. 09/767,259 filed Jan. 23, 2001, now pending, the entire contents of which are incorporated by reference herein.

BACKGROUND OF THE INVENTION

1. Field of the Invention

The present invention relates to a data communications system for implementing a service for communicating data with a prescribed cyclical structure, such as animation data, etc., in high quality via a communications network adopting a datagram type communications protocol, such as the Internet, etc.

As a standard for synchronously communicating animation data, such as digital video, etc., in a local bus, for example, IEEE1394 standard by IEEE (Institute of Electrical and Electronics Engineering) is used.

Recently, with the spread of both equipment, such as a digital video camera, etc., and a high-performance personal computer to a general user, for example, a technology for connecting local networks configured according to the IEEE1394 standard to each other, for example, via the Internet and for relaying a data stream generated based on the standard of each local network is highly demanded.

The present invention is not limited to the Internet or IEEE1394 standard.

2. Description of the Related Art

One frame, which is the basic element of digital video data includes one frame of both video data and audio data and is composed of ten DIF sequences, as shown with serial numbers in FIG. 1A.

Each DIF sequence is composed of 150 DIF blocks and has a structure where a regular pattern consisting of 15 pieces of video data (v) continuing after one piece of audio data (a) following six frame header information (f), is repeated, as shown in FIG. 1B.

Each DIF block is composed of 77 bytes of data and three bytes of identification information, as shown in FIG. 1C.

The data structure shown in FIG. 1 indicates the logical format of digital video data, and when digital video data are transmitted in a real network, a format suitable for the characteristic of the network is adopted.

For example, if digital video data are transmitted via a local bus based on the IEEE1394 standard, an IEEE1394 packet is generated by attaching both a prescribed header (CIP (Common Isochronous Packet) header and synchronous (ISO) header) and CRC to six DIF blocks, as shown in FIG. 2A and digital video data are transmitted in transfer units of these IEEE1394 packets.

In this case, since each DIF sequence is divided into 25 IEEE1394 packets, as shown separated by vertical bars in FIG. 1B, one frame of digital video frame is transmitted as 250 IEEE1394 packets, as shown in FIG. 2B.

Therefore, the combination of DIF blocks included in each IEEE1394 packet has regularity, as shown in FIG. 2C. A repetition pattern shown with an arrow mark in FIG. 2C indicates the variation pattern of the combination of a DIF block (a) with audio data and a DIF block (v) with video data in eight IEEE1394 packets No. 1 through No. 8, and these IEEE1394 packets correspond to the shaded part of a DIF sequence shown in FIG. 1B.

As is clearly known from the regularity in the array of DIF blocks in the DIF sequence described above, the same repetition pattern appears in both IEEE1394 packets No. 9 though No. 16 and IEEE1394 packets No. 17 through No. 24 shown in FIG. 2.

According to the IEEE1394 standard, since it is stipulated that 8,000 IEEE1394 packets should be transmitted per second in a synchronous transfer mode, 30 frames of video and audio data can be reproduced per second via audio/visual equipment connected to a local bus, such as a display device, a speaker, etc.

Therefore, a first network and a second network which are connected by a local bus based on the IEEE1394 standard can also be connected via a third network of another type, and the IEEE1394 packets described above can also be theoretically transmitted/received between them.

A data communications system using such a gateway is also proposed.

For example, a data communications system is proposed by the Principle/Media Laboratory and Environmental Information Department of Keio University (Kazunori Sugiura et al., "Internet DV Transfer Technology Using Frame-Exclusive Technology", The Institute of Electronics, Information and Communication Engineers, Technical Report of IEICE, CPSY99-33, p. 71-81 (May 1999).

As shown in FIG. 3, this data communications system comprises a gateway 10 for relaying data between a first network based on the IEEE1394 standard and the Internet, and a gateway 20 for relaying data between a second network based on the IEEE1394 standard and the Internet.

In FIG. 3, an IEEE1394 packet transmitted to the first network by a digital video camera 1 is transferred to a digital video transmitting unit (DV transmitting unit) 12 via an IEEE1394 adapter 11.

A frame thinning-out process is performed by this digital video transmitting unit 12. Simultaneously, as shown in FIG. 4, header information consisting of an IP header, UDP (User Datagram Protocol) and an application header is attached to an IEEE1394 packet to be transmitted, and a packet encapsulated in an IP packet is transmitted to the Internet via an Internet adapter 413.

In this way, the IP-encapsulated packet is transferred to a digital video receiving unit (DV receiving unit) 21 via an Internet adapter 13 and is decapsulated by this digital video receiving unit 21. Then, the packet is transmitted to the second network via an IEEE1394 adapter 11.

In this way, for example, pictures and voice that are taken by the digital video camera 1 connected to the first network can be transferred to the second network via the Internet and can be recorded/reproduced by a digital video deck 2 connected to the second network.

In this data communications system, an application header, including both an adjustment parameter for indicating information about frame thinning-out, etc., and a sequence number is attached in the encapsulation process by the digital video transmitting unit 12, and an IEEE1394 packet stream is reproduced according to information in this application header in the decapsulation process by the digital video receiving unit 21.

The data communications system shown in FIG. 3 simply encapsulate digital video data in a UDP packet and transmits the data, and information inserted in the application header when data are encapsulated is limited to a few items, such as a sequence number, etc.

For the details of both the frame thinning-out process and IEEE1394 packet stream reproduction process of this data communications system, see the reference described above.

In the data communications system described above, UDP is adopted as the communications protocol of the transport layer of the Internet, and each IEEE1394 packet composing the IEEE1394 packet stream in the first network is transferred to the second network via the Internet as datagram.

Since UDP is connectionless type communication protocol, broadcast type communications in which one sender can simultaneously transmit the same data to many receivers, can be conducted. Therefore, UDP is suited to transmit/receive data between the first and second networks via the Internet.

However, since UPS is provided only with an error detection mechanism as far as a mechanism for maintaining transfer quality is concerned, the loss and redundancy of an IP-encapsulated packet, the modification of an arrival order on the receiving side, etc., must be coped with by an application software program on both the transmitting and receiving sides.

In this way, sufficient information about the loss and redundancy of each packet, the modification of an arrival order, etc., cannot be obtained on the receiving side simply by encapsulating digital video data in an UDP capsule as in the data communications system shown in FIG. 3. Therefore, when the digital video data are reproduced, there is the possibility that there may be some failure and thereby sufficient communication quality cannot be expected.

For example, if a packet stream is synchronously communicated between a sender and a receiver in an IEEE1394 synchronous communications mode described above, transfer delay between the sender and receiver must also be kept constant.

However, in a "best-effort" type network, such as the Internet, both transfer rate and transfer delay vary depending on the traffic of a network and simultaneously, transfer delay on the receiving side greatly varies depending on the loss and redundancy of an IP-encapsulated packet.

Besides, the occurrence probability of the loss and redundancy of a packet, etc., varies depending on the traffic of a network.

Therefore, to implement the transmission of packet streams in an IEEE1394 synchronous communications mode via a network adopting a datagram type communications protocol, such as the Internet, etc., a technology for controlling transfer delay as well as a technology for improving transfer quality between a sender and a receiver are required.

For example, communications between local networks can be implemented via the Internet regardless of a physical distance between the local networks by providing each of a plurality of local area networks with a router or gateway and by connecting this router or gateway to the Internet.

FIG. 5 shows an example of the configuration of a data communications system configured by connecting a plurality of local area networks using gateways.

In the data communications system shown in FIG. 5, personal computers (PC) 21a, 21b and 21c connected to a first LAN, a second LAN and a third LAN, respectively, and gateways 22a, 22b and 22c are connected, for example, according to the communications protocol of a network layer, such as an IP protocol, etc.

If the communications protocols of the network layers between terminals in which data are relayed using both gateways and the Internet are unified, communications between personal computers 21a, 21b and 21c can be implemented regardless of the communications protocols of a data link layer adopted in the first, second and third LANs.

However, the IEEE1394 standard is focussed on as a high-speed interface for connecting audio/visual equipment, such as a digital video camera, etc., to a personal computer.

This IEEE1394 standard is a high-speed serial bus standard that is stipulated around both a physical layer and a data link layer, and stipulates a function to consecutively transfer a prescribed transfer unit in a specific cycle (synchronous transfer mode) and a function to transfer a control command from time to time to control equipment, such as a digital video camera, etc. (asynchronous transfer mode).

According to the IEEE1394 standard, n synchronous transfer channels and an asynchronous transfer packet transfer time coexist in one cycle (125 μs), as shown in FIG. 6A.

If data are transferred in a synchronous transfer mode, a node on the transmitting side requests a bus management node of an isochronous channel, and then a synchronous transfer channel depending on the transfer rate is assigned by the bus management node or a channel ID for identifying an aisochronous channel is provided.

If particularly, animation data with audio data are transferred in real time in a synchronous transfer mode, the transmitting side node attaches a CIP (Common Isochronous Packet) header to transfer data in addition to a synchronous header, including the channel ID described above, generates an aisochronous packet shown in FIG. 6B and transmits the assigned aisochronous channel. A receiving side node identifies a packet to be received based on the channel ID included in the aisochronous packet and receives the transfer data.

The CIP header is provided with 16 bits of a time stamp field, and when transferring digital video data, the transmitting side node writes a time stamp for indicating a transmission time in one of a series of packets composing one frame of video data. The receiving side node adjusts timing based on this time stamp.

In this way, in the synchronous transfer mode of the IEEE1394 standard, an individual communications is identified by the channel ID included in the synchronous header, and data can be transferred while being synchronized by adjusting timing based on the time stamp in the CIP header regardless of the number of receiving side nodes.

However, in asynchronous transfer mode, after obtaining a right to use a bus, a transmitting side node generates an asynchronous packet (see FIG. 6C) by attaching an asynchronous header, including respective node IDs for indicating a transmitting node and a receiving node to transfer data, and transmits the packet to a bus.

Then, a receiving side node receives the packet addressed to him/her based on a receiving ID included in the header and transmits a reply packet (shown by symbol "ack" to a bus within a prescribed time period in FIG. 6A).

In this way, in an IEEE1394 asynchronous transfer mode, an individual communications is identified by the combination of a source ID and a destination ID included in the asynchronous header, and the arrival of a packet with transfer data is confirmed by a prescribed reply packet returned by the receiving side node.

As a data communications system for implementing the transmission/reception of an IEEE1394 packet by connecting first and second networks that are connected to each local bus based on the IEEE1394 standard described above via a third network of another type, the data communications system described above that is proposed by the Principle/Media Laboratory and the Environmental Information department of Keio University is used.

Since the existing router is configured presuming that networks should be connected even in the case of the protocol of a data link layer or a layer lower in hierarchy than a data link layer of a relay network, information transmitted/received between functions of a data link layer or less in an individual network is not used.

However, the information of this data link layer cannot be used simply by encapsulating a packet transferred in an individual network, including information about the functions of a data link layer or less.

This is because the information of a data link layer is peculiar to an individual network, it is presumed that a transmitting node and a receiving node belong to one network and it is not presumed that each of the transmitting and receiving nodes belongs to a different network.

For example, according to the IEEE1394 standard, bus reset is caused by the addition of a new node, etc., and each time, a node ID is provided to each node belonging to the network according to prescribed procedures.

In this case, a node ID provided to each node is not always the same ID provided before the bus reset. There is the possibility that the aisochronous channel ID may also be modified.

If each of a transmitting node and a receiving node belongs to a different network, timing cannot be adjusted using a time stamp indicating a time in the network on the transmitting side without any modification on the receiving side even if the time stamp is written in the CIP header of a synchronous transfer mode and is transferred to the receiving node.

However, since the IEEE1394 standard presumes that a receiving node exists within a prescribed cable length, a time allowed until a reply packet is returned to an asynchronous packet is very short.

Therefore, if the reply packet is transmitted after an asynchronous packet is actually received, delivery confirmation cannot be normally completed in an asynchronous transfer mode.

In addition to the above, there are the following problems.
A) Essentially one communications must be divided into a plurality of communications depending on the usable band of a network and each of the divided communications must be transferred via a different route as a respective independent communications.
B) The delay of data transferred by one sender with a plurality of different communications delay must be adjusted and synchronized on the receiving side.
C) The delay of data transferred by a plurality of senders with a plurality of different communications delay must be adjusted and synchronized on the receiving side.

SUMMARY OF THE INVENTION

It is an object of the present invention to provide both a data communications system for transmitting data with a known data structure in high quality and for transmitting such data while controlling the transfer delay of data with a known data structure in a data communications system for communicating via a network adopting a datagram type communications protocol.

It is another object of the present invention to provide a data communications system for providing information sufficient to reproduce digital video data from each transfer unit on the receiving side by attaching additional information to each transfer unit composing digital video data and transferring the information as a UDP packet.

It is another object of the present invention to provide a data communications system for transferring data theoretically regarding a first network and a second network as one network regardless of the physical locations using information peculiar to both the first network, including a transmitting node and the second network, including a receiving node.

It is another object of the present invention to provide a data communications system for transmitting data with a known data structure among a plurality of physically independent networks via a relay network adopting a datagram type communications protocol.

It is another object of the present invention to provide both a system and a method for synchronizing and receiving a plurality of communications on the receiving side.

The basic concept of the present invention is a data communications system for implementing a synchronous communication in which data are consecutively transferred at a specific transfer rate and with a specific transfer delay using a communications network in which data may be lost, redundant data may be transferred and a data transfer order may be modified and which is configured in such a way that synchronous communications data can be transferred from the transmitting side with information about the data and that the synchronous data can be reproduced by using the information about the synchronous communications data on the receiving side.

The additional configurations of the present invention are as follows.
(1) As information about synchronous communications data, the transmission order of the data is used.
(2) As information about synchronous communications data, a data processing time on the transmitting side is used.
(3) If synchronous communications data have a cyclical structure with a fixed length, for information about the data, both a number for indicating a cycle and a number for indicating an order in a specific cycle are used.
(4) As information about synchronous communications data, a symbol for indicating a data processing method on the transmitting side is used.

According to the first data communications system of the present invention, in a data communications system in which a transmitting side relay device and a receiving side relay device are connected to the first and second networks, respectively, for consecutively transferring prescribed transfer units at a specific transfer rate and with a specific transfer delay, and in which a data stream generated as a series of the transfer units is communicated as a series of datagram type packets, including the transfer unit, via the third network, the transmitting side relay device comprises additional information generation means for generating additional information, including information about relationship between each transfer unit and the data stream, based on the characteristics of the data stream, packet generation means for generating a packet by attaching the additional information when each transfer unit composing the data stream is inputted and by also attaching header information suitable for transfer in the third network and transmitting means for transmitting the packet to the third network according to prescribed procedures. The receiving side relay device comprises separation means for separating the additional information from the transfer unit, both of which are included in a packet received via the third network, analysis means for analyzing the additional information separated by the separation means, reproduction means for reproducing the data stream by locating a plurality of pieces of information included in the transfer unit received from the separation means in respective appropriate positions in the data stream, based on the analysis result of the analysis means and output means for outputting the data stream reproduced by the reproduction means to the second network.

According to the second data communications system of the present invention, in a data communications system in which a transfer unit of a prescribed type transferred in the first network, which is one of a plurality of independent networks, is relayed by a transmitting side relay device installed in relation to the first network, another relay network and a receiving side relay device installed in relation to the second network, which is at least one of other independent networks, the transmitting side relay device comprises extraction means for extracting a transfer unit to be transmitted to the second network, transformation means for applying a prescribed operation to control information included in the extracted transfer unit and generating a relay transfer unit, reshaping means for reshaping the relay transfer unit into a packet in a format suitable for transmission procedures in the relay network and addressed to the receiving side relay device installed in relation to the second network and first transmitting means for transmitting each packet reshaped by the reshaping means to the relay network. The receiving side relay device comprises separation means for separating the relay transfer unit by breaking down the packet received via the relay network, generation means for applying a prescribed operation to the relay transfer unit obtained by the separation means and regenerating a transfer unit, including control information suitable for the transmitting process of the second network and second transmitting means for transmitting the transfer unit generated by the generation means to the second network.

According to the third data communications system of the present invention, in a data communications system in which transmitting side relay means installed in relation to the first network, which is one of a plurality of physically independent networks for transferring structure data with a prescribed regular structure in prescribed transfer units transmits a transfer unit to be transferred in the first network to another relay network, and receiving side relay means installed in relation to the second network, which is one of the plurality of independent networks, relays the transfer unit transmitted to the relay network to the second relay network, the transmitting side relay means comprises generation means for generating a datagram type relay packet, including the transfer unit, addressed to the receiving side relay means, when the transfer unit transferred in the first network is inputted and transmitting means for transmitting the relay packet to the relay network. The receiving side relay means comprises separation means for separating the transfer unit by breaking down the relay packet received via the relay network, reproduction means for reproducing the structure data from the transfer unit obtained by the separation means, based on information about the prescribed regular structure for the structure data to be provided and transmitting means for transmitting the structure data to the second network in the prescribed transfer units.

The fourth system of the present invention is a system for communicating via a plurality of network routes with a plurality of pieces of different communications delay, and comprises transmitting means for transmitting a plurality of divided communications data with additional information for split communications via the plurality of network routes, and receiving means for uniting, synchronizing and receiving a plurality of divided communications data based on the additional information.

According to the first data communications system of the present invention, the transmitting side relay device can transmit a data stream to be transferred in the first network to another third network as a packet with appropriate additional information for each transfer unit, and the receiving side relay device can reproduce a data stream equivalent to the data stream in the first network from these packets and can transmit the data stream to the second network.

In this way, since data transmission with the high degree of freedom is available between at least one terminal device connected to the first network and at least one terminal device connected to the second network, a variety of communications services can be provided.

According to the second data communications system, a plurality of physically independent networks can be connected via a relay network and data can be transmitted to the second network, which is one of other independent networks, after performing an operation necessary for control information included in a transfer unit to be transferred in the first network, which is one of a plurality of independent networks. Therefore, a transfer unit can be transmitted regarding these independent networks as one virtual network while taking into consideration roles played by control information in the first and second networks.

According to the third data communications system, structure data with a known structure to be transferred in the first network can be relayed to the second network side via a relay network and the data can be reproduced using information about the structure. In this way, structure data transmitted by a node belonging to the first network according to synchronous communications procedures can be transmitted to a node belonging to the second network with the original data structure maintained, and a variety of services can be provided, regardless of the scale of each network, the physical distance between networks, etc.

According to the fourth system, communications data that require synchronous control can be transmitted via a plurality of network routes with a plurality of pieces of different communications delay. Therefore, if large-capacity communications data, such as animation, a three-dimensional picture, etc., are transmitted, the receiving side can receive such communications data while securing synchronization even if there is no sufficient band in a single network route.

BRIEF DESCRIPTIONS OF THE DRAWINGS

FIG. 7 shows the configuration of the data communications system in a preferred embodiment of the present invention.

FIG. 8 shows the basic configuration of the data communications system in another preferred embodiment of the present invention.

FIG. 9 shows the basic configuration of the data communications system in another preferred embodiment of the present invention.

FIG. 14 is a flowchart showing the operation of transmitting a DV/IP capsule.

FIGS. 17A and 17B show a receiving buffer unit and a block counter unit, respectively.

FIGS. 18A and 18B are flowcharts showing the receiving operation and reproduction operation, respectively, of a DV/IP packet.

FIGS. 19A through 19C show the reproduction operation of DV data.

FIG. 20 shows the configuration of the data communications system corresponding to that shown in FIG. 10.

FIGS. 26A through 26C show both data writing and reproduction operations depending on a transmission mode.

FIG. 27 shows the transmitting/receiving control operations by the transmission/reception of a control packet.

FIG. 28 shows the basic configuration of the data communications system in a preferred embodiment of the present invention.

FIG. 31 shows the preferred embodiment of the data communications system of the present invention.

FIGS. 34A and 34B show a channel ID table.

FIG. 38 is a flowchart showing the editing operation of a transmitting packet.

FIG. 40 shows the basic configuration of the invented system in another preferred embodiment of the present invention.

FIG. 41 shows the detailed configurations of both transmitting packet editing and receiving packet editing units.

FIG. 48 shows the basic configuration of the data communications system in another preferred embodiment of the present invention.

FIG. 55 is a flowchart showing the reproducing operation of digital video data.

FIGS. 56 A and 56B show the reproducing operation of digital video data.

FIG. 57 shows the configuration of another preferred embodiment of a digital video data receiving unit.

FIG. 58 is a flowchart showing the output to operation of digital video data.

Figure 59A:
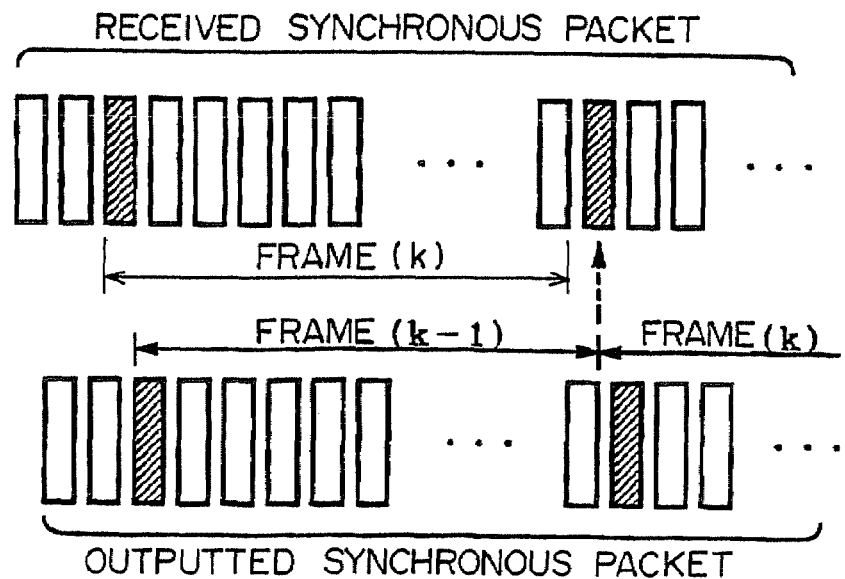
Figure 59B:
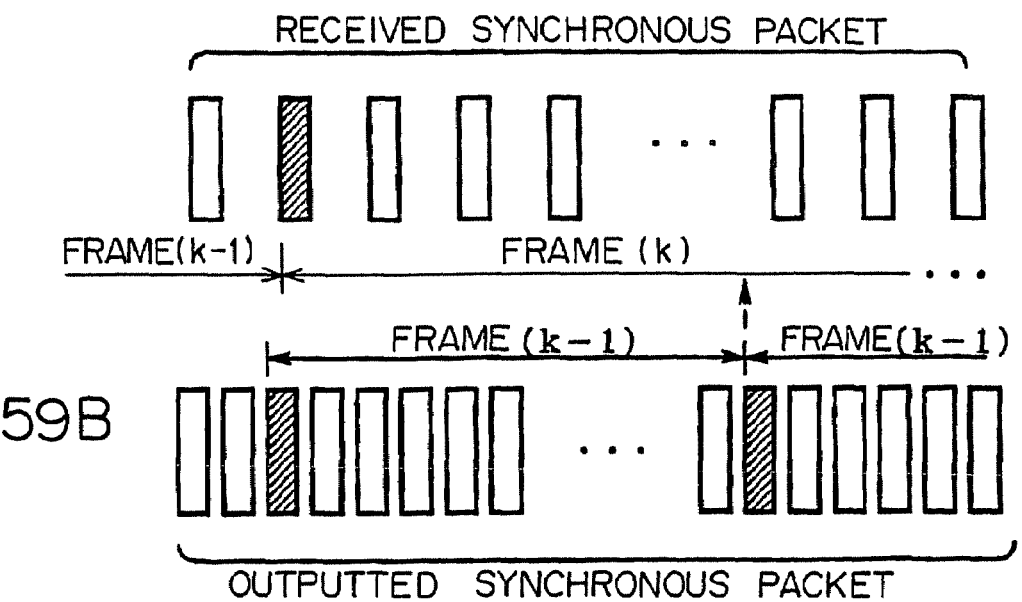

FIGS. 59A and 59B show the output operation of digital video data.

FIGS. 60A through 60C show problems caused in the actual application of the preferred embodiments described above.

FIG. 61 shows the general configuration of a relay device.

FIG. 62 shows problems of the preferred embodiments described above.

Figure 63:
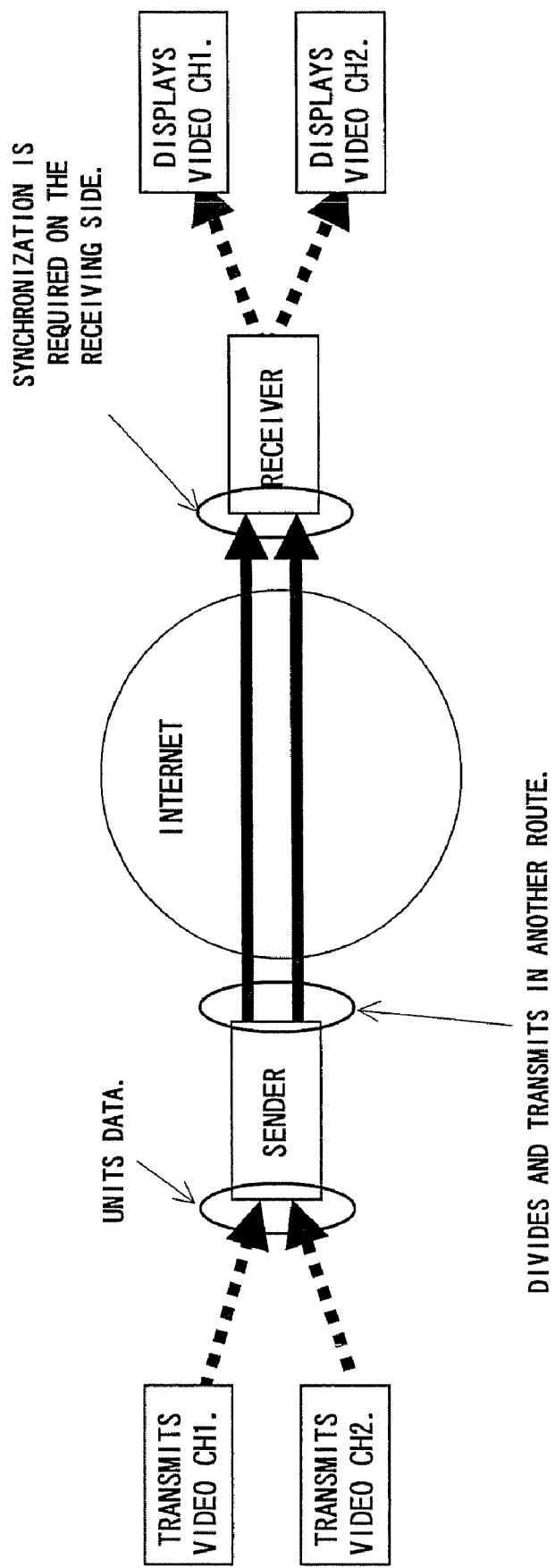

FIG. 63 shows the split communications of DV.

FIG. 64 shows the transmitting relay device in one preferred embodiment of the present invention.

FIG. 65 shows a receiving relay device in order to show how the communications delay of a single sender is adjusted.

FIG. 66 shows how the communications delay of a plurality of senders.

FIG. 67 shows the configuration of a transmitting relay device for synchronizing and transmitting data using a sequence number on the transmitting side.

Figure 68:
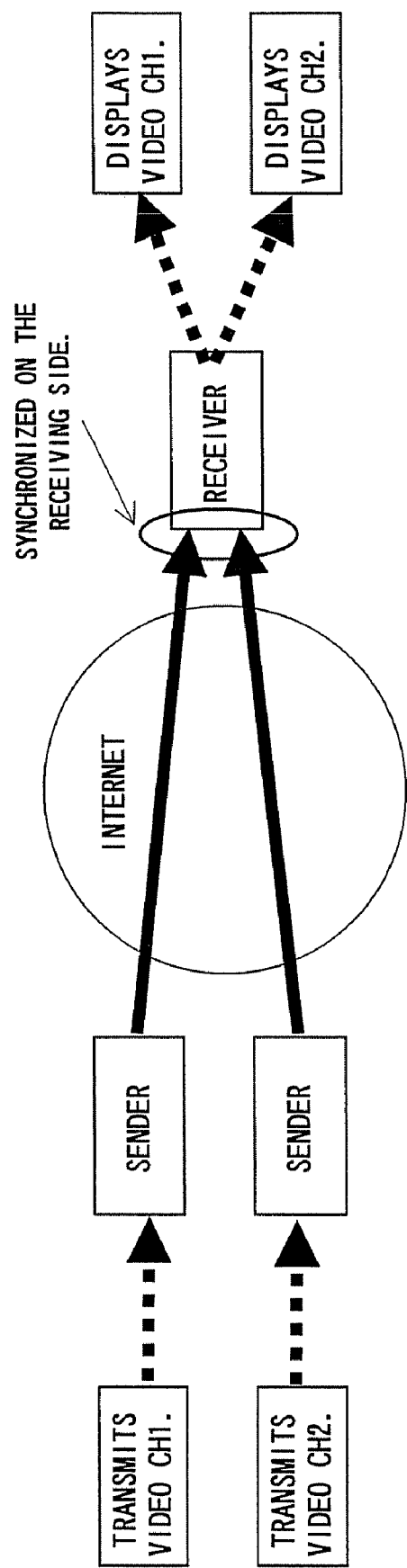

FIG. 68 shows a device for synchronizing and integrating the communications data of a plurality of senders on the receiving side.

Figure 69:
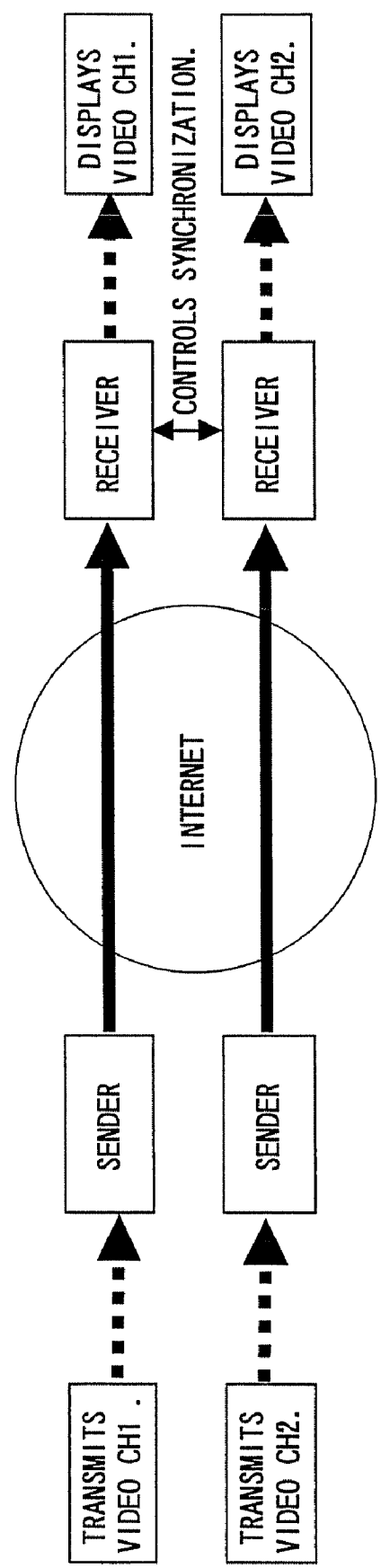

FIG. 69 shows another configuration for synchronizing and integrating a plurality of pieces of communications data from a plurality of senders on the receiving side.

Figure 70:
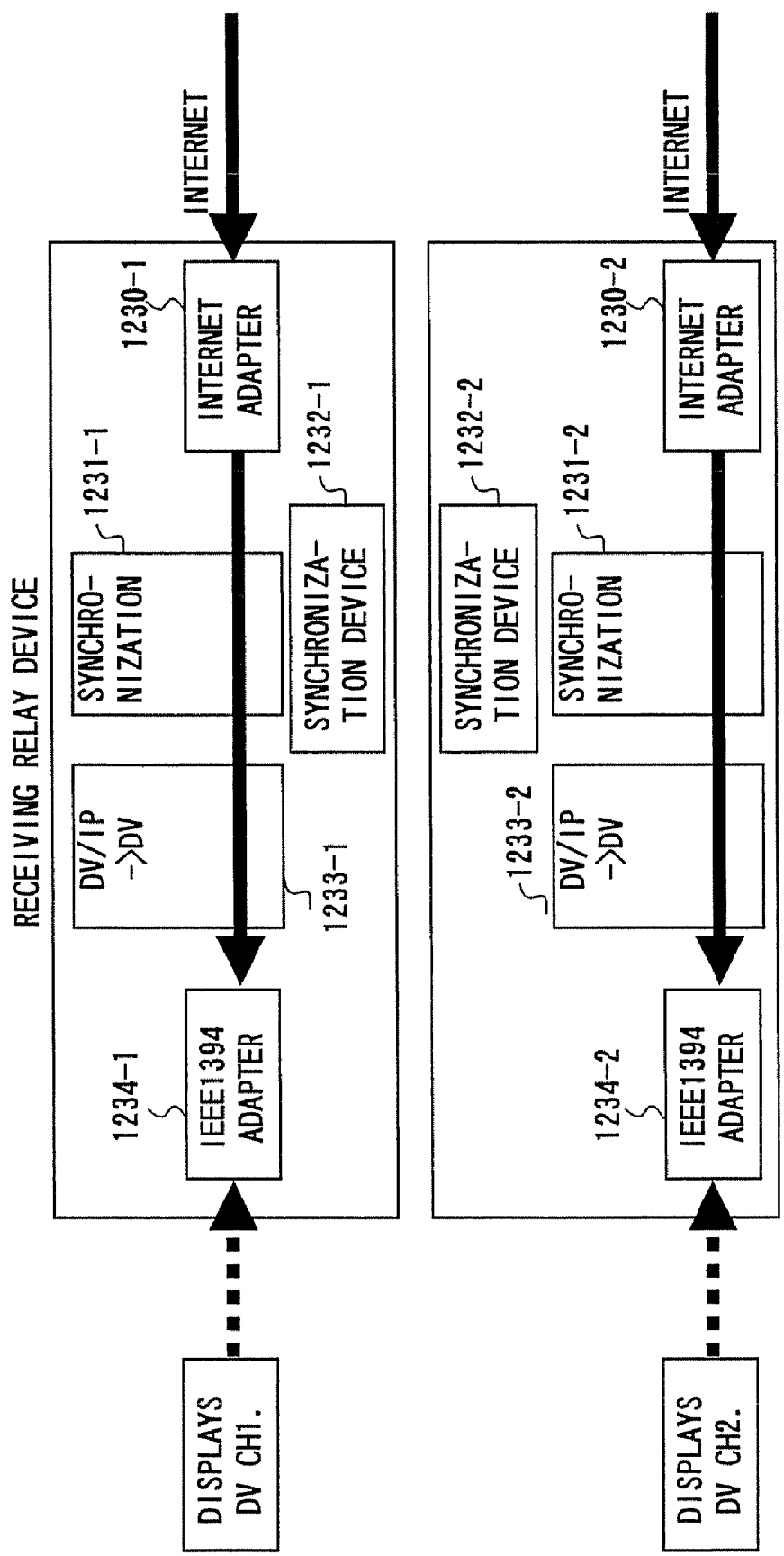

FIG. 70 shows the configuration of a receiving relay device in the case of a plurality of senders.

FIG. 71 shows the synchronous configuration in the case of a plurality of senders and a plurality of receivers.

FIG. 72 shows the configuration of a receiving relay device in the case where a synchronization device is used.

FIG. 73 shows the influence of the dynamic change of an effective available band in split communications (No. 1).

FIG. 74 shows the influence of the dynamic change of an effective available band in split communications (No. 2).

FIG. 75 shows a transmitting relay device for dynamically modifying a division method using network information.

Figure 76:
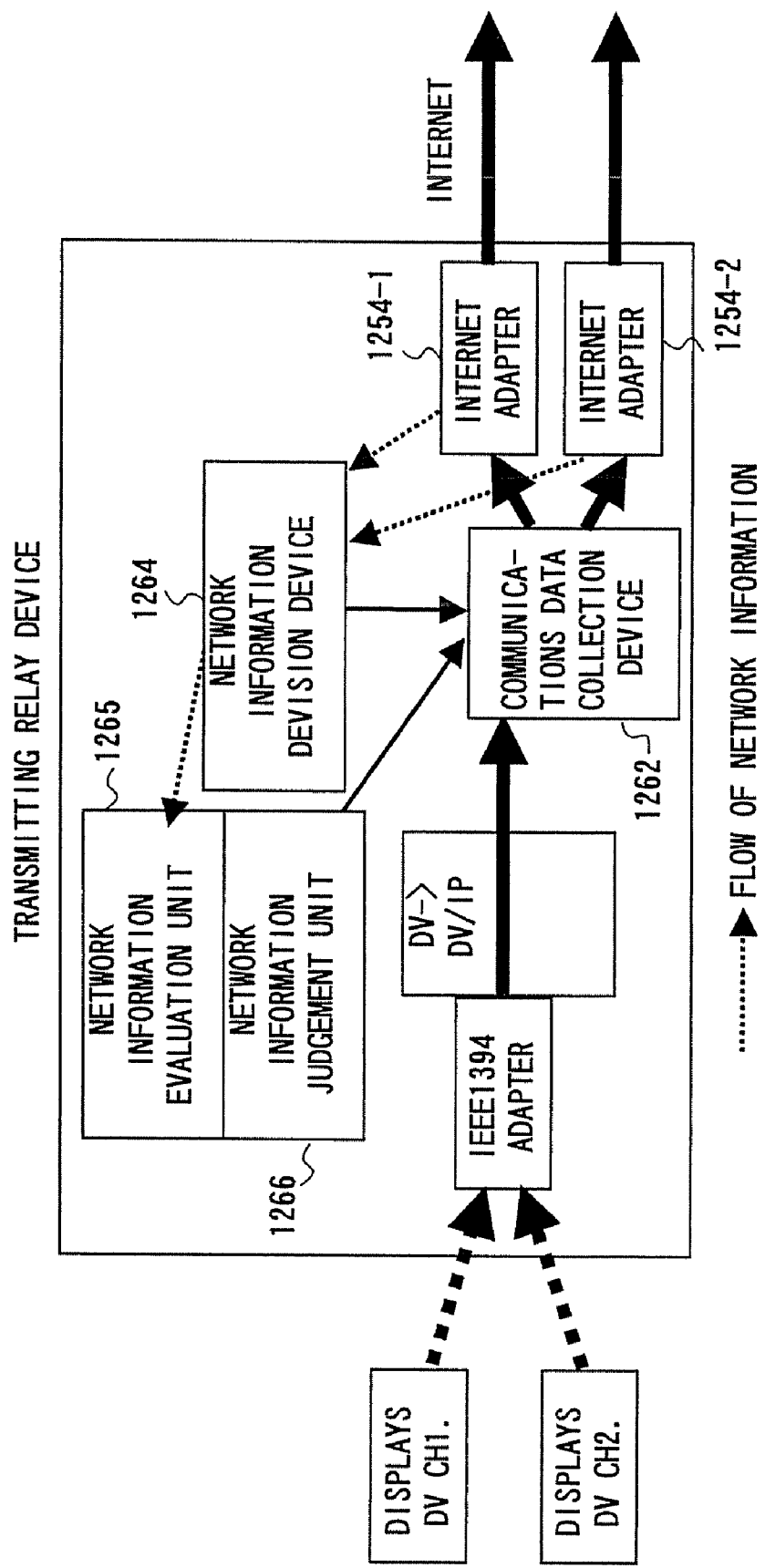

FIG. 76 shows the configuration of a transmitting relay device for preventing a small change in network information from being reflected on a data division principle.

FIG. 77 shows the detailed configuration of the data communications system.

Figure 78:
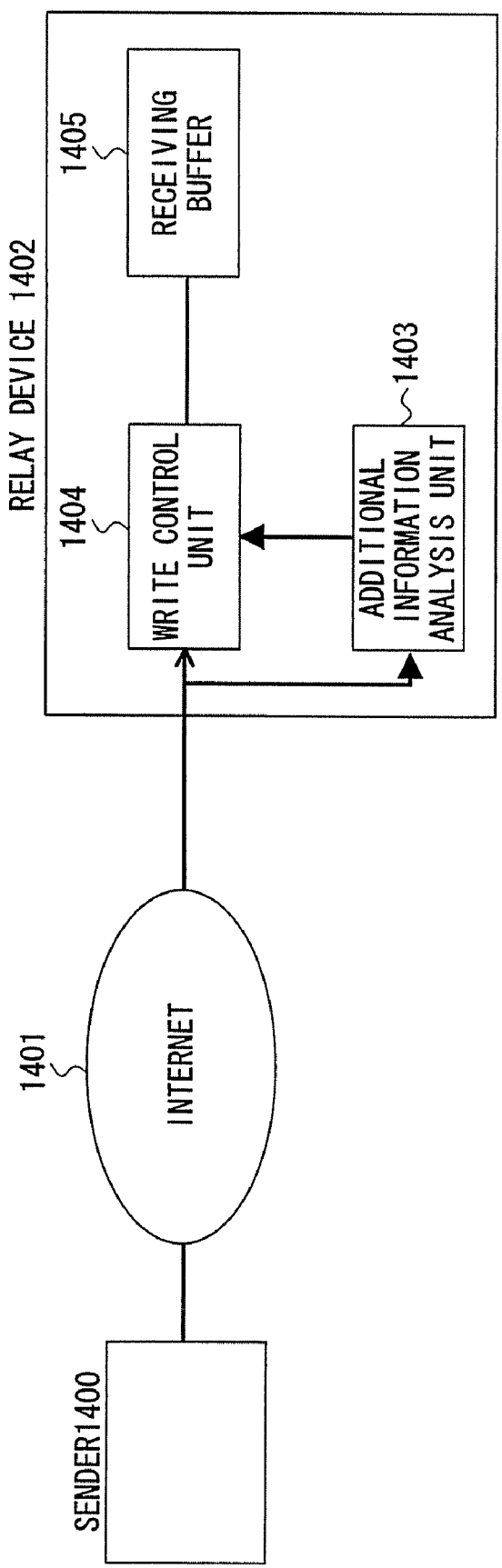

FIG. 78 shows a configuration for synchronizing and receiving a plurality of pieces of data based on additional information on the receiving side.

DESCRIPTION OF THE PREFERRED EMBODIMENTS

FIG. 7 shows the configuration of the data communications system.

According to the first preferred embodiment of the present invention, in a data communications system in which a transmitting side relay device 110 and a receiving side relay device 120 are connected to the first and second networks, respectively, for consecutively transferring prescribed transfer units at a specific transfer rate and with a specific transfer delay, and a data stream generated as a series of the transfer units are communicated as a series of datagram type packets, including the transfer unit via the third network, the transmitting side relay device 110 comprises additional information generation means 111 for generating additional information, including information about relationship between each transfer unit and the data stream based on the characteristics of the data stream, packet generation means 112 for generating a packet by attaching the additional information when each transfer unit composing the data stream is inputted and by also attaching header information suitable for transfer in the third network and transmitting means 113 for transmitting the packet to the third network according to prescribed procedures. The receiving side relay device 120 comprises separation means 121 for separating the additional information from the transfer unit, both of which are included in a packet received via the third network, analysis means 122 for analyzing the additional information separated by the separation means 121, reproduction means 123 for reproducing the data stream by locating a plurality of pieces of information included in the transfer unit received from the separation means 121 in appropriate positions in the data stream based on the analysis result of the analysis means 122 and output means 124 for outputting the data stream reproduced by the reproduction means 123 to the second network.

According to the configuration, a packet with both a transfer unit and additional information about the transfer unit can be transmitted by the additional information generation means 111, the packet generation means 112 and transmitting means 113 of both the transmitting side relay device 110 and the receiving side relay device 120, the original data stream can be reproduced by the analysis means 122 for analyzing additional information separated by the separation means 121 and the reproduction means for locating each transfer unit based on the analysis result.

In the data communications system, the additional information generation means 111 can also generate additional information, including a sequence number for indicating the transmission order of each transfer unit.

Furthermore, by the additional information generation means 111 for generating additional information, including a sequence number in each transfer unit, attaching this additional information to a corresponding transfer unit and transmitting the transfer unit, the arrival state can be checked based on this sequence number on the receiving side.

In the data communications system, the additional information generation means 111 can generate additional information, including a time stamp for indicating the transmission time of each transfer unit.

In this case, by the additional information generation means 111 for generating additional information, including a time stamp in each transfer unit, attaching this information to a corresponding transfer unit and transmitting the transfer unit, the original data stream can be reproduced using this time stamp.

In the data communications system, since a data stream transferred in the first and second networks has a prescribed cyclical structure, the additional information means 111 can generate additional information, including both a cycle to which each transfer unit belong, and a number for indicating an order in the cycle, based on the cyclical structure possessed by the data stream.

In this case, since the additional information generation means 111 generates additional information, including information about a position occupied by the transfer unit in the cyclical structure of the data stream, in each transfer unit, this information is attached to a corresponding transfer unit and the transfer unit is transmitted, the original data dream can be reproduced using this information about the position.

In the data communications system, since a data stream transferred in the first and second networks is digital video data, the additional information generation means 111 can generate additional information, including both a frame number for indicating each video frame composing digital video data and a data block number for indicating a data block composing the video frame.

In this case, since the additional information generation means 111 generates additional information, including both the relevant frame number and block number for each transfer unit composing digital video data, this information is attached to a corresponding transfer unit and the transfer unit is transmitted, the original data stream can be reproduced using a cyclical structure indicated by this information on the receiving side.

In the data communications system, since a data stream transferred in the first and second networks is composed of transfer units in which a plurality of types of different unit information are arranged in a prescribed format, the additional information generation means 111 can generate additional information, including type information about the kind of unit information included in each transfer unit.

In this case, since the additional information generation means 111 generates additional information, including information about the type of information composing a transfer unit, this information is attached to a corresponding transfer unit and the transfer unit is transmitted, a transfer state can be managed for each different type of information on the receiving side.

In the data communications system, since a data stream transferred in the first second networks is digital video data, the additional information generation means 111 can generate additional information, including information about the combination of a video information unit and an audio information unit included in each transfer unit.

In this case, since the additional information generation means 111 generates additional information about the combination of audio information and video information, this information is attached to a corresponding transfer unit and the transfer unit is transmitted, the respective transfer states of the audio information and the video information can be managed on the receiving side.

The data communications system comprises generation control means 114 for controlling the generation operation of a packet corresponding to each transfer unit depending on a transmission mode, and the additional information generation means 111 can generate additional information, including information about a process content designated by each transfer unit using the generation control means 114.

In this case, since both packet generation means 112 and additional information generation means 111 operate according to instructions from the generation control means 114, a different process can be applied for each transfer unit depending on a transmission mode, and information about the applied process content can also reported to the receiving side.

In the data communications system, since a data stream transferred in the first and second networks is digital video data, the generation control means 114 can judge whether audio information and video information, which are the constituent elements of each frame, should be transmitted and can instruct the packet generation means 112 to generate a packet, selectively including data to be transmitted. The additional information generation means 111 can generate additional information, including information about the type of data to be transmitted.

In this case, since the generation control means 114 for controlling the operation of the packet generation means 112 depending on a transmission mode, for example, a series of transfer units composing the relevant frame can be encapsulated by one of a process method for transmitting both pieces of video and audio information composing the frame for each frame, a process method for transmitting only one of audio information and video information and a process method for discarding the information of the relevant frame and can be transmitted to the third network. Simultaneously, information about the applied process method can be reported to the receiving side.

In the data communications system, the generation control means 114 can designate only one of audio data included in each transfer unit or only a transfer unit, including audio data as a transmission target for the packet generation means 112 and can instruct the packet generation means 112 to generate only the packet of the transmission target when a transmission mode for instructing to transmit only audio data included in digital video data is inputted.

In this case, since the generation control means 114 controls the operation of the packet generation means 112 when a transmission mode for instructing only audio data is inputted, a series of packets, including a transfer unit that is generated from the audio information extracted from the relevant frame or a series of packets obtained by selectively encapsulating a transfer unit, including audio information included in a transfer unit composing the relevant frame can be transmitted to the third network using the function of the transmitting means 113.

The data communications system comprises a transmitting control means 115 for adjusting a transmission rate used when the transmitting means 113 transmits a packet, including each transfer unit to the third network, to a prescribed transmission rate corresponding to a transmission mode when a transmission mode is inputted.

In this case, since the transmitting control means 115 operates depending on a transmission mode, the transmitting means 113 can transmit a packet corresponding to each transfer unit to the third network at a transmission rate suitable for the process method of each transfer unit indicated by the transmission mode.

In the data communications system, the transmitting means 113 comprises a transmitting means 116 for sequentially transmitting packets inputted as packets to be transmitted to the third network and a target input means 117 for inputting each packet generated by the packet generation means 112 to the transmitting means 116 as a packet to be transmitted and also selectively repeatedly inputting a part of packets as packets to be transmitted.

In this case, since the target input means 117 repeatedly inputs a part of packets generated by the packet generation means 112 to the transmitting means 116, a packet lost in the transmission process of the third network can be compensated for with the packet repeatedly transmitted.

In the data communications system, the target input means 117 can input a packet to the transmitting means 116 as a packet to be transmitted as many times as required immediately after inputting a packet to be repeatedly transmitted.

In this case, since the target input means 117 inputs the copy of a packet to transmitting means 116 following a packet to be repeatedly transmitted, there is no need of a device for storing the copy and thereby the hardware configuration for implementing the target input means 117 can be simplified.

In the data communications system, since a data stream transferred in the first and second networks has a prescribed cyclical structure, the target input means 117 can store one cycle of data stream of the copy of a packet to be repeatedly transmitted and can input the copy of the packet to be repeatedly transmitted to the transmitting means 116 after inputting packets corresponding to all transfer units composing one cycle of data stream.

In this case, since the target input means 117 can consecutively transmit packets to be repeatedly transmitted that are included in the relevant cycle after all packets corresponding to one cycle of transfer units are transmitted to the third network, a packet to be repeatedly transmitted or the copy can be expected to reach the receiving side even if the lost of a packet bursts in a transmission route.

In the data communications system, since a data stream transferred in the first and second networks has a prescribed cyclical structure, the target input means 117 can store in advance one cycle of data stream of both all packets generated by the packet generation means 112 and the copies of packets to be repeatedly transmitted and can input all the stored packets to the transmitting means 116 in a random order.

In this case, the target input means 117 can transmit both all packets corresponding to one cycle of transfer units and the copies of packets to be repeatedly transmitted to the third network in a random order.

In this way, even if the lost of packets bursts in a transmission route, packets to be repeatedly transmitted or the copies can be expected to reach the receiving side.

In the data communications system, the reproduction means 123 of the receiving side relay device 120 is configured as the array of a plurality of dimensions in which each element has a prescribed data length, and it comprises a receiving buffer 125 for storing each transfer unit separated by the separation means 121 when a write instruction is inputted and a writing control means 126 for generating a write instruction indicating the relevant element of the array of a plurality of dimensions composing the receiving buffer 125, based on the analysis result of additional information corresponding to each transfer unit.

In this case, since both the receiving buffer 125 and writing control means 126 of the reproduction means 123 of the receiving side relay device 120 operate based on the analysis result on additional information corresponding to each transfer unit, information composing a transfer unit included in a received packet can be stored as the appropriate element of an array. Therefore, the order of each transfer unit in the original data stream can be reproduced in the receiving buffer 125, regardless of the modification of the order in a transmission route.

In the data communications system, since a data stream transferred in the first and second networks has a prescribed cyclical structure, the receiving buffer 125 can be an array structure of a plurality of dimensions based on the cyclical structure of a data stream.

In this case, since the receiving buffer 125 is configured based on the cyclical structure of a data stream, the process load of the writing control means 126 can be reduced.

FIG. 8 shows the basic configuration of the data communications system in the second preferred embodiment of the present invention.

In the data communications system, since the additional information generation means 111 of the transmitting side relay device 110 generates additional information, including a sequence number for indicating the transmission order of each transfer unit, the reproduction means 123 of the receiving side relay device 120 comprises a first evaluation means 127 for evaluating the integrity of data stored in the receiving buffer 125, based on the continuity of sequence numbers that are included in additional information separated from each packet that reaches the receiving side relay device 120 and a compensation means 128 for compensating for data stored in the receiving buffer 125, based on the evaluation result on the integrity of data stored in the receiving buffer 125.

In this case, the first evaluation means 127 judges whether a series of packets transmitted to the third network by the transmitting side relay device reach the receiving side relay device with the order maintained, using the sequence numbers attached by the additional information generation means 111, and this judgment result can be provided for the compensation process of the compensation means 128.

In the data communications system, a data stream transferred in the first and second networks is composed of transfer units obtained by arranging a plurality of different types of unit information in a prescribed format and the additional information generation means 111 generates additional information, including type information about the type of unit information included each transfer unit. The reproduction means 123 of the receiving side relay device 120 comprises counter means 129 for sorting and counting transfer units included in each packet that reaches the receiving side relay device 120 for each piece of constituent unit information, second evaluation means 130 for evaluating the integrity of data stored in the receiving buffer 125, based on the counting result of the counter means 129 and compensation means 128 for compensating for data stored in the receiving buffer 125.

In this case, both the counter means 129 and second evaluation means 130 can evaluated an arrival state for each different type of information composing a data stream, using type information attached by the additional information generation means 111, and the compensation means 128 can perform a finer compensation process based on this evaluation result.

In the data communications system, since a data stream transferred in the first and second networks is digital video data, the counter means 129 can sort and count packets, including the audio information unit of digital video data.

In this case, the counter means 129 can obtain information about the number of audio information units that reach the receiving side relay device 120.

In the data communications system, since a data stream transferred in the first and second networks is digital video data, the counter means 129 can sort and count packets, including the frame header information of digital video data.

In this case, the counter means 129 can obtain information about the number of video information units that reach the receiving side relay device 120.

In the data communications system, since a data stream transferred in the first and second networks is digital video data, the counter means 129 can sort and count packets, including the frame header information of digital video data.

In this case, the counter means 129 can obtain information about the number of frame header information units that reach the receiving side relay device 120.

In the data communications system, the compensation means 128 comprises a compensation information storage means 131 for storing appropriate compensation information for each transfer unit and a composition means 132 for composing a data stream consisting of a series of transfer units by selecting either a transfer unit stored in the receiving buffer 125 or corresponding compensation information, based on the evaluation result of the second evaluation means 130.

In this case, since the composition means 132 of the compensation means 128 operates based on the evaluation result of the second evaluation means 130, information that can replace the transfer unit can be compensated for, using the relevant compensation information stored in the compensation information storage means 131, for example, if a packet, including a transfer unit to be stored as the prescribed element of an array composing the receiving buffer 125, is lost.

FIG. 9 shows the basic configuration of the data communications system in the third preferred embodiment of the present invention.

In the data communications system, the receiving side relay device 120 comprises a delay amount storage means 133 for storing a prescribed delay amount and a target determination means 134 for receiving position information about a position that the relevant transfer unit occupies in the original data stream, as an analysis result obtained about additional information separated from the latest arrival packet, determining a list of a series of transfer units to be reproduced by the reproduction means 123 in units of the size of an array composing the receiving buffer 125, based on a result obtained by subtracting the delay amount from the position information and reporting the relevant array to the reproduction means 123.

In this case, since the target determination means 134 determines a series of transfer units to be reproduced using the delay amount stored in the delay amount storage means 133 based on additional information included the latest arrival packet, the relevant part of a data stream can be reproduced from each element of an array, including a transfer unit positioned before the latest arrival packet by the delay amount described above in the original data stream as an element.

In this way, a transfer delay between a data stream transferred in the first network and a data stream reproduced by the reproduction means 123 can be maintained at the delay amount described above.

In the data communications system, since a data stream transferred in the first and second networks is digital video data, the additional information generation means 111 of the transmitting side relay device 110 can generate additional information, including a frame number for indicating each video frame composing the digital video data. The receiving buffer 125 can store a transfer unit, including information composing each piece of information in relation to a plurality of video frames as each element of an array. The delay amount storage means 133 can store a prescribed number of frames as a delay amount. The target determination means 134 can receive the frame number from the analysis means 122 as the position information and can determine an array to be reproduced based on both this frame number and the prescribed number of frame.

In this case, since the target determination means 134 operates based on the frame number received from the analysis means, the transfer delay between a data stream transferred in the first network and the data stream reproduced by the reproduction means 123 can be maintained at the number of frames stored in the delay storage unit 133.

In the data communications system, the additional information generation means 111 of the transmitting side relay can generate additional information, including a time stamp for indicating the transmission time of each transfer unit. The delay amount storage means 133 can store a prescribed delay time as a delay amount. The target determination means 134 can receive the time stamp from the analysis means 122 as position information and can determine an array to be reproduced, based on both the time indicated by this time stamp and the delay time.

In this case, since the target determination means 134 operates based on the time stamp received from the analysis means 122, the transfer delay between a data stream transferred in the first network and the data stream reproduced by the reproduction means 123 can be maintained at the delay time stored in the delay amount storage means 133.

In the data communications system, the receiving side relay device comprises a modification means 135 for modifying the delay amount stored in the delay amount storage means 133 when a modification instruction is inputted.

In this case, since the modification means 135 can adjust dynamically the delay amount stored in the delay amount storage means 133, for example, the change in traffic in the third network, etc., can be flexibly coped with.

Figure 10:
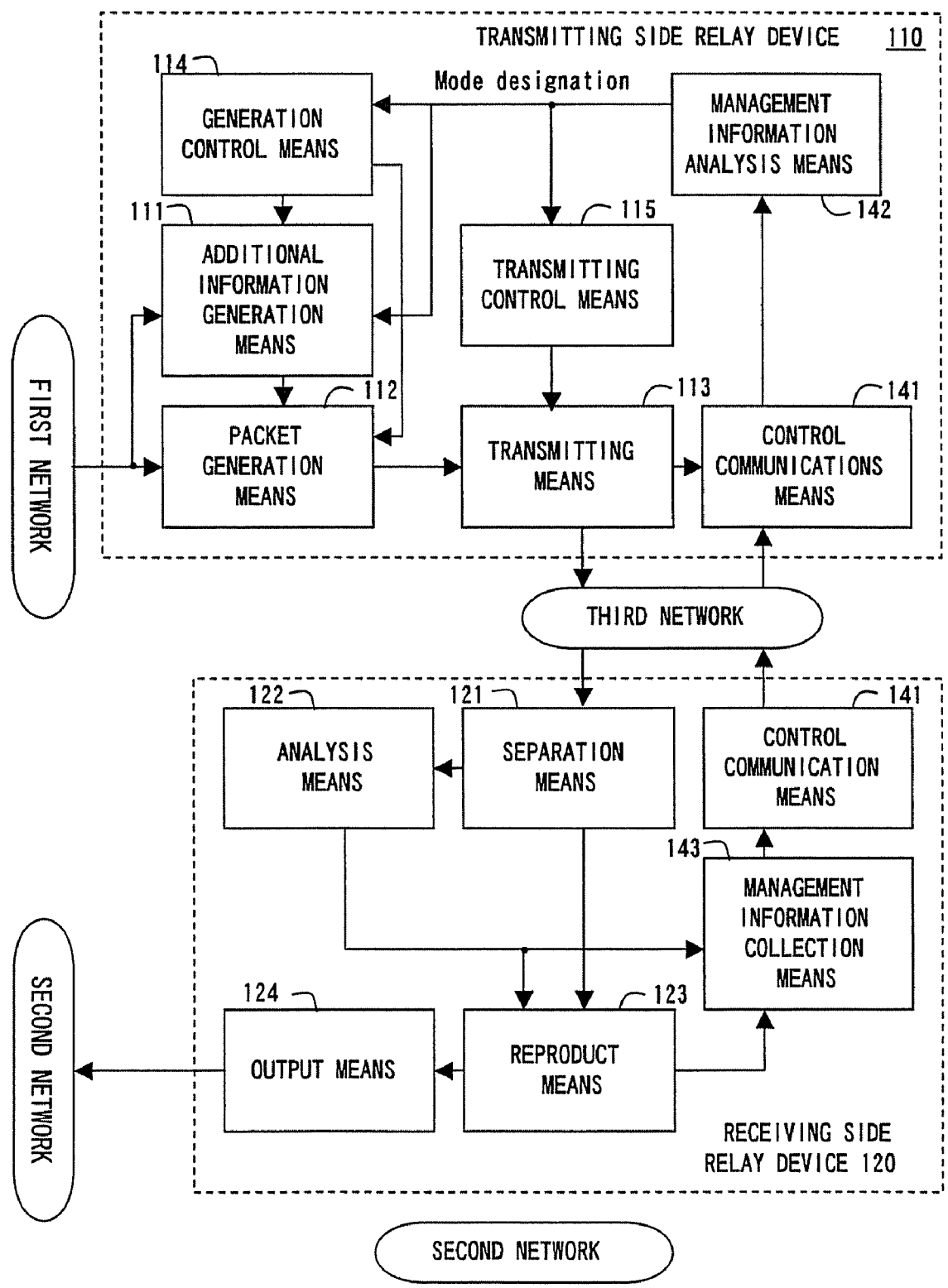
FIG. 10 shows the basic configuration of the data communications system in another preferred embodiment of the present invention.

FIG. 10 shows the basic configuration of the data communications system in the fourth preferred embodiment of the present invention.

In the data communications system, each of the transmitting side relay device 110 and the receiving side relay device 120 comprises a control communications means 141 for transmitting/receiving a control packet in a prescribed format via the third network.

In this case, since each of the transmitting side relay device 110 and the receiving side relay device 120 comprises a control communications means 141, control information for controlling the operation of the opposite device can be transmitted/received to/from each other.

In the data communications system, the transmitting side relay device 110 comprises generation control means 114 for controlling the generating operation of a packet corresponding to each transfer unit when a transmission mode is inputted, transmitting control means 115 for adjusting a transmission rate used when the transmitting means 113 transmits a packet, including each transfer unit to the third network, to a prescribed transmission rate corresponding to the transmission mode when the transmission rate is inputted and management information analysis means 142 for analyzing management information included the control packet received via the control communications means 141 of the self device and inputting an appropriate transmission mode to both the generation control means 114 and transmitting control means 115, based on this analysis result. The receiving side relay device 120 comprises management information collecting means 143 for collecting management information about the quality of a data stream that the self device receives via the third network, based on the analysis result obtained by the analysis means 122 or information about a reproduction process of the reproduction means 123 and transmitting the information to the transmitting side relay device 110 as a control packet via the control communications means 141 of the self device.

In this case, the receiving side relay device 120 can notify the transmitting side relay device 110 of management information about the quality of a data stream received via the third network by the management information collecting means 143 and control communications means 141 of the receiving side relay device 120. Then, the management analysis means 142 of the transmitting side relay device 110 can operate and input an appropriate transmission mode to both the generation control means 114 and transmitting control means 115.

In this way, the transmitting operation of the transmitting side relay device 110 can be controlled depending on the communications quality obtained based on information that actually reaches the receiving side. Then, an appropriate process method can be applied to each transfer unit. Then, a packet can be transmitted to the third network at an appropriate transmission rate.

Figure 11:
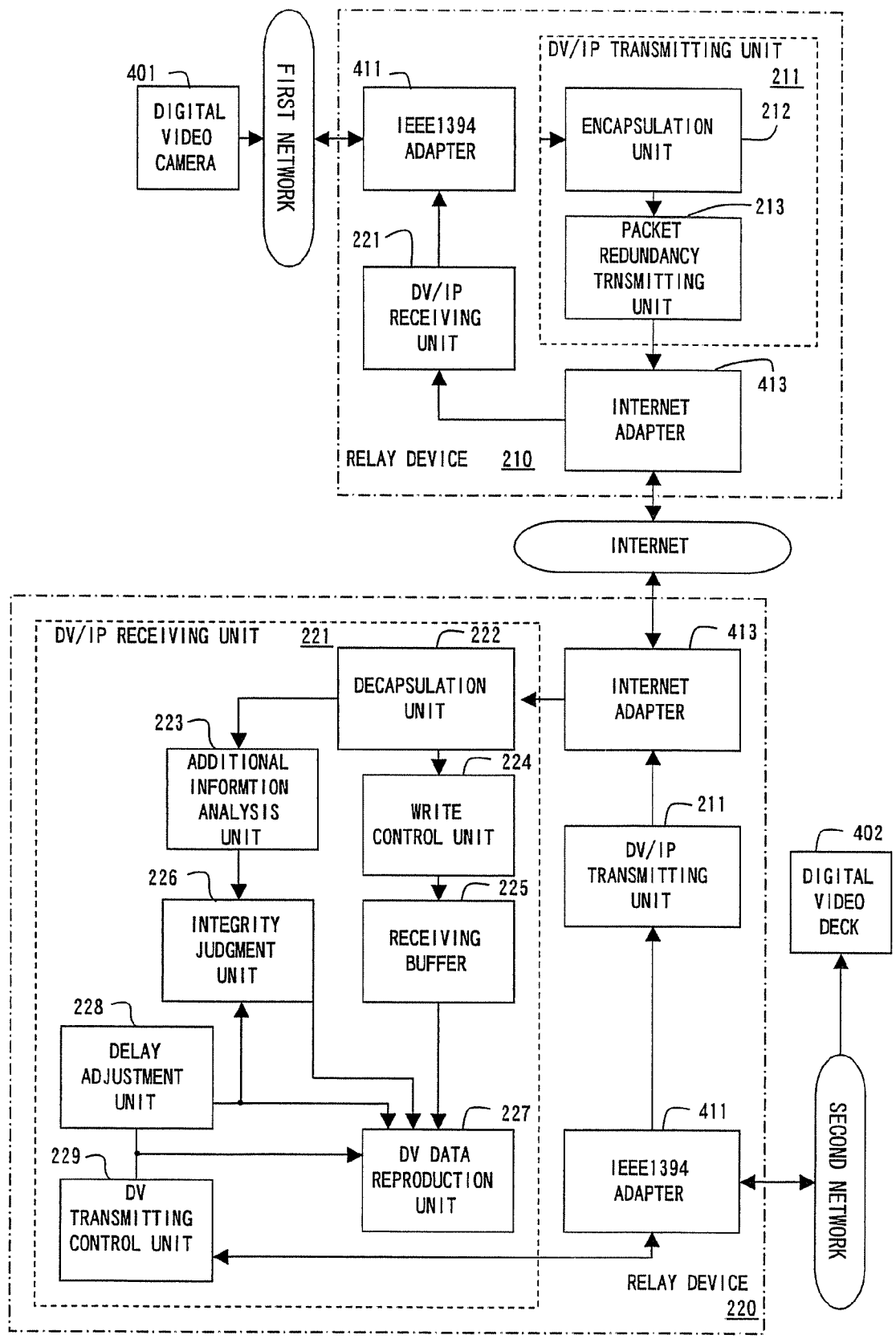
FIG. 11 shows the detailed preferred embodiment of the data communications system of the present invention.

FIG. 11 shows the detailed preferred embodiment of the data communications system of the present invention.

Each of two relay devices 210 and 220 comprises an IEEE1394 adapter 411, and the two devices are connected to the first and second networks, respectively via this IEEE1394 adapter 411.

Each of the relay devices 210 and 220 further comprises an Internet adapter 413, and each of the relay devices is connected to the Internet via this Internet adapter 413.

A DV/IP transmitting unit 211 shown in FIG. 11 comprises an encapsulation unit 212 for IP-encapsulating an IEEE1394 packet received via the IEEE1394 adapter 411 by a method described later, and a packet redundancy transmitting unit 213 for receiving the IEEE1394 packet IP-encapsulated by the encapsulation unit and transmitting the packet to the Internet adapter 413 overlapping a part of packets by a method described later.

Figure 12:
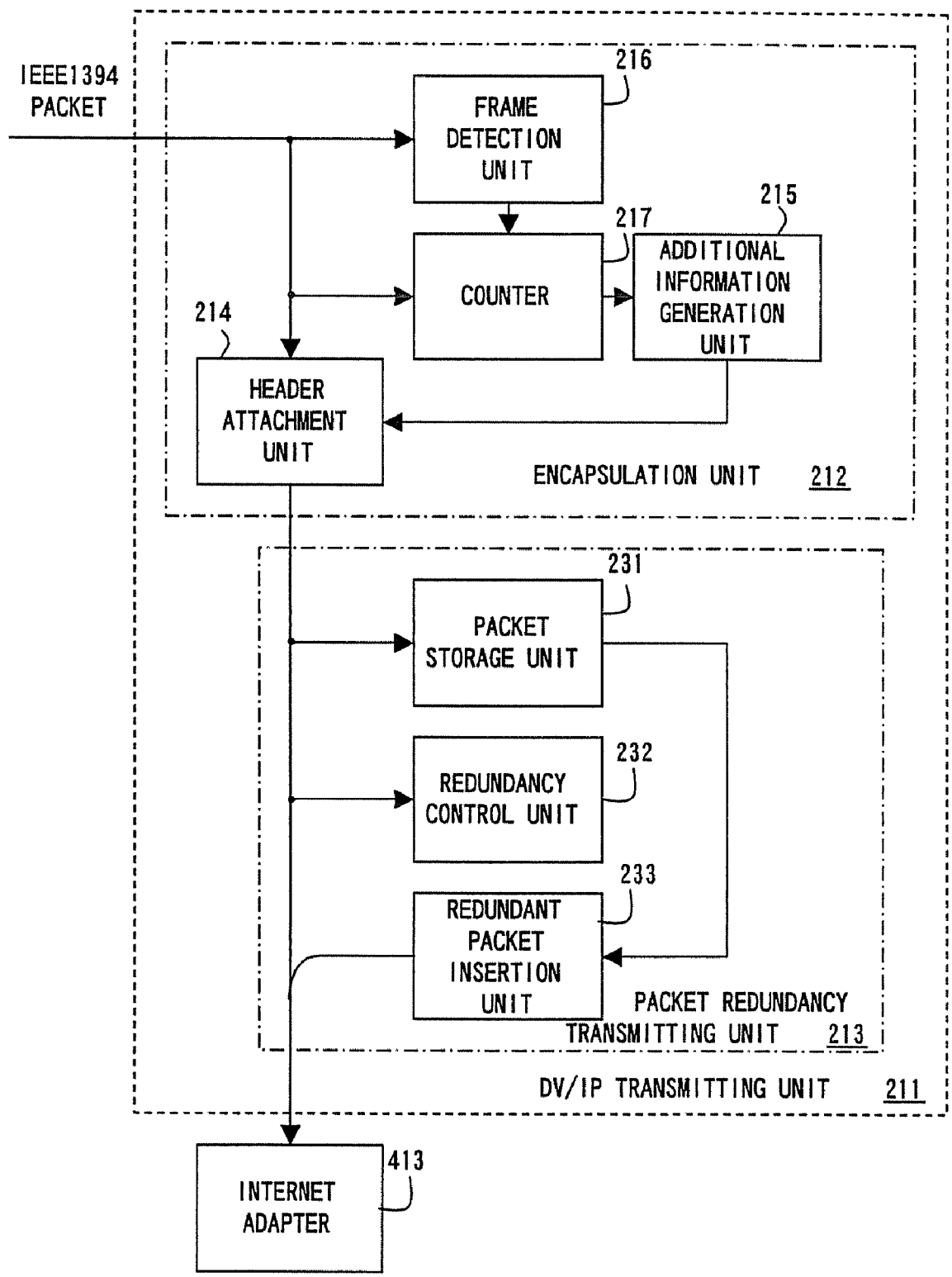
FIG. 12 shows the detailed configuration of a DV/IP transmitting unit.

FIG. 12 shows the detailed configuration of the DV/IP transmitting unit 211.

Figure 13:
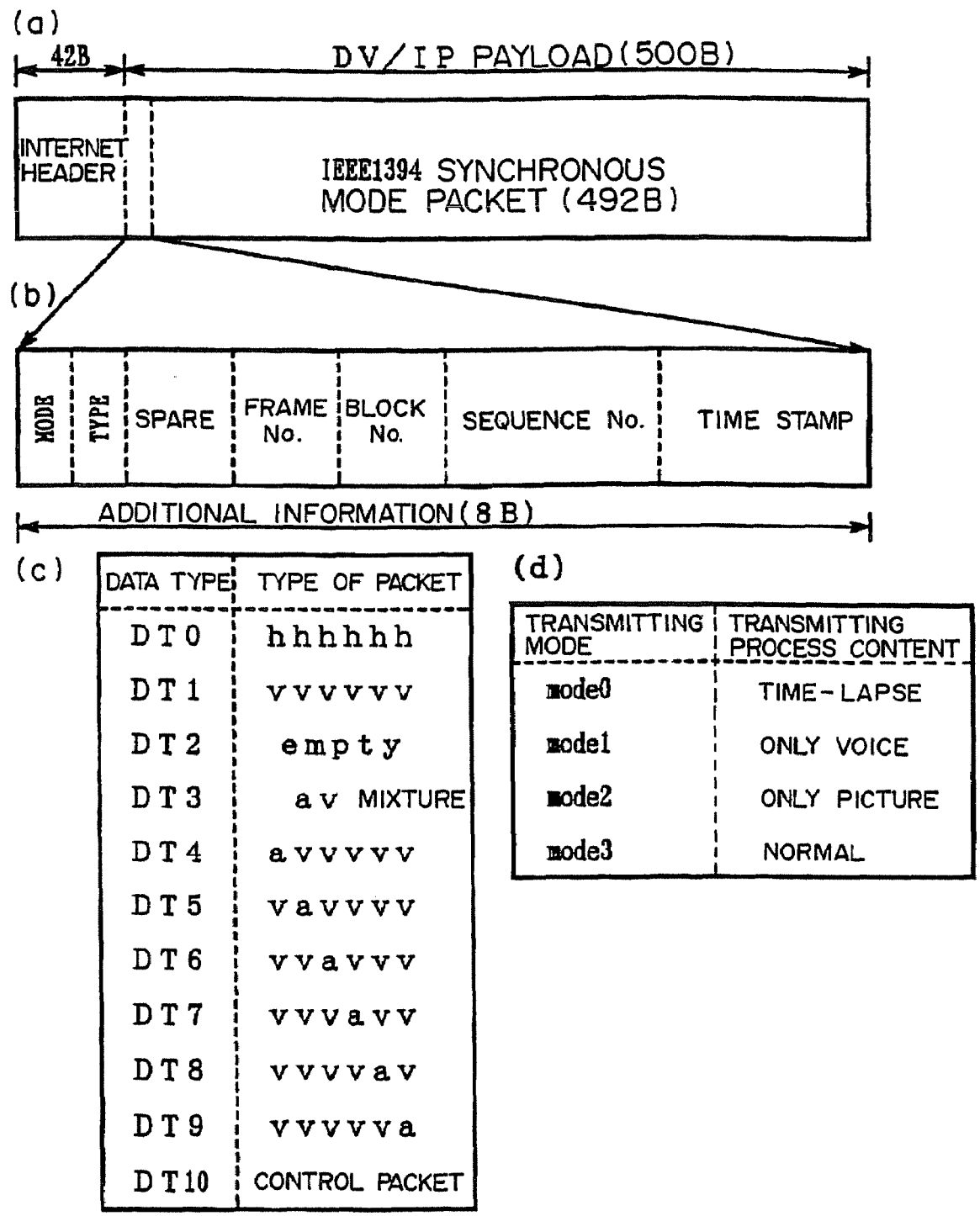
FIG. 13 shows the structure of additional information.

The encapsulation unit 212 shown in FIG. 12 encapsulates an IEEE1394 packet in an Ethernet packet format, IP packet format or UDP packet format. As shown in FIG. 13, a header addition unit 214 generates a DV/IP payload by attaching additional information received from an additional information generating unit 215 to an IEEE1394 packet and further attaches an Internet header consisting of 20 bytes of an IP header, 8 bytes of an UDP header and 14 bytes of Ethernet header to the payload.

The frame detection unit shown in FIG. 12 detects the head of a series of IEEE1394 packets for indicating one frame of both video data and audio data. A counter 217 performs counting operation based on both the detection result of the frame detection unit 216 and the input of an IEEE1394 packet.

The additional information generating unit 215 has a function to generate additional information (see FIG. 13), including a frame number for indicating both a video frame, to which an IEEE1394 packet belongs, and a block number for indicating a position occupied by the relevant IEEE1394 packet in the frame.

In the packet redundancy transmitting unit 213 shown in FIG. 12, a packet extraction unit 231 extracts a part of packets to be repeatedly transmitted that are generated by the encapsulation unit 212, according to the instruction from a redundancy transmitting control unit 232 and stores the packets in a packet storage unit 231.

The redundant packet insertion unit 233 shown in FIG. 12 reads packets to be repeatedly transmitted from the packet storage unit 231 in prescribed procedures according to the instruction from the redundant transmitting control unit 232 and inserts the packets in a series of packets inputted to the Internet adapter 413.

In the relay device 220 shown in FIG. 11, a packet inputted to the DV/IP receiving unit 221 via the Internet adapter 413 is broken down into the additional information and an IEEE1394 packet by a decapsulation unit 222.

Since the additional information separated from the DV/IP packet in this way is analyzed by an additional information analysis unit 223 and a writing control unit 224 operates based on this analysis result, each of the DIF blocks included each IEEE1394 packet is written in the relevant storage place of a receiving buffer 225.

The integrity judgment unit 226 shown in FIG. 11 receives additional information from the decapsulation unit 222, collects information about the integrity of digital video data belonging to each frame based on this additional information, judges the integrity of designated frames based on the collected information and provides this judgment result for the reproduction process of a DV data reproduction unit 227.

The delay adjustment unit 228 shown in FIG. 11 operates according to the reproduction instruction from a DV transmitting control unit 229, determines a frame to be reproduced based on the decapsulation unit 222 and transmits this information for designating a frame to both the integrity judgment unit 226 and DV data reproduction unit 227.

A DV transmitting control unit 229 obtains information about appropriate timing, for example, by transmitting/receiving a timing signal to/from the IEEE1394 adapter 411 and transmits a reproduce instruction to both the delay adjustment unit 228 and DV data reproduction unit 227, based on this signal.

The digital video data reproduced by the DV data reproduction unit 227 shown in FIG. 27 are transmitted to the second network via the IEEE1394 adapter 411 as a packet stream in an IEEE1394 synchronous mode and are inputted to a digital video deck 402.

Next, an operation in which the relay device 210 on the transmitting side transmits digital video data to be transmitted in an IEEE1394 synchronous mode in the first network, to the second network side via the Internet is described.

FIG. 14 is a flowchart showing an operation of transmitting a DV/IP capsule.

If an IEEE1394 packet, including information about the head of a frame, is inputted to the DV/IP transmitting unit 211 via the IEEE1394 adapter 411 (step 301), in step 302 judgment becomes yes based on the detection result of the frame detection unit 216 of the encapsulation unit 212. Then, a counter 217 increments the counter value FC of a frame counter for indicating the number of frames and simultaneously sets the counter value of a packet counter for indicating the number of IEEE1394 packets belonging to a frame, to the initial value 1 (step 303).

If in step 302 judgment is no, the flow proceeds to step 304 and only the counter value PC of the packet counter is incremented.

The additional information generating unit 215 receives the counter values PC and/or FC obtained in this way, calculates a data type for indicating the type of data included in the relevant IEEE1394 packet, based on this packet number, and as shown in FIG. 13, it generates additional information by inserting the data type in the corresponding position (step 305).

Figure 1:
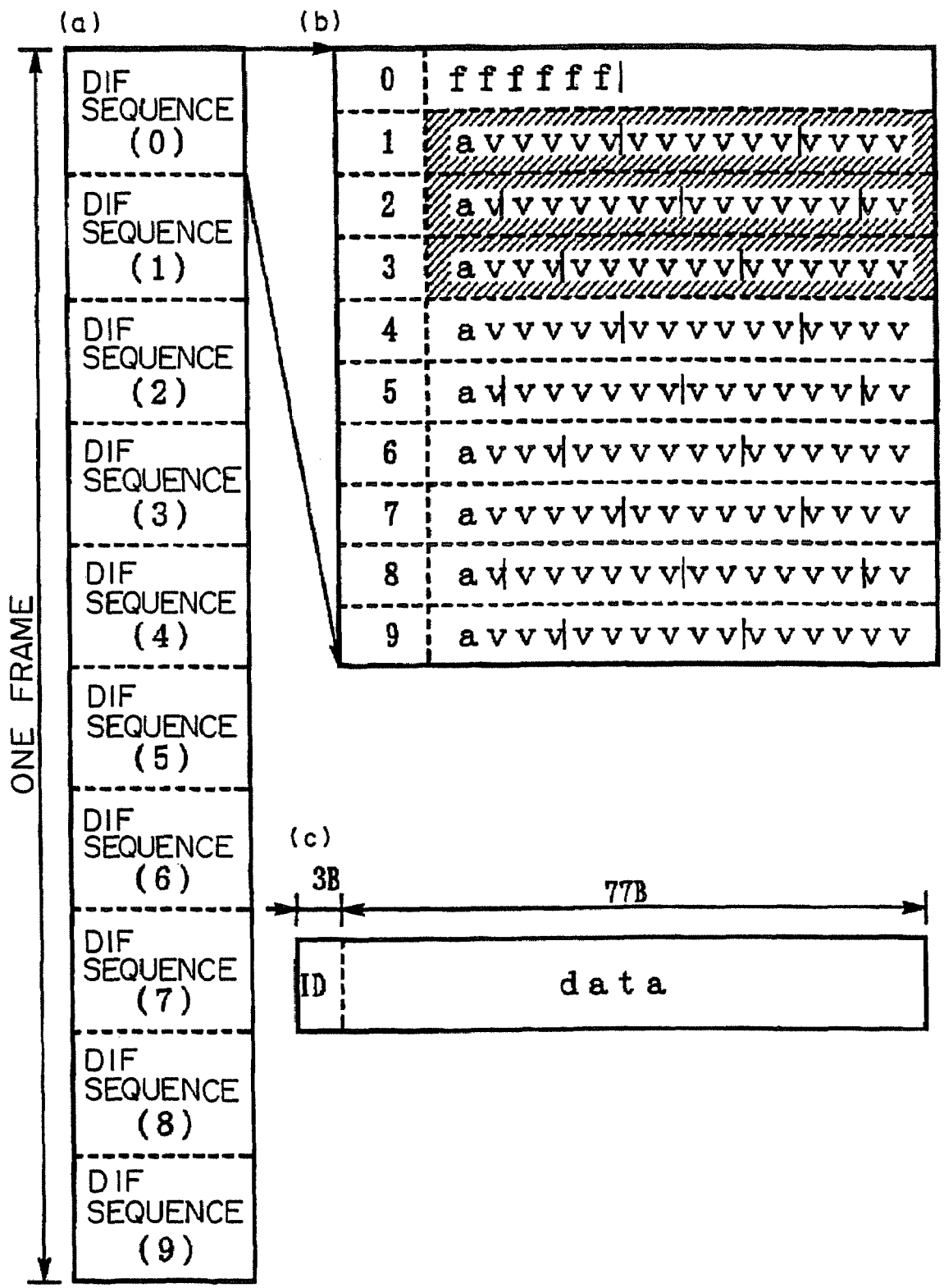
FIG. 1 shows the format of digital video data.

In this case, since in an IEEE1394 synchronous mode, the combination of data included in the IEEE1394 packet is uniquely determined by the packet number for indicating the order of each IEEE1394 packet, as shown in FIG. 1, the data type of each packet is determined, as shown in FIG. 13C.

In FIG. 13C, symbols f, v and a indicate a DIF block, including a frame header, a DIF block, including video data (hereinafter called a "video block") and a DIF block, including audio data (hereinafter called an "audio block"), respectively. "Empty" indicated in relation to data type DT2 indicates an empty packet stipulated in the IEEE1393 standard and "av mixed" indicated in relation to data type DT3 indicates a packet consisting of five video blocks and one audio block, regardless of the position of an audio block. Data types DT4 through DT9 correspond to the respective different combinations of audio blocks and video blocks, and data type DT10 indicates a control packet.

When information generated in this way is inputted, the header addition unit 214 a DV/IP packet, by, first, attaching the additional information described above to an inputted IEEE1394 packet, then by attaching an Internet header consisting of an IP header and an UDP header (step 306) and the obtained DV/IP packets are sequentially transmitted to the Internet via the Internet adapter 413 (step 307).

At this moment, the redundancy transmitting control unit 232 judges whether the relevant DV/IP packet is to be repeatedly transmitted, for example, based on additional information included in each DV/IP packet (step 308).

In this case, the redundancy transmitting control unit 232 judges whether the relevant DV/IP packet includes a frame header or audio data, for example, based on a block number included in the additional information. If one of them is included, the DV/IP packet is judged to be repeatedly transmitted.

In this way, if it is to be repeatedly transmitted (Yes in step 308), the packet storage unit 231 operates according to the instruction from this redundancy transmitting control unit 232, and in step 309, this DV/I P packet is stored and the flow proceeds to step 310.

If the Transmitted DV/IP packet is not to be repeatedly transmitted, in step 308 judgment becomes no, the flow proceeds to step 310 and in step 310 the redundancy transmitting control unit 232 judges whether the transmitting operation of one frame of DC/IP packets are completed.

If in step 310 judgment becomes no, the flow returns to step 301 and a newly inputted IEEE1394 packet is processed.

In this way, if both the encapsulation process and transmitting process of one frame of IEEE1394 packets are completed, in step 310, the judgment of the redundancy transmitting unit 232 becomes yes, and the flow proceeds to step 311. At this moment, a redundant packet insertion unit 233 operates according to the instruction from this redundancy transmitting control unit 232 and the DV/IP packet to be repeatedly transmitted that is stored in the packet storage unit 231 is transmitted to the Internet via the Internet adapter 413 (step 311).

Figure 15A:
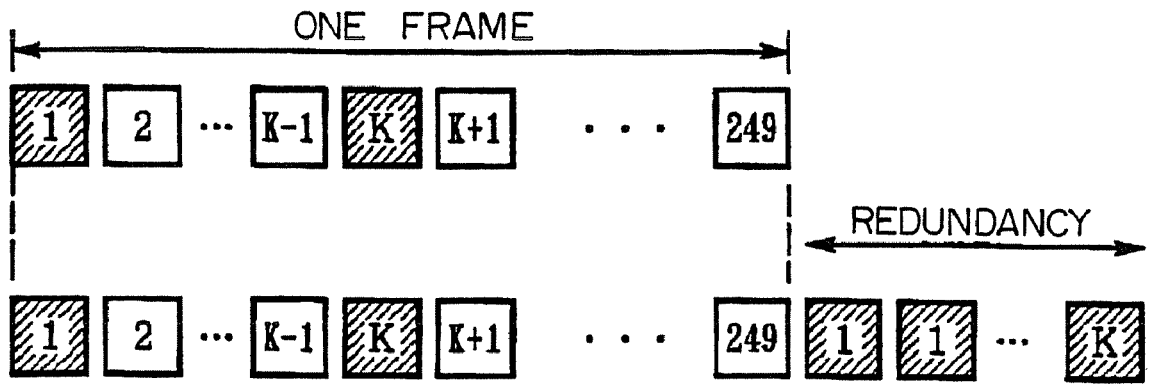
FIG. 15 shows the operation of redundantly transmitting packets.
Figure 15B:
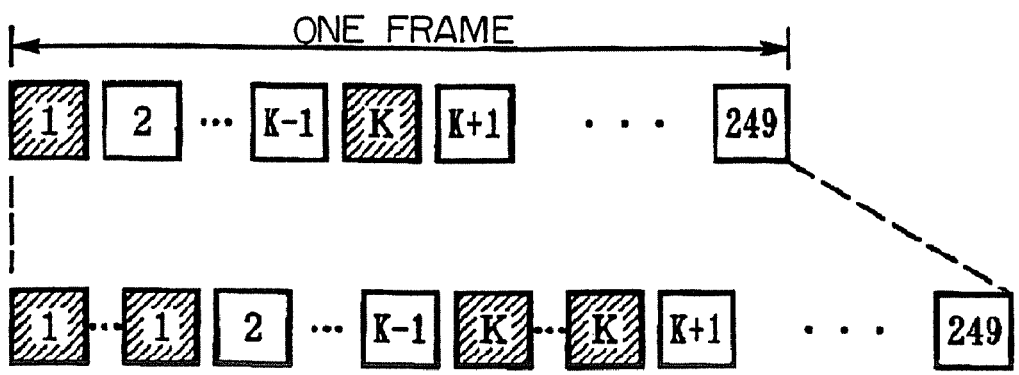
Figure 15C:
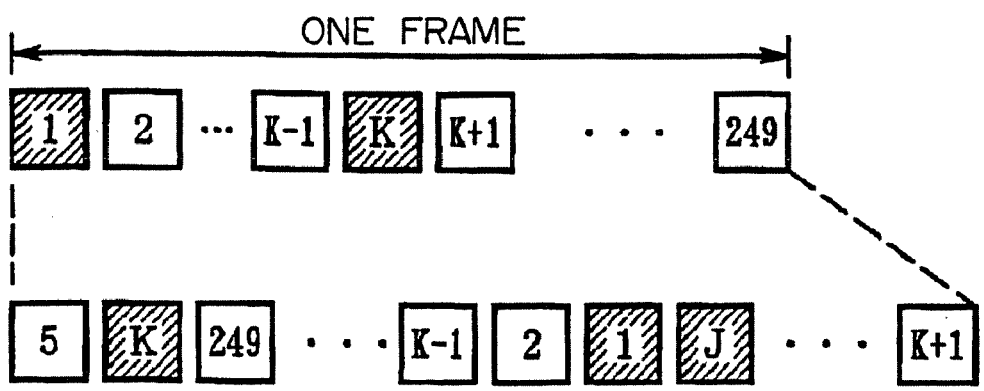

In this case, if the redundant packet insertion unit 233 repeatedly transmits the DV/IP packet stored in the packet storage unit 231, to the Internet adapter 413 as many times as required, as shown in FIG. 15A after one frame of DV/IP packet strings are transmitted, the copies of packets to be repeatedly transmitted indicated by shading in FIGS. 15A through 15C are repeatedly transmitted as many times as required.

In this way, for example, by repeatedly transmitting a DV/IP packet, including information indispensable for the reproduction of digital video data on the receiving side, the possibility that the digital video data may be prevented from being reproduced on the receiving side can be improved.

As described above, a method for collectively transmitting redundant packets after completing the transmission of a series of DV/IP packets equivalent to one frame of digital video data is particularly effective when there is the sudden loss of packets such that several packets are consecutively lost.

This is because there is a high possibility that packets consecutively lost may be compensated for by packets redundantly transmitted during a different time period.

For the transmitting method of redundant packets, a method for transmitting the copies as many times as required following original packets to be repeatedly transmitted can also be adopted.

For example, every time a DV/IP packet to be repeatedly transmitted is inputted, the redundant packet insertion unit 233 can repeatedly transmits the relevant DV/IP packet as many times as required according to the instruction from the redundancy transmitting control unit 232.

In this case, if there is the sudden loss of packets, there is the possibility that the redundant packets as well as the original packets to be repeatedly transmitted may be lost. However, since there is no need to store the copies of one frame of packets to be repeatedly transmitted, the increase of a hardware equipment amount can be avoided.

Next, a method for receiving redundant DV/IP packets repeatedly transmitted as described above and reproducing the IEEE1394 packet stream, based on the additional information included in these DV/IP packets is described.

Figure 16:
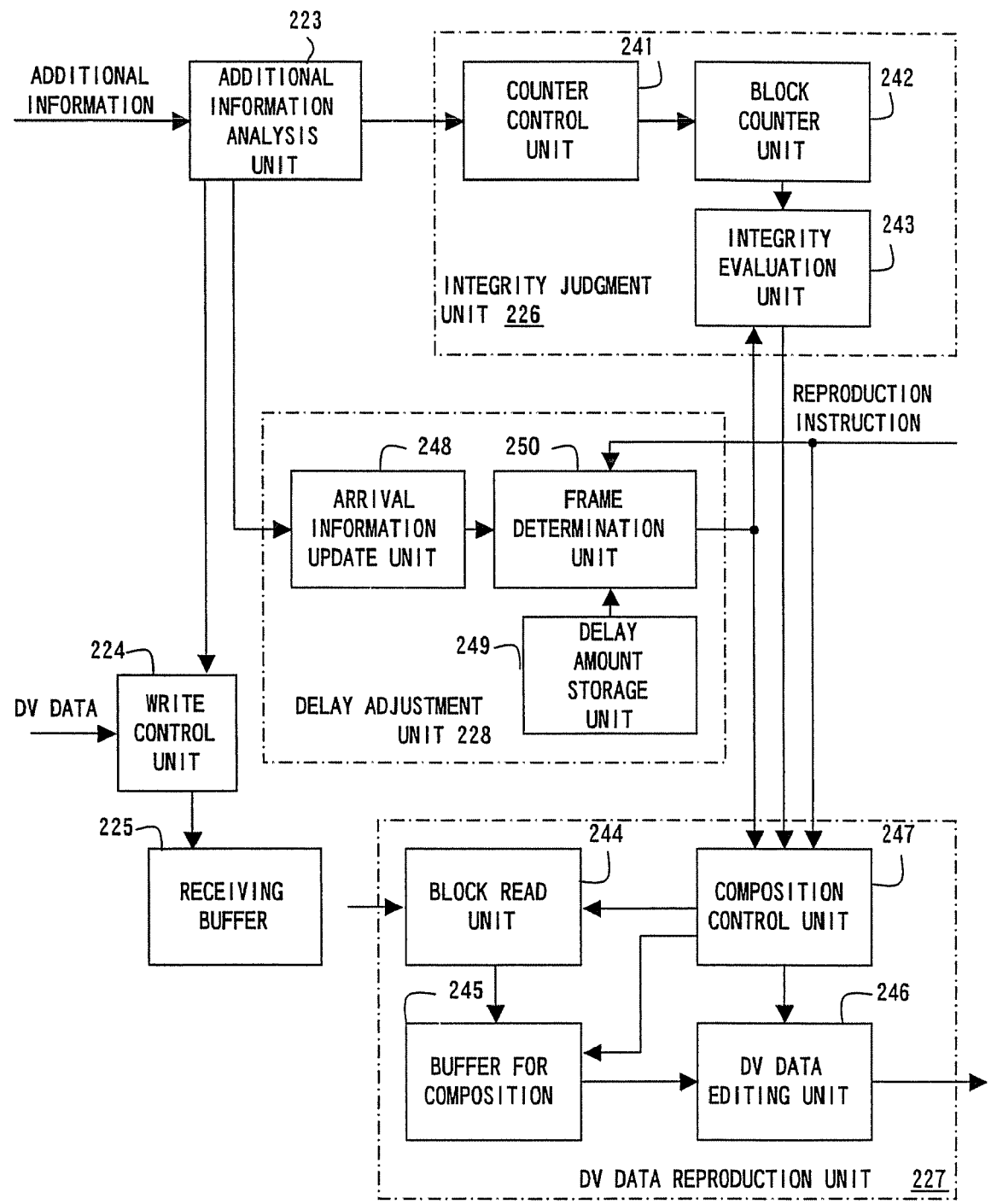
FIG. 16 shows the detailed configuration of a DCV/IP receiving unit.

FIG. 16 shows the detailed configuration of the DV/IP receiving unit.

As shown in FIG. 16, additional information obtained by decapsulating a DV/IP packet by the decapsulation unit 222 is inputted to an additional information analysis unit 223, while each DIF block included in an IEEE1394 packet corresponding to the additional information described above (hereinafter called "DV data") is inputted to a receiving buffer 225 via a writing control unit 224.

This receiving buffer 225 has a capacity equivalent to k frames of digital video data. As shown in FIG. 17A, the storage area corresponding to each frame of the receiving buffer 225 has a capacity equivalent to DV data included in each IEEE1394 packet and is composed of 250 storage places each corresponding to each block number.

The writing control unit 224 receives both a frame number and a block number from the additional information analysis unit 223 and calculates a storage place indicated by the information. This information about the storage place is inputted to the receiving buffer 225 together with DV data.

The integrity judgment unit 226 shown in FIG. 16 comprises a counter control unit 241, a block counter unit 242 and an integrity evaluation unit 243. The block counter unit 242 counts according to the instruction from the counter control unit 241 and the counting result is provided for the process of the integrity evaluation unit 243.

This counter control unit 241 receives a symbol for indicating a data type included as the additional information of a newly received packet and controls the counting operation of the block counter unit 242.

As shown in FIG. 17B, this block counter unit 242, for example, has respective memory areas for storing the total number of the received DV data $RBC_i$ (i=0-k), the number of the header blocks $HBC_i$ (i=0-k), the number of audio blocks $ABC_i$ (i=0-k) and the number of video blocks $VBC_i$ (i=0-k) of k frames and operates the numeric value of the relevant memory area according to instructions from the counter control unit 241.

In FIG. 16, the DV data reproduction unit 227 comprises a block reading unit 244 for reading DV data from the receiving buffer 225, a composition buffer 245 for storing both DV data read by this block reading unit 244 and composition data, which are described later, a DV data editing unit 246 for reproducing the DV data from the data stored in this composition buffer 245 and a composition control unit 247.

A reproduce instruction from the DV transmitting control unit 229 shown in FIG. 11, the evaluation result of the evaluation value calculation unit 243 described above and a frame instruction, which is described later, are inputted to this composition control unit 247. The composition control unit 247 controls the operations of the block reading unit 244, composition buffer 245 and DV data editing unit 246 described above based on these instructions and information.

The delay adjustment unit 228 shown in FIG. 16 comprises an arrival information update unit 248 for updating arrival information about the latest arrival DV data, a delay amount storage unit 249 for storing appropriate number of delay frames DF as a transfer delay amount and a frame determination unit 250 for selecting a frame to be reproduced from k frames each of which is composed of DV data stored in the receiving buffer 225, based on both the arrival information and the number of delay frames DF described above.

Figure 18B:
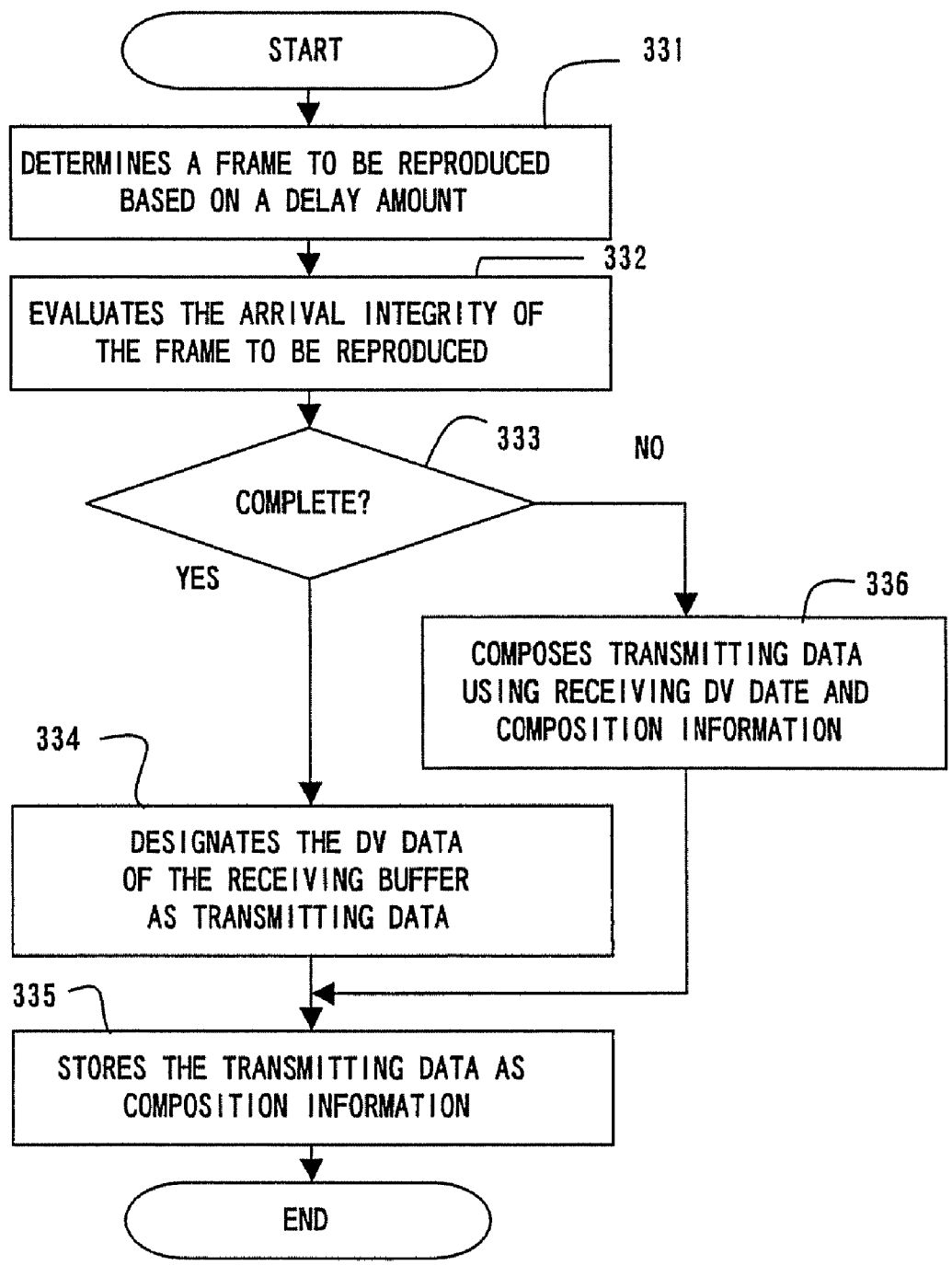

FIGS. 18A and 18B are a flowchart showing the receiving operation of a DV/IP packet and a flowchart showing the reproducing operation of digital video data, respectively.

If a DV/IP packet is inputted via the Internet adapter 413 shown in FIG. 11, first, a decapsulation unit 222 separates additional information included in the inputted DV/IP packet from DV data (step 321) and transmits the information and data to the additional information analysis unit 223 and writing control unit 224, respectively.

As described above, if additional information, including both cycle information and data type information, is attached by the DV/IP transmitting unit 211, in step 322, first, the additional information analysis unit 223 extracts the cycle information from the additional information received from the decapsulation unit 222 and inputs the information to both the writing control unit 224 and arrival information update unit 248.

In this way, the writing control unit 224 writes the DV data in a storage place indicated by the cycle information of the receiving buffer 225 (step 323) and the arrival information update unit 248 of the delay adjustment unit 228 updates the latest cycle information about a DV/IP packet latest transmitted from the transmitting side (step 324).

Since in this way, the writing control unit 224 writes DV data in the receiving buffer 225 based on the cycle information, DV data included in each DV/IP packet can be stored and arrayed in the receiving buffer 225 in the order of the original IEEE1394 packet stream, regardless of the arrival order.

Therefore, if a DV/IP packet is lost, the relevant storage place of the receiving buffer 225 becomes empty. If the same DV/IP packet repeatedly arrives thanks to the redundancy transmitting process described above, etc., the relevant storage place is simply overwritten by the same data. Therefore, the arrival state of each DV/IP packet can be easily managed.

Then, the additional information analysis unit 223 judges whether a received DV/IP packet includes new DV data, based on the cycle information extracted in step 322 (step 325).

If the relevant cycle information is extracted for the first time, from the additional information analysis unit 223, the flow proceeds to step 326 after judgment in step 325 becomes yes. In step 326, the additional information analysis unit 223 extracts data type information from the additional information and transmits the information to the counter control unit 241 of the integrity judgment unit 226 together with the cycle information.

In this case, the counter control unit 241 indicates a counter value to be updated, based on both the received cycle and data type information. Then, the block counter unit 242 updates the relevant counter value by appropriately increasing the relevant counter value (step 327).

For example, on receipt of both cycle information indicating that DV data is included in frame 1 and data type information indicating that the DV data consist of one audio block and five video blocks, the counter control unit 241 instructs the update of the total number of blocks RBC1, the number of audio blocks ABC1 and the number of video blocks VBC1 corresponding to frame 1 (see FIG. 17B).

Then, the block counter unit 242 updates the respective counter values of both the total number of blocks RBC1 and the number of audio blocks ABC1 by increasing by one and updates the counter value of the number of video blocks VBC1 by increasing by five. Then, the block counter unit 242 terminates the receiving operation of this DV/IP packet.

If DV data corresponding to the same cycle information are already received, the flow skips steps 326 and 327 after judgment in step 325 becomes no, and terminates the receiving process of the relevant DV/IP packet.

In this way, since the writing control unit 224 and receiving buffer 225 as well as the counter control unit 241 and block counter unit 242 operate based on the analysis result of the additional information analysis unit 223, the DV data can be arrayed in the order of the original IEEE1394 packet stream, and information about the arrival state of DV data composing each frame can also be collected.

In particular, by totaling DIF blocks stored in the receiving buffer 225 for each type in addition to the total number of receiving blocks in the block counter unit 242, for example, detailed information about the respective numbers of arrival video blocks and audio blocks of each frame can be obtained, and the reproduction process of the digital video data of each frame can be supported.

Next, a method for reproducing digital video data to be transmitted to the second network via the IEEE1394 adapter 411 based on both the detailed information about an arrival state collected in this way and DV data arrayed in the receiving buffer 225 is described.

First, a frame determination unit 250 of the delay adjustment unit 228 determines a frame to be reproduced based on both the arrival information and delay amount received from an arrival information update unit 248 according to the reproduce instruction from a DV transmitting control unit 229 (step 331).

In this case, the frame determination unit 250, for example, subtracts the number of frames stored in the delay amount storage unit 249 as a delay amount from cycle information received as arrival information, designates a frame, to which DV data indicated by obtained cycle information belong, as a frame to be reproduced and notifies both an integrity judgment unit 226 and DV data reproduction unit 227 of the frame.

In this case, since the arrival information indirectly indicates DV data transmitted last from the transmitting side, the delay between an IEEE1394 packet stream in the first network on the transmitting side and an IEEE1394 packet stream reproduced by a DV data reproduction unit 227 as described later can be kept constant by determining a frame to be reproduced as described above.

Specifically, the stop and re-start of transmission to the second network and the thinning-out of a frame can be automatically conducted both at the transfer rate of a DV/IP packet in the Internet and at the transmission speed of a DV/IP packet on the transmitting side in the relay device 220 on the receiving side, by determining a frame to be reproduced in this way.

On receipt of the notification of a frame to be reproduced, the integrity evaluation unit 243 of the integrity judgment unit 226 refers to each counting result on the relevant frame stored in the block counter unit 242 described above, and evaluates the arrival integrity of the relevant frame based on these counting results (step 332).

In this case, the integrity evaluation unit 243, for example, compares each of the total number of receiving blocks RBCi stored in the block counter unit 242 in relation to a designated frame, the number of header blocks HBCi, the number of audio blocks ABCi and the number of video blocks VBCi with the respective value equivalent to those of one complete frame and notifies the composition control unit 247 of the DV data reproduction unit 227 of these comparison results as evaluation results.

For example, if it is evaluated that the total number of receiving blocks RBCi corresponding to a frame to be reproduced is equal to the number of blocks RBC equivalent to that of one complete frame, the composition control unit 247 judges that complete DV data composing this frame arrive (Yes in step 333), and transmits the DV data of the relevant frame stored in the receiving buffer 225 to the IEEE1394 adapter via the block reading unit 244, composition buffer 245 and DV data editing unit 246 without any process (step 334).

In this case, as shown in FIG. 19A, the composition buffer 245 comprises a first buffer with a capacity of one frame and a second buffer with a capacity of one frame. Each of the first and second buffers has a memory capacity equivalent to 250 IEEE1394 packets.

In the following description, a case where composition is conducted by storing composition data, which are described later, in the first buffer, and storing DV data read from the receiving buffer 225 by the block reading unit 244 in the second buffer in ascending order of block numbers, is described.

As described above, if a complete set of DV data composing a frame to be reproduced arrive, the composition control unit 247 reads the DV data of the relevant frame from the receiving buffer 225 via the block reading unit 224, inputs the data to the second buffer, and instructs the DV data editing unit 246 to transmit the DV data stored in the second buffer to the IEEE1394 adapter as transmitting data without any process.

In this case, the composition buffer 245 designates the latest transmitting data as composition data by transferring the DV data stored in the second buffer to the first buffer according to the instruction from the composition control unit 247 (step 335) and terminates the reproduction process.

If, for example, a DV/IP packet, including DV data shown in block number 2, is lost in the transmission process of frame(n) to be reproduced, the integrity evaluation unit 243 described above judges that the total number of receiving blocks RBCn and number of video blocks VBCn that correspond to those of the relevant frame are smaller than the reference values RBC and VBC, respectively.

In this case, the judgment in step 333 becomes no, the flow proceeds to step 336 and the composition control unit 247 composes transmitting data by compensating for the lost receiving data with the composition data.

For the principle of composing transmitting data when DV data are lost, a principle of replacing the lost DV data with composition data in units of IEEE1394 packets (hereinafter called the "first principle", a principle of replacing only the relevant type of lost DV data with composition data in relation to the type of the lost DV data (hereinafter called the "second principle", etc., are used in addition to frame policies of designating composition data as transmitting data by discarding the full receiving data of the relevant frame, stopping the transmission of the relevant frame, etc.

If the first or second principle is adopted, in step 336, the composition control unit 247 first reads DV data of each block composing frame(n) to be reproduced from the receiving buffer 225 and stores the data in the second buffer by controlling the both the block reading unit 244 and composition buffer 245.

If the first principle is adopted, the DV data editing unit 246 composes transmitting data by replacing only DV data in block number 2 indicated by symbol "LOST" in FIG. 19A with corresponding DV data in the first buffer according to the instruction from the composition control unit 247.

In this case, if, as shown in FIG. 19A, the DV data of each block composing frame (n−1) are stored in the first buffer, the lost DV data are replaced with the DV data of the corresponding block of frame(n−1) (shown by symbol $DV_{(n-1,2)}$ in transmission data corresponding to frame(n) by all the units of the DV data reproduction unit 227.

If, for example, as shown in FIG. 19B, DV data consisting of only video blocks, the second principle can be adopted.

In this case, the DV data editing unit 246 operates according to the instruction from the composition control unit 247 and transmitting data are composed by replacing only audio block $a_{n-1}$ indicated by netting in composition data stored in the first buffer shown in FIG. 19B, with a corresponding audio block that is included in new receiving data stored in the second buffer.

In this way, since the DV data editing unit 246 operates according to the instruction from the composition control unit 247 and information lost in the transmission process of a DV/IP packet can be compensated for with appropriate information in the reproduction process of DV data composing each frame by utilizing the structure of digital video data, an IEEE1394 packet stream very close to the IEEE1394 packet stream in the first network on the transmitting side can be edited.

The transmitting data composed by the DV data editing unit 246 in this way are transmitted to the second network via the IEEE1394 adapter 411 and the reproduction process of this frame is terminated after in step 325 the transmitting data are stored as composition data.

In this way, the delay adjustment unit 228, integrity judgment unit 226 and DV data reproduction unit 227 operate according to a reproduce instruction, transfer delay against the transmitting side can be kept constant, and thereby a high-level IEEE1394 packet stream can be reproduced and transmitted to the second network via the IEEE1394 adapter 411 despite the occurrence of packet loss in the transmission process of a DV/IP packet.

The delay adjustment unit 228 can also designate the oldest frame stored in the receiving buffer as a frame to be reproduced.

For example, the delay adjustment unit 228 comprises FIFO having as many frames of memory area as the receiving buffer 225 can store, continues to store the frame number of a new frame in this FIFO every time the DV data of the new frame is stored in the receiving buffer 225 and notifies both the integrity judgment unit 226 and DV data reproduction unit 227 of the frame number read from the head of the FIFO according to a reproduce instruction.

A high evaluation score can be expected from a user on the second network side by performing the compensation process of lost data in the DV data reproduction unit 227 according to the second principle as described above and transmitting transmission data obtained by using and composing only audio data included in new receiving data, as shown in FIG. 19B, to the second network.

This is because, as described above, the audio continuity can be guaranteed by DV data, only the audio blocks of which is updated, and pictures and voice naturally caught by the subjectivity of a user can be provided.

Furthermore, if the DV/IP transmitting 211 of the relay device 210 on the transmitting side selectively repeatedly transmits a DV/IP packet, including an audio block, a method for compensating for lost data according to the second principle described above is very useful since the arrival probability of a DV/IP packet, including an audio block is very high.

If a DV/IP packet, including an audio block, is lost, video blocks included in composition data are replaced with video blocks included a newly received frame according to the second principle and the audio block included in the relevant frame can be compensated for with the audio block included in the composition data.

If DV data are edited in units of frames according to the first principle, for example, both fixed composition data consisting of video data representing one prescribed frame of pictures and audio data and one frame of audio data representing silence are prepared in advance, and the DV data of the frame can also be replaced with the fixed composition data if there is the loss of DV data.

Since the composition control unit 247 selects an appropriate principle and controlling the composition process of the DV data editing unit 246, according to the type and amount of information lost in a transmission route, lost data can also be compensated for while dynamically switching a plurality of principles.

Next, a method for adjusting the transmitting operation of a DV/IP packet by the relay devices on the transmitting and receiving sides transmitting/receiving control information to/from each other is described.

FIG. 20 shows the configuration of the data communications system.

In FIG. 20, each of the relay device on the transmitting side 110 and the relay device on the receiving side 120 comprises a control packet processing unit 251 for transmitting/receiving control information by transmitting/receiving a control packet, which is described later, via both the DV/IP transmitting unit 250 and DV/IP receiving unit 260 and an IP transmitting control unit 252 for adjusting the transmission rate of the Internet adapter 413 and also editing and transferring transmitting data received from the IEEE1394 adapter to the DV/IP transmitting unit 250, according to both an instruction from this control packet processing unit 251 and a mode instruction, which is described later, in addition to all the units shown in FIG. 11.

The control packet processing unit shown in FIG. 20 comprises a control information analysis unit 253, an instruction analysis unit 254, an arrival information collection unit 255 and a control packet generation unit 256. The instruction analysis unit 254 controls both the arrival information collection unit 255 and control packet generation unit 256, based on the analysis result of the control information analysis unit 253 and a transmit instruction, which is described later.

This control information analysis 253 receives control information, which is described later, from a DV/IP packet receiving unit 221 and notifies both the IP transmitting control unit 252 and designation analysis unit 254 of the analysis result obtained by analyzing this control information.

The arrival information collection unit 255 collects arrival information about a packet that reaches the self-device based on information stored in all the units in of the DV/IP receiving 260 according to the instructions from the designation analysis unit 254 and transmits the obtained arrival information to the control packet generation unit 256. This control packet generation unit 256 generates a control packet as described later, according to an instruction from the designation analysis unit 254 and transmits the packet to the DV/IP transmitting unit 250.

Figure 21:
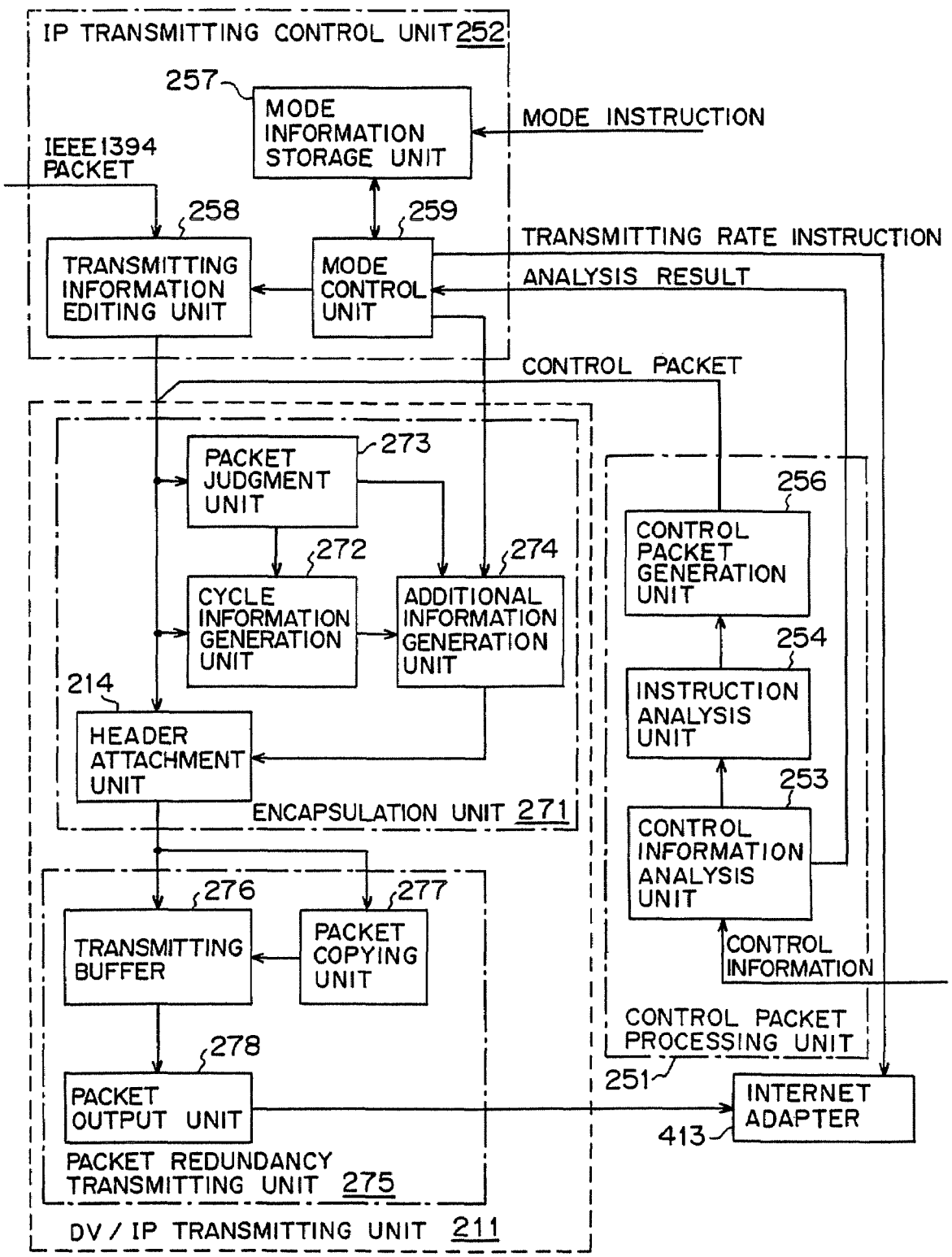
FIG. 21 shows both the detailed configuration of an IP transmitting control unit and an example of another configuration of a DV/IP transmitting unit.

FIG. 21 shows both detailed configuration of the IP transmitting control unit and an example of another configuration of the DV/IP transmitting unit.

The IP transmitting control unit 252 shown in FIG. 21 comprises a transmitting information editing unit 258, a mode information storage unit 257 and a mode control unit 259. This mode information storage unit 257 receives a mode instruction and stores mode information included in this mode instruction. The transmitting information editing unit 258 selects information to be transmitted to the receiving side from information composing an IEEE13294 packet stream received from the IEEE1394 adapter 411 according to both an instruction from the mode control unit 259 and edits transmitting information.

In this case, mode information is composed of symbols for indicating the respective transmission modes corresponding to a prescribed number of consecutive frames.

The mode control unit 259 controls the editing operation of the transmitting information editing unit 258 as described later, based on mode information stored in the mode information storage unit 257, instructs a transmission rate to the Internet adapter 413 and modifies the mode information stored in the mode information storage unit 257, based on the analysis result of the control information analysis unit 253.

The control packet generated by the control packet generation unit 256 is inputted to a header addition unit 214 of an encapsulation unit 271 together with the editing result of the transmitting information editing unit 258 described above.

This encapsulation unit 271 comprises a cycle information generation unit 272 that correspond to both the frame detection unit 216 and counter 217 shown in FIG. 12 and a packet judgment unit 273 for judging whether an input packet is an IEEE1394 packet or a control packet.

Both the judgment result of this packet judgment unit 273 and the cycle information obtained by the cycle information generation unit 272 are inputted to an additional information generating unit 274. The mode control unit 259 described above notifies this additional information generating unit 274 of the transmission mode of a frame to be transmitted.

The additional information generated by this additional information generating unit 274 is inputted to the header addition unit 214 and is attached to a corresponding IEEE1394 packet or a control packet by this header addition unit 214 as a header. Then, the DV/IP packet shown in FIG. 12 is generated and transmitted to a packet redundancy transmitting unit 275.

As shown in FIG. 21, this packet redundancy transmitting unit 275 comprises a transmitting buffer 276 for sequentially storing DV/IP packets received from the encapsulation unit 271, a packet copying unit 277 for copying DV/IP packets to be repeatedly transmitted and storing the packets in the transmitting buffer 276 and a packet output unit 278 for reading DV/IP packets stored in the transmitting buffer 276 in a random order and transmitting the packets to the Internet adapter 413.

Next, the DV/IP packet transmitting operation of the relay device 110 on the transmitting side shown in FIG. 20 is described.

Figure 22:
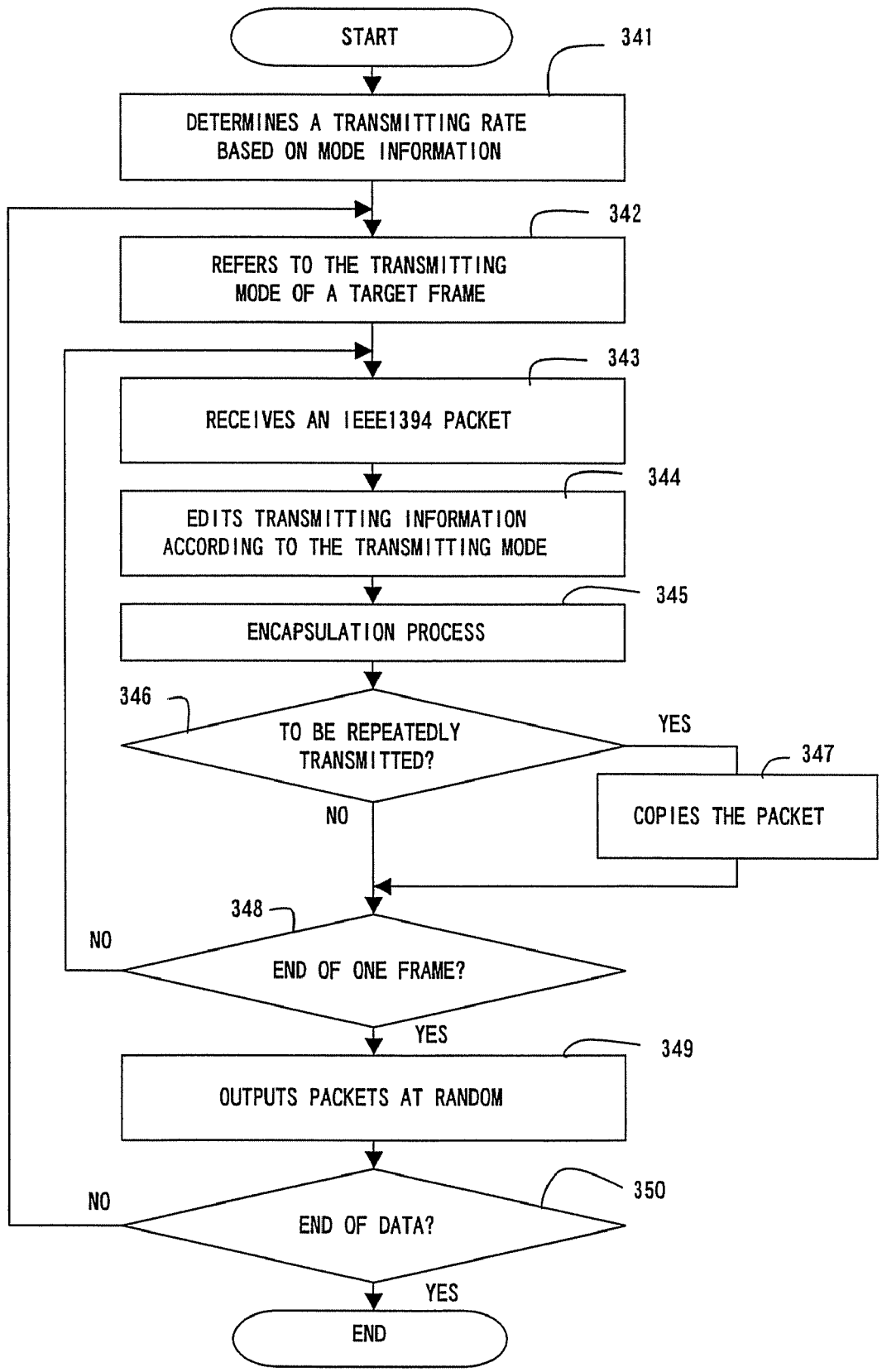
FIG. 22 is a flowchart showing the operation of transmitting a DV/IP packet.

FIG. 22 is a flowchart showing the transmitting operation of DV/IP packets.

Prior to the transmitting process of an IEEE1394 packet stream composing each frame, the mode control unit 259 shown in FIG. 21 first refers to mode information stored in the mode information storage unit 257, calculates an appropriate transmission rate and notifies the Internet adapter 413 of the rate (step 341).

In this case, for the transmission mode, for example, a "cut" mode for cutting the relevant frame, a "voice only" mode for transmitting only the audio blocks of the relevant frame, a "picture only" for transmitting only the video blocks of the relevant frame, a "normal" mode for transmitting the full information composing the relevant frame, etc., are used.

Therefore, mode information is generated by arraying a prescribed number of symbols of two bits for indicating the four transmission modes described above and is stored in advance in the mode information storage unit 257.

For example, 32 bits of memory area are prepared as the mode information storage unit 257 and 16 frames of symbol strings are stored in this mode information storage unit 257 as mode information.

In this case, since the mode control unit 259 sequentially refers to these codes and performs a transmitting process in accordance with a transmission mode indicated by each code as described later, digital video data composing each frame are transmitted with consecutive 16 frames as one set in a transmission mode indicated by corresponding codes.

Therefore, in step 341, the mode control unit 259 calculates an appropriate transmission rate based on both an information amount to be transmitted of a prescribed number of frames corresponding to these code strings and a transmission time in the case where IEEE1394 packets corresponding to these frames are transmitted in an IEEE1394 synchronous mode, according to mode information.

There is no limit in the size of a memory area to be secured as the mode information storage unit 257. Therefore, code strings corresponding to more number of frames can also be stored or only several frames of code strings can also be stored as mode information.

Then, the mode control unit 259 refers to the mode information storage unit 257 described above and notifies both the transmitting information editing unit 258 and additional information generating unit 274 of codes corresponding to frames to be processed (step 342).

Then, the transmitting information editing unit 258 performs an editing process designated by a transmission mode when each IEEE1394 packet is inputted (steps 343 and 344).

For example, if the transmission mode of a frame to be processed is a "cut" mode, the transmitting information editing unit 258 discards all the IEEE1394 packets belonging to the relevant frame. If a "normal" mode is designated, all the IEEE1394 packets are transmitted to the encapsulation unit 271.

If the transmission mode of a frame to be processed is a "picture only" mode, the transmitting information editing unit 258 extracts both header blocks and video blocks included a series of IEEE1394 packets belonging to the relevant frame and transmits packet strings, each of which consists of six of the obtained video blocks, to the encapsulation unit 271 following an IEEE1394 packets consisting of frame blocks.

If a "voice only" is designated, the transmitting information editing unit 258 extracts both IEEE1394 packets, each including a frame header block and IEEE1394 packets, each including an audio block from a series of IEEE1394 packets belonging to the relevant frame and transmits a packet string consisting of these IEEE1394 packets to the encapsulation unit 271 as an editing result.

When the editing result obtained as described above is inputted, the encapsulation unit 271 performs the IP encapsulation process of each packet composing this editing result (step 345).

In this case, the additional information generating unit 274 generates additional information, including type information, cycle information consisting of a frame number and a block number, and a time stamp for indicating the current time together with codes for indicating a transmission mode, which is shown by symbol "MODE" in FIG. 13, based on both a code received from the mode control unit 259 and cycle information obtained by both the judgment result of the packet judgment unit 273 and the cycle information generation unit 272, as shown in FIG. 13B.

In this case, as described above, a packet string edited based on a transmission mode has a cyclical structure corresponding to each transmission mode.

Therefore, if the packet judgment unit 273 reports that an inputted packet is an IEEE1394 packet, the additional information generating unit 274 can obtain type information based on both codes for indicating a transmitting code and cycle information.

If it is reported that an inputted packet is a control packet, the additional information generating unit 274 generates additional information, including type information about the fact, which is shown by symbol "DT10" in FIG. 13C.

When additional information obtained in this way is inputted, the header addition unit 214 generates a DV/IP packet as in step 306 and the obtained DV/IP packet is stored in the transmitting buffer 276 of the packet redundancy transmitting unit 275.

In this case, the packet copying unit 277 judges whether an inputted DV/IP packet is to be repeatedly transmitted (step 346). If the judgment is yes, the copy of the relevant DV/IP packet is overlapped and stored in the transmitting buffer 276 (step 347).

If the judgment in step 346 is no, the flow proceeds to step 348 without any process and the packet output unit 278 judges whether all the DV/IP packets belonging to a frame to be processed are stored in the transmitting buffer 276.

If the judgment in step 348 is no, the flow returns to step 343, and both the editing process of a subsequent packet and the encapsulation process of the editing result are performed.

If in this way, both the editing process and encapsulation process of one frame of IEEE1394 packet strings are completed, the judgment in step 348 is yes, and the packet output unit 278 reads all the DV/IP packets stored in the transmitting buffer 276 in an random order and transmits the packets to the Internet adapter 413 (step 349).

In this case, the packet output unit 278 arrays all the DV/IP packets stored in the transmitting buffer 276, including the copies of packets to be repeatedly transmitted, regardless of the order in the original IEEE1394 packet stream, as shown in FIG. 15C and transmits the packets to the Internet adapter 413.

Therefore, even if packet loss bursts in the transmission route of a DV/IP packet, packets to be repeatedly transmitted or the copies can be surely transmitted to the receiving side.

In this case, if the packet output unit 278 inserts a sequence number for indicating a transmitting order as a part of additional information included in each transmitted DV/IP packet (see FIG. 13B), an arrival integrity check can be made based on the sequence number as described later on the receiving side.

If in this way, an IEEE1394 packet string corresponding to a new frame inputted from the first network side after the transmission of the generated DV/IP packets of a frame to be processed, the judgment in step 350 becomes no, the flow returns to step 342, the transmitting process of this IEEE1394 packet string is performed in a transmission mode corresponding to the relevant frame.

In this way, both an execution ratio of cut and a ratio of frames transmitting only voice can be highly freely designated, for example, by a mode instruction.

DV/IP packet strings can be transmitted at a practical transmission rate suitable for a transfer rate in the Internet by controlling the respective number of frames to be cut and frames with voice only.

For example, if a code string obtained by appropriately combining codes for indicating a "normal" mode and codes for indicating a "voice only" mode is designated, an information amount to be transmitted to the Internet as a DV/IP packet string can be greatly reduced, and thereby the occurrence probability of packet loss, etc., can be reduced.

If in step 344, a "voice only" mode is designated as a transmission mode, the transmitting information editing unit 258 shown in FIG. 21 can also extract audio blocks included in a series of IEEE1394 packets belonging to the relevant frame and can also transmit a packet string consisting of six of the audio blocks, to the encapsulation unit 271.

In this case, since the transmitting information editing unit 258 must generate a packet consisting of audio blocks from a plurality of IEEE1394 packets, a process amount required for the editing process increases, while an information amount to be transmitted as DV/IP packets can be greatly reduced.

In this case, type information DT11 for indicating a packet consisting of only voice is prepared in the encapsulation unit 271, and the additional information generating unit 274 generates additional information, including this type information DT11 and transfers the information to the header addition unit 214.

Next, the receiving operation of the relay device 120 on the receiving side is described.

Figure 23:
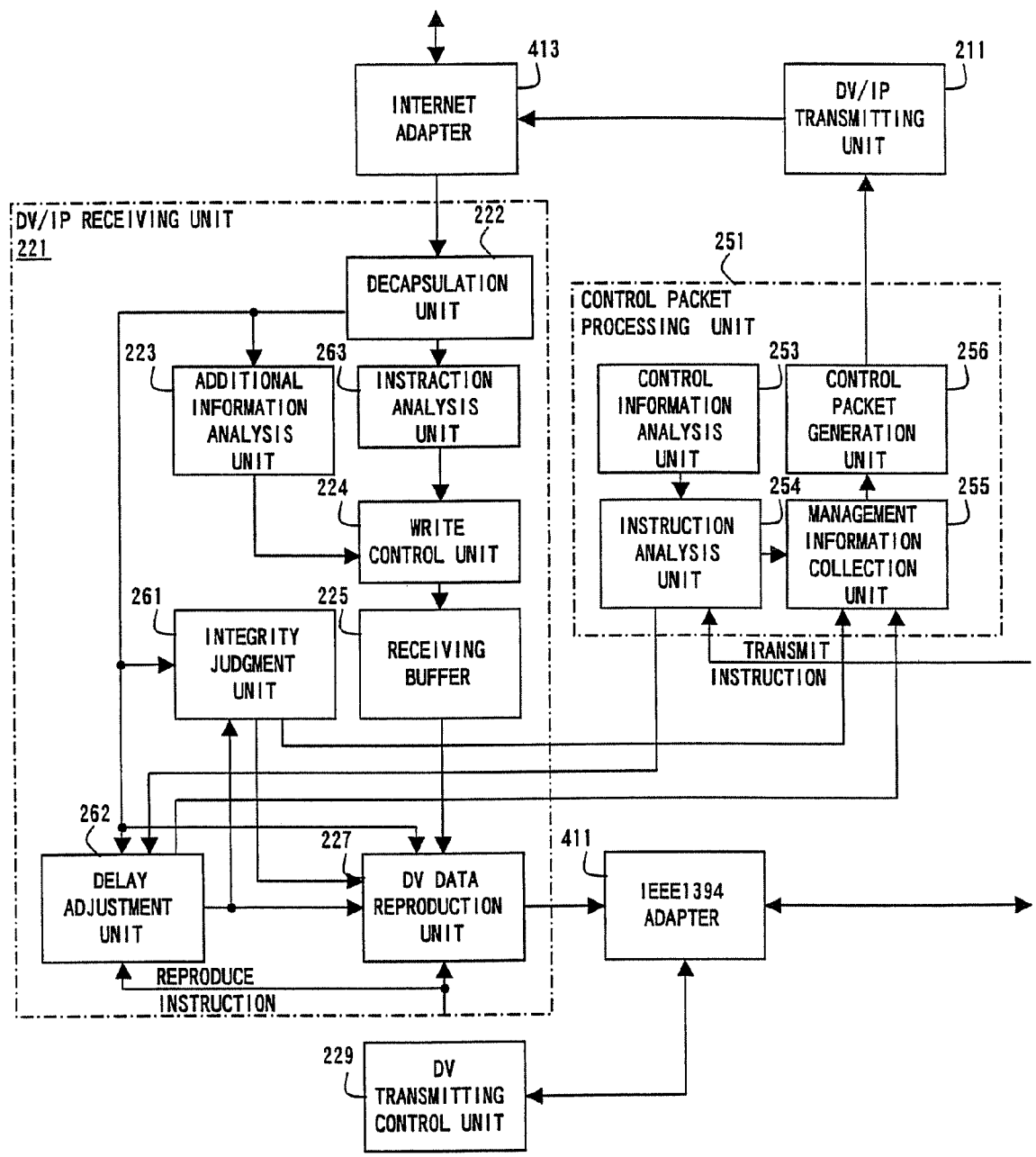
FIG. 23 shows relationship between a DV/IP receiving unit and a control packet processing unit.

FIG. 23 shows the relationship between a DV/IP receiving unit 260 and a control packet processing unit.

The DV/IP receiving unit 260 shown in FIG. 23 comprises an integrity judgment unit 261 and a delay adjustment unit 262, instead of the integrity judgment 226 and delay adjustment unit 228, respectively, and further comprises the packet sorting unit 263 in addition to the units shown in FIG. 11.

This packet sorting unit 263 receives a payload included in a DV/IP packet from the decapsulation unit 222 and transfers DV data and control information included in a control packet, to a writing control unit 224 and the control packet processing unit 251, respectively, based on the analysis result of the additional information analysis unit 223.

Figure 24:
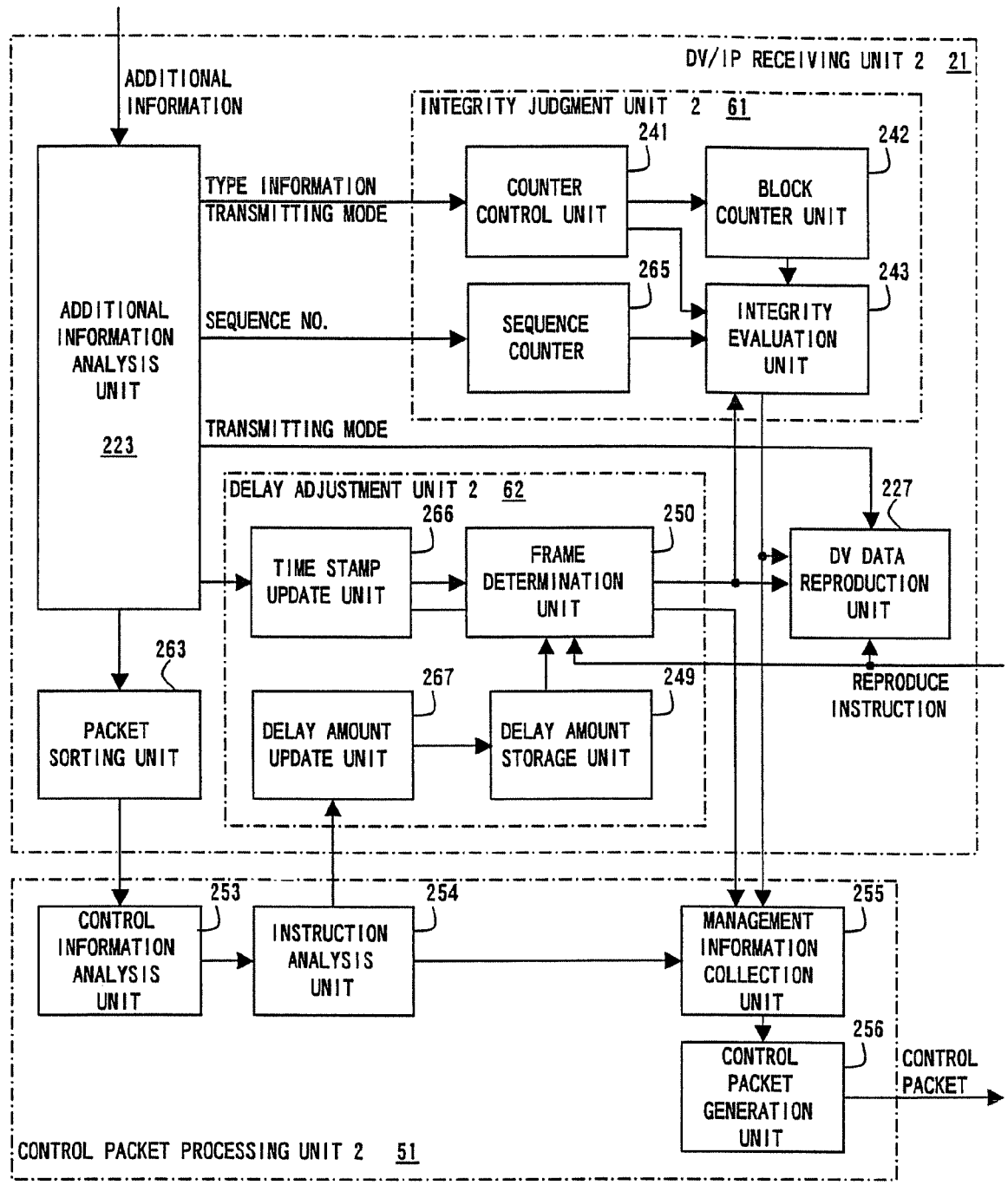
FIG. 24 shows examples of other respective configurations of both an integrity judgment unit and a delay adjustment unit.

FIG. 24 shows the detailed configurations of both the integrity judgment unit 261 and delay adjustment unit 262.

The integrity judgment unit 261 shown in FIG. 24 comprises a sequence counter 265 for checking the continuity of sequence numbers received from the additional information analysis unit 223 in addition to the units of the integrity judgment unit 226 shown in FIG. 16.

In this integrity judgment unit 261, the check result of the sequence counter 265 is inputted to an integrity evaluation unit 243 together with the counting result of a block counter 242.

The delay adjustment unit 262 shown in FIG. 24 comprises a time stamp update unit 266 with a function described later, instead of the arrival information update unit 248 shown in FIG. 16, and also comprises a delay amount update unit 267 for modifying the content of a delay amount storage unit 249 according to the instructions from a designation analysis unit 254.

In this delay adjustment unit 262, the process result of the time stamp update unit 266 is inputted to a frame determination unit 250 together with a delay amount stored in the delay amount storage unit 249.

Information about a frame to be reproduced obtained by this frame determination unit 250 is inputted to a management information collecting unit 225 together with an integrity evaluation result.

Since the packet sorting unit 263 shown in FIG. 23 operates based on the analysis result of the additional information analysis unit 223, the receiving function of the control communications means 141 can be implemented using the functions of both the Internet adapter 413 and DV/IP receiving unit 221.

Next, both a process for receiving DV data using the receiving buffer 225 and a process for reproducing an IEEE1394 packet stream from received DV data depending on the transmission mode described above are described.

Figure 25A:
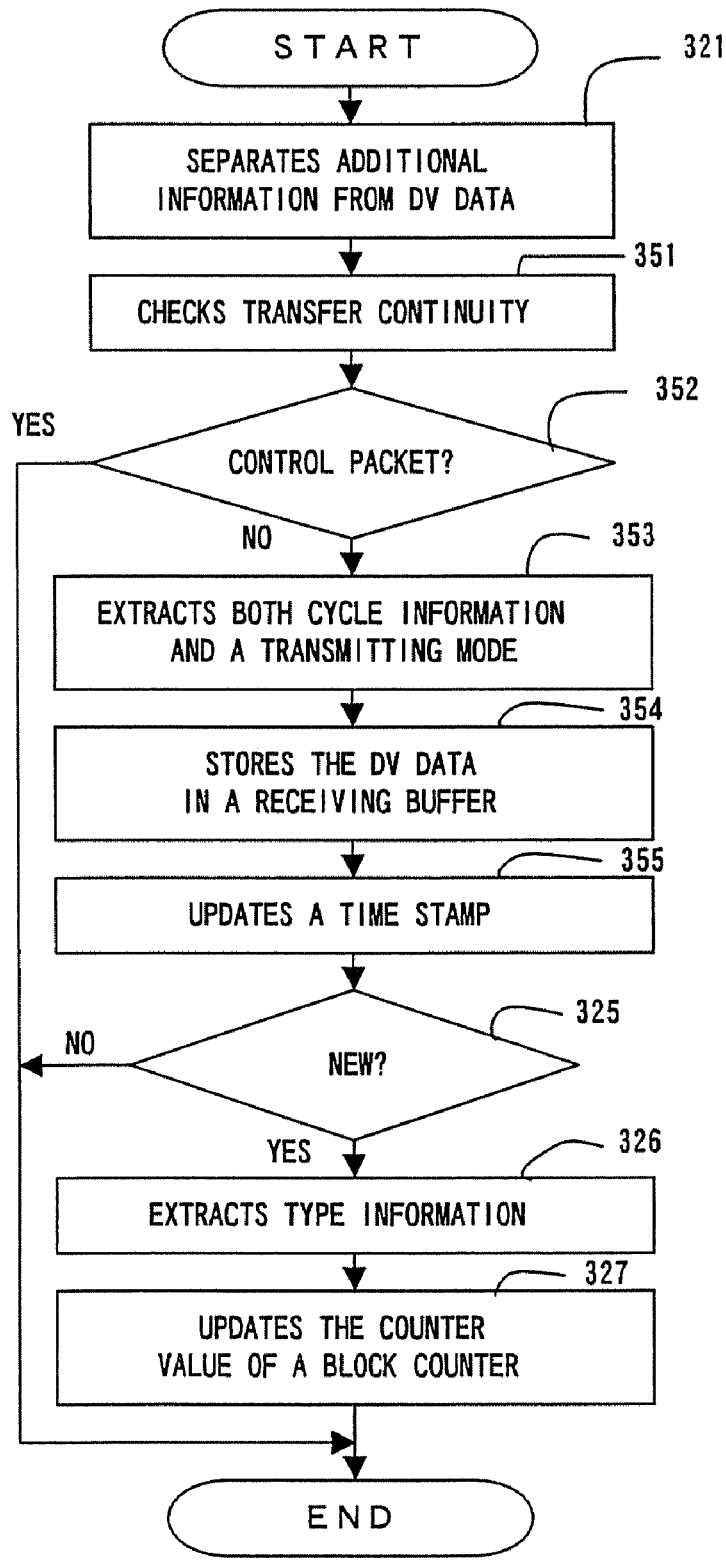
FIGS. 25A and 25B are flowcharts showing the receiving and reproduction operations, respectively, of a DV/IP packet.
Figure 25B:
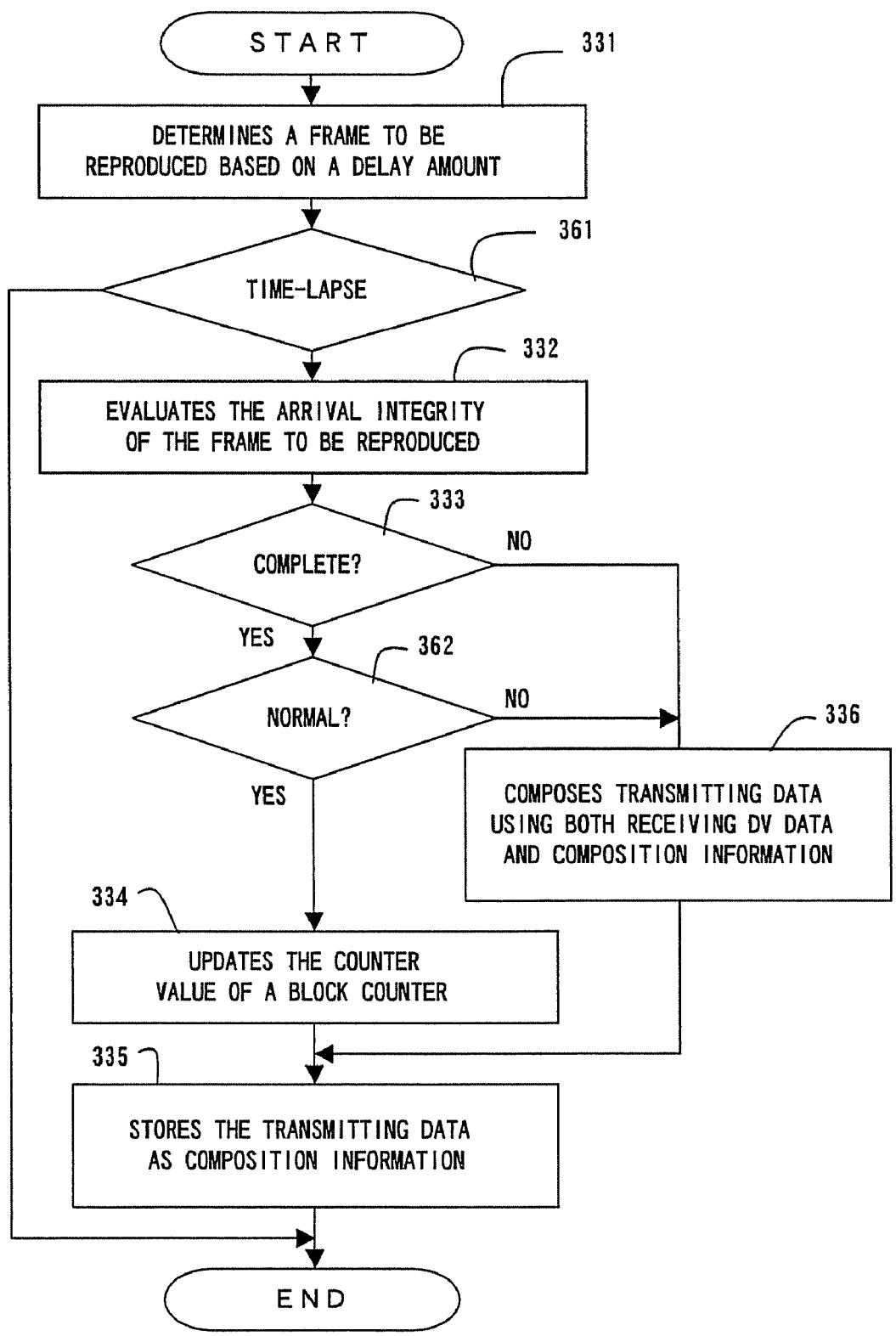

FIGS. 25A and 25B are flowcharts showing the receiving operation and reproducing operation, respectively, of a DV/IP packet.

If a DV/IP packet is inputted, as shown in FIG. 18A, the decapsulation unit 222 separates additional information and a payload part from the packet and transmits the information and payload to the writing control unit 224 and additional information analysis unit 223, respectively (step 321).

Then, the additional information analysis unit 223 notifies the sequence counter 265 of a sequence number included in the additional information. Then this sequence counter 265 checks the continuity of DV/IP packet strings transmitted via the Internet based on both the inputted sequence number and a sequence number inputted immediately before (step 351).

This sequence counter 265, for example, stores in advance a sequence number inputted immediately before as an immediately previous number, judges whether DV/IP packets consecutively arrive in a transmitted order, based on the relationship between this immediately previous number and a newly inputted sequence number, and notifies the integrity evaluation unit 243 of this judgment result.

Then, the additional information analysis unit 223 judges whether a received DV/IP packet is a control packet, based on type information (step 352). If the judgment is yes, processes after step 352 can be skipped and the receiving operation is terminated.

If the judgment in step 352 is no, the additional information analysis unit 223 extracts both cycle information and a transmission mode from additional information, and notifies the writing control unit 224 of both the information and mode (step 353). Then, the writing control unit 224 operates to write DV data in the receiving buffer 225 (step 354).

For example, if a "voice only" mode is designated as a transmission mode, the writing control unit 224 write inputted DV data, which are shown by attaching symbols a and v in FIG. 26A, in a storage place corresponding to the DV data, including an audio block, as shown in FIGS. 26A through 26C.

Similarly, if a "picture only" mode is designated as a transmission mode, the writing control unit 224 writes video blocks included in inputted DV data in a storage place corresponding to video blocks composing DV data belonging to the relevant frame, as shown by attaching symbol v in FIG. 26A.

Then, the additional information analysis unit 223 extracts a time stamp included in additional information and notifies the time stamp update unit 266 of the delay adjustment unit 262 of the time stamp. Then, this time stamp update unit 266 updates a time stamp for indicating arrival information (step 355).

Then, both the additional information analysis unit 223 and integrity judgment unit 261 perform the same operations as those in steps 325 through 327 to update the counter value of the block counter unit 242 when non-redundant DV data are inputted.

In this case, the counter control unit 241 receives codes for indicating a transmission mode together with type information from the additional information analysis unit 223 and stores the codes in a memory area corresponding to the relevant frame, of the block counter unit 242.

Next, a method for reproducing one frame of IEEE1394 packet strings based on a variety of information generated from both DV data and additional information that are stored in the receiving buffer 225, as described above, is described.

FIG. 25B is a flowchart showing the reproducing operation of DV data.

The frame determination unit 250 of the delay adjustment unit 262 determines a frame to be reproduced when a reproduce instruction is inputted, as in the case of the flowchart shown in FIG. 18B (step 331).

In this case, the frame determination unit 250 calculates a time that is traced back by a delay time stored in the delay amount storage unit 248, from a time stamp received from the time stamp update unit 266 as arrival information, designates a frame, including DV data with a time stamp corresponding to this time as a frame to be reproduced and notifies both the integrity judgment unit 262 and DV data reproduction unit 227 of the frame.

Then, the integrity evaluation unit 243 of the integrity judgment unit 261 first refers to a transmission mode stored in relation to a frame designated as a frame to be reproduced. If a transmission mode is a "cut" mode, the judgment in step 361 becomes yes and the reproduction process is terminated.

If the judgment in step 361 is no, the integrity evaluation unit 243 evaluates the arrival integrity of a frame to be reproduced based on both a transmission mode corresponding to the relevant frame and the counter value of a block counter unit 242 (step 332).

In this case, an integrity evaluation unit 243 prepares in advance the appropriate respective reference values of a "normal" mode, a "voice only" mode and a "picture only" mode, evaluates the arrival integrity of a frame to be reproduced based on a result obtained by comparing each counter value stored in the block counter unit 242 with the relevant reference value, and notifies the composition control unit 247 of a DV data reproduction unit 227 (see FIG. 16) of the result.

If it is evaluated that a complete set of DV data to arrive are delivered and it is reported that a transmission mode is a "normal" mode (Yes in steps 333 and 362), a block reading unit 244, a composition buffer 245 and a DV data editing unit 246 execute steps 334 and 335 according to the instructions from the composition control unit 247.

In this way, DV data stored in the receiving buffer 225 are transferred to the IEEE1394 adapter 411 via both the composition buffer 245 and DV data editing unit 246, and are transmitted to the second network as an IEEE1394 packet string.

If it is evaluated that there is loss in DV data (No in steps 333) and a transmission mode is a "voice only" mode or a "picture only" mode (No in step 362), both the composition buffer 245 and DV data editing unit 246 execute steps 336 and 335 according to instructions from the composition control unit 247.

For example, if a transmission mode is a "voice only" mode, the composition control unit 247 adopts the second principle and first instructs the block reading unit 244 to selectively read only header blocks and audio blocks from DV data stored in the receiving buffer 225 in relation to frame n to be reproduced (see FIG. 26A).

Then, the block reading unit 244 reads audio blocks stored in the receiving buffer 225 and stores the blocks in a corresponding storage place of the second buffer of the composition buffer 245, as shown by attaching symbols an and FHn.

Then, the composition control unit 247 designates both the header block and audio block and instructs the data replacement process of the DV data editing unit 246. Then, the DV data editing unit 246 replaces a frame header and an audio block, respectively, stored in the first buffer of the composition buffer 245, which are shown by attaching symbols $FH_{n-1}$ and $a_{n-1}$ and by netting, with corresponding information stored in the second buffer, and the transmitting data, as shown in FIG. 26C can be obtained.

If a transmission mode is a "picture only" mode, similarly, both a frame header and video blocks are replaced, and transmitting data are composed.

In this way, depending on a transmission mode, each unit of the DV data reproduction unit 227 operates to reproduce an IEEE1394 packet string very close to the IEEE1394 packet string composing the original frame and to transmit the reproduced packet string to the second network via the IEEE1394 adapter 411 even if the relay device 210 on the transmitting side transmits only audio blocks or only video blocks.

Next, a method for controlling the transmitting/receiving operation of a DV/IP packet by transmitting/receiving a control packet is described.

FIG. 27 shows the transmitting/receiving operation.

In FIG. 27, a DV/IP transmitting/receiving unit comprises the DV/IP transmitting unit 250, DV/IP receiving unit 260 and Internet adapter 413 shown in FIG. 20.

As described above, prior to the transmission of a DV/IP packet, the mode control unit 259 of the IP transmitting control unit 252 shown in FIG. 21 calculates suitable transmission rate R1 based on mode information M1 stored in the mode information storage unit 257 and notifies the Internet adapter 413 of the rate.

Therefore, in this case, DV data edited by the transmitting data editing unit 258 are re-edited as a DV/IP packet string by the DV/IP transmitting unit 250 depending on a transmission mode indicated by mode information M1, and the Internet adapter 413 transmits the data to the Internet at transmission rate R1.

In this case, for example, as shown in FIG. 27, a transmit instruction is inputted to the control packet processing unit 251 on the receiving side. If it is instructed that the receiving state of the self-device should be reported to the transmitting side, the management information collecting unit 255 operates to collect arrival management information from both the integrity judgment unit 261 and delay adjustment unit 262 according to instructions from the instruction analysis unit 254.

In this case, the management information collecting unit 255 receives a variety of counter values stored for each frame in the block counter unit 242 provided, for example, in the integrity judgment unit 261, also receives both arrival information and information about a frame to be reproduced from the delay adjustment unit 262, processes these pieces of information, as required, and generates arrival management information.

Then, the control packet generation unit 256 generates a control packet, including the arrival management information collected by the management information collecting unit 255 as control information, the DV/IP transmitting unit 250 incorporates the control packet into a DV/IP packet and the Internet adapter 413 transmits the packet to the relay device 250 on the transmitting side via the Internet.

If the DV/IP packet, including a control packet described above is inputted, the packet sorting unit 263 shown in FIG. 23 transfers control information included in the payload of the DV/IP packet to the control information analysis unit 253 of the control packet processing unit 251 (see FIG. 27).

Then, the control information analysis unit 253 analyzes arrival management information included in the control information received from the packet sorting unit 263 and, as shown in FIG. 21, it transmits an obtained analysis result to the mode control unit 259 of the IP transmitting control unit 252 (see FIG. 27).

The mode control unit 259 generates appropriate mode information M2 based on this analysis result, and rewrites the content of a mode information storage unit 257. Simultaneously, a mode control unit 259 calculates transmission rate R2 suitable for the newly obtained mode information M2 and designates the new transmission rate R2 to the Internet adapter 413.

In this way, the transmission rate of a DV/IP packet to be transmitted can be dynamically modified in the relay device 250 on the transmitting side, based on arrival management information about arrival state in the relay device 260 on the receiving side, and the transmission/reception of digital video data can be continued at a transmission rate practical in a transmission route, including the Internet.

Furthermore, the address table of a switch and hub existing in a communications route can be updated and the network address of the relay device 210 on the transmitting side can be registered by transmitting a control packet from the relay device 220 on the receiving side as described above.

For example, the relay device 220 on the receiving side regularly updates the address table of communications equipment, such as a switch, a hub, etc., by transmitting a DV/IP packet, including the control packet described above.

In this way, even if communications equipment, such as a switch, a hub, etc., has a function to regularly delete the network address of an address table, the network address corresponding to the relay device 210 on the transmitting side can be always registered in the address table.

As described above, if a large number of DV/IP packets are transmitted from the relay device 210 on the transmitting side to the relay device 220 on the receiving side, there is the possibility that a large number of DV/IP packets may be lost if the network address of an address table is temporarily deleted in communications equipment, such as a switch, a hub, etc., existing in a transmission route. Therefore, a function to maintain the network address of an address table by transmitting/receiving the control packet described above has a great practical effect.

Alternatively, the relay devices 210 and 220 can be controlled by each other by transmitting/receiving a control packet, including both a variety of commands to start/stop the transmission of a DV/I P packet, etc., and the replies between the relay device 210 on the transmitting side and the relay device 220 on the receiving side.

Alternatively, the operation of the delay adjustment unit 262 of the relay device 260 on the receiving side can be controlled by the relay device 250 on the transmitting side using this control packet.

For example, if a transmit instruction is inputted to the control packet processing unit 251 of the relay device on the transmitting side shown in FIG. 20 and this transmit instruction instructs that a delay amount on the receiving side should be modified, the instruction analysis unit 254 generates a control packet, including both a command to modify the delay amount and delay amount D2 after modification, as control information, using the function of the control packet generation unit 256.

Both the DV/IP transmitting unit 250 and Internet adapter 413 transmit a control packet obtained in this way to the Internet as a DV/IP packet (see FIG. 27) and the DV/IP transmitting/receiving unit of the relay device on the receiving side receives them.

In this case, the control information analysis unit 253 of a control packet processing unit 251 receives control information included in the control packet described above from the packet judgment unit 263 shown in FIG. 24 (see FIG. 27) and transfers both the command and delay amount D2 to the instruction analysis unit 254.

Then, the instruction analysis unit 254 designates new delay amount D2 and instructs the delay amount update unit 267 of a delay adjustment unit 262 to modify the delay amount. Then, the delay amount update unit 267 updates the content of a delay amount storage unit 249 using the designated delay amount D2.

Since the delay adjustment unit 262 can dynamically modify a delay amount to be used to determine a frame to be reproduced in this way, transfer delay between the transmitting and receiving sides can be set to an appropriate value depending on an actual transmission condition.

If a function to calculate appropriate delay amount Dx based on arrival management information collected as described above is provided in the relay device 220 on the receiving side and this new delay amount Dx is stored in the delay amount storage unit 249 using the function of the delay amount update unit 267, the relay device 220 on the receiving side can autonomously control transfer delay.

Alternatively, the operator of the relay device 220 on the receiving side can designate an appropriate delay amount and can instruct the modification of the delay amount. Then, the delay amount update unit 267 can update the delay amount.

Alternatively, one relay device (for example, the relay device 210 shown in FIG. 11) can be exclusively used as a server and the other relay device (for example, the relay device 220 shown in FIG. 11) can be exclusively as a client.

For example, it is configured that the relay device on the server side comprises an IEEE1394 adapter 411, an Internet adapter 413 and a DV/IP transmitting unit 211 and the relay device on the client comprises an IEEE1394 adapter 411, an Internet adapter 413 and a DV/IP receiving unit 221.

If the minimum required functions are provided in both the relay device exclusively used as a server and the relay device exclusively used as a client, a control packet can be transmitted/received between the respective relay devices on the server and client sides.

In this case, for example, the relay device on the server side comprise the decapsulation unit 222, additional information analysis unit 223 and packet sorting unit 263 that are provided in the DV/IP receiving unit 260 as means for performing the minimum functions required to receive a DV/IP packet, and a DV/IP packet, including a control packet, is transferred to the control packet processing unit 251 using the functions of these units.

The relay device on the client side comprises, for example, the encapsulation unit 212 as means for performing the minimum functions required to transmit a DV/IP packet, and the encapsulation unit 212 generates a DV/IP packet, including a control packet generated by the control packet processing unit 251.

The application scope of the present invention is not limited to the preferred embodiments described above.

The data communications system of the present invention is applicable to all data communications system for relaying data between two networks that target data with a prescribed cyclical structure, via another network.

Each of the communications quality compensation technology and delay adjustment technology that are described in the preferred embodiments given above is also independently applicable or a plurality of the techniques described in the individual preferred embodiments can also be combined, if required.

FIG. 28 shows the basic configuration of the fifth preferred embodiment of the present invention.

According to this preferred embodiment, in a data communications system in which a transfer unit of a prescribed format transferred in the first network, which is one of a plurality of physically independent networks is relayed by transmitting side relay means 510 installed in relation to the first network, another relay network and receiving side relay means installed in relation to the second network, which is at least one of other independent networks, the transmitting side relay means 510 comprises extraction means 511 for extracting a transfer unit to be transmitted to the second network, transformation means 512 for applying a prescribed operation to control information included in the extracted transfer unit and generating a relay transfer unit, reshaping means 513 for reshaping the relay transfer unit into a packet in a format based on the transmitting procedures of the relay network and addressed to the receiving side relay device installed in relation to the second network and first transmitting means 514 for transmitting each packet reshaped by the reshaping means 513 to the relay network. The receiving side relay mans 520 comprises separation means 521 for separating the relay transfer unit by breaking down a packet received via the relay network, generation means 522 for applying a prescribed operation to the relay transfer unit obtained by separation means 521 and regenerating a transfer unit, including control information suitable for the transmitting process of the second network and second transmitting means 523 for transmitting the transfer unit generated by the generation means 522 to the second network.

According to this preferred embodiment, in the transmitting side relay means 510, since both transformation means 512 and reshaping means 513 operate to encapsulate a relay transfer unit, including desired information as control information, into a packet suitable for a relay network when receiving the transfer unit from the extraction means 511 and to transmit the packet to the relay network via the first transmitting means 514.

In the receiving side relay means 520, both the separation means 521 and generation means 522 operates to regenerate a transfer unit, including control information suitable for the second network when receiving the packet encapsulated as described above and to transmit the transfer unit to the second network via the second transmitting means 523.

Since in this way, control information required to control functions peculiar to the second network can be generated using control information on the first network side, data can be transferred theoretically in one network, including the functions peculiar to each network, regardless of the physical locations of the first and second networks.

In the data communications system, the transformation means 512 of the transmitting side relay means 510 can further comprises a first rewriting means for rewriting at least a part of control information included in each transfer unit and outputting the transfer unit as a relay transfer unit.

In this case, since the first rewriting means 531 of the transformation means 512 rewrites at least a part of control information into appropriate information, the operation of the generation means 522 of the receiving side relay means 520 can be simplified.

In the data communications system, each transfer unit transferred in the first and second networks includes time information required to keep a transfer operation synchronized as a part of control information. The first rewriting means 531 can replace time information included in each transfer unit with invalid data that are neglected when they are transferred to the second network.

In this case, since the first rewriting means 531 of the transformation means 512 rewrites in advance time information included in control information into invalid information, the generation means 522 of the receiving side relay means 520 can incorporate appropriate time information into a desired transfer unit.

In the data communications system, the generation means 522 of the receiving side relay means 520 can further comprise a second rewriting means 541 for rewriting at least a part of control information included in each relay transfer unit and outputting the transfer unit as a transfer unit to be transmitted to the second network.

In this case, since the second rewriting means 541 of the generation means 522 rewrite at least a part of control information included in each relay transfer unit, control information valid in the second network can be surely generated, regardless of the content of control information in the first network.

In the data communications system, each transfer unit transferred in the first and second networks includes time information required to keep transfer operations synchronized as a part of control information, and the second rewriting means 541 can replace information about a transmission time included in the control information with time information valid in the network on the self-device side.

In this case, since control information, including time information valid in the second network can be obtained by the second rewriting means 541 of the generation means 522, the synchronization of transfer operations can be maintained by using a time independent from the first network as a reference.

In the data communications system, each transfer unit transferred in the first and second networks includes channel identification information about a transmission route as a part of control information. The generation means 522 comprises a storage means 542 for storing information about the correspondence between channel identification information assigned in the first network and channel identification information assigned in the second network, in each communications conducted between a node belonging to the first network and a node belonging to the second network via a relay network. The second rewriting means 541 rewrites channel identification information included in a relay transfer unit based on the correspondence information.

In this case, since correspondence information is stored in the storage means 542 of the generation means 522 and the second rewriting means 541 operates based on this correspondence information, channel numbers in the first network and channel numbers in the second network can be independently managed.

In the data communications system, each transfer unit transferred in the first and second networks includes prescribed fixed information in each transmission route as a part of control information. The generation means 512 of the transmitting side relay means 510 comprise deletion means 532 for deleting the fixed information and outputting the transfer unit as a relay transfer unit. The generation means 522 of the receiving side relay means 520 comprises addition means 543 for attaching fixed information as a part of control information corresponding to each relay transfer unit and outputting the transfer unit as a transfer unit to be transmitted to the second network.

In this case, since fixed information included in a transfer unit is deleted by the deletion means 532 of the transformation means 512, a data amount to be transmitted to a relay network by the first transmitting means 514 can be reduced.

However, when the transfer unit without the fixed information is inputted, the addition means 543 of the generation means 522 operates to attach the fixed information deleted by the transmitting side relay means and to regenerate a transfer unit I a format suitable for the second network.

Figure 29:
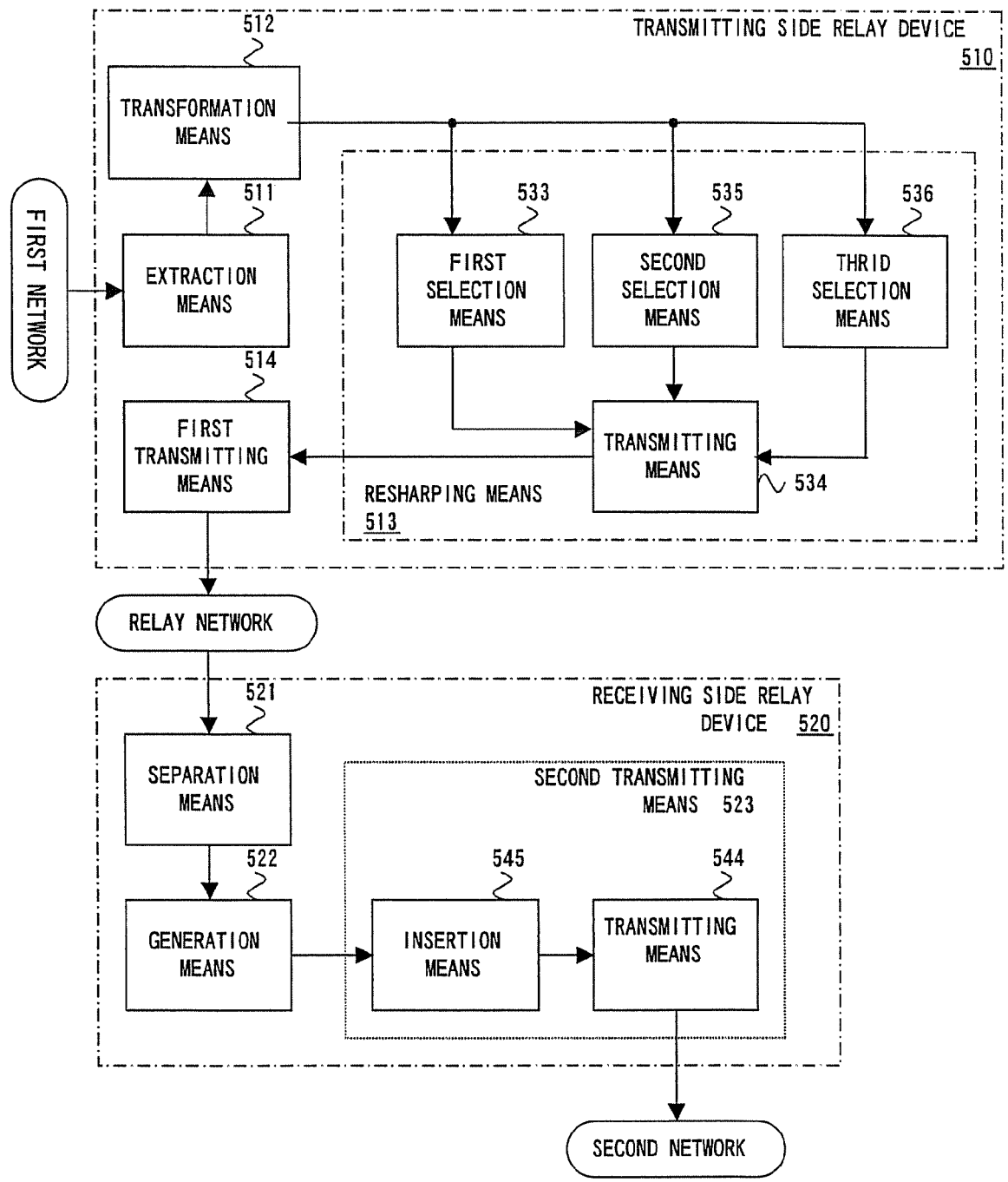
FIG. 29 shows the basic configuration of the data communications system in another preferred embodiment of the present invention.

FIG. 29 shows the basic configuration of the sixth preferred embodiment of the present invention.

In a data communications system, a series of transfer units transferred in the first and second networks are composed of valid transfer units, including information to be transferred and empty transfer units, including no information to be transferred. The reshaping means 513 of the transmitting side relay means 510 comprises first selection means 533 for selecting a valid transfer unit, including information to be transferred, as a target to be transmitted to a relay network and conversion means 534 for converting the transfer unit selected as a transmission target into a packet suitable for the relay network.

In this case, since only valid transfer units are encapsulated and provided for the transmitting process of the transmitting means 514 by both the first selection means 533 and conversion means 534 of the reshaping means 513, a data amount to be transmitted to a relay network can be reduced as a whole.

In the data communications system, the second transmitting means 523 of the receiving side relay means 520 comprises transmitting means 544 for transmitting a transfer unit received as a transmission target to the second network and insertion means 544 for inserting an empty transfer unit, including no information to be transferred, in a series of transfer unit strings received from the generation means 522 according to prescribed rules and inputting the transfer unit to the transmitting means 544 as a transfer unit to be transmitted.

In this case, the series of transfer unit strings can be regenerated according to the prescribed rules by the insertion means 545 of the second transmitting means 523 and can be transmitted to the second network via the transmitting means 544.

In this way, a transfer unit string in which an empty transfer unit is inserted at an appropriate timing can be regenerated and the timing adjustment of synchronous transfer operations on the second network side is possible.

In the data communications system, a series of transfer units transferred in the first and second networks are composed of valid transfer units, including information to be transferred and empty transfer units, including no information to be transferred. The reshaping means 513 of the transmitting side relay means 510 comprises second selection means 535 for selecting all the transfer units or valid transfer units, including information to be transferred as transmission targets and conversion means 534 for converting the transfer units selected as transmission targets into a packet suitable for a relay network.

In this case, when a select instruction is inputted, the second selection means 535 of the reshaping means 513 operates to input all the transfer units or valid transfer units to conversion means 534, if required.

In the data communications system, the reshaping means 513 of the transmitting side relay means 510 comprises third selection means 535 for identifying a correct transfer unit that satisfies the conditions to be met by a transfer unit in the first network and selecting the transfer unit as a target to be transmitted to a relay network and conversion means 534 for converting the transfer units selected as transmission targets into a packet suitable for the relay network.

In this case, only correct transfer units meeting prescribed conditions can be selectively encapsulated by both the third selection means 536 and conversion means 534 and can be transmitted to a relay network via the first transmitting means 514.

Figure 30:
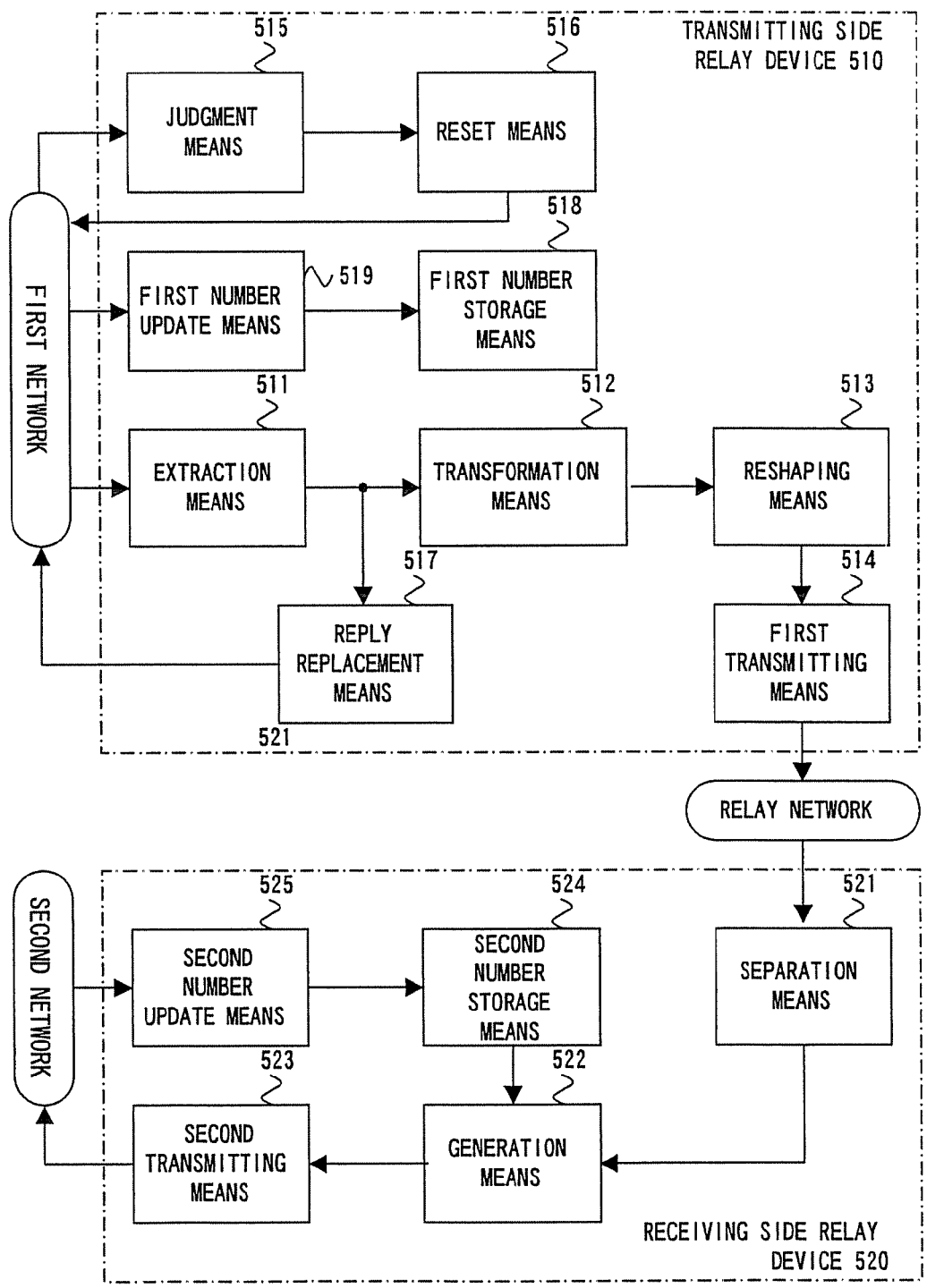
FIG. 30 shows the basic configuration of the data communications system in another preferred embodiment of the present invention.

FIG. 30 shows the basic configuration of the seventh preferred embodiment of the present invention.

The data communications system is configured so that the first and second networks can select a route node from nodes belonging to the network according to prescribed procedures when a prescribed operation is performed and that this route node can manage transmission in the network. Each of the transmitting relay means 510 and receiving side relay means 520 comprises judgment means 515 for judging whether the self-device is designated as a route node when a prescribed operation is performed, and reset means 516 for performing the prescribed operation if the judgment means 515 judges that the self-device is a route node.

In this case, either of the transmitting side relay means 510 and receiving side relay means 520 can be prevented from becoming a route node by both the judgment means 515 and reset means 516 when the prescribed operation is performed.

The data communications system is configured so that the first network can confirm the delivery of an asynchronous transfer unit from time to time transmitted from each node to another node, both of which belong to the network, by a prescribed reply transfer unit. The transmitting relay means 510 comprises a reply acting means 517 for returning the prescribed relay transfer unit to the originating node of the asynchronous transfer unit when the asynchronous transfer unit is extracted by the extraction means 511.

In this case, since the reply acting means 517 of the transmitting side relay means 510 operates to return the prescribed relay transfer unit to the originating source instead of a node belonging to the second network, the delivery confirming operation in the first network can be normally completed, regardless of both a physical distance with the second network and transfer delay due to passing through a relay network.

The data communications system is configured so that each of a plurality of independent networks assigns a node number to each node belonging to the network when a prescribed operation is performed. The transmitting side relay means 510 comprises first number storage means 518 for storing the correspondence between both identification information peculiar to each node belonging to the first network and constant virtual number, and the node number assigned in the first network, and first number update means 519 for collecting node numbers assigned to each node in the first network when the prescribed operation is performed and updating the content of the first number storage means 518. The transformation means 512 replaces a node number included in the extracted transfer unit by the extraction means 511 as information about transmitting source, with a corresponding virtual node stored in the first number storage means 518. The receiving side relay means 520 comprises second number storage means 524 for storing the correspondence between both identification information peculiar to each node belonging to the second network and constant virtual number, and the node number assigned in the second network and second number update means 525 for collecting node numbers assigned to each node in the second network when the prescribed operation is performed and updating the content of the second number storage means 524. The generation means 522 replaces the virtual node number included in the relay transfer unit as information about a destination, with a corresponding node number stored in the second number storage means 524.

In this case, when the prescribed operation is operated, the contents of the first number storage means 518 and second number storage means 524 are updated every time a new node number is assigned to each node belonging to the first network and each node belonging to the second network, respectively, and are provided for the processes of the transformation means 512 and generation means 522, respectively, by the first number update means 519 of the transmitting side relay means 510 and the second number update means 525 of the receiving side relay means 520, respectively.

Therefore, if a destination node belonging to the second network is designated using a virtual node number, the virtual node number can be surely replaced with a node number assigned to a corresponding node in the second network by a replacement process performed by the generation means 522 of the receiving side relay means 520. Therefore, a transfer unit can be surely delivered to the destination node, regardless of the modification of a node number in the second network.

In this case, if a node number for indicating a transmitting source is replaced with a virtual node number by the transformation means 512 of the transmitting side relay means 510, correct information about a transmitting node belonging to the first network on the transmitting side can be delivered to a destination node belonging to the second network on the receiving side.

FIG. 31 shows the configuration of the preferred embodiment of the data communications system of the present invention.

Figure 6A:
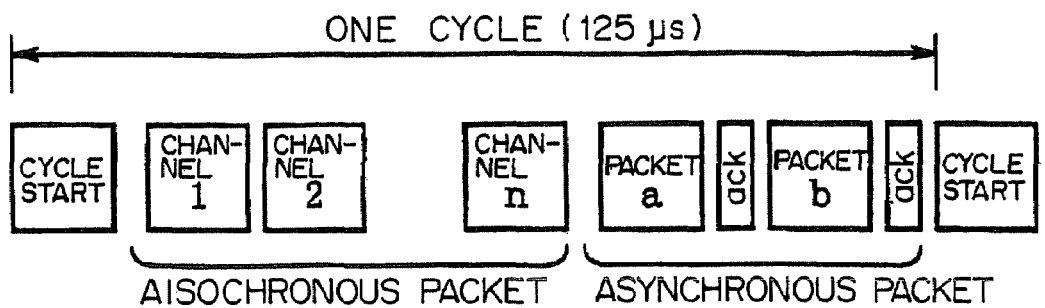
FIGS. 6A through 6C show an interface of the IEEE standard.
Figure 6B:
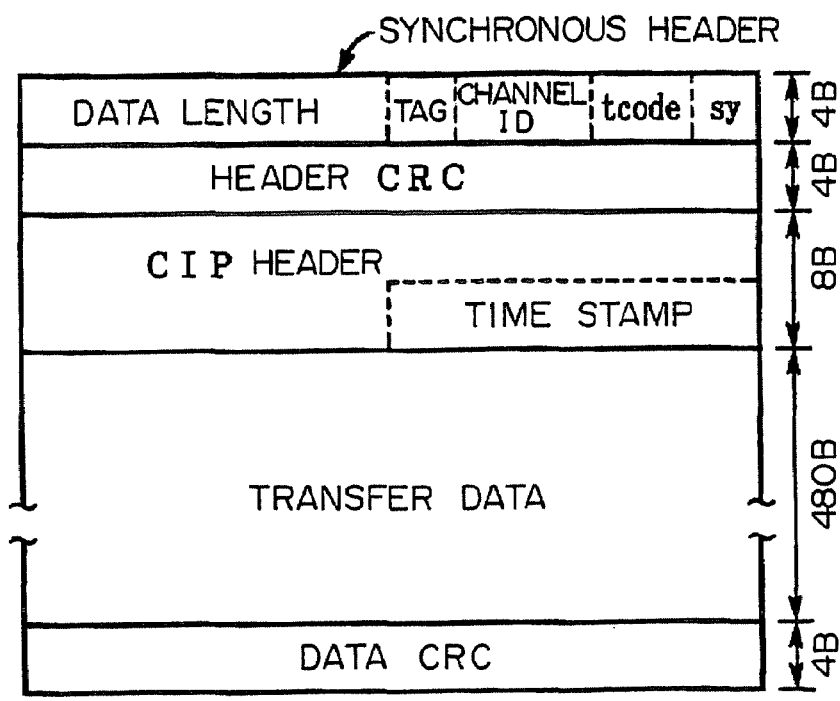
Figure 6C:
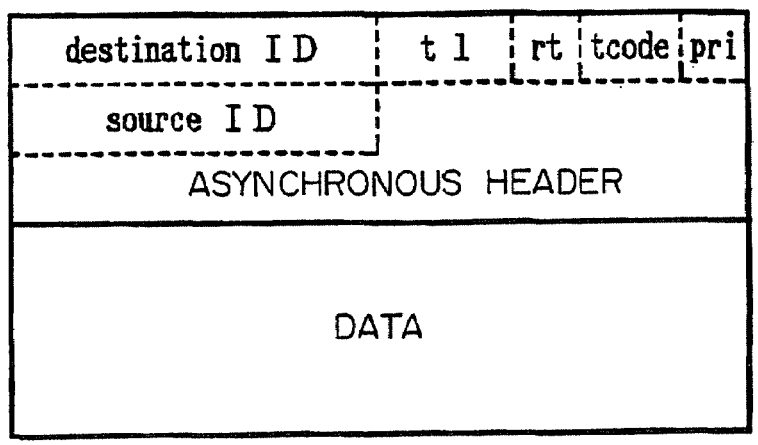

In FIG. 31, each of relay devices 610s and 610r comprises an IEEE1394 adapter 611 corresponding to the IEEE1394 adapter 411 shown in FIGS. 6A through 6C, and the relay devices 610s and 610r are connected to a serial bus composing the first network and a serial bus composing the second network, respectively.

In the following description, when the relay devices 610s and 610r are called together, a relay device 610 is simply used.

In this relay device 610, a transmitting packet editing unit 612 edits control information included in an IEEE1394 packet received from an IEEE1394 adapter 611 as described later and generates a relay packet.

In FIG. 31, an encapsulation unit 613 receives a relay packet generated by the transmitting packet editing unit 612 and encapsulates this packet according to IP protocol or UDP/IP protocol, and an IP packet (or UDP/IP packet) obtained in this way is transmitted to the Internet via the Internet adapter 413.

In this case, if an IEEE1394 packet to be relayed is in a synchronous mode, the relay packet is encapsulated according to UDP protocol. If it is in an asynchronous transfer mode, the packet is encapsulated according to TCP protocol.

In the relay device 610 shown in FIG. 31, a decapsulation unit 621 decapsulates the IP packet received from an Internet adapter 713 and separates the relay packet.

The receiving packet editing unit 622 shown in FIG. 31 edits control information that is included in the relay packet separated by the decapsulation unit 621 as described later and generates an IEEE1394 packet suited to be transferred in the second network. The regenerated IEEE1394 packet is transmitted to the second network via the IEEE1394 adapter 611.

Figure 32:
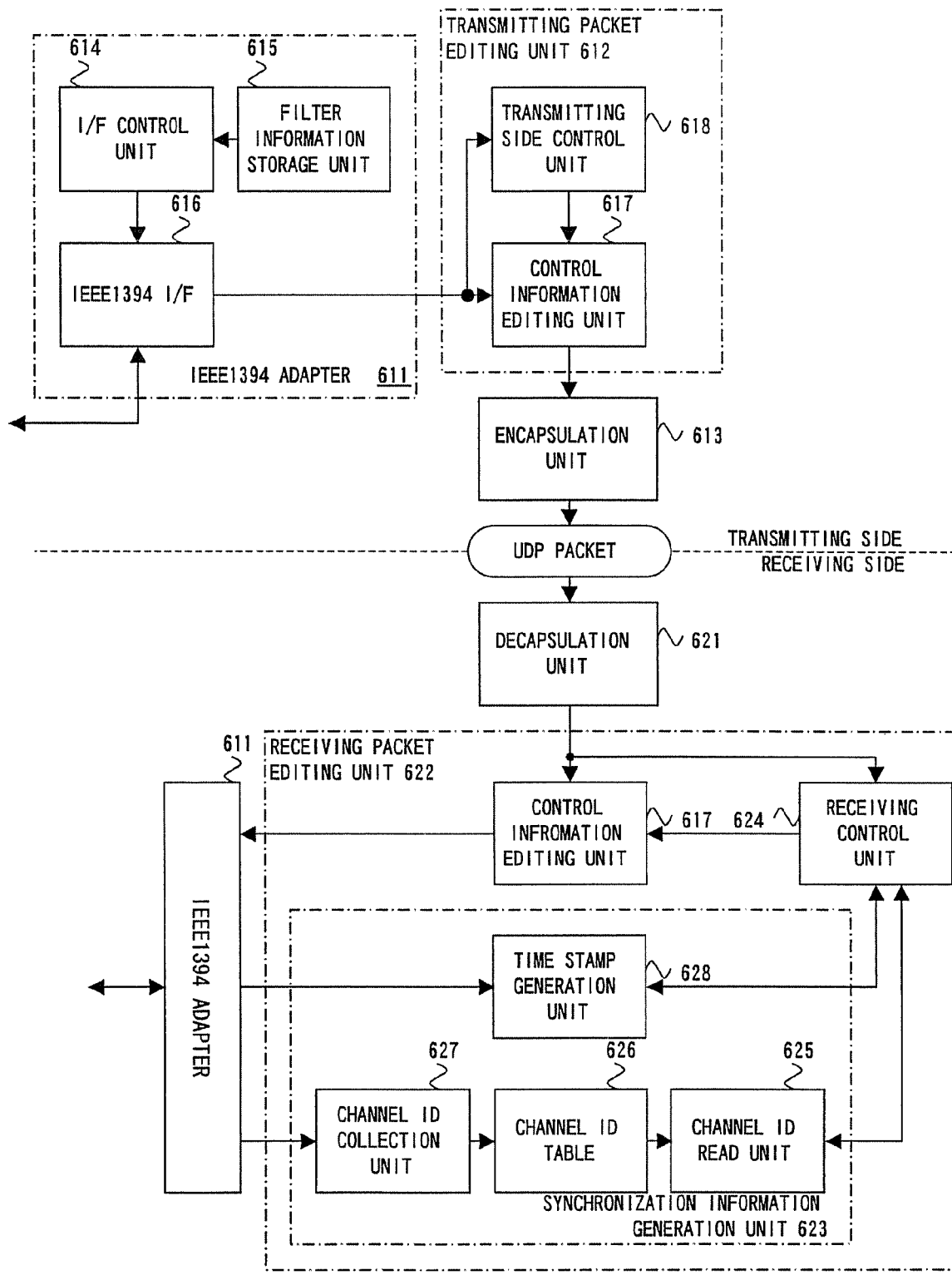
FIG. 32 shows the relay operation of a synchronous packet.

FIG. 32 shows the relay operation of an IEEE1394 packet.

In the IEEE1394 adapter 612 shown in FIG. 32, an interface (I/F) control unit 614 controls the operation of an IEEE1394 interface (I/F) 616 based on filter information stored in a filter information storage unit 615 and extracts IEEE1394 packets to be relayed from IEEE1394 packets transmitted via a connected serial bus, in addition to IEEE1394 packets addressed to the self-device.

For example, filter information, including both a node ID for indicating a digital video deck (see FIG. 31), which is one of nodes belonging to the second network and a channel ID for indicating aisochronous channel that the digital video deck 704b is to receive is generated in advance, in addition to both a node ID for indicating the self-device and a channel ID required by the self-device and is stored in a filter information storage unit 615.

In the transmitting packet editing unit 612 shown in FIG. 32, a control information editing unit 617 edits the designated field of the IEEE1394 packet received from the IEEE1394 adapter 611 according to edit instructions. A transmitting side control unit 618 generates an edit instruction on a necessary editing process based on the content of the inputted IEEE1394 packet and inputs the instruction to a control information editing unit 617.

A relay packet obtained as the editing result of this control information editing unit 617 is encapsulated by an encapsulation unit 613 and is transferred to the relay device 620 on the receiving side.

In FIG. 32, an interface with the Internet is omitted.

In the receiving packet editing unit 622 shown in FIG. 32, a synchronous information generating unit 623 operates according to an instruction from the receiving side control unit 624 to generate information elements to be included in a synchronous packet as control information and to return the elements to the receiving side control unit 624.

In this synchronous information generating unit 623, a channel ID reading unit 625 reads a corresponding channel ID on the receiving side from a channel ID table, which is described later, based on a channel ID designated by an instruction from the receiving side control unit 624. A time stamp generation unit 628 generates a time stamp for indicating a time valid in the second network as described later according to instructions from the receiving side control unit 624.

Both the channel ID obtained by this channel ID reading unit 625 and the time stamp obtained by the time stamp generation unit 628 are transferred to the receiving side control unit 624 as information elements to be included in a synchronous packet as control information.

In FIG. 32, a channel ID collection unit 627 collects a channel ID for indicating an aisochronous channel assigned to communications to be relayed by the relay devices 610s and 610r on the second network side, if required, and updates the content of a channel ID table 226.

Next, the operation of relaying an IEEE1394 aisochronous packet (hereinafter called a "synchronous packet") transferred through a serial bus composing the first network to the second network is described with reference to FIGS. 31 and 32.

Figure 33:
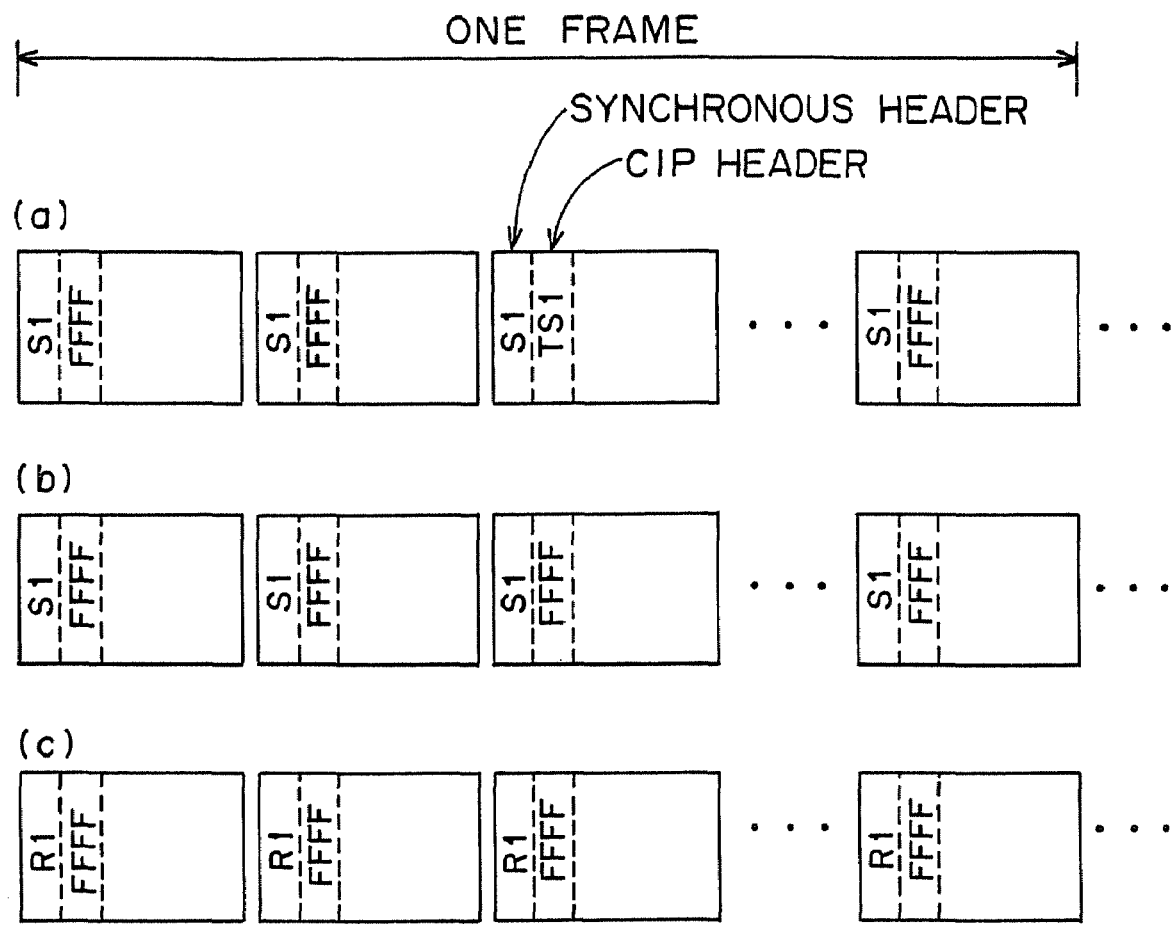
FIG. 33 shows both the conversion and reshaping processes of a synchronous packet.

FIG. 33 also shows both the transformation and regeneration processes of a synchronous packet.

An interface control unit 614 controls the operation of an IEEE1394 interface 616 based on the filter information stored in the filter information storage unit 615 shown in FIG. 32, and the synchronous packet of a corresponding aisochronous channel is extracted and is transferred to the transmitting packet editing unit 612.

For example, if an aisochronous channel indicated by channel ID "S1" in the first network is assigned to communications to be relayed and a valid time stamp is attached to the third synchronous packet from the head of one frame, as shown in FIG. 33A, the synchronous packet includes the channel ID "S1" described above as the value of the corresponding field of a synchronous header composing each synchronous packet, and the third synchronous packet of each frame includes the valid value "TS1" as the value of the time stamp field of a CIP header.

In this case, a control information editing unit 617 rewrites the content of a time stamp field in a CIP header included in a synchronous packet, into a prescribed value (for example, a value expressed by hexadecimal number "FFFF" that is invalid as a time stamp).

In this way, the contents of time stamp fields that are included in all the packets transferred in the aisochronous channel described above are replaced with an invalid value, regardless of whether a time stamp that is included in a synchronous packet received from an IEEE1394 adapter 611 is valid (see FIG. 33B).

Then, a UDP header for designating a network address for indicating the relay device 610s on the transmitting side and a network address for indicating the relay device 610r on the receiving side as originating source and a destination, respectively, is attached to a series of synchronous packets, including this invalid value as a time stamp by the encapsulation unit 613 and are transmitted to the Internet as UDP/IP packets.

On receipt of the series of UDP/IP packets via the Internet adapter 713, the decapsulation unit 621 eliminates the UDP header from each UDP/IP packet and transfers the obtained synchronous relay packets to a receiving packet editing unit 622.

Then, the receiving side control unit 624 judges whether each synchronous packet is located at the head of a frame in digital video data, for example, based on a value that is expressed by the first three bytes of digital video data included in the received synchronous packet and designates a field to be rewritten for the control information editing unit 617 based on this judgment result.

If the relevant synchronous packet is located at the head of a frame, the receiving side control unit 624 instructs a control information editing unit 617 to rewrite a time stamp field included in a CIP header as well as a channel ID field included in a synchronous header and also instructs both a channel ID reading unit 624 and time stamp generation unit 628 that are provided in a synchronous information generating unit 623 to generate respective corresponding information elements.

In this case, if the two relay devices shown in FIG. 31 relay data communications between a digital video camera 703a belonging to the first network and a digital video deck 704b belonging to the second network, the channel ID for indicating an aisochronous channel that the relay device 610 on the second network side has obtained for this communication (shown by attaching symbol R1 in FIG. 31) is stored in the channel ID table 626 in relation to a channel ID for indicating an aisochronous channel assigned to the digital video camera 703*a* (shown by attaching symbol S1), as shown in FIG. 34A.

In this case, the channel ID reading unit 625 receives the channel ID of the transmitting side included in a relay packet, from the receiving side control unit 624 and obtains information elements to be included in a synchronous packet activated in the second network as control information by retrieving the channel ID of the receiving side corresponding to this channel ID from the channel ID table 626.

Since the relay device 620 starts to relay synchronous packets via the Internet and restarts the relay by bus reset, a channel ID collection unit 627 receives the relevant channel ID from the IEEE1394 adapter 611 and stores the channel ID in the channel ID table 626 in relation to a channel ID included in a synchronous packet to be relayed, when obtaining the aisochronous channel in the second network.

For example, a time stamp generation unit 628 receives information about a reference time in the second network from the IEEE1394 adapter 611 and transfers a value obtained by adding a constant corresponding to a prescribed time to this reference time information, to the receiving side control unit 224 as a time stamp for indicating a timing when the relevant synchronous packet is outputted to the serial bus on the second network side, according to instructions from the receiving side control unit 624.

Then, the receiving side control unit 624 inputs the channel ID of the receiving side described above and this time stamp, to the control information editing unit 617 as editing information about a channel ID field and a time stamp field, respectively.

If a synchronous packet is located at a place other than the head of a frame is inputted, the receiving side control unit 624 inputs the channel ID obtained from the channel ID reading unit 625 to the control information editing unit 617 and rewrites only a channel ID field.

In this way, both the synchronous information generating unit 623 and control information editing unit 617 operates according to instruction from the receiving side control unit 624, and, as shown in FIG. 33C, the channel ID field of each synchronous packet relayed via the Internet and the time stamp included in the synchronous packet located at the head of a frame can be replaced with channel ID "R1" and time stamp "TS2", respectively.

The synchronous packet obtained in this way is equivalent to that outputted to a serial bus by a node belonging to the second network.

Specifically, according to a data communications system with the relay device 610 described above, packets can be transferred in an IEEE1394 synchronous mode theoretically regarding two different networks as one network although both an aisochronous channel and a system clock are independently managed in the first and second networks.

Since a channel ID is independently managed on the transmitting and receiving sides, a channel ID can be freely attached in either of the first network, which is a transmitting side, and the second network, which is a receiving side, regardless of whether communications are conducted within one network and thereby the management of channel IDs can be simplified.

For example, if the channel ID on the receiving side is modified by bus reset made in the second network on the receiving side, communications can be maintained without any influence on the transmitting side.

Similarly, a synchronous packet outputted to a serial bus by the digital video camera 703*b* belonging to the second network shown in FIG. 31 can also be transferred to the digital video deck 794*a* belonging to the first network.

Figure 35:
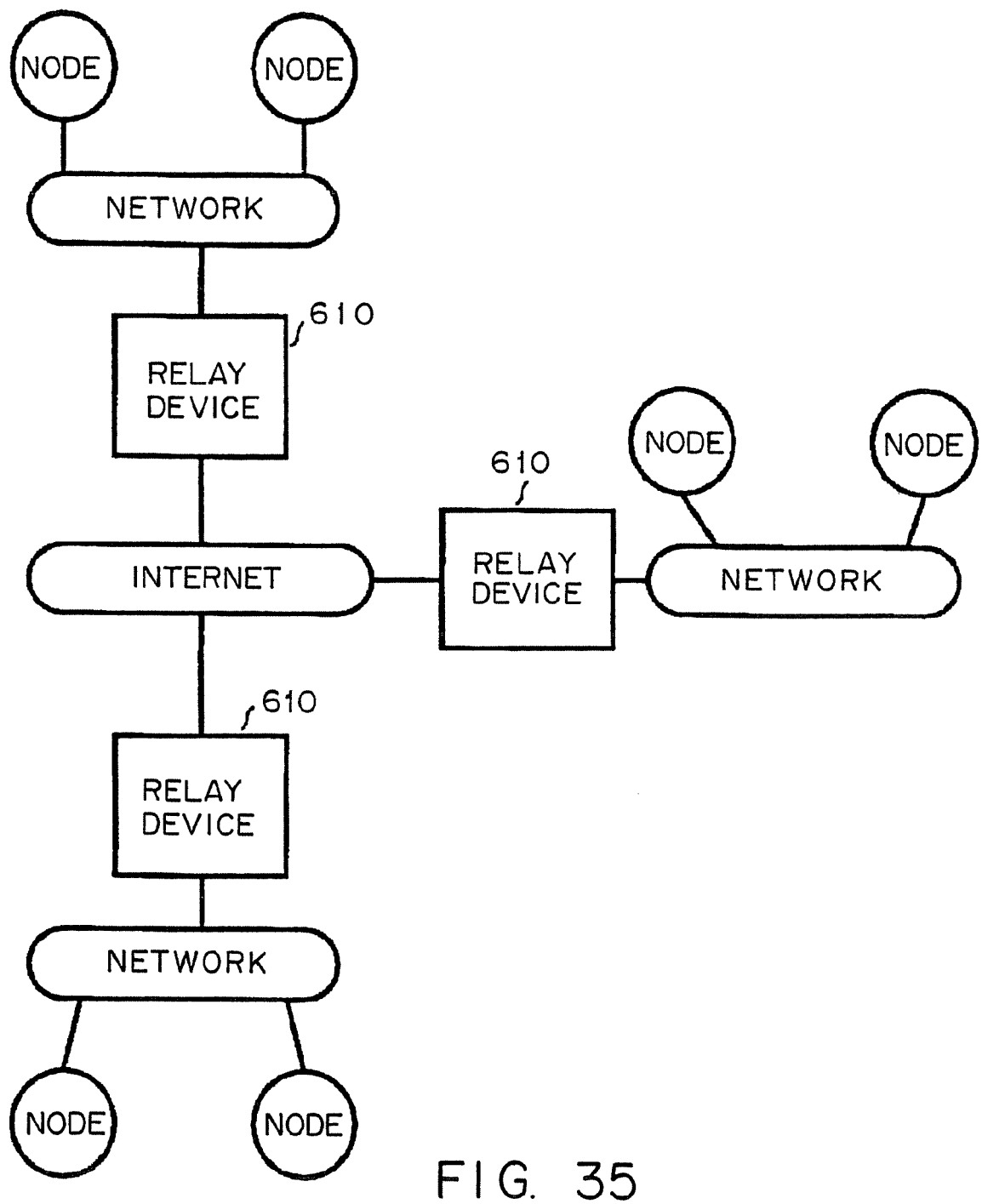
FIG. 35 shows another preferred embodiment of the data communications system of the present invention.

As shown in FIG. 35, two-way data communications can also be conducted among three or more networks with the relay device 610.

In this case, channel IDs on the receiving side are stored in advance in the channel ID table 625 of the receiving packet editing unit 622 (see FIG. 32) in relation to the combination of a channel on the transmitting side and a network address provided to the relay device on the transmitting side (shown by attaching symbols "N1" and "N2" in FIGS. 34A and 34B), as shown in FIG. 34B. For example, the synchronous information generating unit 623 receives the network address of the relay device on the transmitting side from the decapsulation unit 621, retrieves data from the channel ID table 625 based on both the network address and a channel ID included in a relay packet and generates editing information using the obtained channel ID.

Alternatively, a time stamp field included in a packet located at the head of a frame can be replaced with a valid value by the receiving packet editing unit 622, and the time stamp field of another packet can be replaced with an invalid value instead of the transmitting packet editing unit 612 replacing a time stamp with an invalid value.

In this way, since the relay device 610 on the receiving side regenerates a series of synchronous packets in which only a time stamp attached to the leading packet of a frame has a valid value, regardless of the position in a frame of a synchronous packet with a valid time stamp of a series of packets transferred in the first network, a node on the receiving side that belongs to the second network can be prevented from operating wrong.

The data communications system of the present invention can be applied not only to the case where data are transferred in the IEEE1394 synchronous mode described above, but can also be applied to all data communications systems in which networks for transferring packets in a prescribed form in a transmission route that can be specified by information equivalent to an channel ID are connected via another network.

Next, a technology for reducing an information amount to be relayed by both relay devices and the Internet as a whole in the case where a large number of packets in a specific format are consecutively relayed, such as the transfer operation of synchronous packets in an IEEE1394 synchronous mode, is described.

Figure 36:
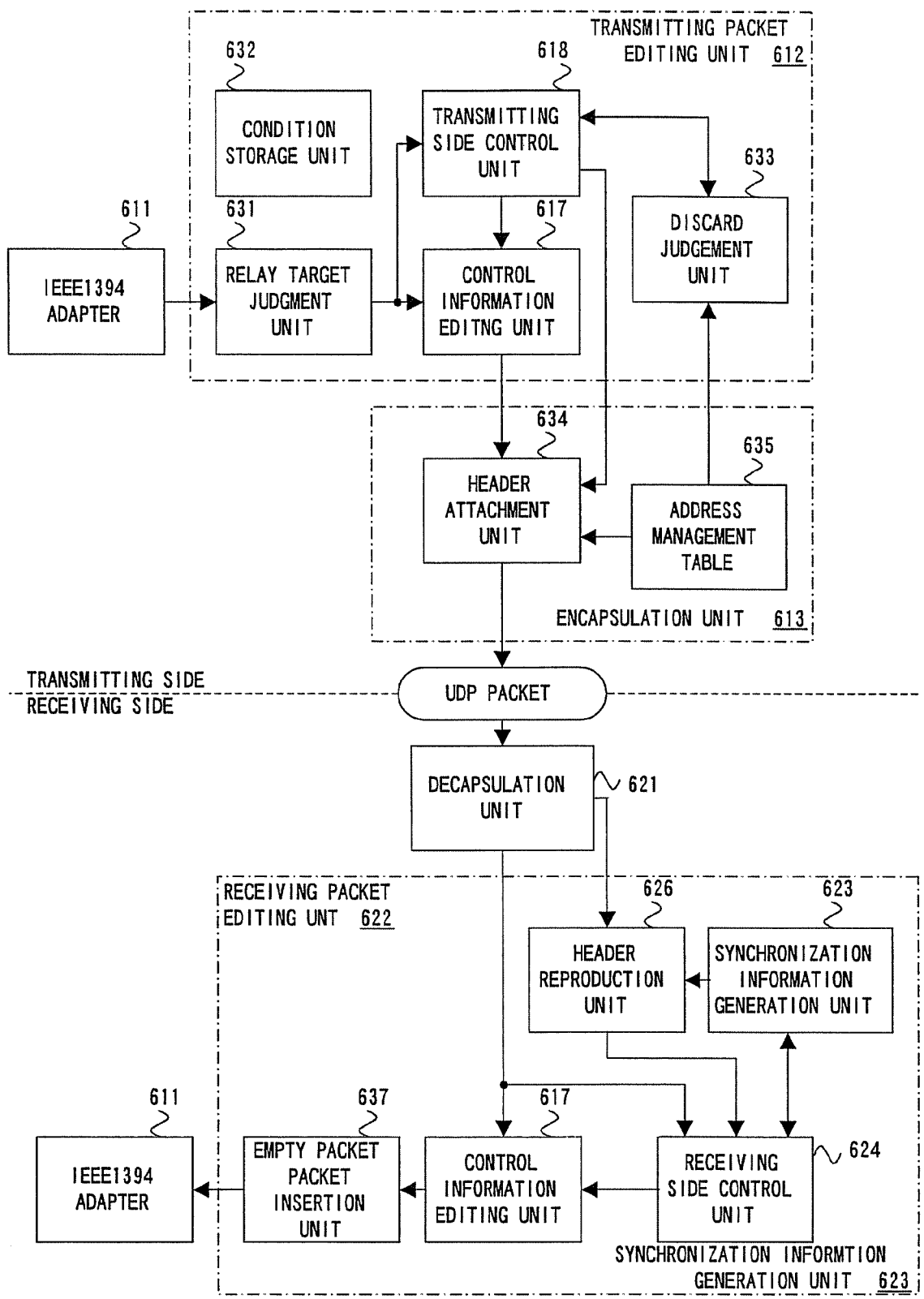
FIG. 36 shows the basic configuration of the data communications system in a preferred embodiment of the present invention.

FIG. 36 shows the basic configuration of a data communications system.

In the transmitting packet editing unit 612 shown in FIG. 36, a relay target identification unit 631 identifies synchronous packets to be relayed to the second network under conditions stored in a condition storage unit 632, and the synchronous packets identified to be relayed by this relay target identification unit 631 are inputted to the control information editing unit 617.

A discard judgment unit 633 judges whether a synchronous header included in a synchronous packet can be omitted, and this judgment result is inputted to the transmitting side control unit 618.

In the encapsulation unit 613 shown in FIG. 36, a header addition unit 634 generates a UDP/IP packet by generating an appropriate UDP header based on address information stored in an address management table 635 and attaching the header to a synchronous packet received from the transmitting packet editing unit 612.

In the receiving packet editing unit 622 shown in FIG. 36, a header reproduction unit 636 receives a network address for indicating the relay device 610*s*, which is a transmitting source, from the decapsulation unit 621 and reproduces the synchronous header as described later, based on this network address.

The synchronous header reproduced by this header reproduction unit 636 is inputted to the receiving side control unit 623.

In FIG. 36, an empty packet insertion unit 637 generates an empty packet in a format specified by the standard of an IEEE1394 synchronous mode and inserts the empty packet in the string of a series of synchronous packets, the editing process of which have been completed by the control information editing unit 617. A series of synchronous packets, including the empty packet regenerated in this way are outputted to the serial bus of the IEEE1394 adapter 611.

In FIG. 36, a transmission route that a UDP/IP packet generated by this encapsulation unit 613 follows is omitted since the route is the same as that shown in FIG. 31.

The operation of omitting redundant information included in a synchronous packet and preventing an incorrect packet from being transmitted by each unit shown in FIG. 36 is described below.

FIGS. 37A through 37D show the relay operation of a synchronous packet.

Figure 39:
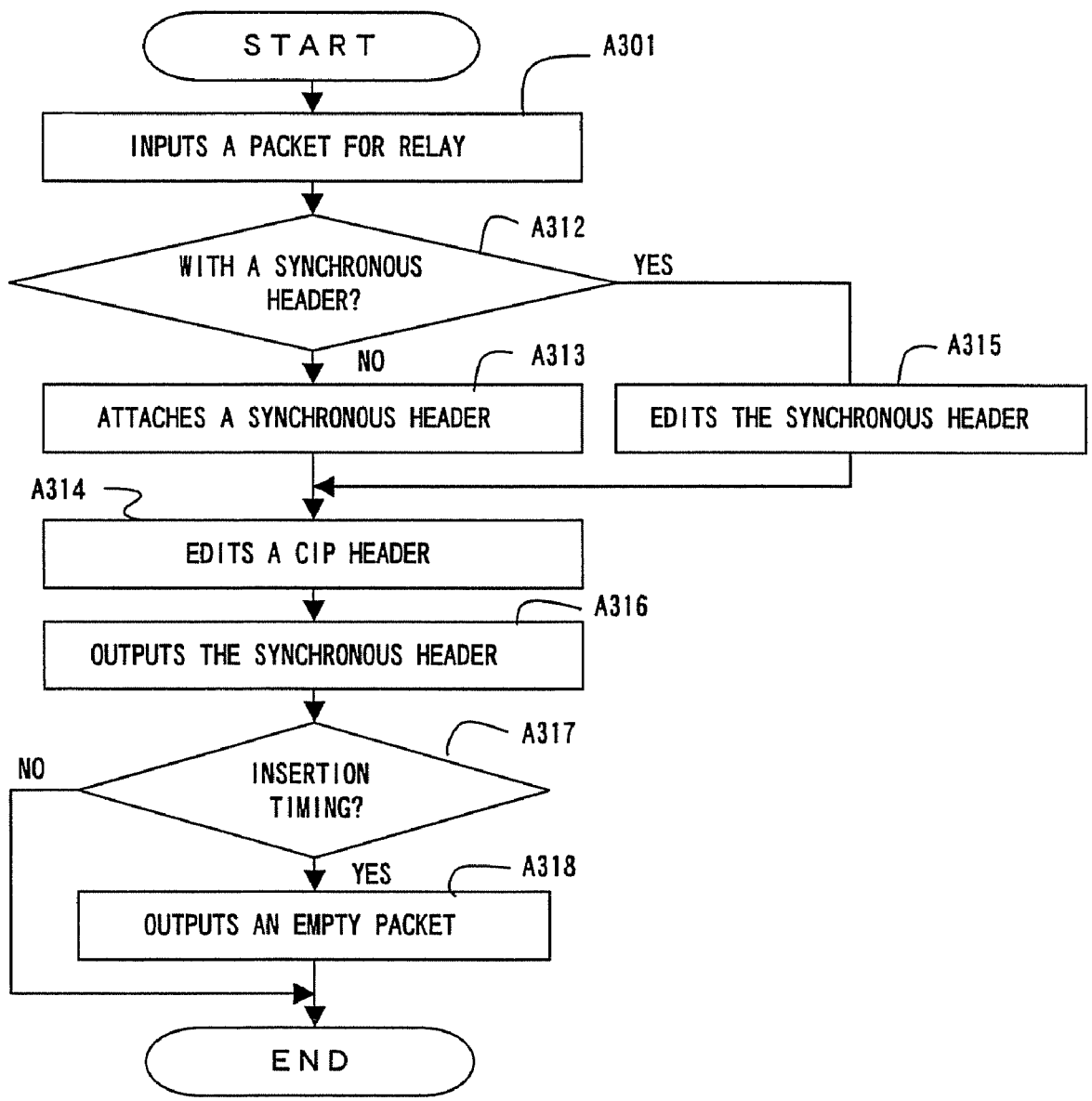
FIG. 39 is a flowchart showing the editing operation of a receiving packet.

FIGS. 38 and 39 are a flowchart showing a transmitting packet editing operation and a flowchart showing a receiving packet editing operation, respectively.

Figure 37A:
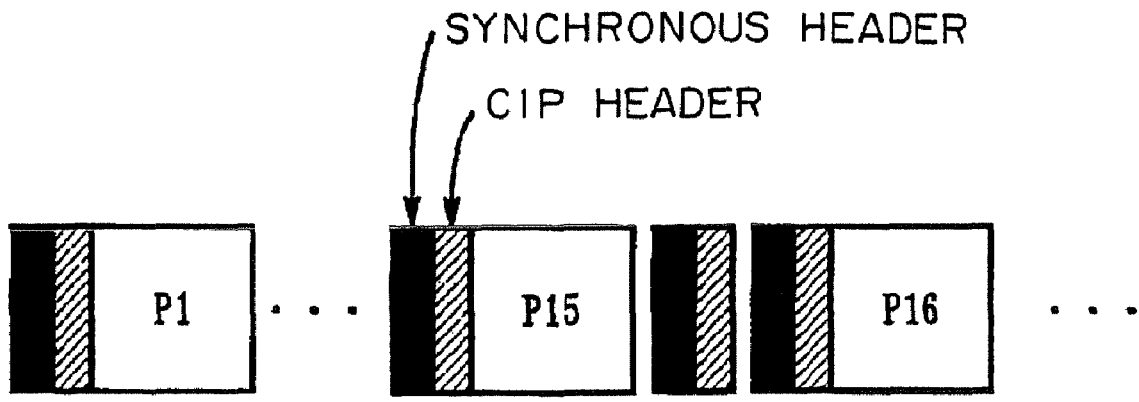
FIGS. 37A through 37D show the relay operation of a synchronous packet.

For example, if a transmitting node transmits one empty packet every time it transmits 15 synchronous packets, the synchronous packet string shown in FIG. 37A are inputted to the relay target identification unit 631 of the transmitting packet editing unit 612 via the IEEE1394 adapter 611 (step A301 show in FIG. 38).

Figure 5:
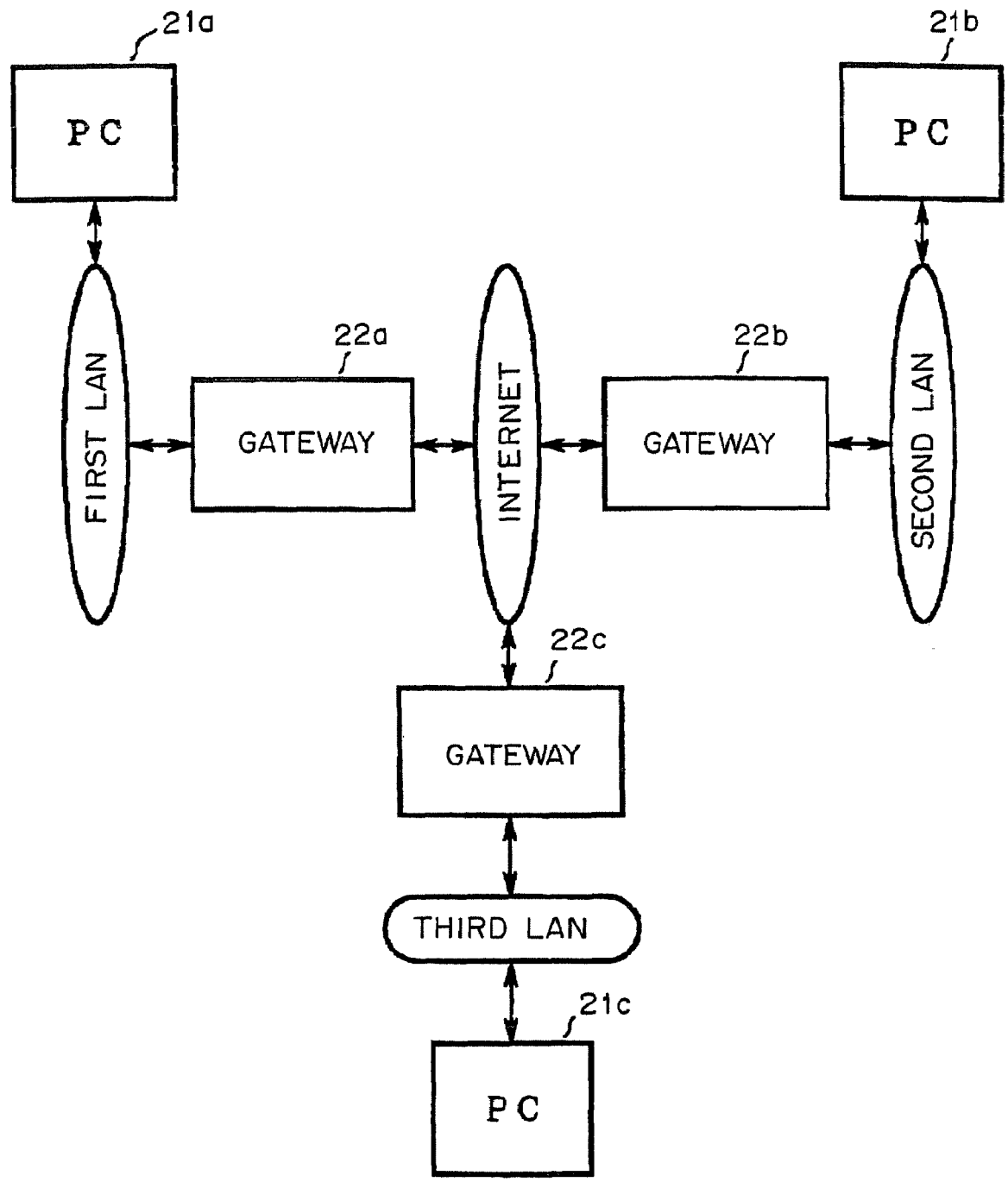
FIG. 5 shows an example of the configuration of data communications system connected to a plurality of LANs.

In FIGS. 37A through 37D, valid synchronous packets, including video data to be transferred that are shown by symbols P1 through P15 and empty packets are identified by data-length information that is included in a synchronous header attached to each packet (shown by painting in FIG. 37). Since, as shown in FIG. 5, the data length of a synchronous packet, including valid transfer information is fixed, it can be judged whether the synchronous packet is normal by comparing the data length of an inputted synchronous packet with the data length of the correct synchronous packet.

Therefore, for example, the condition storage unit 632 stores in advance a first condition that data length is eight bytes and a second condition that data length is over 250 bytes, as a condition for the specification of an empty packet and a condition for the specification of an incorrect packet, respectively.

In this case, the relay target identification unit 631 first checks data length included in a synchronous header attached to an inputted synchronous packet, with the first condition. If the packet meets the condition, in step A302, the packet is judged to be empty and the transmitting packet editing process is terminated.

If in step A302 the packet is not judged to be empty, the relay target identification unit 631 then checks the data length of the inputted synchronous packet with the second condition. If the packet meets the condition, the judgment in step A303 it becomes yes and the transmitting packet editing process is terminated.

If the judgment in step A303 is be no, the relay target identification unit 631 inputs the inputted synchronous packet to the control information editing unit 617 as a relay target, and then the generation operation of a relay packet is started.

In this case, first, a discard judgment unit 633 receives a channel ID included in the synchronous header of a synchronous packet to be relayed, from the transmitting side control unit 618 and judges whether communications can be uniquely specified on the receiving side based on this channel ID (step A304).

In this case, as shown in FIG. 5, the synchronous header attached to a synchronous packet consists of fixed information, such as data length, a synchronous code, etc., and only an channel ID differs for each communications.

However, if an aisochronous channel to be relayed to the relay device 610r, which is a destination, is single, communications to be relayed can be uniquely specified by a network address for indicating the relay device, which is a transmitting source. Therefore, there is no need to notify the receiving side of a channel ID on the transmitting side.

Especially, as described above, if the receiving packet editing unit 622 of the relay device 610r on the receiving side rewrites the content of a synchronous header attached to each synchronous packet, attaching a synchronous header on the transmitting side does not mean nothing but to secure a field to be rewritten. Therefore, the synchronous header can be omitted.

Therefore, if the judgment in step A304 is yes, the control information editing unit 617 discards a synchronous header attached to a synchronous packet according to an instruction from the transmitting side control unit 618 (step A305), then performs the editing process of a CIP header, such as rewriting of a time stamp field, etc., (step A306) and transmits an obtained relay packet to the encapsulation unit 613 (step A307).

Figure 37B:
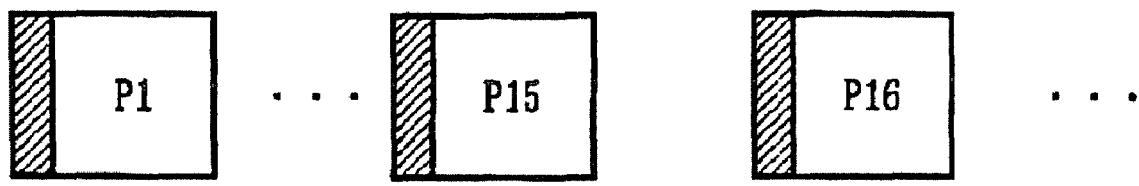
Figure 37C:
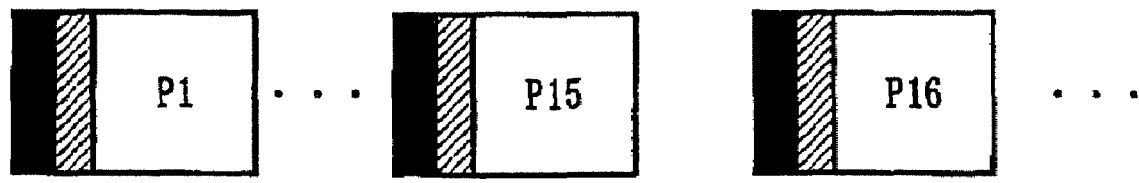

In this case, as shown in FIG. 37B, a relay packet string such that only a CIP header is attached to data main body with a prescribed data length is inputted to the encapsulation unit 613, each packet is encapsulated into a UDP/IP packet and the packet string is transmitted to the Internet.

In this way, by eliminating an omissible synchronous header as well as an empty packet from information to be relayed, an information amount to be relayed via the Internet can be reduced as a whole without the loss of substantial information to be relayed to the receiving side.

By eliminating incorrect synchronous packets, the data length of which exceeds a prescribed data length, from information to be relayed, each node belonging to the second network on the receiving side can be prevented from operating wrong due to the input of an incorrect packet.

If communications of a plurality of aisochronous channels is relayed to the same relay device 610r, the communications cannot be uniquely specified simply by the network address of the relay device 610s, which is a transmitting source. Therefore, the judgment in step A304 it is no, and the flow proceeds to step A306 with the synchronous header left as it is.

Next, a method for regenerating a synchronous packet string in a format suitable for an IEEE1394 synchronous mode from a relay packet obtained by eliminating omissible information as described above is described.

As shown in FIG. 39, when a relay packet is inputted, the receiving side control unit 624 first judges whether this relay packet includes a synchronous header (steps A311 and A312).

In this case, the receiving side control unit 624 judges whether there is a synchronous header, for example, based on whether the leading two bytes of the relay packet indicates the data length of the synchronous packet.

In this case, however, a header reproduction unit 636 receives the network address of a transmitting source from the decapsulation unit 621 and reproduces a synchronous header, including a channel ID valid on the receiving side based on both this network address and the channel ID table 626 (see FIGS. 32, 34A and 34B) of the synchronous information generating unit 623.

In this case, as shown in FIG. 34B, each communications is specified by the pair of the network address of a transmitting source and a transmitting channel, regardless of the number of networks via which a data communications system relays communications and a channel ID valid on the receiving side is stored for each communications. Then, the header reproduction unit 623 retrieves a corresponding channel ID of the receiving side from this channel ID table 625 based on the network address of a transmitting source, reproduces a synchronous header from both this channel ID and fixed information and transfers the header to the receiving side control unit 624.

As shown in FIG. 37B, if a relay packet without the synchronous header is inputted and the judgment in step A312 becomes no, the control information editing unit 617 receives the synchronous header obtained by the header reproduction unit 636 together with an instruction from the receiving side control unit 624 and generates a synchronous packet based on the IEEE1394 standard by attaching this synchronous header to the relay packet and performing a CIP header editing process, such as rewriting of a time stamp, etc. (steps A313 and 314).

If the judgment in step A312 is yes, the control information editing unit 617 performs the editing process, such as writing of a channel ID, etc., of the synchronous header included in the relay packet according to instructions from the receiving side control unit 624 (step A315) and then the flow proceeds to step A314.

After outputting the synchronous packet generated in this way to a serial bus via the IEEE1394 adapter 611 (step A316), the empty packet insertion unit 637 judges whether an empty packet should be inserted, based on the number of transmitted synchronous packets (step A317).

In this case, the empty packet insertion unit 637 judges that insertion timing arrives (Yes in step A317), outputs an empty packet (step A318) and then terminates the process, after transmitting the synchronous packet, located, for example, at the i-th position from the head of a frame, and every time transmitting j synchronous packets after that.

If the judgment in step A317 is no, the empty packet insertion unit 637 terminates the process.

Figure 37D:
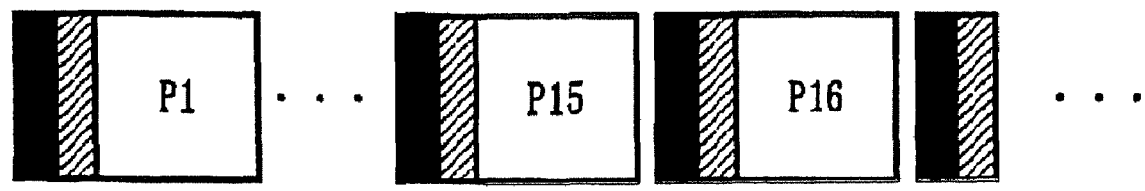

In this way, an empty packet can be inserted at timing suitable for the second network on the receiving side (for example, at the timing of following the 16$^{th}$ synchronous packet), regardless of the timing when the node of a transmitting source outputs an empty packet (see FIG. 37A), as shown in FIG. 37D. In this way, a synchronous packet string equivalent to the synchronous packet string outputted by a node belonging to the second network can be generated and outputted to a serial bus.

In this case, since the empty packet insertion unit 637 of the relay device 610r on the receiving side can freely determine the insertion timing of an empty packet, for example, the empty packet insertion unit 637 can also insert an empty packet every time k synchronous packets are transmitted, regardless of the separation of frames.

Alternatively, the system can be configured so that a select instruction can be inputted to the relay target identification unit 631 shown in FIG. 36 and the relay target identification unit 631 can identify a relay target based on the first principle according to this selection instruction.

In this case, for example, when a select instruction to ignore the first principle is inputted, the relay target identification unit 631 operates to judge that an empty packet outputted by a node on the transmitting side as well as the synchronous packet with a data section are judged to be relayed and is relayed via the Internet.

In this way, if whether an empty packet should be inserted in a relay target or not can be selected according to a select instruction, the information amount of a relay target can be adjusted depending on the traffic of the Internet.

Next, a method for implementing the transfer of a packet equivalent to IEEE1394 asynchronous communications among a plurality of networks located physically far away from one another is described.

FIG. 40 shows the basic configuration of one preferred embodiment of the data communications system.

In the IEEE1394 adapter 611 shown in FIG. 40, a reply generation unit 641 generates a reply packet in a prescribed format according to a reply instruction and outputs the packet to a serial bus via the IEEE1394 interface 616.

In the relay device 610s shown in FIG. 40, a packet distribution unit 642 identifies the destination of asynchronous packets to be inputted, distributes the packets between a packet processing unit 643 and a transmitting packet editing unit 644 and inputs a reply instruction corresponding to the asynchronous packet distributed to the transmitting packet editing unit 644 to the reply generation unit 641 described above.

This transmitting packet editing unit 644 rewrites both an originating node ID and a destination node ID that are included in an asynchronous packet received from the packet distribution unit 642 as described later based on node information, which is described later, stored in a node ID table 645s and generates a relay packet. This relay packet is inputted to an encapsulation unit 613.

In each of the two relay devices 610s and 610r shown in FIG. 40, a node information collection unit 646 collects node information about all the nodes belonging to a network to which the self-device is connected as described later and stores the node information in the respective node ID tables 645.

In the relay device 610r shown in FIG. 40, the receiving packet editing unit 647 receives a relay packet from the decapsulation unit 621, rewrites both the originating node ID and destination node ID included in this relay packet as described later, based on the node information stored in the node ID table 645r and generates an asynchronous packet suitable for the second network.

In FIG. 40, a route judgment unit 648 judges whether the self-device (for example, relay device 610r) is designated to be a route node, based on node information collected by a node information collection unit 646. A reset signal transmitting unit 649 outputs a prescribed reset signal to a serial bus via the IEEE1394 adapter 611 based on the judgment result that the self-device is designated to be a route node.

FIG. 41 shows the detailed configurations of both the transmitting packet editing unit and receiving packet editing unit.

In the transmitting packet editing unit 644 shown in FIG. 41, a virtual ID reading unit 651 reads an appropriate virtual ID, which is described later, from the node ID table 645 according to an instruction from the transmitting side control unit 618 and returns the ID to the transmitting side control unit 618. This virtual ID is transferred to the control information editing unit 617 via the transmitting side control unit 618 and is provided for the editing process of an asynchronous packet.

Similarly, in the receiving packet editing unit 647 shown in FIG. 41, a node ID reading unit 652 reads an appropriate node ID from the node ID table 645r according to an instruction from the receiving side control unit 624. This node ID is transferred to the control information editing unit 617 via the receiving side control unit 624 and provided for the editing process of the relay packet.

In FIGS. 40 and 41, both the units related to the receiving function of the relay device 610s and the units related to the transmitting function of the relay device 610r are omitted.

Next, the operations are described using as an example a case where an asynchronous packet is relayed from a node belonging to the first network (for example, the digital video camera 703 shown in FIG. 31) to a node belonging to the second network (for example, the digital video deck 704 shown in FIG. 31).

To relay an asynchronous packet among a plurality of networks, the correspondence between information for absolutely identifying a node that participates in communication and information for identifying the node in the respective network to which the nodes belong must be managed.

This is because a node ID to be used to identify each node belonging to a network in each network may sometimes be modified when bus reset is made.

In this case, in an asynchronous header included in a an asynchronous packet, each of a destination field for indicating a destination and a transmitting field for indicating a transmitting source is composed of both a bus ID field for indicating a network to which the relevant node belongs and a node ID field to be provided in the network. The bus ID is fixed, regardless of whether bus reset is made or not.

Figures 42A, 42B, 42C:
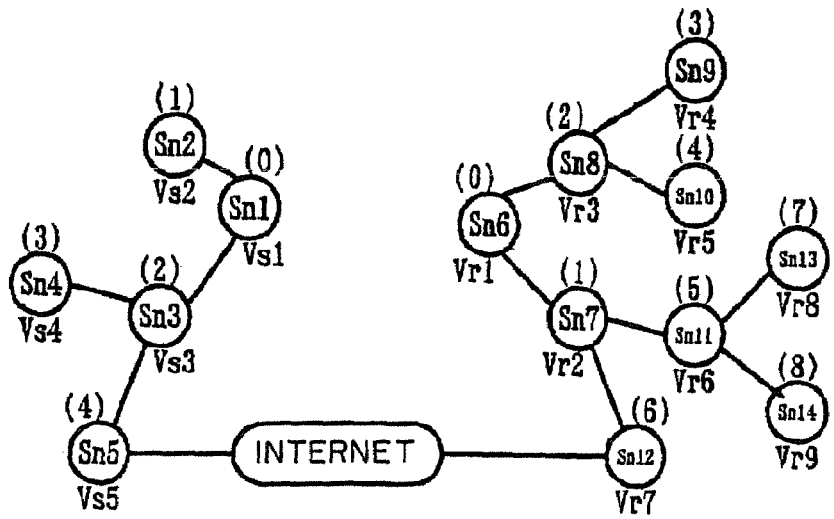
FIGS. 42A through 42C show a node ID table.

Therefore, as shown in FIG. 42A, a virtual ID with a fixed value (shown by attaching symbols Sn1 through Sn14) is in advance provided to each node regardless of whether bus reset is made or not, and if both a transmitting source and a destination are indicated using this virtual ID instead of a node ID when an asynchronous packet is relayed among a plurality of networks, information for specifying both the destination and transmitting source can be surely delivered regardless of whether bus reset is made in each network.

In this case, if each node is specified by the combination of a serial number, which is identification information peculiar to each node, and the virtual ID and the correspondence between each node belonging to the network on the self-device side and a node ID assigned to the network (shown by a bracketed number in FIG. 42A) is stored in the node ID table 245 of the relay device 610 belonging to each network, both the information for absolutely identifying each node belonging to the respective network and information for identifying each node in the network can also be managed (see FIGS. 42B and 42C).

In this case, destination information about each node belonging to the second network is also stored in a filter information storage unit 615 as the filter information of the IEEE1394 adapter 611 of the relay device 610s shown in FIG. 40 together with destination information about the self-device.

Based on the filter information, an interface control unit 614 can also control the operation of the IEEE1394 interface 616 to receive an asynchronous packet, the destination of which is a node belonging to the second network as well as an asynchronous packet addressed to the self-device and to distribute the packet to the packet distribution unit 624.

Next, the relay operation of an asynchronous packet using the virtual ID described above is described.

FIGS. 43 and 44A through 44C show the relay operation of an asynchronous packet.

For example, an asynchronous packet outputted to a serial bus addressed to a node belonging to the second network by a node belonging to the first network (shown as a transmitting node in FIG. 43) is inputted to a packet distribution unit 642 via the IEEE1394 interface 616 of the relay device 610s.

Figure 44A:
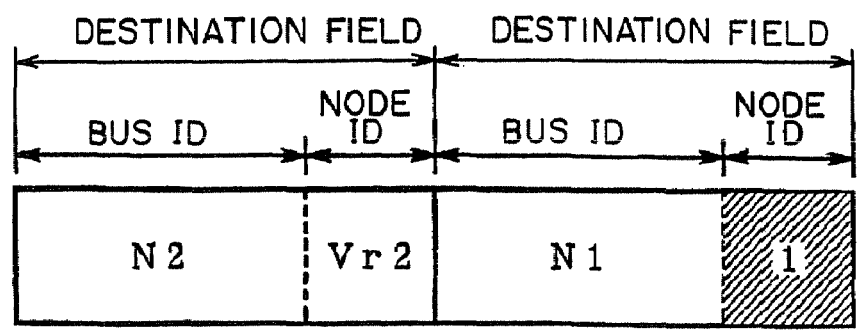
FIGS. 44A through 44C show the relay operation of an asynchronous packet.
Figure 44B:

In this case, as shown in FIG. 44A, the transmitting node designates virtual ID "Vr2" provided to the relevant node together with bus ID "B2" for indicating the second network as a destination field and designates node ID "1" as well as bus ID "B1" for indicating the first network as a transmitting field for indicating the self.

In this case, the packet distribution unit 642 judges the distributing destination of the asynchronous packet based on information indicated in a destination field for indicating a destination attached to the asynchronous packet.

Figure 43:
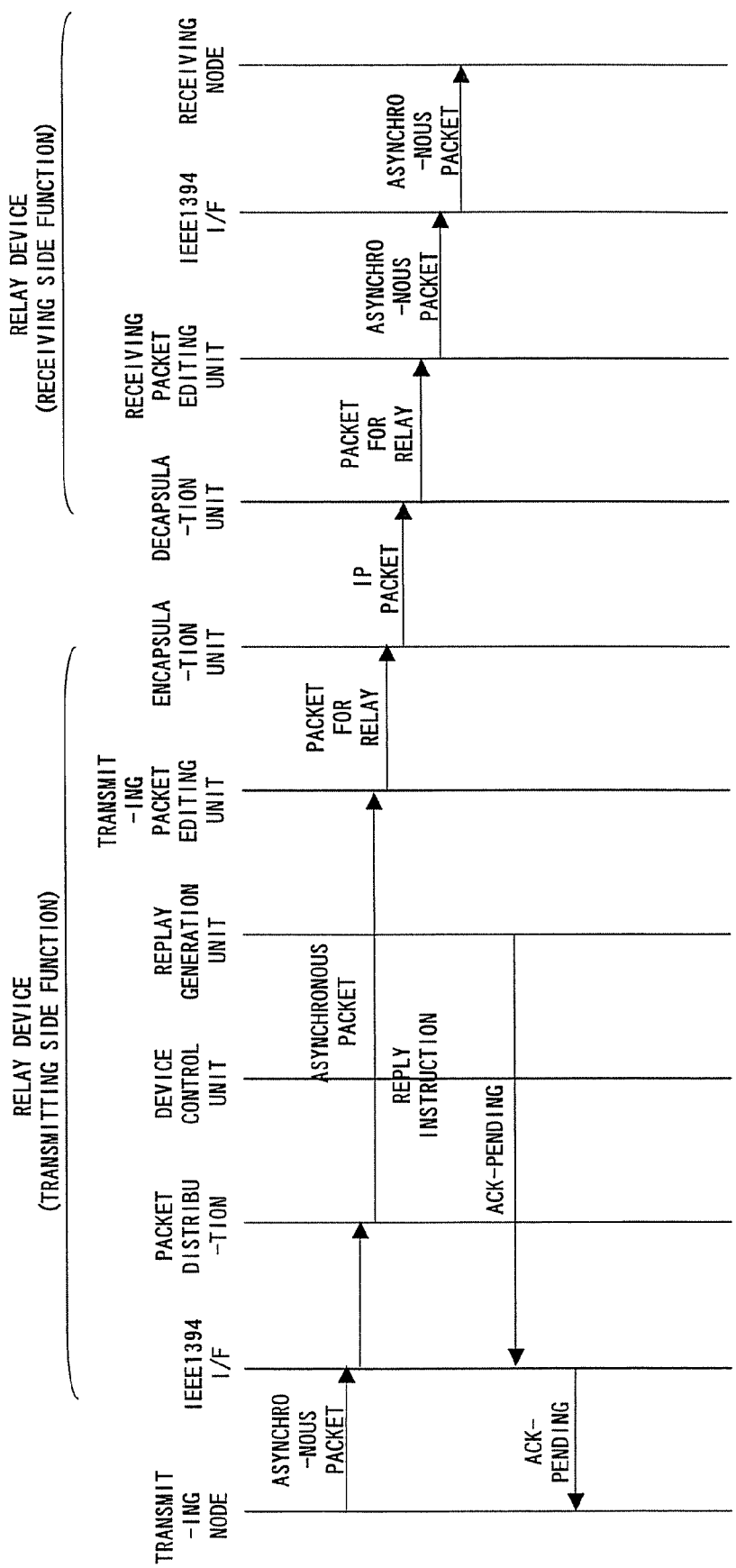
FIG. 43 shows the relay operation of an asynchronous packet.

As described above, if an asynchronous packet with a destination field, including a bus ID for indicating the second network is inputted, the packet distribution unit 642 judges that the packet should be relayed to another network, transmits the packet to the transmitting packet editing unit 612 and inputs a reply instruction to a reply generation unit 641 (see FIG. 43).

Then, the reply generation unit 641 generates packet "ackpending" for indicating that a formal reply packet is returned later and transmits the packet to a serial bus via the IEEE1394 adapter 611 as a reply packet (see FIG. 43).

In this way, the relay device 610s that takes charge of the relay process of an asynchronous packet can return a reply packet in place of the destination node.

Since a time required to return the reply packet described above is the same as that required to output a reply packet to an asynchronous packet addressed to the relay device 610s, the reply packet can be outputted to a serial bus within a specified time after the transmitting node transmits the asynchronous packet to a serial bus and the transmitting operation of the asynchronous packet can be normally completed.

As shown in FIG. 43, an asynchronous packet is transformed into a relay packet by the transmitting packet editing unit 644, is further reshaped into an IP packet by the encapsulation unit 613 and is transmitted to the Internet via the Internet adapter 713 (see FIG. 40).

In this case, the virtual ID reading unit 651 of the transmitting packet editing unit 644 reads corresponding virtual ID "Vs2" from the node ID table 645 based on node ID "1" designated by an originating field according to an instruction from a transmitting side control unit 618 (see FIG. 42C) and returns the ID to the transmitting side control unit 618.

In this case, the control information editing unit 617 also replaces a node ID included in the originating field of an asynchronous packet (shown by shading in FIG. 44B) using the virtual ID described above according to an instruction from the transmitting side control unit 618.

In this way, a relay packet both the destination and originating source of which are indicated by a virtual ID is generated. When this relay packet is inputted, the encapsulation unit 613 generates an IP packet by attaching an IP header with the network address of the self-device and the network address of the relay device 610r connected to the second network as an originating source and a destination, respectively, and transmits the packet to the Internet via the Internet adapter 713.

As shown in FIG. 43, after being received by the Internet adapter of the relay device 610r, this IP packet is transformed back to the relay packet by the header eliminating process of the decapsulation unit 621 and inputted to the receiving side editing unit 647.

In this case, the node ID reading unit 652 shown in FIG. 42A receives a virtual ID indicated in the destination field from the receiving side control unit 624, reads a node ID correct in the second network from the node ID table 645*r* based on this virtual ID and returns the ID to the receiving side control unit 624.

Figure 44C:
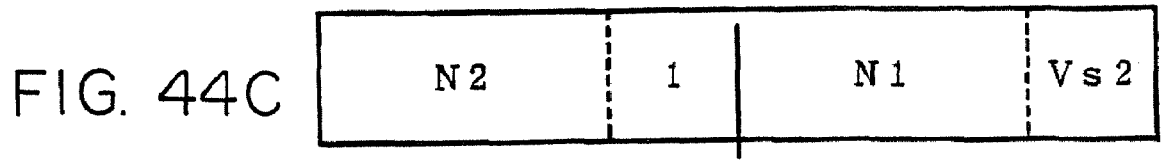

Next, since the control information editing unit 617 replaces a node ID included in the destination field of the relay packet (shown by shading in FIG. 44B) with this node IDs according to instructions from the receiving side control unit 624, the relay packet is converted to an asynchronous packet with a node indicated by a node ID correct in the second network (for example, node number 1), as shown in FIG. 44C.

In this way, the transmission/reception of an asynchronous packet can be implemented between two nodes belonging to different networks regarding the first and second physically independent networks as one virtual network.

In this way, correct commands and replies can be transmitted/received according to a function control protocol (FCP) stipulated in the IEEE1394 standard regardless of physical distance. For example, a device connected to the first network can control the operation of a device connected to the second network.

In this case, according to the data communications system of the present invention described above, in a relay packet both a destination node ID and an originating node ID are represented by virtual IDs and the virtual IDs are converted to node IDs correct in each of the first and second networks.

Therefore, an asynchronous packet can surely be delivered to a target node, regardless of whether bus reset is made or not in a network to which the destination node belongs.

When in such a relay device 610 both the destination and originating source of an asynchronous packet are managed by a virtual ID, it is sufficient if the correspondence between the virtual ID and the node ID in the network is managed in each of networks participating in communications. Therefore, the management process of a node ID table is very simple, as described later.

Next, a method for managing a node ID table when bus reset is made is described using a relay device 610*r* connected to the second network as an example.

Figure 45:
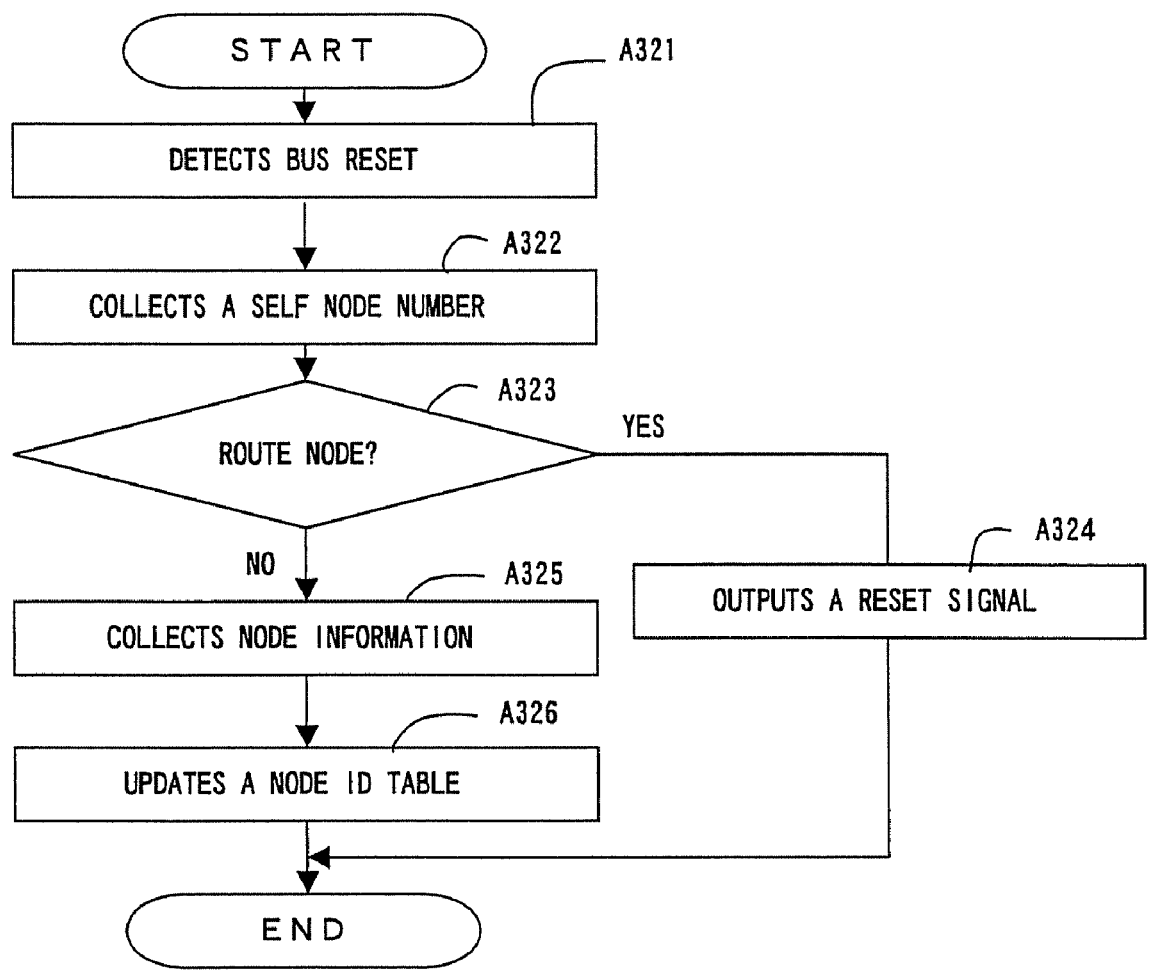
FIG. 45 is a flowchart showing an operation corresponding to bus reset.
Figure 46:
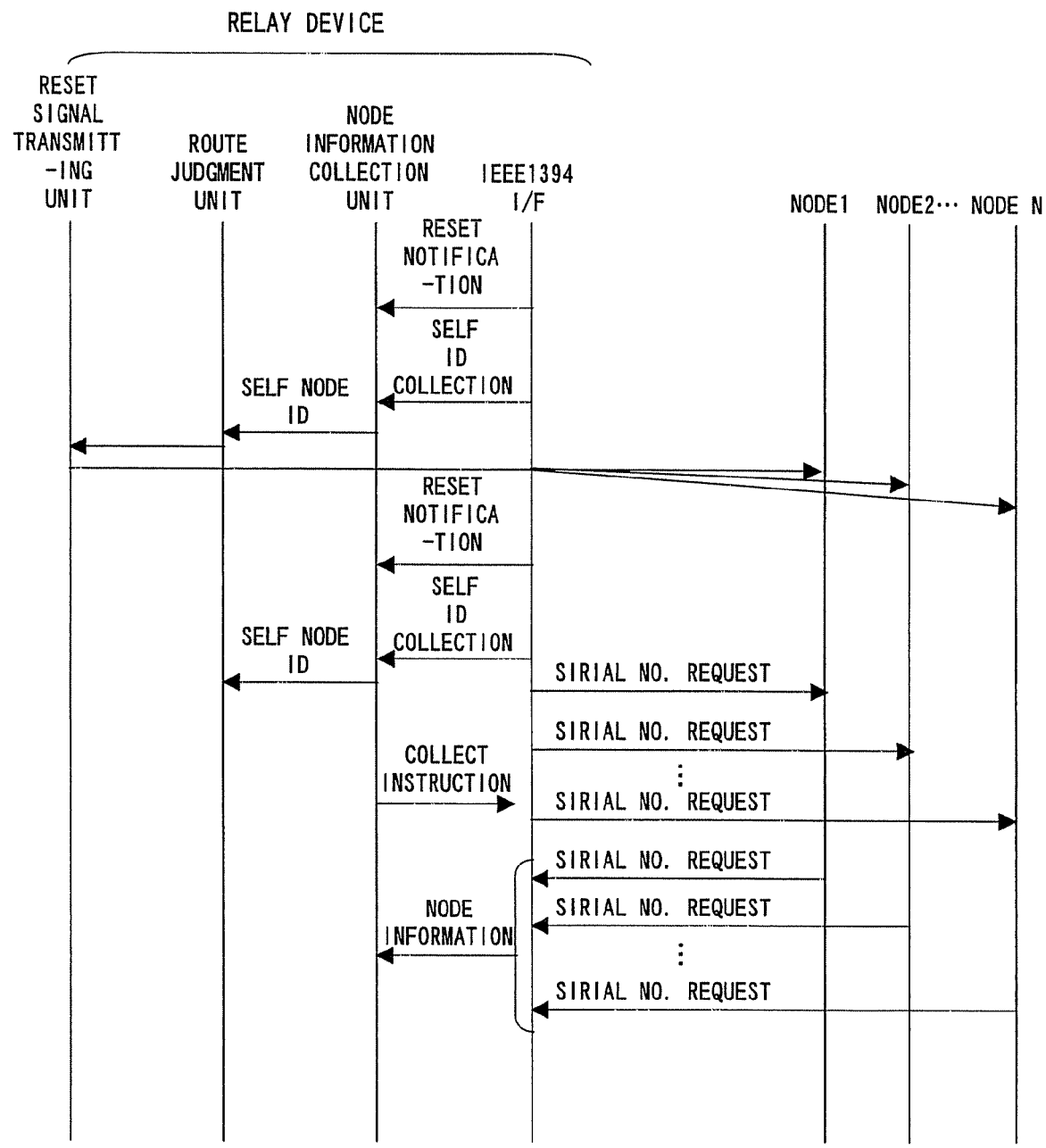
FIG. 46 shows an operation in the case where there is bus reset.

FIG. 45 is a flowchart showing the operation in relation to bus reset. FIG. 46 shows the operation in the case where bus reset is made.

When reset notification is inputted from an I/F control unit 614 of the IEEE1394 adapter 611 (see FIG. 46), the node information collection unit 646 shown in FIG. 40 detects the generation of bus reset (step A321 in FIG. 45) and first checks a node number provided to the self-device (step A322 in FIG. 46).

In this case, a route judgment unit 648 receives the node number from the node information collection unit 646 (see FIG. 46) and judges whether this node number indicates a route node (step A323).

If judgment in step A323 is yes, the reset signal transmitting unit 649 shown in FIG. 40 instructs the I/F control unit 614 of the IEEE1394 adapter 611 to output a bus reset signal. Then, the I/F control unit 614 controls the operation of the IEEE13294 interface 616 to output a rest signal to a serial bus and to reset the bus (step A324).

In this way, since the relay device 610 makes bus reset and demands the retry of a route node assignment when a route node is assigned to the relay device 610, the relay device 610 can be surely prevented from becoming a route node.

In this case, most of the IEEE1394 adapters currently put into the market are not provided with functions to be stipulated in the specification of the IEEE1394 standard as a route node. However, most of both digital video cameras and digital video decks put into the market are surely provided with the functions stipulated in the specification.

Therefore, by preventing the relay device 610 from becoming a route node and applying a technology to enable another node to take charge of the route node, the relay device 610 can be implemented using the IEEE1394 adapter in the market without ant modification. Furthermore, a normal synchronous transfer can be guaranteed.

If bus reset is made, as described above, the node information collection unit 646 stops the node information collection and restarts the node information collection when new bus reset is made.

If the judgment in step A323 is no, the node collection information unit 646 continues the collection of node information and collects node information about all the nodes belonging to the second network (step A325).

In this case, for example, as shown in FIG. 46, the node information collection unit 646 transmits a serial number read request packet (shown as a serial number request in FIG. 46) to all the nodes but the self-device belonging to the second network and extracts an originating node ID included the header as well as a serial number reported by the reply packet (shown as serial number notification in FIG. 46).

Then, the node information collection unit 646 retrieves a corresponding entry from the node ID table 645, updates the content of the node ID table 645 by storing the node number extracted from the originating node ID as a new node ID (step A326) and terminates the process.

The same process applies to the collection of node information of the node information collection unit 646 of the relay device 610*s* on the first network side.

In this way, since the node information collection unit 646 performs the simple process described above every time there is bus reset, node information about the correspondence between a node belonging to each network and a virtual ID can be always kept latest.

However, if bus reset is made by the addition of a new node, there is no entry corresponding to a notified serial number.

In this case, the node information collection unit 646 generates a new entry in the node ID table 645 by assigning a new virtual ID to a node specified by the notified serial number and stores the node number extracted from the originating node ID as a corresponding ID.

In this case, if an IOP packet in a correct format, including the pair of a serial number and a virtual ID described above is generated and is transmitted to another relay device 610 via the Internet adapter 713, node information about a node added to each network can also be shared by the relay devices 610 connected to the network.

If a relay device 610 is connected to each of three or more physically independent networks and a unique virtual ID is assigned to each of all the nodes belonging to these networks, similarly, an asynchronous packet can be transmitted/received regardless of the boundary of physical networks regarding these networks as one virtual network.

The data communications system is applicable not only a network based on the IEEE1394 standard, but also to any network only if datagram is transmitted/received in the network by specifying both a destination and an originating source by a node ID.

Figure 47:
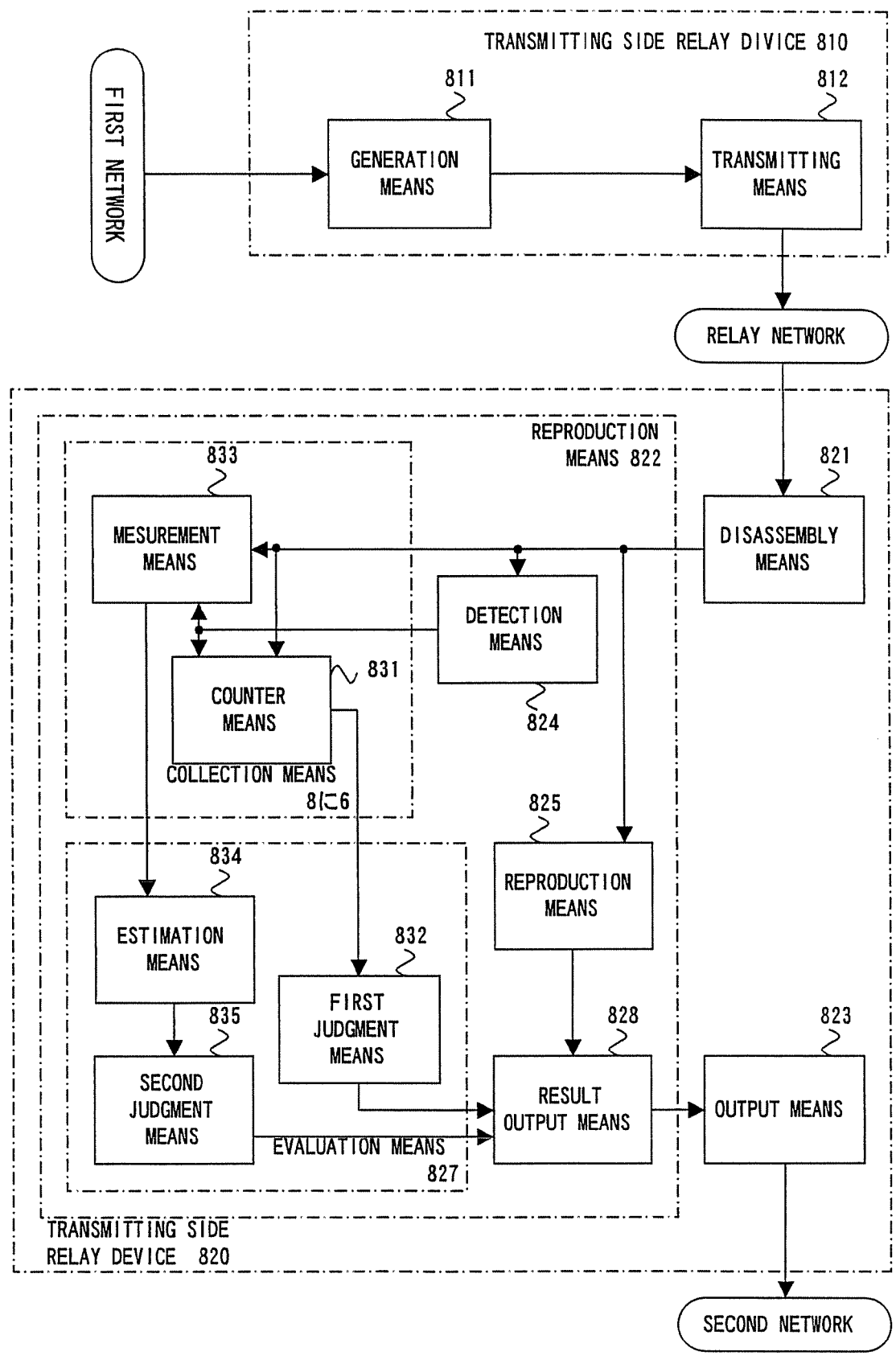
FIG. 47 shows the basic configuration of the data communications system in a preferred embodiment of the present invention.

FIG. 47 shows the basic configuration of the data communications system in the seventh preferred embodiment of the present invention.

According to this preferred embodiment, in a data communications system in which transmitting side relay means 810 installed in relation to the first network, which is one of a plurality of physically independent networks for transferring structure data with a prescribed regular structure in prescribed transfer units, transmits a transfer unit to be transferred in the first network to another relay network and receiving side relay means 820 installed in relation to the second network, which is one of the plurality of independent networks relays the transfer unit transmitted to the relay network to the second relay network, the transmitting side relay means 810 comprises generation means 811 for generating a relay packet in a datagram format, including the transfer unit and addressed to the receiving side relay means 820 when a transfer unit transferred in the first network is inputted, and transmitting means 812 for transmitting the relay packet to a relay network. The receiving side relay means 820 comprises separation means 821 for separating the transfer unit by breaking down the relay packet received via the relay network, reproduction means 822 for reproducing the structure data using the transfer unit obtained by the separation means 821 based on information about the prescribed regular structure for the structure data to be provided with and transmitting means 823 for transmitting the structure data to the second network in the prescribed transfer units.

In this case, since a relay packet, including a transfer unit transferred in the first network is transmitted to the receiving side relay means 820 by both the generation means 811 and transmitting means 812 of the transmitting side relay means 810, and the original structure data are reproduced from a series of relay packets by both the separation means 821 and reproduction means 822 of the receiving side relay means 820 and are provided for the output process of an output means 823, the structure data transferred in transfer units in the first network can be relayed to the second network.

In the data communications system, digital video data are transferred in prescribed transfer units in a plurality of independent networks. The reproduction means 822 of the receiving side relay means 820 comprises detection means 824 for detecting information about the head of a video frame included in an inputted transfer unit, regeneration means 825 for regenerating one video frame of structure data using the transfer unit received from the separation means 821 from when the detection means 824 detects the head of the video frame until the means 824 detects the head of a subsequent video frame, collection means 826 for collecting regeneration information about an information amount included the structure data to be regenerated by the regeneration means 825 based on the transfer unit inputted to the regeneration means 825, evaluation means 827 for evaluating the integrity of the structure data regenerated by the regeneration means 825 based on both the detection result of the detection means 824 and regeneration information and result output means 828 for outputting the structure data regenerated by the regeneration means 825 as a reproduction result based on the evaluation result of the evaluation means 827.

In this case, the regeneration means 825 regenerates structure data based on the detection result of the detection means 824 of the reproduction means 822 of the receiving side relay device 820 and both the collection means 826 and evaluation means 827 operate to evaluates the integrity of the structure data.

When this evaluation result is inputted, the result output means 828 operates, for example, to selectively output only structure data judged to be sufficiently exactly regenerated as a reproduction result and to provide the result for the process of the output means 823.

In the data communications system, the collection means 826 comprises counter means 831 for counting the number of transfer units inputted to the regeneration means 825 from when the detection means 824 detects the head of the video frame until the means 824 detects the head of a subsequent video frame and sequentially outputs regeneration information, including this counter value. The evaluation means 827 comprises a first judgment means 832 for monitoring the counter value included in the regeneration information, judging that the structure data regenerated by the regeneration means 825 are incomplete if the counter value exceeds a prescribed threshold value and outputting the judgment as an evaluation result.

In this case, when the counter value of the counter means 831 of the collection unit 826 is inputted, the first judgment means 832 operates to judge that the structure data are incomplete if the number of transfer units included in the structure data being regenerated becomes abnormally large.

In this way, for example, if a transfer unit, including the head of a video frame is lost in the transmission process of a relay network and transfer units belonging to two different video frames are combined into one piece of structure data, the structure data can be surely eliminated for the reason that the structure data are incomplete.

In the data communications system, the collection means 826 comprises measurement means 833 for measuring an information amount included in the structure data regenerated by the regeneration means 825 based on both the detection result of the detection means 824 and information about data length that is included in each transfer unit inputted to the regeneration means 825 and outputs the regeneration information, including this measurement result. The evaluation means 827 comprises estimation means 834 for estimating the number of transfer units that have contributed to the regeneration process of the regeneration means 825 based on the measurement result included in the regeneration information and second judgment means 835 for judging whether the information amount lost when the regeneration means 825 regenerates the structure data is allowable, based on the result of the comparison between the estimation result of the estimation means 834 and the prescribed threshold value and outputting the judgment result as an evaluation result. The result output means 828 outputs the structure data regenerated by the regeneration means 825 as a valid reproduction result and provides the data for the output process to the second network of the output means 823.

In this case, information about the number of transfer units that are included in the structure data regenerated by the regeneration means 825 are obtained by both the measurement means 833 of the collection means 826 and the estimation means 834 of the evaluation mans 827 and based on this information, the second judgment means 835 judges whether an information amount lost in the transmission process of a relay network is allowable and controls the structure data output of the result output means 828 based on this judgment result.

In this way, by providing structure data, the lost information amount of which is allowable for the process of the output means 823, as a reproduction result, structure data to be transmitted to the second network can be secured as a reproduction result corresponding to many video frames.

FIG. 48 shows the basic configuration of the data communications system in the eighth preferred embodiment of the present invention.

According to the data communications system in this preferred embodiment, digital video data are transferred in transfer units in a plurality of independent networks. The reproduction means 822 of the receiving side relay means 820 reproduces structure data in units of video frames using a transfer unit received from the separation means 821. The output means 823 comprises first storage means 836 for storing one video frame of structure data reproduced by the reproduction means 822, second storage means 837 for storing one video frame of structure data to be transmitted, transmitting means 838 for transmitting each transfer unit stored in the second storage means 837 to the second network according to prescribed procedures, third judgment means 839 for referring to the first storage means 836 and checking whether new structure data are stored every time one video frame of structure data are transmitted and input means 840 for inputting the structure data stored in the first storage means 836 to the second storage means 837.

In this case, when the judgment result of the third judgment means 839 is inputted, the input means 840 operates to input the transmitted structure data stored in the second storage means 837 to the transmitting means 838 in place of structure data corresponding to a subsequent video frame if a reproduction result corresponding to the subsequent video frame is not prepared in the first storage means 836 when the transmission of a reproduction result corresponding to each video frame is completed.

Figure 49:
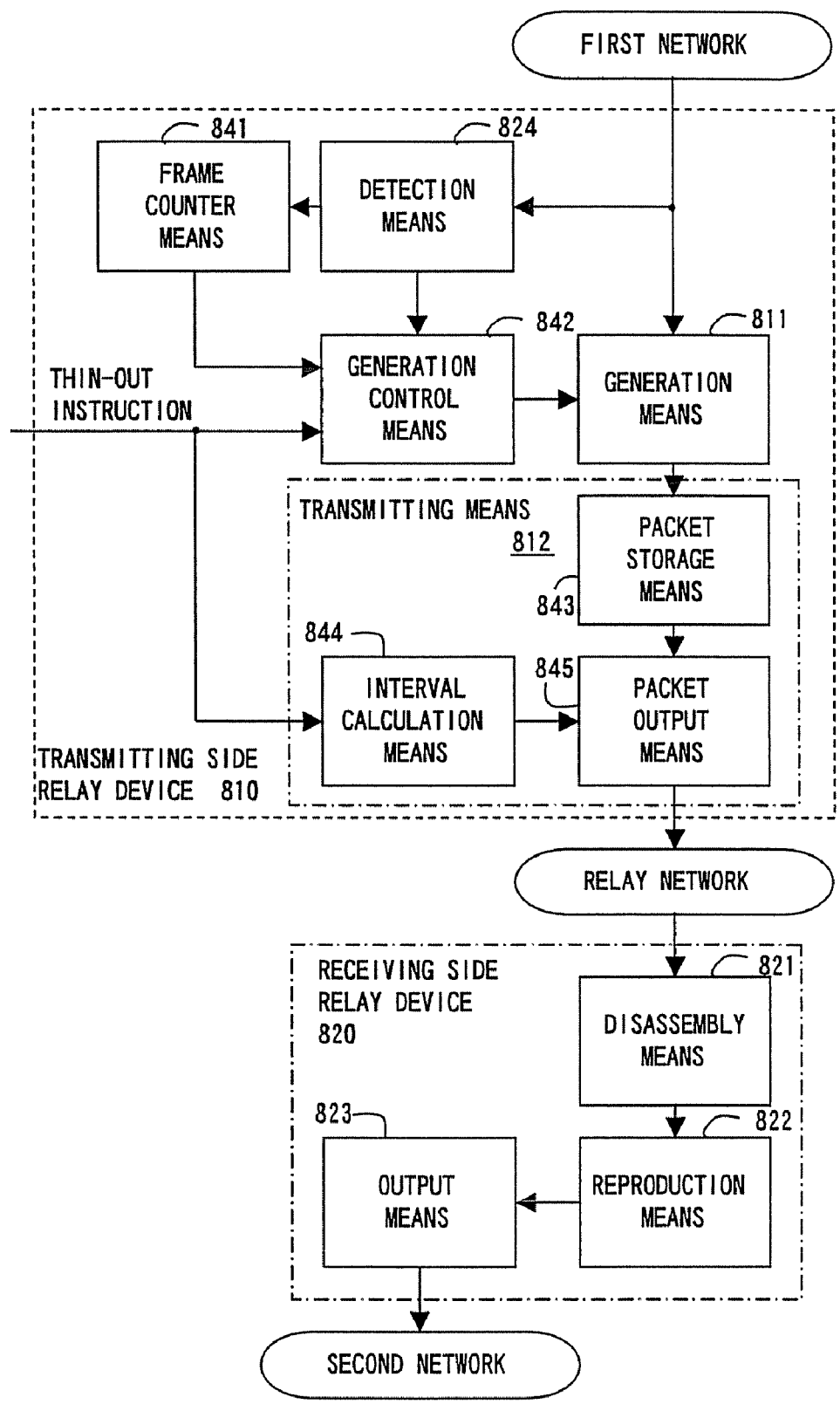
FIG. 49 shows the basic configuration of the data communications system in another preferred embodiment of the present invention.

FIG. 49 shows the basic configuration of the data communications system in the ninth preferred embodiment of the present invention.

According to the data communications system, digital video data are transferred in prescribed transfer units in a plurality of independent networks. The transmitting side relay means 810 comprises frame counter means 841 for counting video frames transferred in the first network as structure data and generation control means 842 for controlling the stop and restart of the packet generation of the generation means 811 based on both the counter value of the frame counter means 841 and a thinning-out ratio designated by a thin-out instruction.

In this case, since when both the counter value of the frame counter means 841 and thinning-out information are inputted in the transmitting side relay means 810, the generation control means 842 operates to stop and restart the packet generation process of the generation means 811, a part of structure data transferred in the first network is converted to a series of relay packets based on the thinning-out ratio indicated by the thinning-out information described above and is transmitted to the second network via a relay network.

In this way, since frame thinning-out can be implemented by both the generation control means 842 and generation means 811, and an information amount to be transmitted via a relay network can be reduced by the transmitting side relay device 810 selectively relaying a part of structure data, the load of a relay network can be reduced and the occurrence probability of information loss, etc., can be reduced.

In the data communications system, the transmitting means 812 of the transmitting side relay means 810 comprises packet storage means 843 for storing a series of packets generated by the generation means 811, interval calculation means 844 for calculating a transmission interval at which packets are transmitted to a relay network based on the thinning-out ratio designated by a thin-out instruction and packet output means 845 for sequentially extracting packets stored in the packet storage means 843 at transmission intervals and transmitting the packet to the relay network.

In this case, since when frame thinning-out is conducted by both the generation control means 842 and generation means 811, the packet output means 845 operates at intervals obtained by the interval calculation means 844, the series of relay packets stored in the packet storage means 843 are transmitted to the relay network at transmission intervals based on a thinning-out ratio, regardless of the transfer timing of each transfer unit in the first network.

In this way, traffic in a relay network can be averaged, the workload of the relay network can be reduced and the occurrence probability of information loss, etc., can be reduced.

Figure 50:
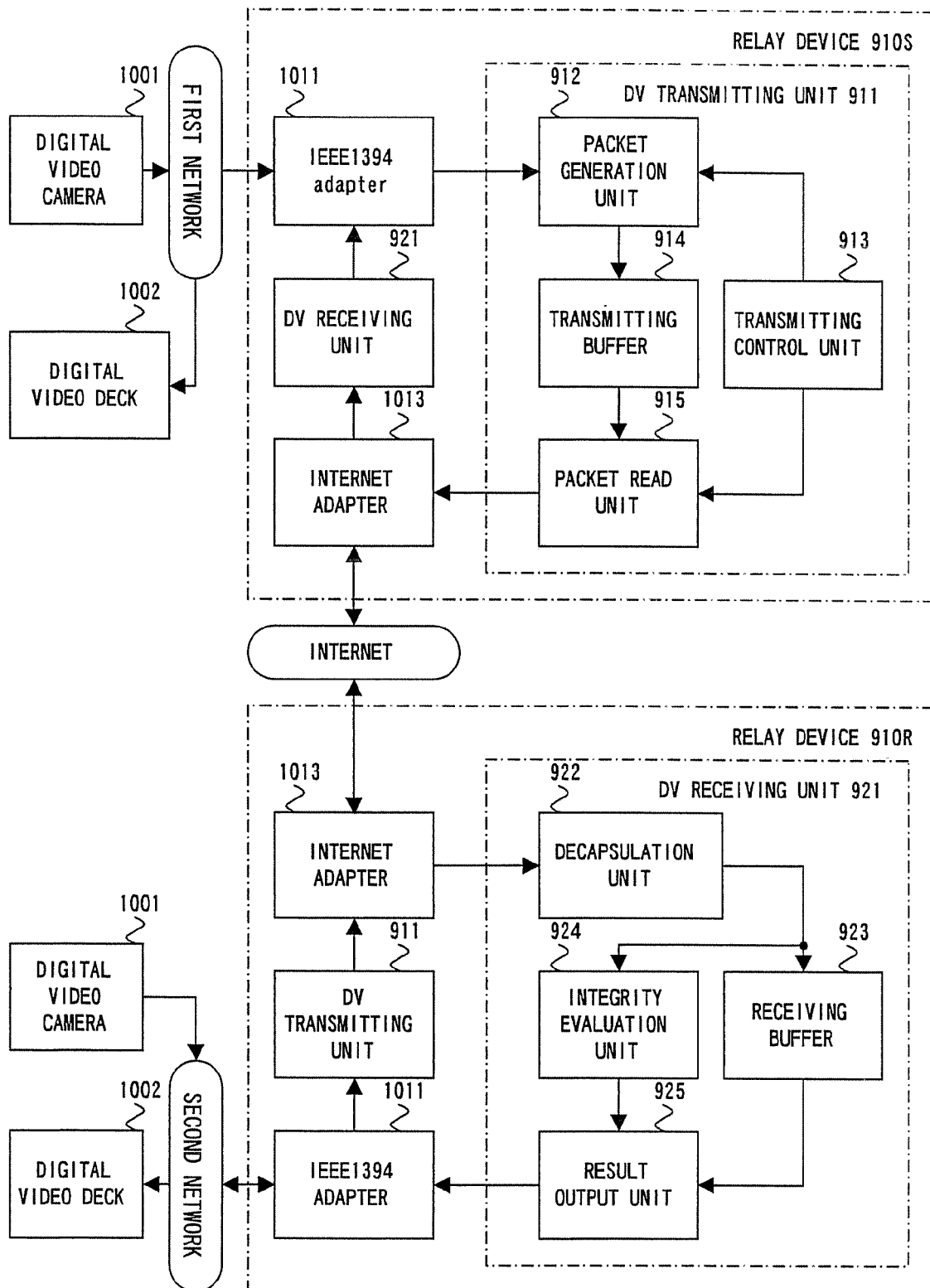
FIG. 50 shows the configuration of the preferred embodiment of the data communications system of the present invention.

FIG. 50 shows the preferred embodiment of the data communications system of the present invention.

In the data communications system shown in FIG. 50, each of two relay devices 910s and 910r comprises an IEEE1394 adapter 1011 and an Internet adapter 1013, and the two relay devices 910s and 910r further comprise a digital video (DV) transmitting unit 911 for converting digital video data into a relay packet, which is described later, and a digital video (DV) receiving unit 921 for converting the relay packet into digital video data as described later, respectively.

In these relay devices 910s and 910r, the IEEE1394 adapters 1011 are connected to serial buses equivalent to the first and second networks, respectively, and a packet in a format stipulated in an IEEE1394 synchronous mode that is transferred using a prescribed synchronous channel (hereinafter simply called a "synchronous packet") is extracted by this IEEE1394 adapter 1011 and is inputted to the digital video unit 911.

In this digital video transmitting unit 911, a packet generation unit 912 operates according to instructions from a transmitting control unit 913 to convert a synchronous packet received from the IEEE1394 adapter 1011 to a relay packet suitable for the transfer in the Internet by attaching an appropriate header to the synchronous packet.

A transmitting buffer 914 receives a series of relay packets from this packet generation unit 912 and temporarily stores the packets. A packet reading unit 915 sequentially reads the relay packets stored in the transmitting buffer 914 and inputs the packets to the Internet adapter 1013 according to instructions from the transmitting control unit 913.

In the digital video receiving unit 921 shown in FIG. 50, a decapsulation unit 922 breaks down the relay packets described above and separates synchronous packets. The obtained synchronous packets are sequentially stored in a receiving buffer 923.

An integrity evaluation unit 924 evaluates the integrity of digital video data consisting of synchronous packets stored in the receiving buffer 923 as described later.

Based on this evaluation result, the result output unit 925 shown in FIG. 50 reads the series of synchronous packets stored in the receiving buffer 923 and inputs the packets to the IEEE1394 adapter 1011.

Figure 51:
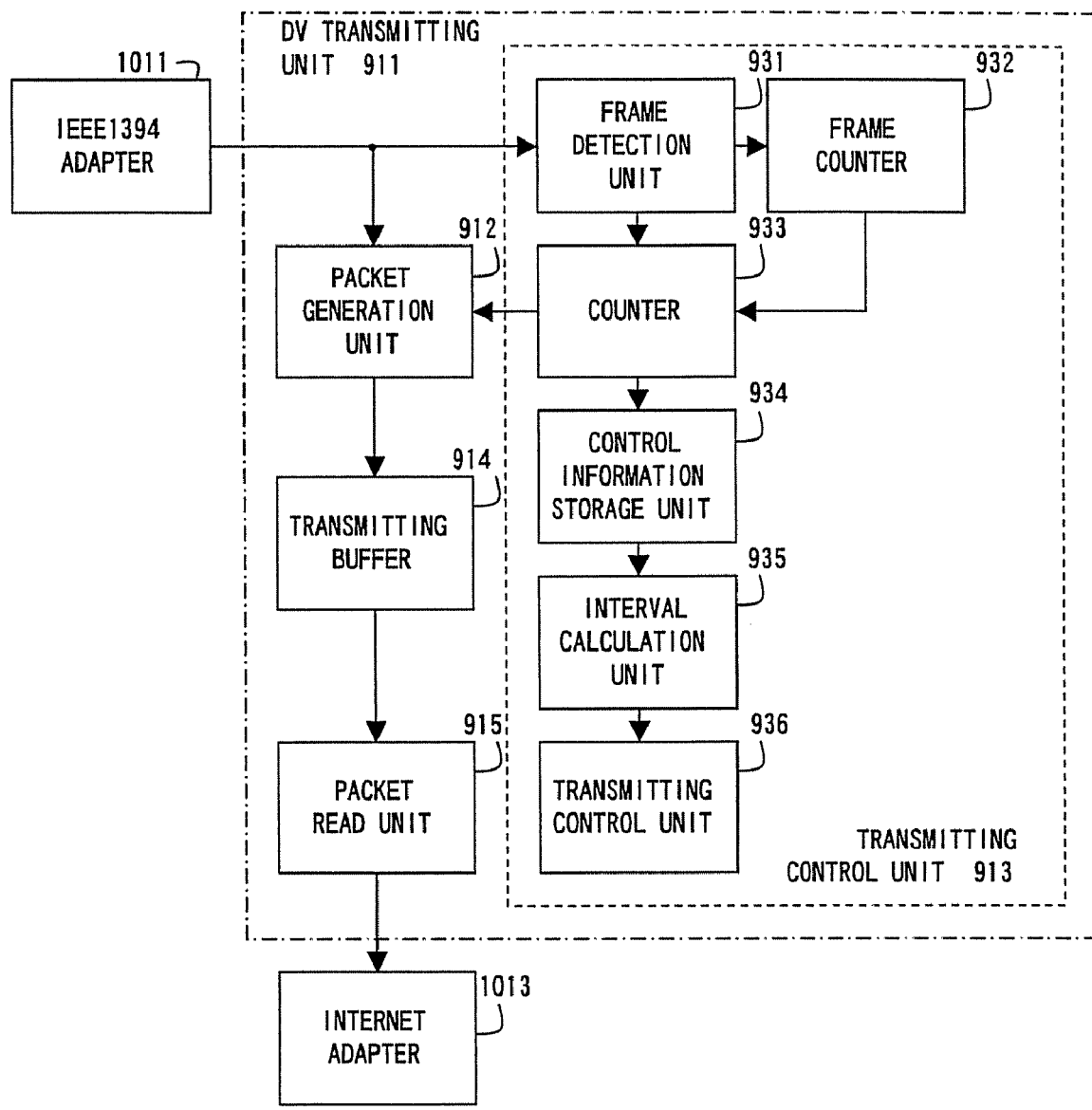
FIG. 51 shows the detailed configuration of a digital video transmitting unit.
Figure 52:
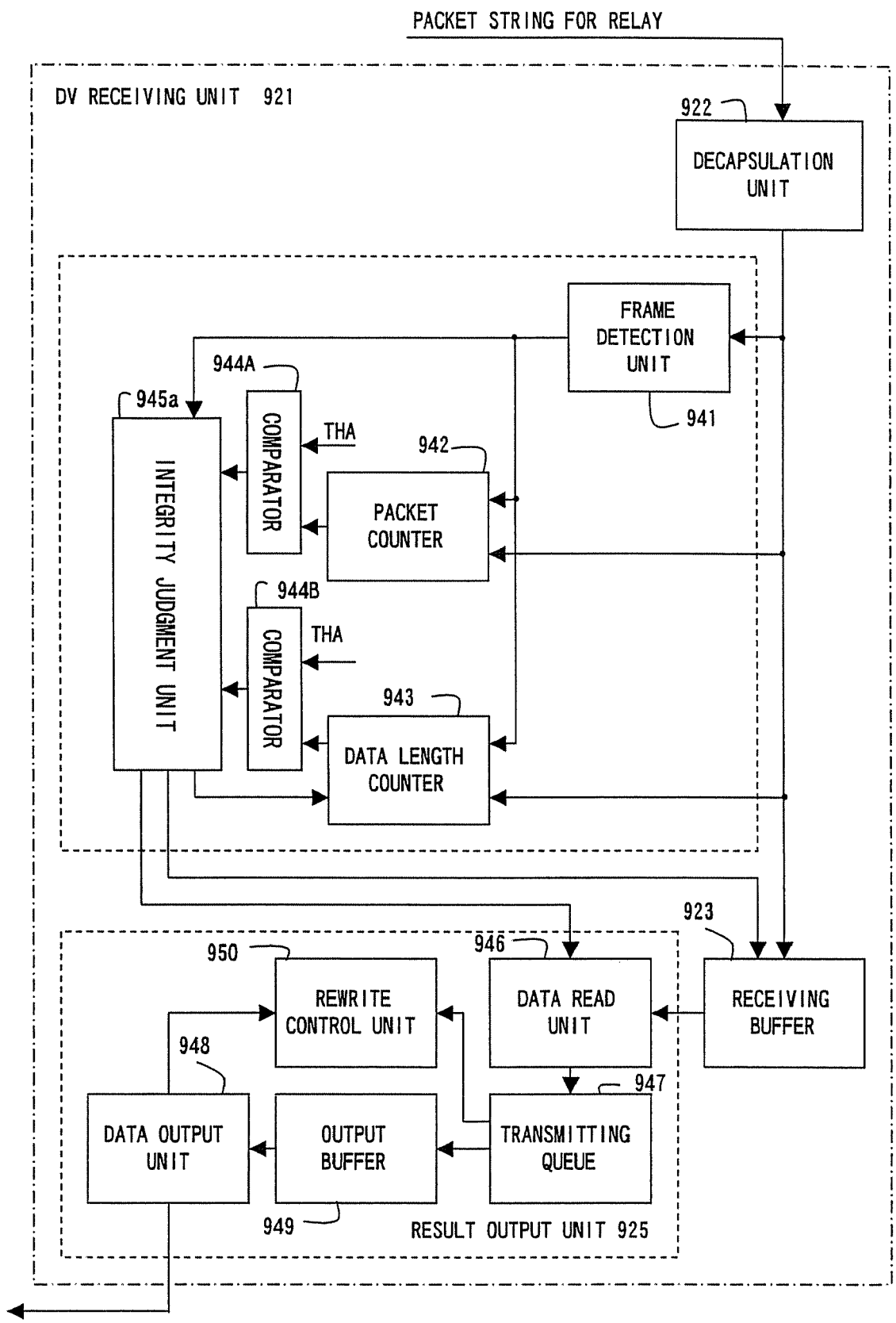
FIG. 52 shows the detailed configuration of a digital video receiving unit.

FIGS. 51 and 52 show the detailed configurations of the digital video transmitting and receiving units, respectively.

In the transmitting control unit 913 shown in FIG. 51, a frame detection unit 931 detects a synchronous packet, including information about the head of a video frame, in the series of synchronous packets inputted to the packet generation unit 912.

In FIG. 51, a frame counter 932 counts the number of video frames to be composed of the series of synchronous packets inputted to the packet generation unit 912. The counter value of this frame counter 932 is inputted to a generation control unit 933.

This generation control unit 933 generates a generate instruction to stop or restart the relay packet generation process of the packet generation unit 912 based on both the counter value described above and thinning-out information stored in a control information storage unit 934. This generate instruction is inputted to the packet generation unit 912 as an instruction from the transmitting control unit 913.

The interval calculation unit 935 calculates an appropriate packet transmission interval and the packet transmission interval obtained by this interval calculation unit 935 is reported to the transmitting control unit 936.

This transmitting control unit 936 outputs a read instruction at notified packet transmission intervals, and this read instruction is inputted from the transmitting control unit 913 to the packet reading unit 915.

In the integrity evaluation unit 924 shown in FIG. 52, the frame detection unit 941 detects a synchronous packet, including information about the head of a video frame, in the series of synchronous packets inputted to the receiving buffer 923 as a boundary of video frames, and this detection result is inputted to both a packet counter 942 and a data length counter 943.

The packet counter 942 and data length counter 943 that are shown in FIG. 52 perform counting operations based on the detection result of the frame detection unit 941 and the input of synchronous packets to the receiving buffer 923, respectively, and total the numbers of synchronous packets included one video frame separated by the boundary indicated by the detection result and the numbers of the bytes of a data section included in these synchronous packets, respectively.

In the integrity evaluation unit 224 shown in FIG. 52, a comparator 944a compares the counter value of the packet counter 942 with a prescribed threshold value Tha and a comparator 944b compares the counter value of the data length counter 943 with a prescribed threshold value Thb. The comparison results of these comparators 944a and 944b are inputted to an integrity judgment unit 945.

This integrity judgment unit 945 judges the integrity of a video frame to be regenerated by the aggregate of synchronous packets stored in the receiving buffer 923 based on both the comparison result of the comparator 944a and the comparison result of the comparator 944b at the time when the frame detection unit 941 detects the boundary of video frames. This judgment result is reported to the result output unit 925 as the evaluation result of the integrity evaluation unit 924.

In the result output unit 925 shown in FIG. 52, a data reading unit 946 sequentially reads one video frame of synchronous packets stored in the receiving buffer 923 based on the evaluation result reported by the integrity evaluation unit 924 and inputs the packets to a transmitting queue 947.

A data output unit 948 sequentially extracts a series of synchronous packets stored in an output buffer 949 and transmits the packets to the IEEE1394 adapter 1011.

The rewriting control unit 950 shown in FIG. 52 refers to the transmitting queue 947 and controls the rewriting operation of the output buffer 949 depending on whether the transmitting queue 947 stores a new synchronous packet, every time this data output unit 948 outputs one video frame of synchronous packets.

Next, the operation of the data communications system shown in FIG. 50 is described using as an example a case where a synchronous packet transmitted to a serial bus by the digital video camera 1001, which is a node belonging to the first network, is relayed to the digital video deck 1002, which is a node belonging to the second network.

Figure 53A:
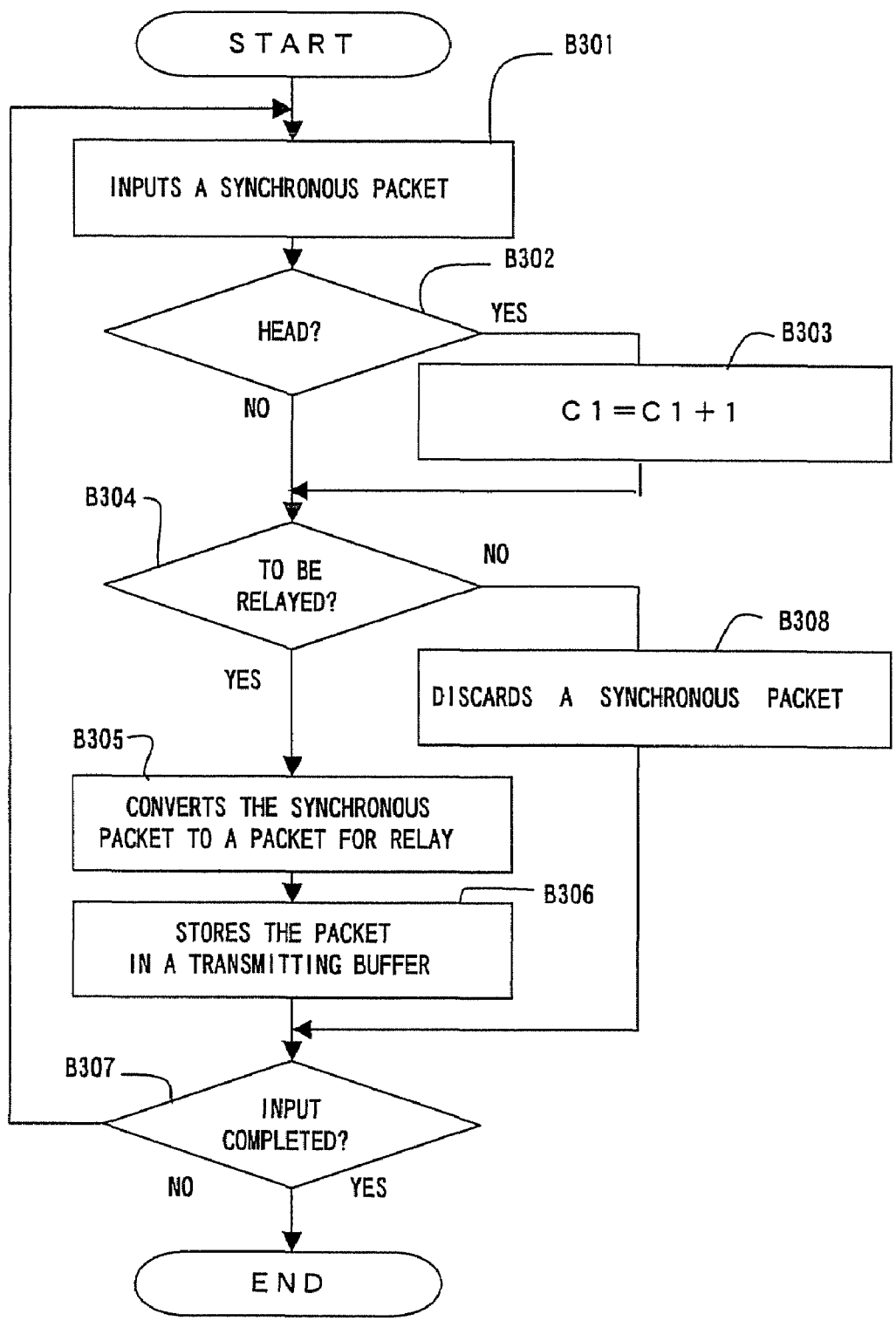
FIGS. 53A and 53B are flowcharts showing both the packet generation and packet transmitting the operations of a DV transmitting unit.
Figure 53B:
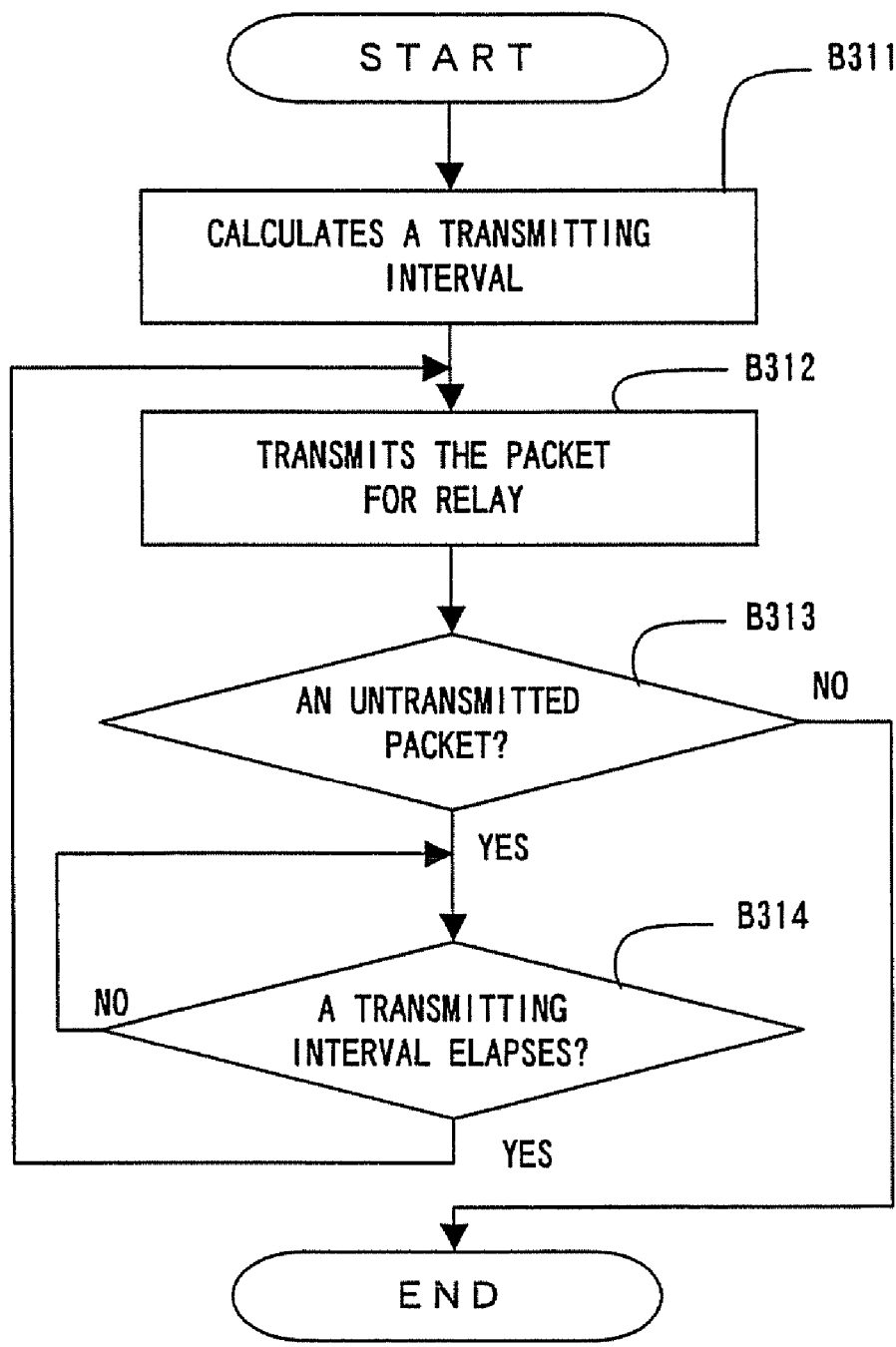

FIGS. 53A and 53B are flowcharts showing the packet generation operation and the relay packet transmitting operation of the digital video transmitting unit, respectively.

Every time the IEEE1394 adapter 1011 inputs a synchronous packet, the frame detection unit shown in FIG. 51 judges whether the packet is located at the head of a new video frame, based on whether the leading three bytes of the data section of the inputted synchronous packet match a bit pattern indicating for the head of a video frame (steps B301 and B302 in FIG. 53A).

If judgment in step B302 is yes, the frame counter 932 increments the counter value C1 for indicating the number of inputted video frames (step B303), then the flow proceeds to step B304. If the judgment in step B302 is no, the flow proceeds to step B304 without any process.

In step B304, the generation control unit 933 judges whether the inputted synchronous packet should be converted to a relay packet, based on both the counter value C1 of the frame counter 932 and thinning-out information stored in the control information storage unit 934.

For example, if thinning-out information indicating that a video frame is thinned out at a thinning-out rate of 1/2 is stored in the control information storage unit 934 and if the counter value C1 of the frame counter 932 is an odd number, the generation control unit 933 judges that the synchronous packet inputted to the packet generation unit 912 is to be converted to a relay packet.

If the judgment in step B304 is yes, the packet generation unit 912 attaches a prescribed header to the inputted synchronous packet and converts the packet to a relay packet according to an instruction from the generation control unit 933 (step B305).

In this case, the packet generation unit 912 attaches both an IP header and a UDP header, each of which has the network address of the relay device 910r shown in FIG. 50 as a destination, to the head of the inputted synchronous packet.

The relay packets obtained in this way are sequentially stored in the transmitting buffer 914 (step B306).

Then, it is judged whether the input of all the synchronous packets is completed (step B307). If the judgment is no, the flow returns to step B301 and continues the process of a new synchronous packet.

However, if the judgment in step B304 is no, the packet generation unit 912 discards the inputted packet according to an instruction from the generation control unit 933 (step B308) and then the flow proceeds to step B307.

In this way, the generation control unit 933 controls the operation of the packet generation unit 912 based on the counter value of the frame counter 932, selectively converts synchronous packets composing a part of a video frame outputted to a serial bus by the digital video camera 1001, to relay packets and provides the packets for the transmitting process of relay packets via the transmitting buffer 914.

In this way, an information amount to be transmitted to the Internet can be reduced and the transmission load of the Internet can be reduced.

The thinning-out information described above is, for example, inputted to the control information storage unit 934 prior to the start of the relay operation of digital video data.

The format of thinning-out information is not specified and it is sufficient if the information can be an index for judging whether the relevant video frame should be thinned out by comparing the number of inputted frames with a prescribed value.

Next, the transmitting operation of relay packets stored in the transmitting buffer 914 as described above to the Internet is described.

The interval calculation unit 935 shown in FIG. 51 calculates the transmission interval of relay packets based on thinning-out information stored in the control information storage unit 934 prior to the start of the transmission of the relay packets (step B311 in FIG. 53B).

In this case, the interval calculation unit 935 calculates a transmission interval taking into consideration a transfer time corresponding to video frames thinned out based on the thinning-out information.

Figure 54A:
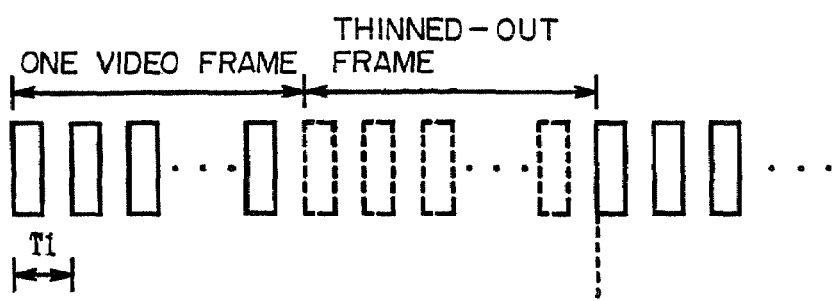
FIGS. 54A and 54B show a transmission interval adjustment operation.

For example, as described above, if video frames are thinned out at a thinning-out ratio of 1/2, as shown in FIG. 54A, each relay packet composing video frames to be relayed can be transmitted during the transfer time of the thinned-out video frames (shown by dotted lines in FIG. 54A) in addition to a transfer time of video frames selected as a relay target.

Therefore, the interval calculation unit 935 calculates transmission interval TS by multiplying the transfer interval T1 of synchronous packets in a serial bus composing the first network by the reciprocal of a value obtained by subtracting a thinning-out ratio $\delta$ from numeric value "1" (i.e., $1/(1-\delta)$) and notifies the transmitting control unit 936 of the interval.

Then, a packet reading unit 915 sequentially reads a relay packet from the transmitting buffer 914 and inputs the packets to the Internet adapter 1013 according to instructions from the transmitting control unit 936 (step B312) and then this relay packet is transmitted to the Internet.

Then, it is judged whether there is an untransmitted relay packet in the transmitting buffer 914 (step B313). If the judgment is yes, the transmitting control unit 936 repeats step B314 and waits for the lapse of the transmission interval TS described above. After the transmission interval TS elapses, the judgment in step B314 becomes yes, the flow returns to step B312 and starts the transmitting operation of a subsequent relay packet.

Figure 54B:
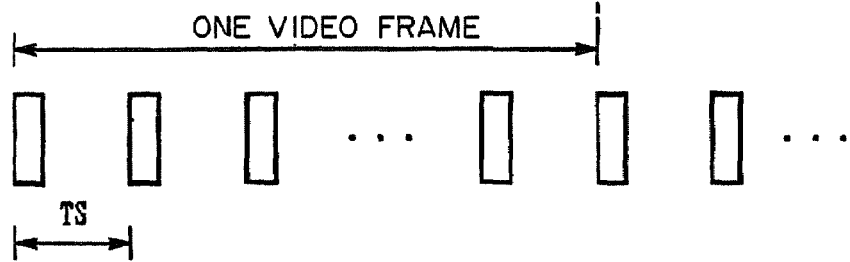

In this way, by determining the transmission interval of each relay packet composing a video frame to be relayed, the timing of transmitting relay packets to the Internet can be distributed, as shown in FIG. 54B.

In this case, since a band used to transmit a relay packet can be reduced in accordance with an information amount reduced by thinning out video frames, the transmission load in the Internet can be effectively reduced.

By reducing traffic in the Internet on an average, the occurrence probability of packet loss in the transmission route via the Internet can be reduced and as a result, the possibility of reproducing a high-integrity video frame in the second network on the receiving side can be improved.

Since there is a clear correlation between the increase of transmission load and the degradation of communications quality in a "best-effort type" network, such as the Internet, the occurrence probability of relay packet loss, etc., can be suppressed by reducing the transmission load and thereby the degradation of communications quality can be suppressed.

Next, the operation of the digital video receiving unit is described.

FIG. 55 is a flowchart showing the reproducing operation of digital video data.

As shown in FIG. 55, when a relay packet is inputted, first, a synchronous packet is separated by the decapsulation unit 922 shown in FIG. 52 eliminating both a UDP header and an IP header from the relay packet (steps B321 and B322).

In this case, the frame detection unit 941 shown in FIG. 52 judges whether the synchronous packet separated by the decapsulation unit 922 includes the leading part of a video frame as in the frame detection unit 931 (step B323).

If the judgment in step B323 is no, the packet counter 942 increments counter value PC (step B324), and the data length counter 943 refers to the synchronous header of the synchronous packet separated by the decapsulation unit 922 and adds value DM obtained by subtracting the data length of a CIP header from the data length of a data section DL to counter value DS (step B325).

Then, the integrity judgment unit 945 judges whether the counter value PC of the packet counter 942 exceeds threshold value Tha, based on the comparison result of the comparator 944a (step B326).

If the judgment in step B326 is no, the receiving buffer 923 sequentially stores synchronous packets received from the decapsulation unit 922 (step B327).

Then, it is judged whether the input of all the synchronous packets is completed (step B328). If the judgment in step B328 is no, the flow returns to step B321 and starts the reception of a new relay packet.

If in this way, when the synchronous packets of the first network included in the relay packet received via the Internet are sequentially stored in the receiving buffer 923 and a synchronous packet, including the leading part of a new video frame, is inputted, the judgment in step B323 becomes yes.

In this case, the counter value DS of the data length counter 943 indicates the total of the data length of the data section included in a synchronous packet stored in the receiving buffer 923, and one video frame of digital video data consisting of synchronous packets transferred in the first network is regenerated as a series of synchronous packets stored in the receiving buffer 923.

Figure 56A:
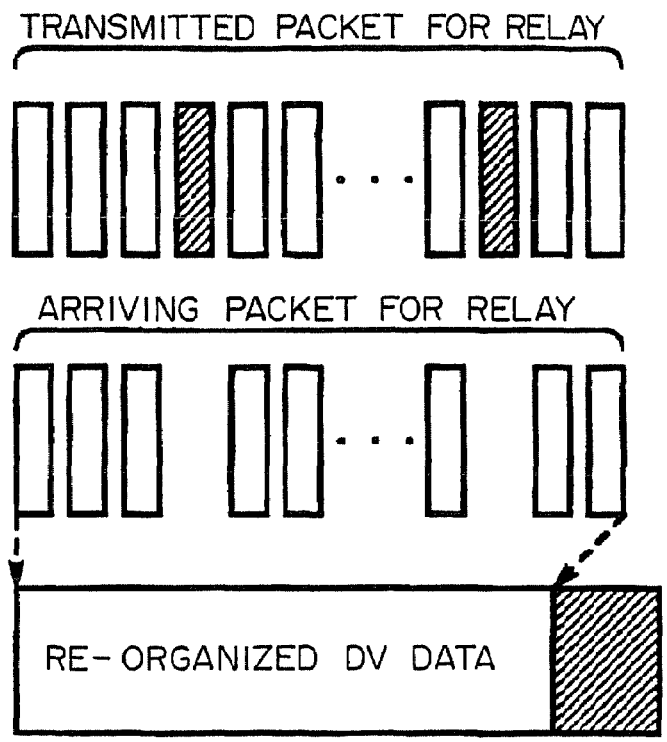

In this case, if a part of one video frame of relay packets transmitted to a transmission route (shown by netting in FIG. 56A) is lost in the transmission route of a relay network (for example, the Internet), as shown in FIG. 56A, one video frame of the digital video data regenerated by the receiving buffer 923 are incomplete.

However, if the number of lost relay packets is small, pictures and voice that are regenerated using incompletely regenerated digital video data maintain allowable quality although they include somewhat noise.

Taking this fact into consideration, the integrity judgment unit 945 judges whether the counter value of the data length counter 943 Ds exceeds threshold value Thb based on the affirmative judgment in step B323 (step B329).

If the judgment is yes, the data reading unit 946 inputs the content of the receiving buffer 923 to the transmitting queue 947 according to an instruction from the integrity judgment unit 945 (step B330), the result output unit 925 selectively transfers the digital video data of a video frame meeting quality standard indicated by threshold value Thb, to the IEEE1394 adapter 1011.

In this case, since a video frame incompletely regenerated due to the loss of a relay packet in a transmission route as well as a complete video frame with 250 synchronous packets are transmitted to the second network, the quality of each video frame degrades.

However, by also transmitting an incomplete video frame, the quality of which can be expected to meet a prescribed standard as described above, a sufficient number of video frames can be transmitted to the second network, regardless of the transmission quality in a transmission route and thereby the overall video/audio quality of enormous numbers of video frames can be guaranteed.

As the threshold value Thb, an appropriate value can be obtained based on both the result of an experiment for checking the quality of a reproduced picture, etc., obtained when several synchronous packets are lost and the loss probability of a relay packet anticipated in a transmission route.

After one video frame of synchronous packets stored in the receiving buffer 923 are outputted in this way, the receiving buffer 923 stores the first synchronous packet received from the decapsulation unit 922 as the leading synchronous packet of a video frame (step B331).

The packet counter 942 and data length counter 943 set initial value 1 and initial value DL as the respective counter values (step B332) and the flow proceeds to step B328, respectively.

However, if the judgment in step B329 is no, the receiving buffer 923 discards a series of stored synchronous packets according to an instruction from the integrity judgment unit 945 (step B333) and then the flow proceeds to step B331.

Figure 56B:
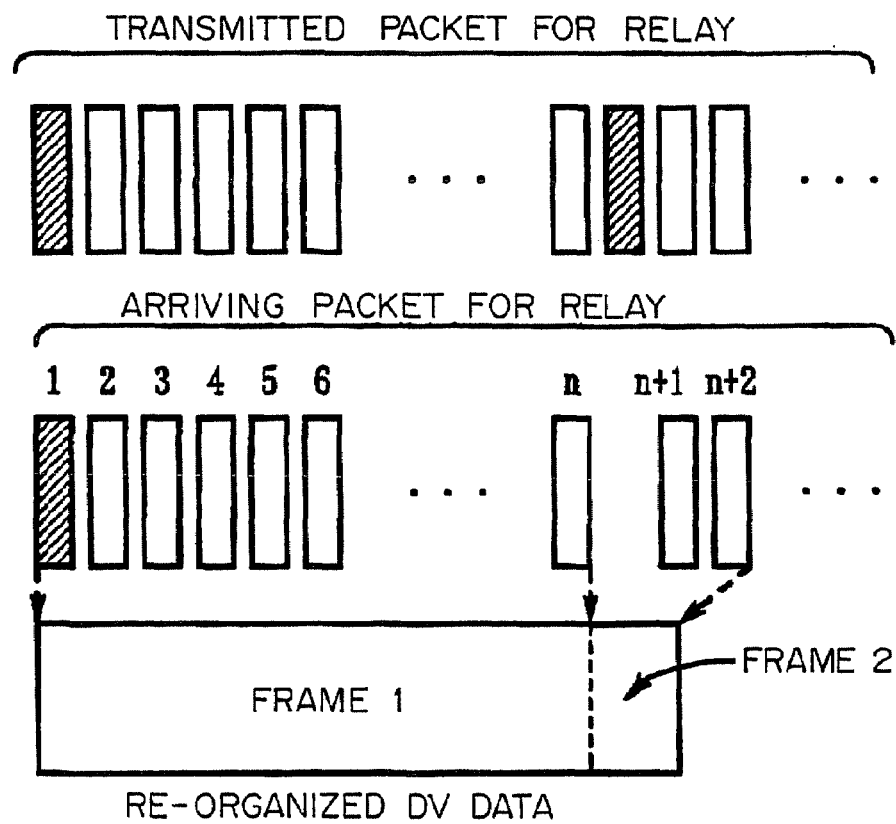

If, as shown in FIG. 56B, a relay packet, including the leading part (shown by netting in FIG. 56B) of a video frame is lost in a transmission route, the counter value PC of the packet counter 942 continues to be incremented based on the number of synchronous packets exceeding the total n of synchronous packets for one video frame to be counted for another video frame.

In this case, since it is considered that two video frames (shown as frames 1 and 2 in FIG. 56B) are stored in an inseparable state, digital video data cannot be regenerated using a series of synchronous packets stored in the receiving buffer 923.

In this case, the integrity judgment unit 945 judges that the judgment in step B326 is yes and the flow proceeds to step B333.

In this case, since in a synchronous transfer mode based on the IEEE1394 standard, a transmitting node inserts an empty packet in order to adjust transmitting timing, the total n of synchronous packets composing one video frame becomes the total of synchronous packets with a data section Ps (hereinafter called a "valid packet") and the number of inserted empty packets and is not constant. However, since the insertion interval of an empty packet is restricted, 20 or emptier packets are never inserted in one video frame.

Therefore, for example, if a value obtained by adding the total Pe of empty packets that can be inserted to the total Ps of valid packets composing one video frame is in advance inputted in the comparator 944a as threshold value Tha, the loss of a synchronous packet, including the leading part of a video frame, can be surely detected.

In this way, an incorrect video frame obtained by combining synchronous packets belonging to two video frames can be eliminated and thereby the influence on the second network of the low transmission quality in a relay network can be reduced.

If the number of packets, excluding empty packets, is counted based on both the detection result of the frame detection unit 941 and the number of inputted synchronous packets, an evaluation process equivalent to that in the integrity evaluation unit 924 described above is possible based on this counter value.

For example, in this case, as shown in FIG. 57, the integrity evaluation unit 924 comprises the packet judgment unit 951 instead of the data length counter 943 shown in FIG. 52, this packet judgment unit 951 judges whether an inputted synchronous packet is valid and the packet counter 942 increments counter value PC based on this judgment result.

In this case, this packet judgment 951 judges whether the synchronous packet is an empty packet, for example, based on information about the data length of a data section indicated in the synchronous header of each synchronous packet.

In this case, the total (Ps=250) of valid packets for one video frame is inputted to the comparator 944a as threshold value Tha, and a value obtained by subtracting the allowable number of lost packets Pd from the total of the correct valid packets Ps described above is inputted to the comparator 944b as threshold value Thb.

Next, the operation of outputting the digital video data regenerated as described above to a serial bus via the IEEE1394 adapter 1011 is described.

FIG. 58 is a flowchart showing the output operation of digital video data. FIG. 59 shows the output operation of digital video data.

At the output start timing of each video frame, which is described later, the rewriting control unit 950 refers to the transmitting queue 947 and judges whether there are digital video data to be transmitted to a serial bus in the transmitting queue 947 (steps B341 and B342).

If, as shown in FIG. 59A, at timing when the output of the (k−1)-th video frame (shown as frame (k−1) in FIG. 59A) is completed the reception of all the synchronous packets composing the k-th video frame (shown as frame (k) in FIG. 59A) is completed. In this case, if one video frame of digital video data with allowable quality are regenerated, as described above, a series of synchronous packets stored in the receiving buffer 923 are inputted to the transmitting queue 947 by the data reading unit 946 shown in FIG. 52.

If in this way, the transmitting queue 947 is updated by new digital video data, the rewriting control unit 950 judges that the judgment in step B342 is yes and instructs the output buffer 949 to rewrite the content (step B343). Then, the output buffer 949 receives the series of synchronous packets stored in the transmitting queue 947 and stores the packets as an output target (step B344).

In this case, when in step B345 the data output unit 948 performs an output operation to the IEEE1394 adapter 1011, the synchronous packets composing the k-th video frame (shown as frame (k) in FIG. 59A) are sequentially outputted to a serial bus.

When in this way, the output of one video frame of digital video data is completed, the data output unit 948 notifies the rewriting control unit 950 of the arrival of the output start timing of a new video frame (step B346) and terminates the output operation of this video frame.

For example, if the transmission interval of relay packets is adjusted following the thinning-out process of a video frame on the transmitting side or if the arrival of relay packets is delayed due to the fluctuation of transfer delay in a transmission route via the Internet, as shown in FIG. 59B, there is a possibility that the reception of all the synchronous packets composing a subsequent video frame (shown as frame (k) in FIG. 59B) may not be completed at timing when the outputting operation of the previous video frame (shown as frame (k−1) in FIG. 59B) to a serial bus.

If many relay packets are lost in a transmission route, it is judged that the quality of digital video data regenerated in the receiving buffer 923 is below the allowable value and the series of synchronous packets stored in this receiving buffer 923 are not outputted and discarded.

In such a case, since the transmitting queue 947 is not updated by new digital video data, the rewriting control unit 950 judges that the judgment in step B342 is no and skips the rewriting process of the output buffer 949.

In this case, since there are the data of an immediately previous video frame in the output buffer 949, as shown in FIG. 59B, the data output unit 948 outputs the series of synchronous packets outputted in the immediately previous video frame (shown as frame (k−1) in FIG. 59B) to the IEEE1394 adapter 1011 again (step B345).

In this way, if the new digital video data inputted to the transmitting queue 947 are transmitted to the IEEE13294 adapter and new digital video data cannot be obtained in synchronization with the transmission timing of a new video frame, the series of synchronous packets transmitted in the immediately previous video frame can be reused.

In this way, a specified number of video frame based on the IEEE1394 standard can be surely transmitted to a serial bus, regardless of both a thinning-out process on the transmitting side and transmission quality in a transmission route and thereby digital video data, from which high-quality pictures and voice can be reproduced as a whole can be regenerated.

As described above, by the digital video transmitting unit 911 of the relay device 910s that is installed as a node belonging to the first network, digital video data consisting of a series of synchronous packets transferred in an IEEE1394 mode in the first network can be relayed to the relay device 919r installed as a node belonging to the second network via a relay network (for example, the Internet) as a series of relay packets. By the digital video receiving unit 921 of this relay device 910r, digital video data can be regenerated from this series of relay packets and can be transmitted to the second network.

In this way, by relaying relay packets between the physically independent first and second networks via a relay network, a data communications system for transmitting synchronous packets transmitted by a node belonging to the first network to a node belonging to the second network can be implemented regarding the first and second networks described above as one virtual network.

The data communications system of the present invention is applicable not only to the relay between networks connected by a serial bus based on the IEEE1394 standard, but also to the relay between networks where digital data with the existing structure in each transfer unit with a prescribed format are transferred.

For the relay network, not only the Internet, but also a network based on a datagram type communication protocol.

FIGS. 60A through 60C show problems caused by the actual application of the preferred embodiments described earlier.

In an actual practice, not only a series of single communications data, but also a plurality of related communications data are requested to be transferred. Specifically, since a series of communications data require a very broad band, the series of communications data must be divided into a plurality of pieces of communications data, each piece of data must be transmitted via a different network route and the plurality of pieces of divided communications data must be synchronized and united (FIG. 60B), if the data cannot be transferred via one route of a network (FIG. 60A). There are also a case where the video data of a multi-channel picture, such as a three-dimension picture, etc., are transferred from a plurality of video sources and a case where pictures and voice from a plurality of points are synchronized on the receiving side at a network conference (FIG. 60C).

In the preferred embodiments described earlier, a method in which the transmitting side transfers a series of communications data (digital video data) after attaching a sequence number or an identification code that features data to the data and the receiving side properly processes the data after arraying the data by referring to the sequence number or the identification code and detecting the redundancy/loss of data, is described. However, according to this method, since the following means are not provided, problems occur when the method is actually applied.

A) A method for transferring a series of communications data via different routes B) A method for relating a plurality of pieces of communications data to one another and synchronizing the data with one another FIG. 61 shows the general configuration of the "relay device". Although this relay device can actually transmit and receive data simultaneously, in the description of the present invention it is assumed that the relay device simply transmits or receives data at one time.

When DV data are transmitted from the transmitting side, in a relay device 1100, an IEEE1394 adapter 1111 receives the data and terminates the line. Then, the received DV data are inputted to a DV→DV/IP conversion circuit 1112, the format of the DV data is converted into a format required to be transmitted to the Internet and the data is inputted to an Internet adapter 1114. The Internet adapter 1114 transmits the converted data to the Internet.

Conversely, if the Internet adapter 1114 receives an IP packet accommodating DV data from the Internet, the IP packet is inputted to a DV/IP→DV conversion circuit 1113, the IP packet is converted into DV data and the DV data are inputted to the IEEE1394 adapter 1111. The DV data are transmitted to a destination terminal and are displayed on the terminal.

FIG. 64 shows the problems of the preferred embodiments described earlier.

For example, if on the transmitting side, two channels of video data are multiplexed and are transmitted to the Internet, and if on the receiving side, the two channels of video data are separated and each channel of video data is viewed, in the relay device 1120 on the transmitting side, video data from the sender of video channel 1 and video data from the sender of video channel 2 must be united and transmitted to a receiving side relay device 1121 via the Internet. However, in this case, approximately 70 to 80 Mbps of band for transfer is required for the Internet to transfer the two channels of video data. However, it is difficult to secure such a broad band. According to the protocol of the Internet, these two channels of video data are automatically divided into a plurality of pieces of data and are transferred within the Internet. On the receiving side, the receiving side relay device 1121 composes the plurality of pieces of split data and then they are broken down into each channel.

FIG. 63 shows the split communications of DV.

Split communications means communications where one piece of communications data are divided into a plurality of pieces of communications data, the plurality of pieces of divided communications data are transmitted and on the receiving side the plurality of pieces of divided communications data are united into one piece of communications data. Specifically, approximately 70 to 80 Mbps of band is required for one relay device to unite two channels of three-dimension video data, each channel of which is DV data, and to transfer the data on the Internet as one piece of communications data. If there is a broad communications band sufficient to conduct such communications, there is no problem. However, if there is no such band, communications cannot be conducted.

Although there are generally a plurality of routes connecting a sender and a receiver in a network, communications can be implemented by dividing one piece of communications into a plurality of pieces of communications, distributing the plurality of pieces of divided communications among the plurality of different routes and transmitting the communications, if the total of the respective bands of the plurality of routes exceeds a required communications band.

Figure 2:
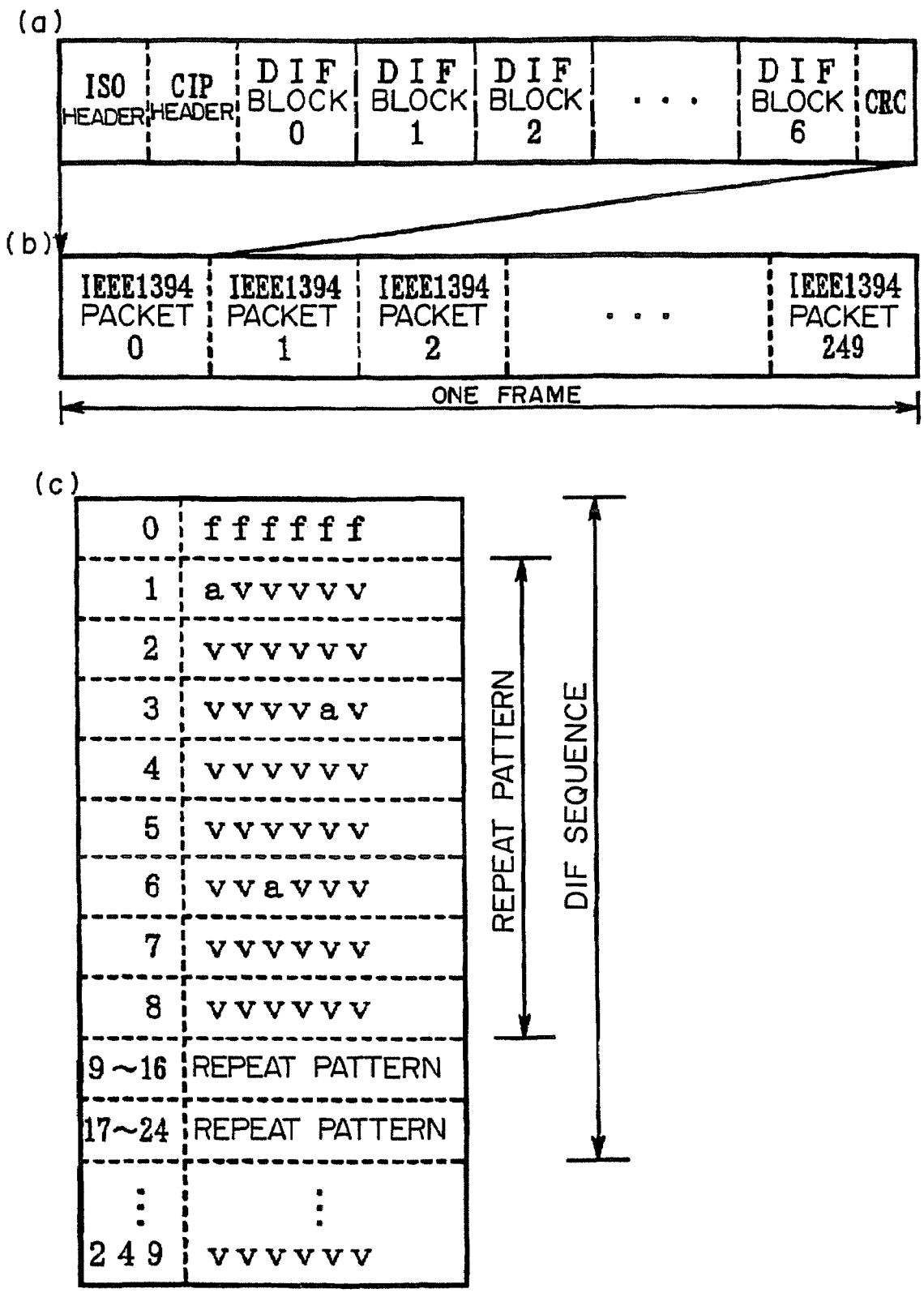
FIG. 2 shows a data structure in the case where DV data are transferred in an IEEE1394 synchronous mode.
Figure 3:
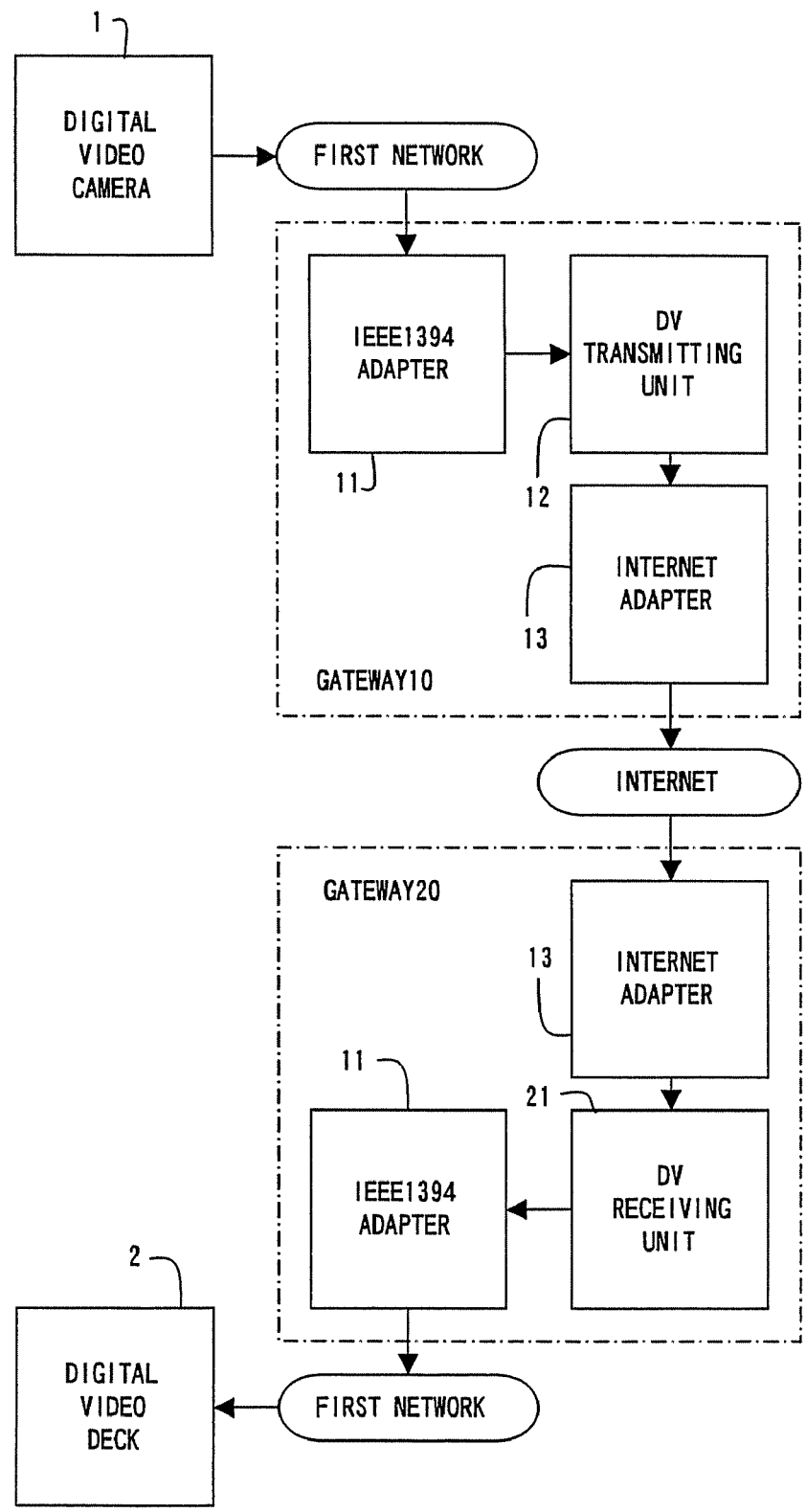
FIG. 3 shows a system configuration used in an animation communications experiment.
Figure 4:
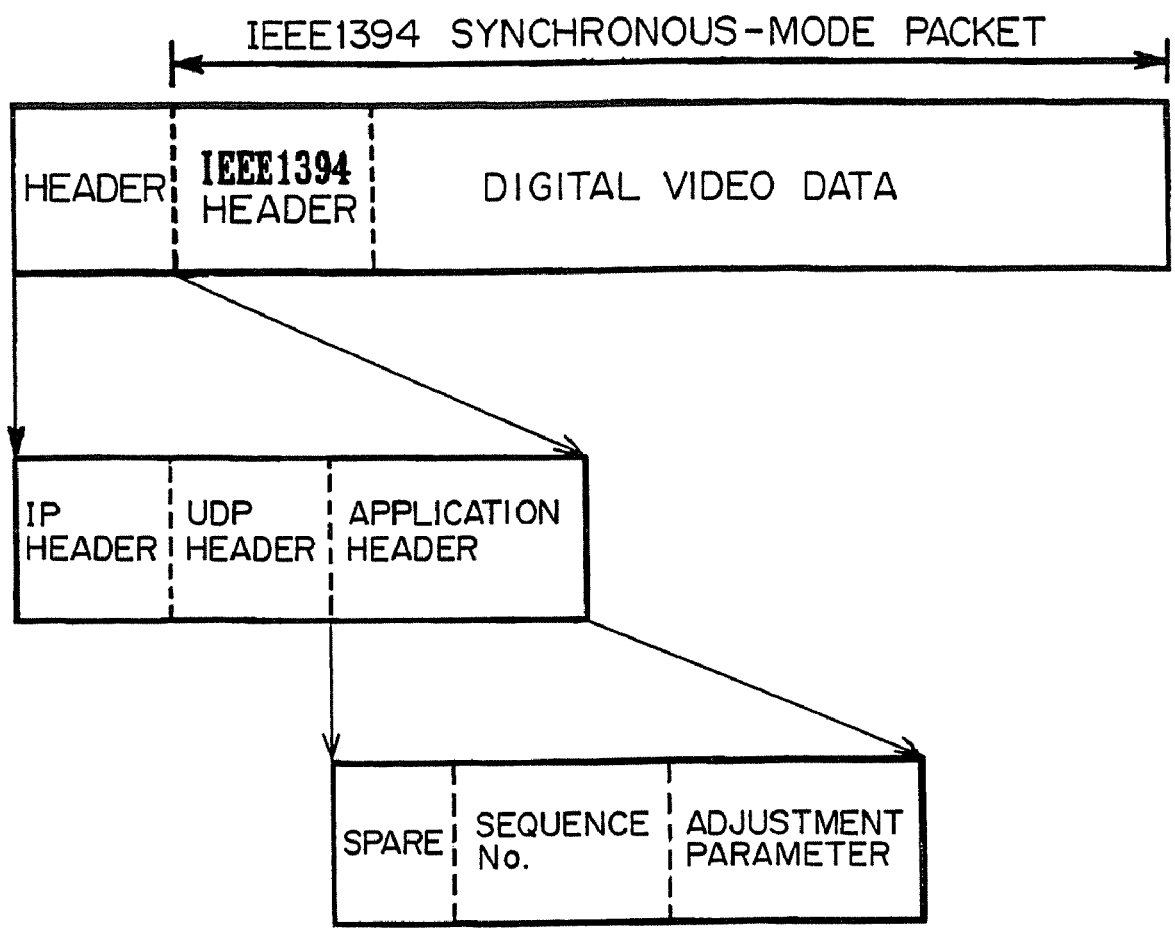
FIG. 4 shows a format in the case where DV data are transmitted using a UDP.

FIG. 2 shows the transmitting relay device in one preferred embodiment of the present invention.

In a related patent, a frame number, sequence number, etc., are provided as identifiers, and the receiving side performs the recognition process of communications data using these identifiers. In the preferred embodiment of the present invention, to implement split communications, an identifier for identifying data, such as a "channel number", a "data generation time", the "existence/non-existence of audio data", the "existence/non-existence of video data", etc., are newly added as the additional information of the related patent. On the receiving side, data are synchronized and united using these identifiers and the identifiers disclosed in the related patent.

The DV data of channels 1 and 2 that are inputted to an IEEE1394 adapter 1201 are composed and a DV→DV/IP conversion device 1202 maps the data from a DV data format into an IP format. Then, a communications division device 1203 divides the DV data as described below and transmits the data to the Internet via Internet adapters 1204-1 and 1204-2.

A communications data division device 1203 divides communications data into a plurality of pieces of communications data and attaches the identifiers. For a method for dividing communications data, for example, in the case of digital video data the following methods are used.

A) A method for dividing data into video data and audio data
B) A method for dividing data by a frame number, such as a pair of an odd frame and an even frame
C) A method for dividing data by a channel number
D) A method for dividing data by a sequence number
E) A method for dividing data by time information, such as an origination time, a data generation time, etc.

In this way, data can be arbitrarily divided only if an identifier can identify the split data.

As a method for designating a different route for each divided communications on the transmitting side, there are publicly known technologies, such as a technology to designate a source route and to transmit a packet, a technology to apply a multi-home to the receiving side, that is, assigning a plurality of addresses to the receiving side, etc.

The preferred embodiments of the present invention presume these technologies.

FIG. 65 shows the communications delay adjustment process of a receiving relay device in the case of a single sender.

In a receiving relay device 1214, when Internet adapters 1210-1 and 1210-2 receive data divided and transmitted from the Internet, a communication data unification device 1211 unites the plurality of pieces of divided communications data into one piece of communications data, and a DV/IP→DP conversion device 1212 extracts DV data from the DV data mapped into an IP format and transmits the DV data to DV data display devices 1215-1 and 1215-2 via an IEEE1394 adapter 1213. At this moment, the DV data display devices 1215-1 and 1215-2 extract the respective channels from the DV data.

In split communications, since a single sender can attach an arbitrary identifier on a specific basis, communications delay can be adjusted by referring to this identifier on the receiving side. This can be implemented by adding a communications data unification device 1211 with a communications data unification function to the configuration of the related patent.

The communications data unification device 1211 checks the order, loss and redundancy of communications data using the identifier that is a single queue and is attached in the preferred embodiment of the present invention in addition to a method disclosed in the related patent, as in the frame buffer provided in the preferred embodiment describe earlier.

FIG. 66 shows the communications delay adjustment function in the case of a plurality of senders.

If each of a plurality of senders prepares and transmits communications data, the following means is used as a method for uniting the plurality of pieces of communications data.

A) A plurality of senders are synchronized and an identifier is attached as in case a single sender transmits data.

For example, in FIG. 66, sender 1220-1 that receives the transmitting data of video channel 1 and sender 1220-2 that receives the transmitting data of video channel 2 exchange synchronization information between them. In this way, two pieces of transmitting data are synchronized and transmitted.

As synchronization means between the plurality of senders, there is a method for notifying one another of respective identifiers attached in the preferred embodiment of the present invention. For example, by notifying one another of respective sequence numbers, a unique sequence number can be obtained, if the sequence numbers are not overlapped. Therefore, the respective data can be united.

FIG. 67 shows the configuration of a transmitting relay device for synchronizing and transmitting data using a sequence number.

DV→DV/IP conversion devices 1226-1 and 1226-2 map the respective DV data of channels 1 and 2 independently received by IEEE13294 adapters 1125-1 and 1225-2, respectively, of respective transmitting relay devices into IP formats, and identifier addition units 1227-1 and 1227-2 attach sequence numbers the respective data. At this moment, synchronization devices 1228-1 and 1228-2 notify each other of respective sequence numbers to be used and prevent the same sequence number from being used. Respective data with sequence numbers attached in this way are transmitted to Internet adapters 1229-1 and 1229-2.

FIG. 68 shows the configuration of a device for synchronizing and uniting a plurality of pieces of communications data of a plurality of senders.

Another method for uniting a plurality of pieces of communications data on the receiving side is as follows.

B) A plurality of senders independently prepare and transmit respective communications data and the plurality of pieces of communications data are united on the single receiving side.

In a video conference conducted among a plurality of points, sometimes senders are located far away from one another and there is no means for synchronizing the plurality of senders. In such a case, the senders must be synchronized only on the receiving side. For example, if a plurality of senders store and transmit respective "data origination time" or "data generation time" in identifiers, the senders can be synchronized by comparing the plurality of pieces of time on the receiving side. In this case, if the respective time of the clocks of the plurality of senders are set using a GPS (Global Positioning System), the plurality of senders can be synchronized by using the absolute time. Even if the absolute time cannot be obtained, the plurality of senders can be synchronized by designating difference in local time for a receiver since the difference in local time between senders 1 and 2 is constant.

FIG. 69 shows another configuration for synchronizing and uniting a plurality of pieces of communications data from a plurality of senders on the receiving side.

Another method for uniting a plurality of pieces of communications data on the receiving side is as follows.

C) If there are a plurality of receivers, a plurality of senders independently prepare and transmit respective communications data and a plurality of receivers are synchronized and united on the receiving side.

In this case, by notifying one another of the identifiers of respective processed communications data a plurality of independent receivers are synchronized. For example, the synchronization can be performed when audio data are generated in a state without audio data. In this case, an empirical law that timing when a picture starts generally matches timing when a state without audio data shifts to a state with audio data, is used. Similarly, variations, such as synchronizing when a state without video data shifts to a state with video data, synchronizing using a specific video/audio data pattern, etc., can also be used.

FIG. 70 shows the configuration of a receiving relay device used in the case of a plurality of senders.

The synchronization units 1231-1 and 1231-2 of the receiving relay device synchronize respective communications data inputted from the Internet to Internet adapters 1230-1 and 1230-2 and DV/IP→DV conversion devices 1233-1 and 1233-2 extract respective DV data from respective IP formats. In the synchronization units 1231-1 and 1231-2, synchronization devices 1232-1 and 1232-2 notify each other of synchronization timing, and the synchronization units 1231-1 and 1231-2 synchronize the two pieces of communications data. IEEE1394 adapters 1234-1 and 1234-2 transmit the respective communications data that are synchronized and converted into DV data to a display terminal as DV data.

FIG. 71 shows the synchronous configuration in the case of a plurality of senders and a plurality of receivers.

Another method for uniting a plurality of communications data on the receiving side is as follows.

D) If there are a plurality of receivers, a communications data synchronization mechanism is provided outside the receivers and the mechanism adjusts and synchronizes a plurality of receivers.

For example, synchronization can be implemented by a human being observing video display and setting respective communications delay to each receiver. According to the preferred embodiment described earlier, once communications delay is set, the delay is maintained after that time. Therefore, if at first, respective communications delay are set to a plurality of receivers, the synchronization can be maintained after that time. There are a variety of variations using such an external synchronization device.

FIG. 72 shows the configuration of a receiving relay device using the synchronization device.

When independently receiving DV data from the receiving relay device, display devices 1240-1 and 1240-2 perform synchronizing operations using the synchronization device by the method described above, transfer the results to the synchronization unit of the receiving relay device and synchronize the two independent DV data.

The split communications in the preferred embodiment of the present invention implements a stable communications by distributing broadband communications among a plurality of routes and making the total of the bands of the plurality of routes exceed a band required by the broadband communications. However, the effective available band of a route is affected by other communications that share a communications link with the communications and compose the route and it dynamically varies. In this case, as a result, sometimes there is a sudden shortage in a band although the band has been considered to be sufficient. Sometimes, conversely, a route becomes free although the route has been considered to have no room in band.

FIGS. 73 and 74 show the influence on split communications of the dynamic change of an effective available band.

For example, in the case of FIG. 73 (initial state), more split data should be distributed to route A than those distributed to route B. However, when the state of a network changes and the state shown in FIG. 74 appears, conversely, more split data should be distributed to route B than those distributed to route A. In other words, if the division ratio can be modified based on the state of a network (effective available band), stable communications can be implemented.

In this case, since communications data can be divided in an arbitrary ratio using a frame number or a sequence number, it is sufficient if an effective band for each route can be found in addition. Although generally it is difficult to directly measure an effective available band, the effective available band can be estimated if a network state is monitored and information is collected by providing a network information collection device. If as a result, the total of estimated effective available bands is less than a required band, the number of division is increased and data are also delivered via another new route.

FIG. 75 shows the configuration of a transmitting relay device for dynamically modifying a division method using network information.

An IEEE1394 adapter 1250 receives the two pieces of DV data of channels 1 and 2 received from two DV display devices and combines them into one piece of DV data. Then, a DV→DV/IP conversion device 1251 maps the DV data into an IP format. Then, the DV data mapped into an IP format are inputted to communications data division device 1253 and divided using the additional information described earlier. At this moment, the network information collection device 1252 obtains the available band information of the network from the management information of the network and notifies the communications data division device 1253 of the information. The communications data division device 1253 determines how to distribute a band among channels and divides the communications data. The divided communications data are transmitted to the Internet via Internet adapters 1254-1 and 1254-2.

For the network information that can be used for the band estimation, the followings are used.

1 A) The packet loss ratio of a route
1 B) Packet data amount passing through a network interface on the transmitting side, etc.

In A), for example, if a packet loss ratio is 20% in a state where 50 Mbps of divided broadband data are distributed via one specific route, the effective available band can be estimated to be 50×(1−0.2)=40 Mbps. As a method for measuring the packet loss ratio, there is means for a receiver measuring a packet loss ratio using a sequence number attached to synchronous data and feeding back the information to the transmitting side, as disclosed in the related patent.

In B), the data amount of the target divided broadband communications that passes through a transmitting side network interface is checked and is regarded as an effective available band without any process. According to this method, even if a network interface unit is bottlenecked or overflowed, an effective available band can be accurately estimated. However, in other cases, B) is inferior to A) in accuracy. However, since it is said that in the Internet, packet loss occurs in a link closest to a transmitting host or a receiving host, a nearly accurate estimation can also be expected to be obtained even by this method. Although in A) information exchange between the receiving and transmitting sides is required to obtain information, in B) information can be obtained just on the transmitting side.

In the dynamic split communications, it is preferable to rapidly reflect obtained network information on the division principle. However, conversely, if the information is reflected although there is no major change in the network information, overhead due to the modification of the division principle increases and sometimes performance degrades.

For example, it is assumed that the originally required band of broadband communications is 100 Mbps and an effective available band (or the estimation value) in the case where data communications are distributed between two routes fluctuates between 99 to 101 Mbps. In this case, the effective available band decreases to 99 Mbps, band shortage occurs, another new route is searched for and data are distributed via the route. However, if the effective available band increase to 101 Mbps, the third route is cancelled. In this case, route search must be frequently made. In this case, by reflecting no minor change of network information on the data division principle, this phenomenon can be avoided.

FIG. 76 shows the configuration of a transmitting relay device for preventing a minor change in network information from being reflected on a data division principle.

First, the transmitting relay device comprises a network information evaluation unit 1265 for storing in advance network information obtained immediately before and digitizing the difference between the stored network information and newly obtained network information and a network information judgment unit 1266 for judging whether the difference exceeds a specific threshold value. An instruction from a network information collection unit 1264 to a communications division device 1262 is masked based on the output result of the network information judgment unit 1266. For a method for digitizing network information, the raw numeric value of an effective available band obtained from the network information can be used. If fluctuations in the effective available band exceed the threshold value, the data division method is modified. In this case, if the effective available band is narrower than the required band, the data division method can be promptly modified and if the effective available band is broader than the required band, the data division method can be slowly modified. Specifically, if the effective available band is narrower than the required band, the data division method is promptly modified since communications data cannot be completely transmitted and communication quality degrades. If the effective available band is broader than the required band, data division method is slowly modified since there is no degradation of communications data. This can be implemented by modifying the threshold value of the network information judgment unit 1266 depending on the increase/decrease of the band.

In a reliable network, such as the Internet, sometimes the network state instantaneously degrades and immediately returns to a stable state. Specifically, since the network information collection unit 1264 picks up this instantaneous fluctuation of a network state and response to this leads to the degradation of performance, the system can also be configured so that the division principle is modified only when the network state fluctuates for a somewhat long time.

This can be implemented as follows. First, a transmitting reply device comprises a network information evaluation unit 1265 for storing in advance network information based when the current communications data division principle is determined and digitizing the difference between the stored network information and newly obtained network information, and a network information judgment unit 1266 for judging whether the difference exceeds a specific threshold value. Then, the network information judgment unit 1266 is configured to prevent an instruction from being delivered from the network information collection unit 1264 to the communication data division device as a rule by masking the instruction and to release the mask only when the difference exceeds the threshold value a plurality of consecutive times predetermined in the network information judgment unit 1266. Then, simultaneously, the reference network information is updated.

FIG. 77 shows the detailed configuration of the data communications system.

Each of two relay devices 1330 and 1332 comprises an IEEE12394 adapter 1335 and the two relay devices 1330 and 1332 are connected to the first and second networks, respectively, via this IEEE1394 adapter 1335.

Each of the relay devices 1330 and 1332 further comprises an Internet adapter 1339 and is connected to the Internet via this Internet adapter 1339.

The DV/IP transmitting unit 1331 shown in FIG. 77 comprises an encapsulation unit 1337 for IP-encalsulates IEEE1394 packets received via the IEEE1394 adapter 1335 by a predetermined method, a packet redundancy transmitting unit 1338 for receiving the packets IP-encapsulated by the encapsulation unit 1337 and transmitting the packets to the Internet adapter 1339 after overlapping a part of the packets by a predetermined method.

FIG. 78 shows the configuration for synchronizing a plurality of pieces of data using additional information and receiving the data on the receiving side.

FIG. 78 shows the configuration for synchronizing a plurality of pieces of data using additional information in the receiving side relay device 1402. A sender 1400 divides communications data into a plurality of pieces of data, attaches additional information to each piece of the data and transmits the plurality of pieces of data to the Internet 1401. The divided data are inputted to the receiving relay device 1402 following a plurality of network routes of the Internet 1401. The relay device 1202 extracts additional information from the received data and analyzes the content of the additional information. Then, a writing control unit 1404 controls the writing of the data into a receiving buffer 1405 based on the content of the additional information. For example, if additional information is about a "channel number", the writing control unit 1404 controls to distribute data via a different buffer for each channel. If additional information is about an "origination time" or a "data generation time", the writing control unit 1404 inputs a plurality of pieces of data with the same setting time as additional information to the receiving buffer at the same timing and outputs the plurality of pieces of data from the receiving buffer 1405 at the same timing. If additional information is about "existence/non-existence of audio data" or "existence/non-existence of video data", the writing control unit 1404 controls to match the input timing to the receiving buffer 1405 or the output timing from the receiving buffer 1405 of data packets in which information about the existence/non-existence of audio or video data varies.

What is claimed is:

1. A system for conducting communications using a plurality of network routes with different communications delay, comprising:

a transmitting unit transmitting a plurality of split communications data with additional information for split communications; and a receiving unit uniting, synchronizing and receiving the plurality of split communications data based on the additional information, and wherein each of a plurality of senders has said transmitting unit, independently transmits communications data, each of a plurality of receivers having said receiving unit comprises a synchronization unit adjusting a synchronization state by observing a reproduction state of receiving data and secures synchronization of communications data by adjusting the synchronization by said synchronization unit.

2. The system according to claim 1, wherein the additional information is one of a channel number of communications data, an origination time of communications data and a generation time of communications data.

3. The system according to claim 1, wherein existence/non-existence of specific data, including voice, pictures, or information about a specific pattern is used for the additional information.

4. The system according to claim 1, wherein said transmitting unit divides communications data into a plurality of split data and transmits the split data via a plurality of network routes.

* * * * *

UNITED STATES PATENT AND TRADEMARK OFFICE
CERTIFICATE OF CORRECTION

PATENT NO. : 7,746,906 B2
APPLICATION NO. : 11/456237
DATED : June 29, 2010
INVENTOR(S) : Akira Jinzaki et al.

It is certified that error appears in the above-identified patent and that said Letters Patent is hereby corrected as shown below:

IN THE SPECIFICATIONS:
Column 1, Line 7, change "pending," to --U.S. Patent No. 7,133,407,--.

Signed and Sealed this

Second Day of November, 2010

David J. Kappos
*Director of the United States Patent and Trademark Office*